US012766553B2

(12) United States Patent
Kim et al.

(10) Patent No.: US 12,766,553 B2
(45) Date of Patent: Oct. 20, 2026

(54) APPARATUS HAVING CURVED VIBRATION APPARATUS

(71) Applicant: LG Display Co., Ltd., Seoul (KR)

(72) Inventors: Taehyung Kim, Paju-si (KR); GyungBo Ha, Paju-si (KR); SeulKi Nam, Paju-si (KR); Saseong Moon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1178 days.

(21) Appl. No.: 17/735,012

(22) Filed: May 2, 2022

(65) Prior Publication Data

US 2022/0371051 A1 Nov. 24, 2022

(30) Foreign Application Priority Data

May 4, 2021 (KR) ........................ 10-2021-0057923
Dec. 31, 2021 (KR) ........................ 10-2021-0194809
Mar. 24, 2022 (KR) ........................ 10-2022-0036809

(51) Int. Cl.
*B06B 1/06* (2006.01)
*H04R 1/28* (2006.01)

(52) U.S. Cl.
CPC .............. *B06B 1/06* (2013.01); *H04R 1/2811* (2013.01); *H04R 2400/03* (2013.01); *H04R 2499/15* (2013.01)

(58) Field of Classification Search
CPC ..... B06B 1/06; H04R 1/2811; H04R 2400/03; H04R 2499/15; H04R 2499/13; H04R 1/26; H04R 7/045; H04R 1/02; H04R 1/24; H04R 1/2803; H04R 17/005; H04R 7/04; H04R 1/345; H04R 5/027; H04R 2499/11
See application file for complete search history.

(56) References Cited

U.S. PATENT DOCUMENTS 10,782,740 B2 9/2020 Kim et al.
11,064,274 B2 7/2021 Kim
2012/0162143 A1* 6/2012 Kai ..................... H04M 1/0266 345/177
2014/0079255 A1* 3/2014 Ando ..................... H04R 7/045 381/190
2015/0341714 A1* 11/2015 Ahn ....................... H04R 7/045 381/333
2018/0356926 A1 12/2018 Park et al.
2019/0028669 A1* 1/2019 Shin ..................... H10K 50/841
(Continued)

FOREIGN PATENT DOCUMENTS

CN 105096778 A 11/2015
CN 109391889 A 2/2019
(Continued)

OTHER PUBLICATIONS

Office Action dated Mar. 3, 2023, issued in TW Patent Application No. 111116524.
(Continued)

*Primary Examiner* — Dominick L Plakkoottam
(74) *Attorney, Agent, or Firm* — Morgan, Lewis & Bockius LLP

(57) ABSTRACT

An apparatus may include a vibration member, a supporting member at a rear surface of the vibration member, and a vibration apparatus. The vibration apparatus may be disposed at the supporting member and may include a curved shape.

39 Claims, 45 Drawing Sheets

(56) References Cited

U.S. PATENT DOCUMENTS

| | | | | |
|---|---|---|---|---|
| 2020/0120304 | A1 | 4/2020 | Shin et al. | |
| 2020/0209973 | A1 | 7/2020 | Kim et al. | |
| 2020/0213699 | A1* | 7/2020 | You | H04R 1/028 |
| 2020/0280796 | A1 | 9/2020 | Lee et al. | |
| 2020/0314551 | A1 | 10/2020 | Kim | |
| 2021/0006879 | A1 | 1/2021 | Kim et al. | |
| 2021/0026590 | A1* | 1/2021 | Nam | B60K 35/26 |
| 2021/0383660 | A1* | 12/2021 | Kim | G08B 6/00 |

FOREIGN PATENT DOCUMENTS

| | | | |
|---|---|---|---|
| CN | 110830887 | A | 2/2020 |
| CN | 111754891 | A | 10/2020 |
| EP | 2947857 | A2 | 11/2015 |
| EP | 3439323 | A1 | 2/2019 |
| EP | 3613514 | A1 | 2/2020 |
| JP | 2004208130 | A | 7/2004 |
| JP | 2015219528 | A | 12/2015 |
| JP | 2019-174500 | A | 10/2019 |
| JP | 2020109933 | A | 7/2020 |
| JP | 2020145674 | A | 9/2020 |
| JP | 2021-012372 | A | 2/2021 |
| JP | 2021-018436 | A | 2/2021 |
| KR | 10-2019-0009188 | A | 1/2019 |
| KR | 10-2020-0021392 | A | 2/2020 |
| TW | 201545559 | A | 12/2015 |
| TW | 201721387 | A | 6/2017 |
| TW | 202118114 | A | 5/2021 |

OTHER PUBLICATIONS

Office Action issued in corresponding Chinese Patent Application No. 202210480009.1, dated Mar. 13, 2025. (Note: US 2020/0213699 A1 was previously cited.).

European Search Report from Application No. EP22171193 dated Oct. 10, 2022, 7 pages.

Office Action dated Jun. 1, 2023, issued in JP Patent Application No. 2022-076199, 6 pages.

Office Action issued in corresponding Japanese Patent Application No. 2024-062743, dated Mar. 4, 2025. (Note: JP 2015-219528 A and JP 2004-208130 A were previously cited.).

* cited by examiner

23L: 23L1, 23L2 24: 24A, 24B1, 24B2 : WS 25-4: 25Q

APPARATUS HAVING CURVED VIBRATION APPARATUS

CROSS-REFERENCE TO RELATED APPLICATIONS

This application claims the benefit of and priority to Korean Patent Application No. 10-2021-0057923 filed on May 4, 2021, No. 10-2021-0194809 filed on Dec. 31, 2021, and No. 10-2022-0036809 filed on Mar. 24, 2022, the entirety of each of which is incorporated herein by reference for all purposes.

BACKGROUND

1. Technical Field

The present disclosure relates to an apparatus, including, without limitation, an apparatus for outputting a sound.

2. Discussion of the Related Art

Apparatuses, for example, display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel for displaying an image and a sound apparatus for outputting a sound associated with the image. In addition, in display apparatuses, because a sound output from a sound apparatus may travel in a rearward or a downward direction of the display panel, sound quality may be degraded due to interference among sound waves reflected from walls and the floor. For this reason, it may be difficult to transfer an accurate sound, and an immersion experience of a viewer may be reduced.

The description provided in the background section should not be assumed to be prior art merely because it is mentioned in or associated with the background section. The background section may include information that describes one or more aspects of the subject technology.

SUMMARY

The inventors of the present disclosure have recognized problems of the display apparatuses described above, have performed various experiments, and developed a new invention so that, when a user in front of a display panel is watching an image, a traveling direction of a sound is a forward direction of the display panel. Thus, sound quality may be enhanced. Thus, the inventors have invented a display apparatus having a new structure, which may generate a sound traveling in a forward region of the display panel, thereby enhancing sound quality. Accordingly, embodiments of the present disclosure are directed to an apparatus that substantially obviates one or more problems due to limitations and disadvantages of the related art.

One or more aspects of the present disclosure are directed to provide an apparatus and a vibration apparatus for improving sound quality and increasing an immersion experience of a viewer, and a vehicular apparatus including the same.

One or more aspects of the present disclosure are directed to provide an apparatus (or a display apparatus) and a vibration apparatus where a sound characteristic and/or a sound pressure level characteristic may be enhanced, and a vehicle including the same.

One or more aspects of the present disclosure are directed to provide an apparatus (or a display apparatus) and a vibration apparatus where a sound characteristic and/or a sound pressure level characteristic in a low-pitched sound band may be enhanced, and a vehicle including the same.

One or more aspects of the present disclosure are directed to provide an apparatus (or a display apparatus), a vibration apparatus, and a vehicle including the same, each of which may generate a sound in a forward direction of a vibration member by using a vibration member as a sound vibration plate.

Additional features and aspects will be set forth in part in the description that follows and in part will become apparent from the description or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the present disclosure, as embodied and broadly described herein, an apparatus may include a vibration member, a supporting member at a rear surface of the vibration member, and a vibration apparatus at the supporting member and including a curved shape.

In one or more aspects of the present disclosure, an apparatus may include a supporting member including a curved portion, and a vibration apparatus at the curved portion.

In one or more aspects of the present disclosure, an apparatus may include a passive vibration member, and a vibration generating apparatus connected to the passive vibration member and configured to vibrate the passive vibration member, and the vibration generating apparatus may include an apparatus including a supporting member having a curved portion and a vibration apparatus at the curved portion.

An apparatus according to an example embodiment of the present disclosure may improve sound quality and may increase an immersion experience of a viewer.

The apparatus according to an example embodiment of the present disclosure may generate or output a sound in a forward direction of a display panel by the display panel as a vibration plate.

The apparatus according to an example embodiment of the present disclosure may enhance a sound characteristic and/or a sound pressure level characteristic of a sound.

The apparatus according to an example embodiment of the present disclosure may enhance a sound characteristic and/or a sound pressure level characteristic of a sound of a low-pitched sound band.

The apparatus according to an example embodiment of the present disclosure may output a stereo sound, a stereophonic sound, or a multi-channel sound having an enhanced sound pressure level characteristic.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain the principle of the disclosure.

Figure 1:
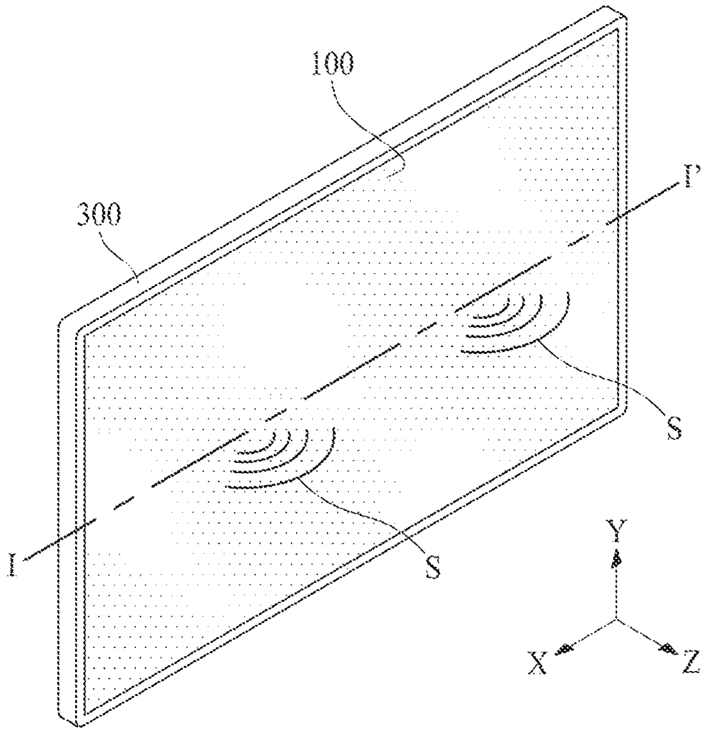
FIG. 1 illustrates an apparatus according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Same reference numerals designate same elements throughout. Names of the respective elements used in the following explanations are selected only for convenience of writing the specification and may be thus different from those used in actual products.

Advantages and features of the present disclosure, and implementation methods thereof, will be clarified through following embodiments described with reference to the accompanying drawings. The present disclosure may, however, be embodied in different forms and should not be construed as limited to the embodiments set forth herein. Rather, these embodiments are provided so that this disclosure is thorough and complete and fully conveys the scope of the present disclosure to those skilled in the art. Furthermore, the present disclosure is only defined by claims and their equivalents.

The shapes, sizes, ratios, angles, numbers, and the like disclosed in the drawings for describing embodiments of the present disclosure are merely examples, and thus, the present disclosure is not limited to the illustrated details. Like reference numerals refer to like elements throughout. In the following description, when the detailed description of the relevant known function or configuration is determined to unnecessarily obscure aspects of the present disclosure, the detailed description may be omitted. Where the terms "comprise," "have," "include," "contain," "constitute," "make up of," "formed of," and the like are used, one or more other elements may be added unless the term, such as "only" is used. The terms of a singular form may include plural forms unless the context clearly indicates otherwise.

In construing an element, the element is construed as including an error or tolerance range even where no explicit description of such an error or tolerance range is provided.

Where positional relationships are described, for example, where the positional relationship between two parts is described using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

In describing a temporal relationship, for example, when the temporal order is described as, for example, "after," "subsequent," "next," or "before," a case that is not continuous may be included unless a more limiting term, such as "just," "immediate(ly)," or "direct(ly)" is used.

It will be understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure.

In describing elements of the present disclosure, the terms "first," "second," "A," "B," "(a)," "(b)," or the like may be used. These terms are intended to identify the corresponding elements from the other elements, and basis, order, or number of the corresponding elements should not be limited by these terms.

The expression that an element or layer is "connected," "coupled," or "adhered" to another element or layer, the element or layer can not only be directly connected or adhered to another element or layer, but also be indirectly connected or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" may apply, for example, to a separate circuit or structure, an integrated circuit, a computational block of a circuit device, or any structure configured to perform a described function as should be understood to one of ordinary skill in the art.

Hereinafter, an apparatus, a vibration apparatus and a vehicle including the same according to example embodiments of the present disclosure will be described in detail with reference to the accompanying drawings. In adding reference numerals to elements of each of the drawings, although the same elements may be illustrated in other drawings, like reference numerals may refer to like elements. In addition, for convenience of description, a scale, size and thickness of each of elements illustrated in the accompanying drawings may differ from an actual scale, size and thickness, and thus, embodiments of the present disclosure are not limited to a scale, size and thickness illustrated in the drawings. All the components of each apparatus according to all embodiments of the present disclosure are operatively coupled and configured.

Figure 2:
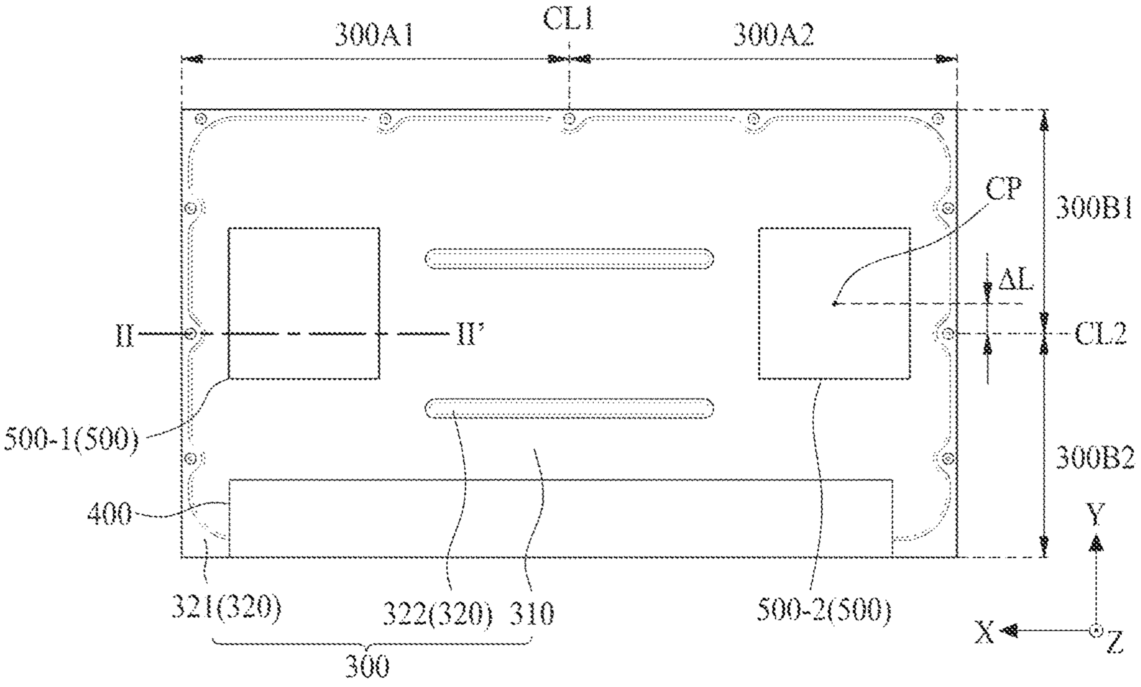
FIG. 2 is a rear view illustrating an apparatus according to an example embodiment of the present disclosure.

FIG. 1 illustrates an apparatus according to an example embodiment of the present disclosure. FIG. 2 is a rear view illustrating an apparatus according to an example embodiment of the present disclosure.

With reference to FIGS. 1 and 2, the apparatus according to an example embodiment of the present disclosure may be a display apparatus, but embodiments of the present disclosure are not limited thereto.

The display apparatus may include a display panel, which includes a plurality of pixels for implementing a black/white or color image, and a driver for driving the display panel. Each of the pixels may be a subpixel which implements one of a plurality of colors configuring a color image.

The apparatus according to an example embodiment of the present disclosure may include a set electronic apparatus or a set device (or a set apparatus) such as a notebook computer, a television, a computer monitor, an equipment apparatus including an automotive apparatus or another type apparatus for vehicles, or a mobile electronic apparatus such as a smartphone or an electronic pad, which is a complete product (or a final product) including a liquid crystal display panel or an organic light emitting display panel, or the like.

The apparatus according to an example embodiment of the present disclosure may include a vibration member 100, a supporting member 300, and a vibration apparatus 500.

The vibration member 100 may be used as a vibration plate which generates or outputs one or more of a sound and a vibration. Accordingly, the vibration member 100 may be a vibration plate, a passive vibration plate, or a passive vibration member, but embodiments of the present disclosure are not limited thereto.

The vibration member 100 according to an example embodiment of the present disclosure may include a display panel which displays an image. For example, the image may include an electronic image, a digital image, a still image, or a video image, or the like. For example, the display panel may include a liquid crystal display panel including a plurality of pixels which implement a black/white or color image, but the kind of the display panel is not limited thereto. For example, the display panel may be a display panel, such as an organic light emitting display panel, an electrophoretic display panel, a micro light emitting diode display panel, an electrowetting display panel, a quantum dot light emitting display panel, or the like. For example, in the liquid crystal display panel, a pixel may include a liquid crystal layer between a pixel electrode and a common electrode. For example, in the organic light emitting display panel, a pixel may include an organic light emitting device such as an organic light emitting layer or the like between a pixel electrode and a common electrode, or the like. However, embodiments of the present disclosure are not limited thereto, and in the light emitting display panel, a pixel may include an inorganic light emitting device such as an inorganic light emitting layer, or the like.

The supporting member 300 may be disposed at a rear surface of the vibration member 100. For example, the supporting member 300 may be implemented to cover a rear surface of the vibration member 100. The supporting member 300 may include a rear portion 310 which covers the rear surface of the vibration member 100. For example, the supporting member 300 may include a glass material, a plastic material, a metal material, or a stacked structure thereof. For example, the supporting member 300 may be referred to as a rear cover, a back cover, a system rear cover, a housing, a system housing, a set cover, a rear set cover, an outermost cover, an outermost set cover, a product cover, or an outermost product cover, or the like, but embodiments of the present disclosure are not limited thereto.

A rear portion 310 of the supporting member 300 may include a first region 300A1 and a second region 300A2. For example, the rear portion 310 of the supporting member 300 may be divided into the first region 300A1 and the second region 300A2, with respect to a center line (or a first center line) CL1 having a first length (or a horizontal length) parallel to a first direction X. For example, each of the first region 300A1 and the second region 300A2 may have the same size or area in the rear portion 310. For example, the center line CL1 having the first length may be a first center line or a horizontal center line, and in the following description, may be referred to as a first center line CL1. For example, the first region 300A1 may be a first rear region, a left region, or a rear left region, and the second region 300A2 may be a second rear region, a right region, or a rear right region. For example, the first direction X may be an X-axis direction in a long-side lengthwise direction, a widthwise direction, a horizontal direction, or one of an XYZ-axis direction of the supporting member 300.

Each of the first region 300A1 and the second region 300A2 in the rear portion 310 of the supporting member 300 may include a first sub-region 300B1 and a second sub-region 300B2, with respect to a center line CL2 having a second length (or a vertical length) parallel to a second direction Y intersecting with the first direction X. For example, the first sub-region 300B1 and the second sub-region 300B2 in each of the first region 300A1 and the second region 300A2 may have the same size or area in the rear portion 310. For example, the center line CL2 having the second length may be a second center line or a vertical center line, and in the following description, may be referred to as a second center line CL2. For example, the second direction Y may be a Y-axis direction in a short-side lengthwise direction, a lengthwise direction, a vertical direction, or another one of an XYZ-axis direction of the supporting member 300.

The supporting member 300 may further include a reinforcement portion 320 disposed at the rear portion 310.

The reinforcement portion 320 may be implemented to reinforce the stiffness of the supporting member 300. Therefore, the reinforcement portion 320 may be a reinforcement member, a reinforcement pattern, a reinforcement pattern portion, a stiffness portion, a stiffness reinforcement member, a stiffness pattern, or a stiffness pattern portion, but embodiments of the present disclosure are not limited thereto.

The reinforcement portion 320 may include a first reinforcement portion 321 which is disposed along a rear periphery portion of the supporting member 300. For example, the first reinforcement portion 321 may be disposed along a periphery portion of the rear portion 310 of the supporting member 300. For example, the first reinforcement portion 321 may be implemented by protruding in a direction from the periphery portion of the rear portion 310 of the supporting member 300 to a rear surface of the supporting member 300 so as to have a predetermined height. The first reinforcement portion 321 may reinforce the stiffness of the supporting member 300 or the stiffness of the rear portion 310 of the supporting member 300, thereby preventing or reducing a bending phenomenon of the apparatus or the vibration member 100. For example, the first reinforcement portion 321 may be a first reinforcement member, a first reinforcement pattern, a first reinforcement pattern portion, a first stiffness portion, a first stiffness reinforcement member, a first stiffness pattern, a first stiffness pattern portion, an edge reinforcement portion, an edge reinforcement pattern, or a border reinforcement pattern, but embodiments of the present disclosure are not limited thereto.

The reinforcement portion 320 may further include a second reinforcement portion 322 which is disposed at a center portion of the rear portion 310 of the supporting member 300. The second reinforcement portion 322 may be implemented at the rear portion 310 of the supporting member 300 to have a predetermined length in one or more directions of the first direction X and the second direction Y intersecting with the first direction X. For example, the second reinforcement portion 322 may be implemented by protruding in a direction from the center portion of the rear portion 310 to the rear surface of the supporting member 300 in parallel with the first direction X. The second reinforcement portion 322 may additionally reinforce the stiffness of the supporting member 300 or the stiffness of the rear portion 310 of the supporting member 300, thereby preventing or reducing a bending phenomenon occurring in the center portion of the vibration member 100 or the apparatus. For example, the second reinforcement portion 322 may be a second reinforcement member, a second reinforcement pattern, a second reinforcement pattern portion, a second stiffness portion, a second stiffness reinforcement member, a second stiffness pattern, a second stiffness pattern portion, a middle reinforcement portion, a middle reinforcement member, a middle reinforcement pattern, or a middle reinforcement pattern portion, but embodiments of the present disclosure are not limited thereto.

The vibration apparatus 500 may be disposed at the supporting member 300 and may be implemented to vibrate the vibration member 100. The vibration apparatus 500 according to an example embodiment of the present disclosure may include a film vibration apparatus or a film-type vibration apparatus. Thus, the vibration apparatus 500 may be referred to as a sound generating apparatus, a sound generating device, a sound generating member, a sound generator, a vibration source, an active vibration member, an active vibration device, an active vibration apparatus, a piezoelectric vibration apparatus, a piezoelectric vibration member, a piezoelectric vibration device, a piezoelectric vibrator, a piezoelectric vibration generator, a flexible vibration generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present specification are not limited thereto.

The vibration apparatus 500 may be supported by the supporting member 300. The vibration apparatus 500 may be coupled to or attached on the rear portion 310 of the supporting member 300. For example, the vibration apparatus 500 may be disposed in a state where a pre-stress is applied to the rear portion 310 of the supporting member 300. For example, the vibration apparatus 500 may be disposed in a non-planar (or non-flat) structure at the rear portion 310 of the supporting member 300. For example, the vibration apparatus 500 may be disposed in a curved shape or a curved structure at the rear portion 310 of the supporting member 300.

The vibration apparatus 500 according to an example embodiment of the present disclosure may include a first vibration apparatus 500-1 and a second vibration apparatus 500-2.

Each of the first and second vibration apparatuses 500-1 and 500-2 may be a film-type vibration apparatus. Each of the first and second vibration apparatuses 500-1 and 500-2 may be disposed at a rear periphery portion of the supporting member 300. For example, the first and second vibration apparatuses 500-1 and 500-2 may be arranged in parallel with the second reinforcement portion 322 of the reinforcement portion 320 therebetween. For example, the first and second vibration apparatuses 500-1 and 500-2 may be arranged to have a symmetric structure (or a left-right symmetric structure) or an asymmetric structure (or a left-right asymmetric structure) with respect to the first center line CL1 of the supporting member 300.

The first vibration apparatus 500-1 may be disposed at a first rear periphery portion of the supporting member 300. For example, the first vibration apparatus 500-1 may be disposed at a first region 300A1 of the supporting member 300. For example, the first vibration apparatus 500-1 may be disposed close to the first rear periphery portion.

According to an example embodiment of the present disclosure, a center portion (or a central portion or a middle portion) CP of the first vibration apparatus 500-1 may be aligned or positioned at a second center line CL2 of the supporting member 300. For example, the center portion (or the central portion or the middle portion) CP of the first vibration apparatus 500-1 may be disposed between the first center line CL1 of the supporting member 300 and a first sidewall (or a first short side or a first side) of the supporting member 300 on the second center line CL2 within the first region 300A1 of the supporting member 300. For example, the first vibration apparatus 500-1 may be disposed between the first reinforcement portion 321 and the second reinforcement portion 322 within the first region 300A1 of the supporting member 300. For example, the first vibration apparatus 500-1 may be disposed closer to the first sidewall of the supporting member 300 than the first center line CL1 of the supporting member 300 within the first region 300A1 of the supporting member 300.

According to another example embodiment of the present disclosure, the center portion (or the central portion or the middle portion) CP of the first vibration apparatus 500-1 may be spaced apart from the second center line CL2 of the supporting member 300. For example, the center portion (or the central portion or the middle portion) CP of the first vibration apparatus 500-1 may be positioned in the first sub-region 300B1 of the first region 300A1. For example, the center portion (or the central portion or the middle portion) CP of the first vibration apparatus 500-1 may be positioned in the first sub-region 300B1 of the first region 300A1 by a predetermined separation distance ΔL from the second center line CL2 of the supporting member 300. Accordingly, a sound characteristic and/or a sound pressure level characteristic of a low-pitched sound band generated based on a vibration of the first vibration apparatus 500-1 may be enhanced.

For example, when the apparatus according to an example embodiment of the present disclosure is applied to a display apparatus, a lowermost portion (or a lowermost end) of the second sub-region 300B2 of the supporting member 300 may act as a propping portion, and thus, may be a free end capable of freely moving or vibrating toward an uppermost portion of the first sub-region 300B1 from the lowermost portion of the second sub-region 300B2 in a vibration of the supporting member 300. Accordingly, when the center portion CP of the first vibration apparatus 500-1 is positioned in the first sub-region 300B1 spaced apart from the second center line CL2 of the supporting member 300, a vibration width (or a displacement width) of the first vibration apparatus 500-1 corresponding to the same driving signal may increase more than when the center portion CP of the first vibration apparatus 500-1 is positioned at the second center line CL2 of the supporting member 300, and thus, a sound characteristic and/or a sound pressure level characteristic of a low-pitched sound band generated based on a vibration of the first vibration apparatus 500-1 may be enhanced.

The second vibration apparatuses 500-2 may be disposed at a second rear periphery portion of the supporting member 300. For example, the second vibration apparatus 500-2 may be disposed at a second region 300A2 of the supporting member 300. For example, the second vibration apparatus 500-2 may be disposed close to the second rear periphery portion.

According to an example embodiment of the present disclosure, a center portion (or the central portion or the middle portion) CP of the second vibration apparatus 500-2 may be aligned or positioned at a second center line CL2 of the supporting member 300. For example, the center portion (or the central portion or the middle portion) CP of the second vibration apparatus 500-2 may be disposed between the first center line CL1 of the supporting member 300 and a second sidewall (or a second short side or a second side) of the supporting member 300 on the second center line CL2 within the second region 300A2 of the supporting member 300. For example, the second vibration apparatus 500-2 may be disposed between the first reinforcement portion 321 and the second reinforcement portion 322 within the second region 300A2 of the supporting member 300. For example, the second vibration apparatus 500-2 may be disposed closer to the second sidewall of the supporting member 300 than the first center line CL1 of the supporting member 300 within the second region 300A2 of the supporting member 300.

According to another example embodiment of the present disclosure, the center portion (or the central portion or the middle portion) CP of the second vibration apparatus 500-2 may be spaced apart from the second center line CL2 of the supporting member 300. For example, the center portion (or the central portion or the middle portion) CP of the second vibration apparatus 500-2 may be positioned in the first sub-region 300B1 of the second region 300A2. For example, the center portion (or the central portion or the middle portion) CP of the second vibration apparatus 500-2 may be positioned in the first sub-region 300B1 of the second region 300A2 by a predetermined separation distance ΔL from the second center line CL2 of the supporting member 300. Accordingly, a sound characteristic and/or a sound pressure level characteristic of a low-pitched sound band generated based on a vibration of the second vibration apparatus 500-2 may be enhanced.

Each of the first vibration apparatus 500-1 and the second vibration apparatus 500-2 may vibrate based on a driving signal including a sound signal and a haptic feedback signal or including a sound signal (or a voice signal) input from the outside to vibrate the vibration member 100, and thus, may generate a sound S based on a vibration of the vibration member 100 or may generate a haptic feedback (or a haptic vibration) responding to a user touch.

The apparatus according to another example embodiment of the present disclosure may generate the sound S and/or the haptic feedback (or the haptic vibration) based on a vibration of the vibration member 100 based on driving of the vibration apparatus 500. For example, the sound S generated based on a vibration of the vibration member 100 may be output in a forward direction of the vibration member 100 or a forward direction of a screen. For example, the apparatus according to an example embodiment of the present disclosure may output a left sound and a right sound in the forward direction of the vibration member 100 or the forward direction of the screen by a vibration of the vibration member 100 based on driving of each of the first vibration apparatus 500-1 and the second vibration apparatus 500-2 and may implement a sound, for example, a stereo sound through the left sound and the right sound. Accordingly, the apparatus according to an example embodiment of the present disclosure may output a sound in the forward direction of the vibration member 100 or the forward direction of the screen using the vibration member 100, including the display panel, as a vibration plate for generating a sound (or outputting a sound), and thus, may transfer a more accurate sound, thereby improving sound quality and/or a sound and enhancing the immersion of a viewer.

Figure 3:
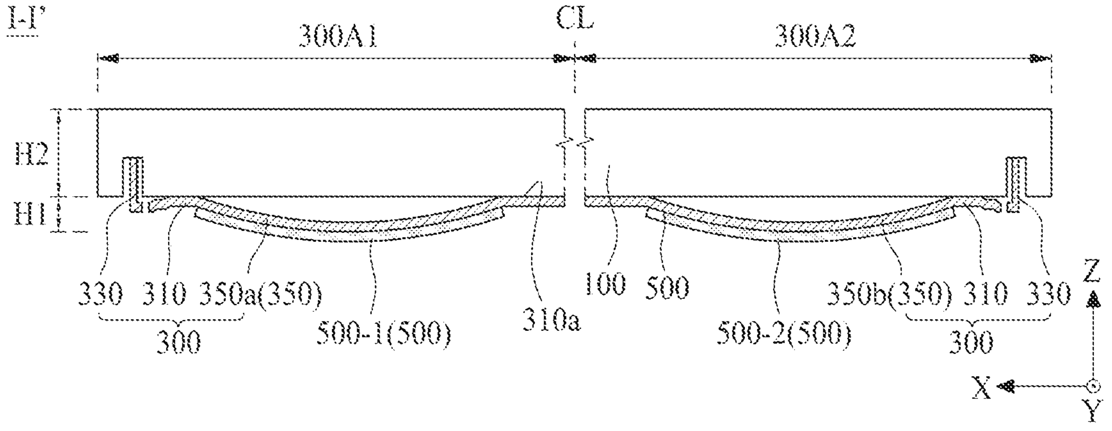
FIG. 3 is an example cross-sectional view taken along line I-I' illustrated in FIG. 1.

FIG. 3 is an example cross-sectional view taken along line I-I' illustrated in FIG. 1. FIG. 3 illustrates a cross-sectional structure of a supporting member according to an example embodiment of the present disclosure.

With reference to FIG. 3, in an apparatus according to an example embodiment of the present disclosure, a supporting member 300 may include a rear portion 310, a lateral portion 330, and a curved portion 350.

The rear portion 310 may be disposed in a rear surface of a vibration member 100. The rear portion 310 may include a floor surface (a bottom surface or a supporting surface) 310*a* which supports the vibration member 100. The rear portion 310 may be substantially the same as the rear portion 310 described above with reference to FIGS. 1 and 2, and thus, the repetitive description thereof is omitted for brevity. The rear portion 310 may include the reinforcement portion described above with reference to FIGS. 1 and 2.

The lateral portion 330 may be connected to a periphery portion of the rear portion 310. The lateral portion 330 may be implemented to support the vibration member 100. The lateral portion 330 may be implemented to have a predetermined height along the periphery portion of the rear portion 310, and thus, an accommodating space may be provided on the floor surface 310*a* of the rear portion 310. For example, the lateral portion 330 may be bent from the periphery portion of the rear portion 310. For example, the lateral portion 330 may be a sidewall portion or a lateral cover portion, and embodiments of the present disclosure are not limited thereto.

The curved portion 350 may be implemented at the rear portion 310. The curved portion 350 may vibrate together with a vibration of the vibration apparatus 500 to vibrate the vibration member 100. For example, the curved portion 350 may be configured to vibrate based on a vibration of the vibration apparatus 500 to indirectly vibrate the vibration member 100.

According to another example embodiment of the present disclosure, the curved portion 350 may be implemented at the rear portion 310 to have a predetermined curvature. For example, the curved portion 350 may include a curved structure which protrudes in a direction from the rear portion 310 to the rear surface of the supporting member 300. For example, the curved portion 350 may protrude from the rear portion 310 to have a curved shape having one curvature (or a single curvature). For example, the curved portion 350 may have a curved structure having one curvature (or a single curvature) without inflection point. For example, the curved portion 350 may protrude convexly in the direction from the rear portion 310 to the rear surface of the supporting member 300. For example, the curved portion 350 may have a single convex curved shape having a certain curvature. For example, the curved portion 350 may be a curved protrusion portion, a floor curved protrusion portion, a rear curved portion, a curved structure, a curvature structure, a forming portion, or a stress application portion, but embodiments of the present disclosure are not limited thereto. For example, the curved portion 350 may be a curved portion, a concave portion, a concave curved portion, a concave arch portion, a groove portion, or a concave groove portion having a first shape with respect to the floor surface 310*a* of the rear portion 310 facing the vibration member 100, but embodiments of the present disclosure are not limited thereto.

According to another example embodiment of the present disclosure, a center portion of the curved portion 350 may be spaced apart from the rear surface of the vibration member 100. For example, a height (or a distance) between the rear surface of the vibration member 100 and the curved portion 350 may increase toward a center portion of the curved portion 350 from a periphery portion of the curved portion 350. According to an example embodiment of the present disclosure, the curved portion 350 may be implemented to have a first height H1 from the rear portion 310. For example, the first height H1 of the curved portion 350 may be a shortest distance between the floor surface 310*a* of the rear portion 310 and a rearmost surface of the curved portion 350.

According to another example embodiment of the present disclosure, the first height H1 of the curved portion 350 may be set within a range which enables a pre-stress to be applied to the vibration apparatus 500. For example, the first height H1 of the curved portion 350 may be about 2 mm to about 200 mm, but embodiments of the present disclosure are not limited thereto, and the first height H1 may vary based on a size of the vibration apparatus 500. The first height H1 of the curved portion 350 may be smaller than a second height H2 of the vibration member 100. For example, the second height H2 of the vibration member 100 may be a shortest distance between the floor surface 310*a* of the rear portion 310 and an uppermost surface (or a top surface) of the vibration member 100. For example, when the first height H1 of the curved portion 350 is greater than the second height H2 of the vibration member 100, a thickness of the apparatus or the display apparatus may increase, and due to this, it may be difficult to slim (or have thin thickness) the apparatus or the display apparatus.

The curved portion 350 according to an example embodiment of the present disclosure may include a first curved portion 350*a* and a second curved portion 350*b*.

The first curved portion 350*a* may be implemented at the rear portion 310 corresponding to the first region 300A1 of the supporting member 300. For example, the first curved portion 350*a* may be configured to support the first vibration apparatus 500-1. The first curved portion 350*a* may be implemented to vibrate together with a vibration of the first vibration apparatus 500-1.

The second curved portion 350*b* may be implemented at the rear portion 310 corresponding to the second region 300A2 of the supporting member 300. For example, the second curved portion 350*b* may support the second vibration apparatus 500-2. The second curved portion 350*b* may be implemented to vibrate together with a vibration of the second vibration apparatus 500-2.

The vibration apparatus 500 may be coupled to or attached on the curved portion 350. For example, the vibration apparatus 500 may have a size which is smaller than that of the curved portion 350. The vibration apparatus 500 may be coupled to or attached on the curved portion 350 to have an equiangular shape (or a conformal shape) based on a curvature of the curved portion 350, but embodiments of the present disclosure are not limited thereto. For example, the vibration apparatus 500 may be coupled to or attached on the curved portion 350 to have an equiangular shape which conforms to the contour of a curvature of the curved portion 350. For example, the vibration apparatus 500 may be coupled to or attached on the curved portion 350 to have a non-equiangular shape (or a non-conformal shape) which is not based on a curvature of the curved portion 350 or have a curvature which differs from that of the curved portion 350. For example, the vibration apparatus 500 may be coupled to or attached on the curved portion 350 to have a non-equiangular shape which is not based on the contour of a curvature of the curved portion 350 or have a curvature which differs from that of the curved portion 350.

According to another example embodiment of the present disclosure, the vibration apparatus 500 may be coupled to or attached on the curved portion 350, and thus, may have a pre-stress or receive the pre-stress based on the curved portion 350. For example, the vibration apparatus 500 may be coupled to or attached on the curved portion 350, and thus, may be maintained in a state where the vibration apparatus 500 has or receives a pre-stress based on the curved portion 350. For example, the vibration apparatus 500 may receive a tension stress or include the tension stress based on a curvature of the curved portion 350. For example, the curved portion 350 may be implemented to apply only the tension stress to the vibration apparatus 500, to enhance a vibration characteristic of the vibration apparatus 500. For example, when the vibration apparatus 500 receives a compression stress instead of a tension stress based on the curved portion 350, a vibration characteristic of the vibration apparatus 500 may be reduced.

According to another example embodiment of the present disclosure, the vibration apparatus 500 may include a state which the vibration apparatus 500 is bent in a curved shape or may receive a pre-stress (or a pre-tension stress), based on the curved portion 350, and thus, a second moment of inertia may increase. In the vibration apparatus 500, the number of resonance frequencies occurring in vibrating may decrease because a second moment of inertia increases, and thus, the number of nodes (or joint points or connection points) may decrease, thereby enhancing a sound characteristic and/or a sound pressure level characteristic of a sound. For example, in the vibration apparatus 500, because the number of resonance frequencies is reduced due to an increase in second moment of inertia, a mode shape may be corrected, and thus, a sound pressure level characteristic and/or a sound characteristic may be enhanced.

According to another example embodiment of the present disclosure, the vibration apparatus 500 may include a state which the vibration apparatus 500 is bent in a curved shape or may receive a pre-stress (or a pre-tension stress), based on the curved portion 350, and thus, a vibration direction (or a displacement direction or a bending direction or a driving direction) thereof may be implemented as a single direction and a dynamic displacement may extend. Accordingly, a sound generated based on a vibration of the vibration apparatus 500 may concentrate in a direction toward a center of the curved portion 350 and a sound pressure level transferred to the vibration member 100 may increase or may be amplified, and thus, a sound characteristic and/or a sound pressure level characteristic generated based on a vibration of the vibration member 100 may be enhanced.

The first vibration apparatus 500-1 of the vibration apparatus 500 may be coupled to or attached on the first curved portion 350*a*. The first vibration apparatus 500-1 may be coupled to or attached on the first curved portion 350*a* to have an equiangular shape based on a curvature of the first curved portion 350*a*, but embodiments of the present disclosure are not limited thereto. For example, the first vibration apparatus 500-1 may be coupled to or attached on the first curved portion 350*a* to have an equiangular shape which conforms to the contour of a curvature of the first curved portion 350*a*. For example, the first vibration apparatus 500-1 may be coupled to or attached on the first curved portion 350*a* to have a non-equiangular shape which is not based on a curvature of the first curved portion 350*a* or have a curvature which differs from that of the first curved portion 350*a*. For example, the first vibration apparatus 500-1 may be coupled to or attached on the first curved portion 350*a* to have a non-equiangular shape which is not based on the contour of a curvature of the first curved portion 350*a*. Therefore, the first vibration apparatus 500-1 may vibrate in a state in which the first vibration apparatus 500-1 receives a pre-stress (or a pre-tension stress) or is bent in a curved shape, based on the first curved portion 350*a*, and thus, may vibrate the first curved portion 350*a* to generate a sound or a sound wave. Accordingly, a first region of the vibration member 100 overlapping the first vibration apparatus 500-1 may receive a sound or a sound wave generated based on a vibration of the first curved portion 350*a* to vibrate, and thus, may generate or output a sound and/or a haptic feedback.

The second vibration apparatus 500-2 of the vibration apparatus 500 may be coupled to or attached on the second curved portion 350*b*. The second vibration apparatus 500-2 may be coupled to or attached on the second curved portion 350*b* to have an equiangular shape based on a curvature of the second curved portion 350*b*, but embodiments of the present disclosure are not limited thereto. For example, the second vibration apparatus 500-2 may be coupled to or attached on the second curved portion 350*b* to have an equiangular shape which conforms to the contour of a curvature of the second curved portion 350*b*. For example, the second vibration apparatus 500-2 may be coupled to or attached on the second curved portion 350*a* to have a non-equiangular shape which is not based on a curvature of the second curved portion 350*b* or have a curvature which differs from that of the second curved portion 350*b*. For example, the second vibration apparatus 500-2 may be coupled to or attached on the second curved portion 350*b* to have a non-equiangular shape which is not based on the contour of a curvature of the second curved portion 350*b*. Therefore, the second vibration apparatus 500-2 may be configured to vibrate in a state in which the second vibration apparatus 500-2 receives a pre-stress (or a pre-tension stress) or is bent in a curved shape, based on the second curved portion 350*b*, and thus, may vibrate the second curved portion 350*b* to generate a sound or a sound wave. Accordingly, a second region of the vibration member 100 overlapping the second vibration apparatus 500-2 may receive a sound or a sound wave generated based on a vibration of the second curved portion 350*b* to vibrate, and thus, may generate or output a sound and/or a haptic feedback.

Figure 4A:
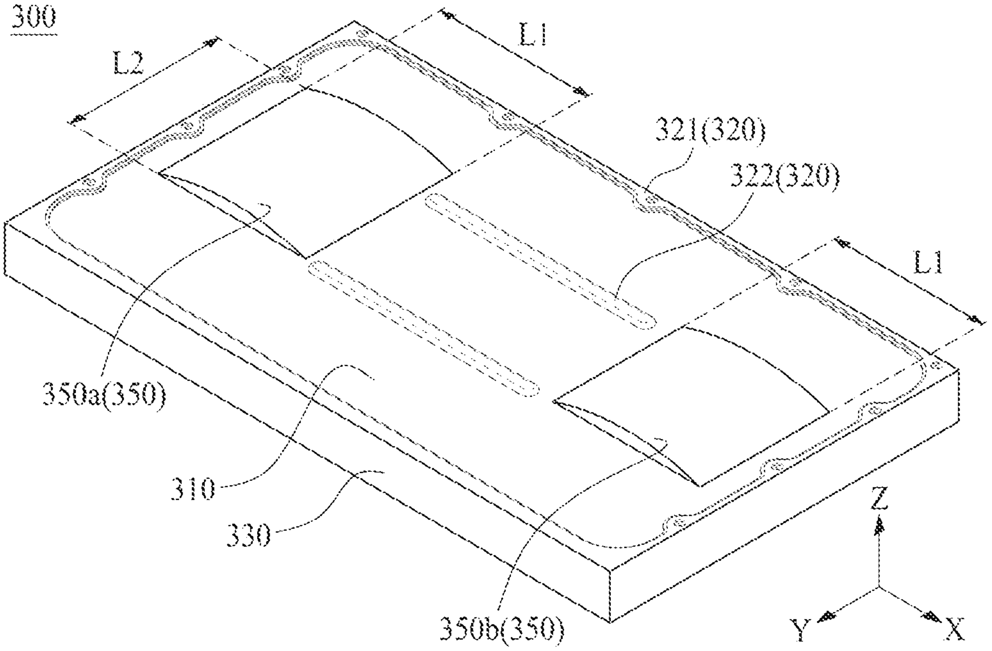
FIGS. 4A to 4C are rear perspective views illustrating a supporting member according to an example embodiment of the present disclosure illustrated in FIGS. 1 to 3.
Figure 4B:
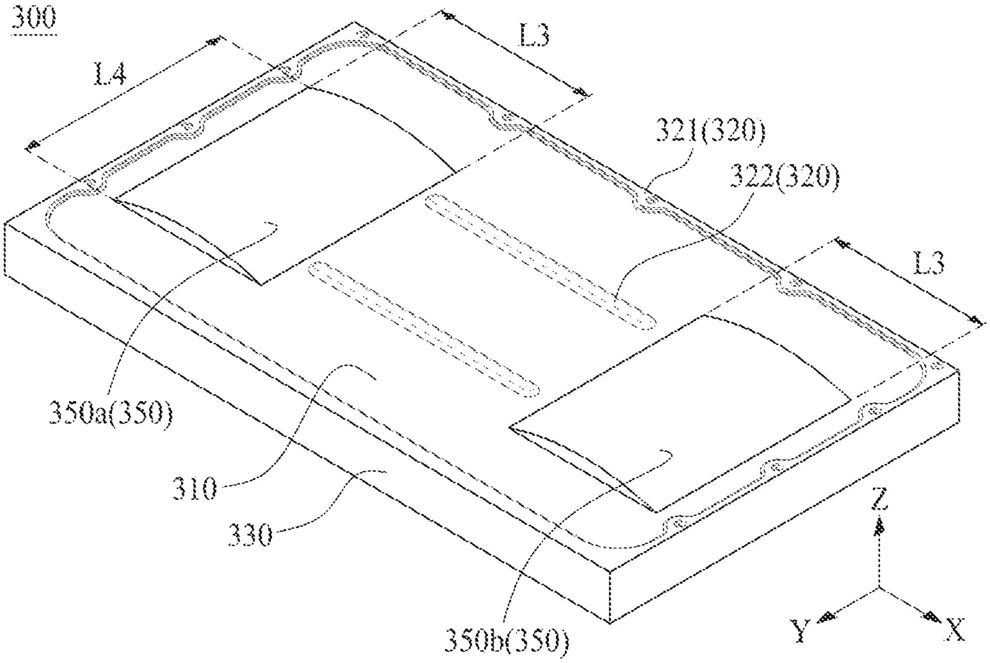
Figure 4C:
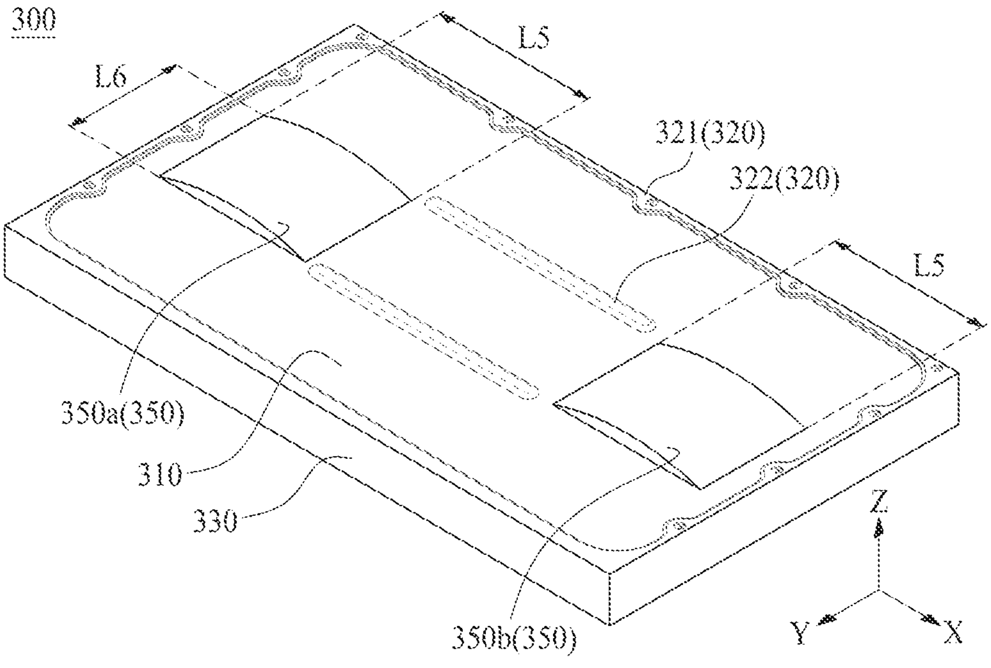

FIGS. 4A to 4C are rear perspective views illustrating a supporting member according to an example embodiment of the present disclosure illustrated in FIGS. 1 to 3. FIGS. 4A to 4C illustrate a curved portion according to first to third example embodiments of the present disclosure.

With reference to FIG. 4A, a curved portion 350 or first and second curved portions 350*a* and 350*b* according to a first example embodiment of the present disclosure may one-dimensionally have a square shape and may cross-sectionally have an arch shape. For example, the curved portion 350 or the first and second curved portions 350*a* and 350*b* may include a first side and a second side. For example, the curved portion 350 or the first and second curved portions 350*a* and 350*b* may include a pair of first sides having a first length L1 and a pair of second sides having the same second length L2 as the first length L1. A curved shape of the curved portion 350 or the first and second curved portions 350*a* and 350*b* according to the first example embodiment of the present disclosure may be formed in an arch shape having a predetermined curvature between the pair of second sides. For example, the first length L1 may be parallel to a first direction X and may be a first-direction length, a widthwise length, or a horizontal length. For example, the second length L2 may be parallel to a second direction Y and may be a second-direction length, a lengthwise length, or a vertical length.

With reference to FIG. 4B, a curved portion 350 or first and second curved portions 350*a* and 350*b* according to a second example embodiment of the present disclosure may one-dimensionally have a rectangular shape and may cross-sectionally have an arch shape. For example, the curved portion 350 or the first and second curved portions 350*a* and 350*b* may include a short side and a long side. For example, the curved portion 350 or the first and second curved portions 350*a* and 350*b* may include a pair of short sides having a third length L3 and a pair of long sides having a fourth length L4 which is greater than the third length L3. A curved shape of the curved portion 350 or the first and second curved portions 350*a* and 350*b* according to the second example embodiment of the present disclosure may be formed in an arch shape having a predetermined curvature between the pair of long sides. For example, the third length L3 may be parallel to a first direction X and may be a short-side length, a first-direction length, a widthwise length, or a horizontal length. For example, the fourth length L4 may be parallel to a second direction Y and may be a long-side length, a second-direction length, a lengthwise length, or a vertical length.

With reference to FIG. 4C, a curved portion 350 or first and second curved portions 350*a* and 350*b* according to a third example embodiment of the present disclosure may one-dimensionally have a rectangular shape and may cross-sectionally have an arch shape. For example, the curved portion 350 or the first and second curved portions 350*a* and 350*b* may include a short side and a long side. For example, the curved portion 350 or the first and second curved portions 350*a* and 350*b* may include a pair of long sides having a fifth length L5 and a pair of short sides having a sixth length L6 which is smaller than the fifth length L5. A curved shape of the curved portion 350 or the first and second curved portions 350*a* and 350*b* according to the third example embodiment of the present disclosure may be formed in an arch shape having a predetermined curvature between the pair of short sides. For example, the fifth length L5 may be parallel to a first direction X and may be a long-side length, a first-direction length, a widthwise length, or a horizontal length. For example, the sixth length L6 may be parallel to a second direction Y and may be a short-side length, a second-direction length, a lengthwise length, or a vertical length.

Figure 5:
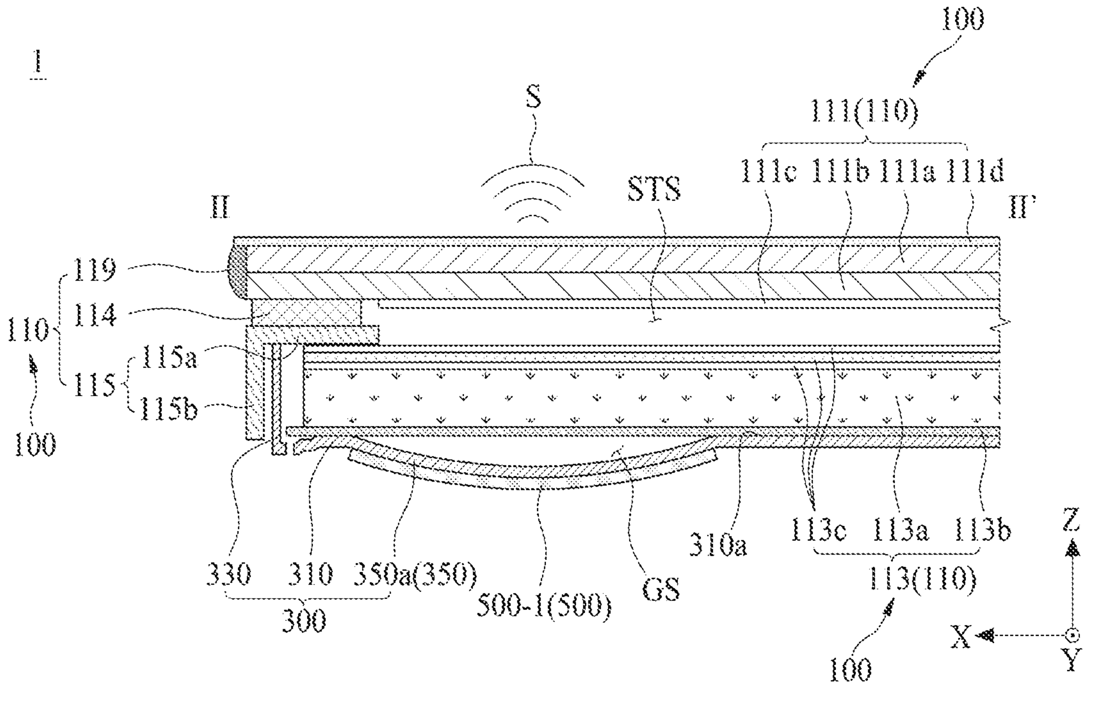
FIG. 5 is an example cross-sectional view taken along line II-II' illustrated in FIG. 2.

FIG. 5 is an example cross-sectional view taken along line II-II' illustrated in FIG. 2. FIG. 5 illustrates an apparatus according to a first example embodiment of the present disclosure.

With reference to FIG. 5, the apparatus 1 according to a first example embodiment of the present disclosure may include a vibration member 100, a supporting member 300, and a vibration apparatus 500.

The vibration member 100 may include a display member 110 which displays an image or directly outputs a sound while displaying an image. The display member 110 may include a display panel 111 and a guide member 115.

The display panel 111 may be a liquid crystal display panel, but embodiments of the present disclosure are not limited thereto. For example, the display panel 111 may be a light emitting display panel, an electrophoretic display panel, a micro light emitting diode display panel, an electrowetting display panel, a quantum dot light emitting display panel, or the like.

When the display panel 111 is a liquid crystal display panel, the vibration member 100 may further include a backlight 113 between the display panel 111 and the supporting member 300.

The display panel 111 according to an example embodiment of the present disclosure may include a first substrate 111*a*, a second substrate 111*b*, a first polarization member 111*c*, and a second polarization member 111*d*.

The first substrate 111*a* may be a upper substrate or a thin film transistor (TFT) array substrate and may include a pixel array (or a display portion or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate 111*a* may further include a pad part, which is provided at a first periphery (or a first non-display portion) and is connected to a panel driving circuit, and a gate driving circuit which is provided at a second periphery (or a second non-display portion) and is connected to the plurality gate lines. For example, the panel driving circuit may be connected to the pad part and may be disposed at a rear surface of the supporting member 300. For example, the panel driving circuit may be disposed in the second sub-region 300B2 of each of the first and second regions 300A1 and 300A2 of the supporting member 300 illustrated in FIG. 2. The panel driving circuit may be covered or protected by a cover shield 400. For example, the cover shield 400 may be coupled or fixed to the second sub-region 300B2 of each of the first and second regions 300A1 and 300A2 of the supporting member 300 to cover a portion, other than a user connector, of the panel driving circuit, and thus may protect the panel driving circuit.

The second substrate 111b may be a lower substrate or a color filter array substrate and may include a pixel opening pattern including an opening area corresponding to each of the plurality of pixels formed at the first substrate 111a, and a color filter layer formed at the opening area. The second substrate 111b may be bonded to a portion, other than a first periphery, of the first substrate 111a with a liquid crystal layer therebetween by a sealant.

The liquid crystal layer may be disposed or interposed between the first substrate 111a and the second substrate 111b and may include a liquid crystal including liquid crystal molecules where an alignment direction thereof is changed based on an electric field generated by the common voltage and a data voltage applied to a pixel electrode for each pixel.

The first polarization member 111c may be attached on a lower surface of the second substrate 111b and may polarize light which is incident from the backlight 113 and travels to the liquid crystal layer. The second polarization member 111d may be attached on an upper surface of the first substrate 111a and may polarize light which passes through the first substrate 111a and is output to the outside.

In the display panel 111 according to an example embodiment of the present disclosure, the liquid crystal layer may be driven based on an electric field which is generated in each pixel by the data voltage and the common voltage applied to each pixel, and thus, an image may be displayed based on light passing through the liquid crystal layer.

In the display panel 111 according to an example embodiment of the present disclosure, the first substrate 111a implemented as the TFT array substrate may configure an image display surface, and thus, a whole front surface of the display panel 111 may be exposed to the outside without being covered by a separate mechanism.

In the display panel 111 according to another example embodiment of the present disclosure, the first substrate 111a may be implemented as the color filter array substrate, and the second substrate 111b may be implemented as the TFT array substrate. For example, the display panel 111 according to another example embodiment of the present disclosure may have a type where an upper portion and a lower portion of the display panel 111 according to an example embodiment of the present disclosure are reversed therebetween, in this case, a pad part of the display panel 111 may be covered by a separate mechanism or a separate structure.

The display panel 111 according to an example embodiment of the present disclosure may further include a buffer member 119. The buffer member 119 may be formed to surround one or more side surfaces of the display panel 111. The buffer member 119 may protect the side surfaces of the display panel 111 from an external impact, or may prevent light leakage through the side surfaces of the display panel 111.

The backlight (or an illumination part or a backlight part) 113 may be disposed at a rear surface of the display panel 111 and may irradiate light onto the rear surface of the display panel 111. The backlight 113 according to an example embodiment of the present disclosure may include a light guide plate 113a, a light source part, a reflective sheet 113b, and an optical sheet part (or an optical member) 113c, but embodiments of the present disclosure are not limited thereto.

The light guide plate (or a light guide member) 113a may include a light input surface which is disposed at the supporting member 300 to overlap the display panel 111 and is provided at one side thereof. The light guide plate 113a may include a light-transmitting plastic or glass material, but embodiments of the present disclosure are not limited thereto. The light guide plate 113a may transfer (output) light, which is incident through the light input surface from the light source part, to the display panel 111.

The light source part may irradiate light onto the light input surface provided at the light guide plate 113a. The light source part may be disposed at the supporting member 300 to overlap a periphery portion of the display panel 111. The light source part may include a plurality of light emitting diode devices which are mounted at a light-source printed circuit board (PCB) and irradiate lights onto the light input surface of the light guide plate 113a.

The reflective sheet 113b may be disposed at the supporting member 300 to cover a rear surface of the light guide plate 113a. The reflective sheet 113b may reflect light, which is incident from the light guide plate 113a, to the light guide plate 113a to minimize the loss of the light.

The optical sheet part 113c may be disposed on a front surface of the light guide plate 113a and may enhance a luminance characteristic of light output from the light guide plate 113a. The optical sheet part 113c according to an example embodiment of the present disclosure may include a lower diffusive sheet, a lower prism sheet, and an upper prism sheet, but embodiments of the present disclosure are not limited thereto. For example, the optical sheet part 113c may be configured as one layer including the lower diffusive sheet, the lower prism sheet, and the upper prism sheet. However, embodiments of the present disclosure are not limited thereto, and the optical sheet part 113c may be configured by a stacked combination of one or more sheets among a diffusive sheet, a prism sheet, a dual brightness enhancement film, and a lenticular sheet, or may be configured with one composite sheet having a light diffusing function and a light collecting function.

The guide member 115 may be disposed at a rear periphery portion of the display panel 111 and may support the rear periphery portion of the display panel 111. The guide member 115 may be supported by or accommodated into the supporting member 300 to overlap the rear periphery portion of the display panel 111. The guide member 115 may be disposed under the rear periphery portion of the display panel 111 not to protrude to the outside of each side surface of the display panel 111.

The guide member (or a supporting frame) 115 according to an example embodiment of the present disclosure may include a guide frame 115a and a guide side portion 115b. For example, the guide member 115 may have a cross-sectional structure having a "┓"-shape (a gamma shape) or a "┏"-shape (a rotated "┓"-shape) based on a coupling structure or a connection structure between the guide frame 115a and the guide side portion 115b, but embodiments of the present disclosure are not limited thereto.

The guide frame 115a may be connected to the rear periphery region of the display panel 111 and may be supported by the supporting member 300. For example, the guide frame 115a may have a tetragonal band (or belt) shape including an opening portion overlapping a center portion, other than the rear periphery region, of the display panel 111, but embodiments of the present disclosure are not limited thereto. For example, the guide frame 115a may directly contact an uppermost surface of the backlight 113 (for example, an uppermost surface of the optical sheet part 113*c*), or may be spaced apart from the uppermost surface of the optical sheet part 113*c* by a certain distance.

The guide side portion 115*b* may be connected to the guide frame 115*a* and may surround one portion or side surfaces of the supporting member 300. For example, the guide side portion 115*b* may be bent from the guide frame 115*a* to the side surfaces of the supporting member 300 and may surround the side surfaces of the supporting member 300 or may be surrounded by the side surfaces of the supporting member 300.

The guide member 115 according to an example embodiment of the present disclosure may include a plastic material, a metal material, or a mixed material of a plastic material and a metal material, but embodiments of the present disclosure are not limited thereto. For example, the guide member 115 may act as a vibration transfer member which transfers a sound vibration, generated by the vibration apparatus 500, to the periphery portion of the display panel 111. Therefore, the guide member 115 may transfer the sound vibration, generated by the vibration apparatus 500, to the display panel 111 without being lost in a state of maintaining stiffness of the display panel 111. For example, the guide member 115 may include a metal material for transferring the sound vibration, generated by the vibration apparatus 500, to the display panel 111 without being lost in a state of maintaining stiffness of the display panel 111, but embodiments of the present disclosure are not limited thereto.

The guide member 115 according to an example embodiment of the present disclosure may be connected or coupled to the rear periphery portion of the display panel 111 by a coupling member (or a panel coupling member) 114. The coupling member 114 may be disposed between the rear periphery portion of the display panel 111 and the guide member 115 and may dispose or couple the display panel 111 to the guide member 115. For example, the coupling member 114 may include an acrylic-based adhesive member or a urethane-based adhesive member, but embodiments of the present disclosure are not limited thereto. For example, the coupling member 114 may include the acrylic-based adhesive member which is relatively better in adhesive force and hardness than the urethane-based adhesive member so that the vibration of the guide member 115 can be well transferred to the display panel 111. For example, the coupling member 114 may include a double-sided foam adhesive pad having an acrylic-based adhesive layer, or an acrylic-based adhesive resin curing layer.

A front surface of the coupling member 114 according to an example embodiment of the present disclosure may be disposed at the second substrate 111*b* or the first polarization member 111*c* of the display panel 111. The coupling member 114 may be directly coupled to a rear periphery portion of the second substrate 111*b* to enhance an adhesive force to the display panel 111. For example, the coupling member 114 may surround side surfaces of the first polarization member 111*c*, thereby preventing light leakage of the side surface from occurring in the first polarization member 111*c*.

The coupling member 114 may have a certain thickness (or height). Thus, the coupling member 114 may provide a sound transfer space STS between the display panel 111 and the backlight 113 together with the guide frame 115*a* of the guide member 115. The coupling member 114 may be provided in a four-side-closed shape or a closed loop shape in the guide frame 115*a* of the guide member 115, but embodiments of the present disclosure are not limited thereto. For example, the coupling member 114 may seal (or close) the sound transfer space STS between a rearmost surface of the display panel 111 and an uppermost surface of the backlight 113 which face each other with an opening portion of the guide member 115 therebetween, thereby preventing or minimizing the leakage (or loss) of a sound pressure transferred to the sound transfer space STS. The sound transfer space STS may also act as a sound pressure level generating space where a sound pressure is generated based on a vibration of the backlight 113 or a panel vibration space which enables a vibration of the display panel 111 to be smoothly performed. For example, the sound transfer space STS may be a sound wave transmission portion or a sound transmission portion, but embodiments of the present disclosure are not limited thereto.

The supporting member 300 may be configured to support the vibration member 100. The supporting member 300 may include a rear portion 310, a lateral portion 330, and a curved portion 350 described above with reference to FIG. 3.

The rear portion 310 may be configured to support or accommodate the backlight 113 of the vibration member 100. A floor surface (or a bottom surface or supporting surface) 310*a* of the rear portion 310 may contact a rear surface of the backlight 113 or directly contact the rear surface of the backlight 113. For example, the floor surface 310*a* of the rear portion 310 may contact a reflective sheet 113*b* of the backlight 113 or directly contact the reflective sheet 113*b*.

The lateral portion 330 may be configured to support the guide member 115 of the vibration member 100. A lateral surface of the lateral portion 330 may be surrounded by the guide side portion 115*b* of the guide member 115. Accordingly, a vibration of the vibration apparatus 500 may be transferred to the guide member 115 though the lateral portion 330 of the supporting member 300 and may be transferred to a periphery portion of the display panel 111 through the coupling member 114. For example, the lateral portion 330 may be a sidewall portion or a side cover portion, but embodiments of the present disclosure are not limited thereto.

The curved portion 350 may be implemented at the rear portion 310. The curved portion 350 may be the same or substantially the same as described above with reference to FIGS. 3 and 4A to 4C, and thus, the repetitive description thereof may be omitted for brevity.

The apparatus 1 according to the first example embodiment of the present disclosure may further include a gap space GS between the curved portion 350 of the supporting member 300 and the vibration member 100.

The gap space GS may be provided between the curved portion 350 of the supporting member 300 and the rear surface of the vibration member 100. For example, the gap space GS may be provided between the curved portion 350 and the reflective sheet 113*b* of the backlight 113. The gap space GS may include a space where a sound or a sound pressure level is generated based on a vibration of the curved portion 350, a space where a vibration of the curved portion 350 is smoothly performed, or a space where a sound wave generated based on a vibration of the vibration apparatus 500 is propagated to the vibration member 100. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

The vibration apparatus 500 may be disposed at or coupled to the curved portion 350. For example, the vibration apparatus 500 may be disposed at or coupled to a rear surface of the curved portion 350. The vibration apparatus 500 disposed at or coupled to the curved portion 350 may include first and second vibration apparatuses 500-1 and 500-2 and may be the same or substantially the same as described above with reference to FIGS. 2 to 4C, and thus, their repetitive description may be omitted for brevity.

The vibration apparatus 500 may vibrate in a state in which the vibration apparatus 500 receives a pre-stress (or a pre-tension stress) or is bent in a curved shape, and thus, may be configured to vibrate the curved portion 350 to vibrate the vibration member 100 based on a vibration of the curved portion 350, thereby generating or outputting a sound and/or a haptic feedback. For example, the vibration apparatus 500 may vibrate based on a driving signal to vibrate the curved portion 350, and thus, a sound (or a sound wave) generated based on a vibration of the curved portion 350 may be output to the gap space GS, a sound generated by a vibration of the backlight 113 based on a sound of the gap space GS may be transferred to the sound transfer space STS, and a sound and/or a haptic feedback may be generated by a vibration of the display panel 111 based on a sound of the sound transfer space STS.

Therefore, the apparatus 1 according to the first example embodiment of the present disclosure may include the vibration apparatus 500 which vibrates in a state in which the vibration apparatus 500 receives a pre-stress (or a pre-tension stress) or is bent in a curved shape, and thus, a second moment of inertia may increase or a vibration direction of the vibration apparatus 500 may be implemented as a single direction, thereby enhancing a sound characteristic and/or a sound pressure level characteristic of a sound generated by the vibration member 100 which vibrates based on a vibration of the vibration apparatus 500.

Figure 6:
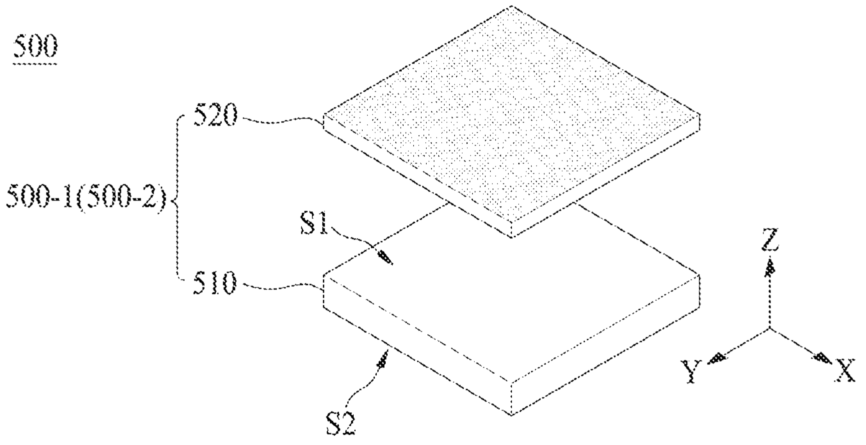
FIG. 6 is a perspective view illustrating a vibration apparatus according to a first example embodiment of the present disclosure.

FIG. 6 is a perspective view illustrating a vibration apparatus according to a first example embodiment of the present disclosure. FIG. 6 illustrates the vibration apparatus or the first and second vibration apparatuses illustrated in FIGS. 2 to 6.

With reference to FIG. 6, a vibration apparatus 500 or first and second vibration apparatuses 500-1 and 500-2 according to an example embodiment of the present disclosure may include a vibration generator 510 and a connection member 520.

The vibration generator 510 may vibrate (or displace) based on a driving signal (or an electrical signal or a voice signal) applied thereto to vibrate (or displace) a vibration member 100. For example, the vibration generator 510 may be referred to as a vibration device, a vibration structure, a vibrator, a vibration generating device, a sound generator, a sound device, a sound generating structure, or a sound generating device, but embodiments of the present disclosure are not limited thereto.

The vibration generator 510 according to an example embodiment of the present disclosure may include a piezoelectric material (or an electroactive material) having a piezoelectric characteristic. The vibration generator 510 may autonomously vibrate (or displace) based on a vibration (or a displacement) of a piezoelectric material generated by the driving signal applied thereto, or may vibrate (or displace) the vibration member 100. For example, the vibration generator 510 may vibrate (or displace) as contraction and/or expansion are alternately repeated by a piezoelectric effect (or a piezoelectric characteristic). For example, the vibration generator 510 may vibrate (or displace) in a vertical direction (or a thickness direction) Z as contraction and/or expansion are alternately repeated by an inverse piezoelectric effect.

The vibration generator 510 may be configured to have flexibility. For example, vibration generator 510 may be configured to be bent in a non-planar shape including a curved surface.

The vibration generator 510 according to an example embodiment of the present disclosure may include a tetragonal shape which has a first length parallel to a first direction X and a second length parallel to a second direction Y intersecting with the first direction X. For example, the vibration generator 510 may include a square shape where the first length is the same as the second length, or may include a rectangular shape where the first length differs from the second length. For example, a vibration apparatus including the vibration generator 510 having a square shape may be coupled to or attached on the curved portion 350 of the supporting member 300 illustrated in FIG. 4A. For example, a vibration apparatus including the vibration generator 510 having a rectangular shape may be coupled to or attached on the curved portion 350 of the supporting member 300 illustrated in FIG. 4B or 4C.

The connection member 520 may be connected or coupled to one of a first surface S1 and a second surface S2, which is different from (or opposite to) the first surface S1, of the vibration generator 510. For example, in the vibration generator 510, the first surface S1 may be a top surface, a forward surface, a front surface, or an upper surface. In the vibration generator 510, the second surface S2 may be a bottom surface, a backside surface, a rear surface, a lower surface, or a backward surface. For example, in the vibration generator 510, the first surface S1 may be disposed closer to the connection member 520 than the second surface S2. For example, the connection member 520 may be a first connection member, an adhesive member, or a first adhesive member.

The connection member 520 according to an example embodiment of the present disclosure may include an adhesive layer (or a tacky layer) which is good in adhesive force or attaching force. For example, the connection member 520 may include a double-sided adhesive tape, a double-sided foam pad, or a tacky sheet. For example, when the connection member 520 includes a tacky sheet (or a tacky layer), the connection member 520 may include only an adhesive layer or a tacky layer without a base member such as a plastic material or the like.

The adhesive layer (or a tacky layer) of the connection member 520 according to an example embodiment of the present disclosure may include epoxy, acrylic, silicone, or urethane, but embodiments of the present disclosure are limited thereto. The adhesive layer (or a tacky layer) of the connection member 520 according to another example embodiment of the present disclosure may include a pressure sensitive adhesive (PSA), an optically clear adhesive (OCA), or an optically clear resin (OCR), but embodiments of the present disclosure are limited thereto.

The connection member 520 according to an example embodiment of the present disclosure, as illustrated in FIGS. 3 and 5, may connect or couple the vibration generator 510 to the curved portion 350 of the supporting member 300. For example, the connection member 520 may be disposed between the curved portion 350 of the supporting member 300 and the first surface of the vibration generator 510. For example, the connection member 520 may be interposed between the curved portion 350 of the supporting member 300 and the first surface of the vibration generator 510.

Therefore, the vibration generator 510 may be coupled to or attached on the curved portion 350 of the supporting member 300 through the connection member 520, and thus, may receive a pre-stress (or a pre-tension stress) or may include a state where the vibration generator 510 is bent in a curved shape, based on a curved shape of the curved portion 350. Accordingly, the vibration generator 510 may vibrate in a state where the vibration generator 510 receives a pre-stress (or a pre-tension stress) or is bent in a curved shape, and thus, as described above, a second moment of inertia may increase, or a vibration direction may be implemented as a single direction.

Figure 7:
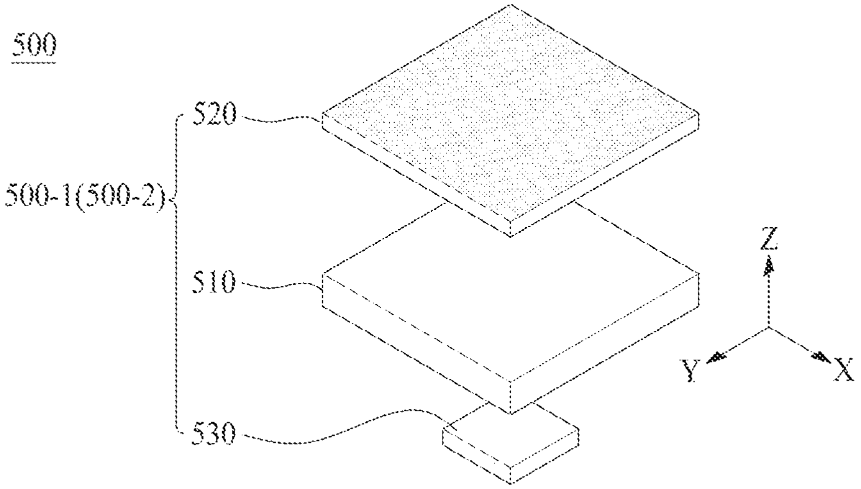
FIG. 7 is a perspective view illustrating a vibration apparatus according to a second example embodiment of the present disclosure.

FIG. 7 is a perspective view illustrating a vibration apparatus according to a second example embodiment of the present disclosure. FIG. 7 illustrates an example embodiment where a pad is added to the vibration apparatus illustrated in FIG. 6.

With reference to FIG. 7, a vibration apparatus 500 or first and second vibration apparatuses 500-1 and 500-2 according to the second example embodiment of the present disclosure may include a vibration generator 510, a connection member 520, and a pad 530.

Each of the vibration generator 510 and the connection member 520 may be the same or substantially the same as described above with reference to FIG. 6, and thus, like reference numerals refer to like elements and their repetitive descriptions may be omitted for brevity.

The pad 530 may be coupled to or attached on a second surface of the vibration generator 510. For example, the pad 530 may be coupled to or attached on a center portion of the second surface of the vibration generator 510. The pad 530 may have a size which is smaller than or equal to that of the vibration generator 510. For example, the pad 530 may have a polygonal pillar shape or a circular pillar shape, but embodiments of the present disclosure are not limited thereto.

The pad 530 according to an example embodiment of the present disclosure may include a material having stiffness which is smaller than a bending stiffness of the vibration generator 510. The pad 530 according to another example embodiment of the present disclosure may include an elastic material which may act as a mass (or a weight) on the vibration generator 510.

The pad 530 according to an example embodiment of the present disclosure may increase a mass of the vibration generator 510, and thus, may reduce a lowest resonance frequency (or a lowest natural frequency) of the vibration generator 510. Therefore, the vibration generator 510 may vibrate at a relatively low frequency due to a lowest resonance frequency (or a lowest natural frequency) based on an increase in mass caused by the pad 530. Accordingly, a sound characteristic and/or a sound pressure level characteristic of a low-pitched sound band generated based on a vibration of the vibration apparatus 500 may be enhanced. For example, the pad 530 may be a resonance pad, a mass member, a weight clapper, or a weight member. For example, the low-pitched sound band may be about 300 Hz or about 500 Hz or less, but embodiments of the present disclosure are not limited thereto.

Figure 8:
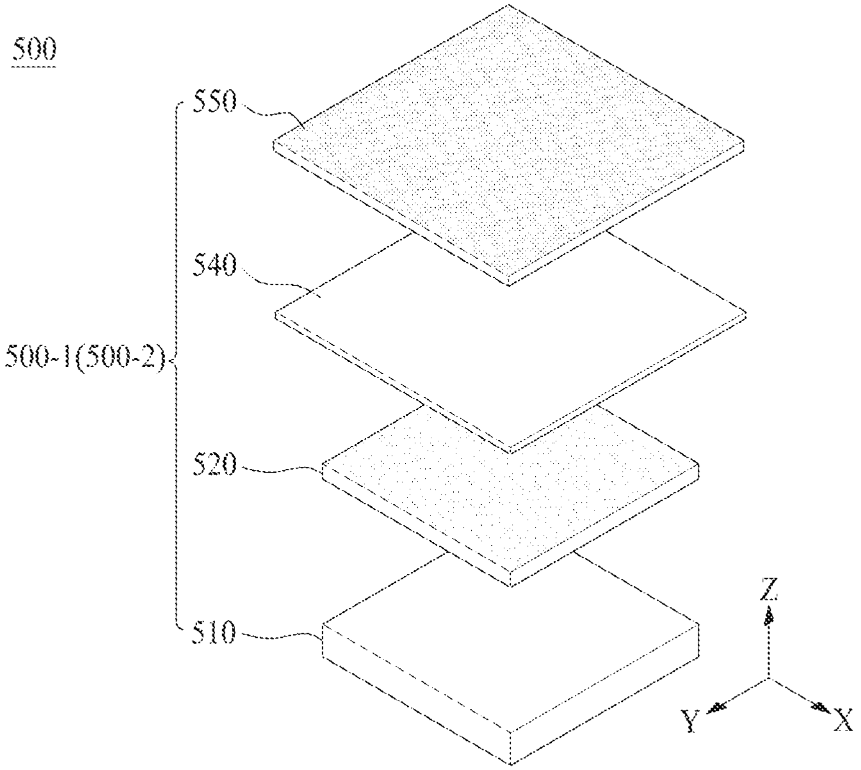
FIG. 8 is a perspective view illustrating a vibration apparatus according to a third example embodiment of the present disclosure.

FIG. 8 is a perspective view illustrating a vibration apparatus according to a third example embodiment of the present disclosure. FIG. 8 illustrates an example embodiment where a plate and a second connection member are added to the vibration apparatus illustrated in FIG. 6. In describing FIG. 8, therefore, a plate, a second connection member, and relevant elements will be only described for brevity.

With reference to FIG. 8 in conjunction with FIG. 3 or 5, a vibration apparatus 500 or first and second vibration apparatuses 500-1 and 500-2 according to the third example embodiment of the present disclosure may include a vibration generator 510, a first connection member 520, a plate 540, and a second connection member 550.

Each of the vibration generator 510 and the first connection member 520 may be the same or substantially the same as described above with reference to FIG. 6, and thus, like reference numerals refer to like elements and their repetitive descriptions may be omitted for brevity.

The plate 540 may be connected to or attached on the first connection member 520. For example, the plate 540 may have a size or an area which is greater than that of the vibration generator 510. For example, a center portion of the plate 540 may be aligned or positioned at a center portion of the vibration generator 510. The plate 540 may be coupled to or attached on the curved portion 350 of the supporting member 300 illustrated in FIGS. 2 to 6 by the second connection member 550.

According to an example embodiment of the present disclosure, the vibration generator 510 may have a modulus which is greater than a modulus (or a young's modulus) of each of the first connection member 520, the plate 540, and the second connection member 550 or may have a modulus which is equal to a modulus (or a young's modulus) of each of the first connection member 520 and the second connection member 550 and is greater than a modulus (or a young's modulus) of the plate 540, so that the vibration generator 510 is bent in a curved shape and a vibration of the vibration generator 510 is transferred to a curved portion 350 of a supporting member 300. For example, the plate 540 may have a modulus which is smaller than that of the vibration generator 510. Therefore, the vibration generator 510 may be bent in a shape corresponding to the curved portion 350 of the supporting member 300 through the first connection member 520, the plate 540, and the second connection member 550, thereby enhancing the reliability of sound reproduction. In addition, the vibration generator 510 according to an example embodiment of the present disclosure may have enhanced adhesiveness to the curved portion 350 of the supporting member 300 through the first connection member 520, the plate 540, and the second connection member 550, and a vibration may be transferred to the curved portion 350 of the supporting member 300 without loss in vibrating, thereby enhancing a sound characteristic and/or a sound pressure level characteristic of the low-pitched sound band.

For example, when a modulus of the plate 540 is greater than that of the vibration generator 510, the vibration generator 510 may be difficult to be bent in a shape corresponding to the curved portion 350 of the supporting member 300, and adhesiveness to the curved portion 350 of the supporting member 300 through the first connection member 520, the plate 540, and the second connection member 550 may be reduced. Accordingly, the reliability of sound reproduction may be reduced, and a sound characteristic and/or a sound pressure level characteristic of the low-pitched sound band may be reduced. According to an example embodiment of the present disclosure, the plate 540 may include a material having a material characteristic suitable so that the vibration generator 510 is bent in a curved shape and a vibration of the vibration generator 510 is transferred to the curved portion 350 of the supporting member 300. For example, the plate 540 may include a material having stiffness which is smaller than a bending stiffness of the vibration generator 510. The plate 540 may include one or more materials of metal, glass, plastic, fiber, leather, rubber, wood, cloth, and paper. For example, the plate 540 may be a supporting plate, a stiffness plate, a transmission plate, an intermediate plate, or a vibration transmission plate, but embodiments of the present disclosure are not limited thereto. The second connection member 550, as illustrated in FIG. 8, may connect or couple the plate 540 to the curved portion 350 of the supporting member 300, shown in FIGS. 3 and 5. For example, the second connection member 550 may be disposed between the curved portion 350 of the supporting member 300 and the plate 540. For example, the second connection member 550 may be interposed between the curved portion 350 of the supporting member 300 and the plate 540.

The second connection member 550 may include an adhesive layer (or a tacky layer) which is good in adhesive force or attaching force. The second connection member 550 may include an adhesive material having a modulus which differs from that of the first connection member 520. For example, the first connection member 520 may have a modulus (or an adhesive force or hardness) which is greater than that of the second connection member 550, so that the plate 540 and the vibration generator 510 are smoothly bent in a curved shape.

Therefore, the vibration generator 510 may be coupled to or attached on the curved portion 350 of the supporting member 300 through the first connection member 520, and thus, may receive a pre-stress (or a pre-tension stress) or may include a state where the vibration generator 510 is bent in a curved shape, based on a curved shape of the curved portion 350. Accordingly, the vibration generator 510 may vibrate in a state where the vibration generator 510 receives a pre-stress (or a pre-tension stress) or is bent in a curved shape, and thus, a second moment of inertia may increase, or a vibration direction may be implemented as a single direction.

Figure 9:
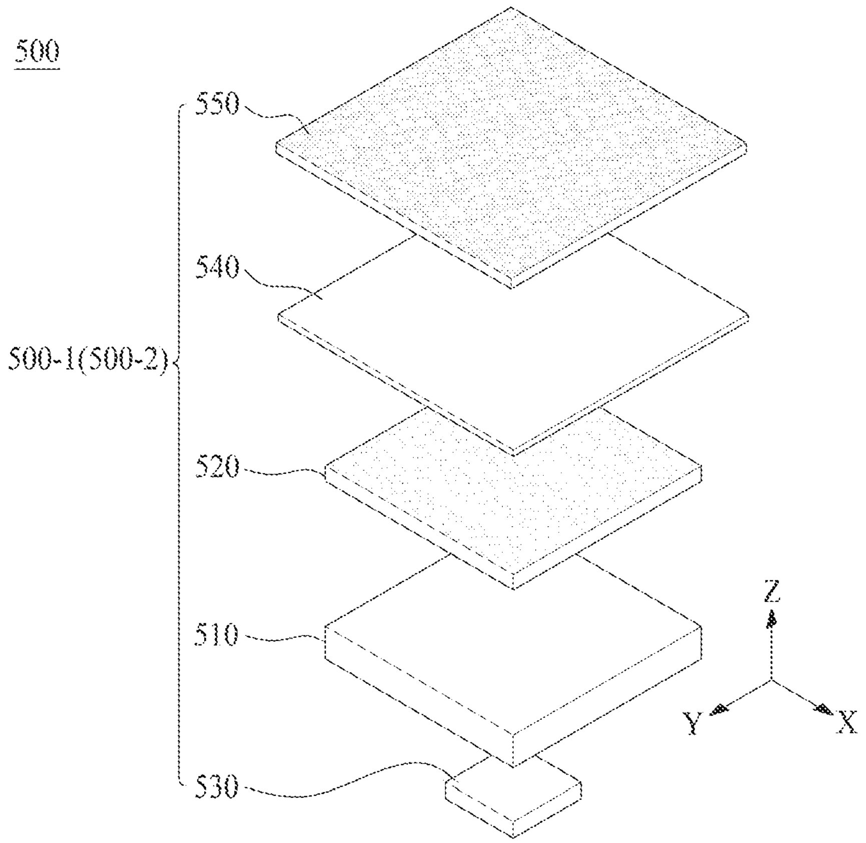
FIG. 9 is a perspective view illustrating a vibration apparatus according to a fourth example embodiment of the present disclosure.

FIG. 9 is a perspective view illustrating a vibration apparatus according to a fourth example embodiment of the present disclosure. FIG. 9 illustrates an example embodiment where a pad is added to the vibration apparatus illustrated in FIG. 8.

With reference to FIG. 9, a vibration apparatus 500 or first and second vibration apparatuses 500-1 and 500-2 according to the fourth example embodiment of the present disclosure may include a vibration generator 510, a first connection member 520, a plate 540, a second connection member 520, and a pad 530.

Each of the vibration generator 510, the first connection member 520, the plate 540, and the second connection member 520 may be the same or substantially the same as described above with reference to FIG. 8, and thus, like reference numerals refer to like elements and their repetitive descriptions may be omitted for brevity.

The pad 530 may be coupled to or attached on the second surface of the vibration generator 510. For example, the pad 530 may be coupled to or attached on a center portion of the second surface of the vibration generator 510. The pad 530 may increase a mass of the vibration generator 510 to decrease a lowest resonance frequency (or a lowest natural frequency) of the vibration generator 510. The pad 530 may be substantially the same as described above with reference to FIG. 7, and thus, like reference numeral refer to like element and the repetitive description thereof may be omitted for brevity.

Figure 10:
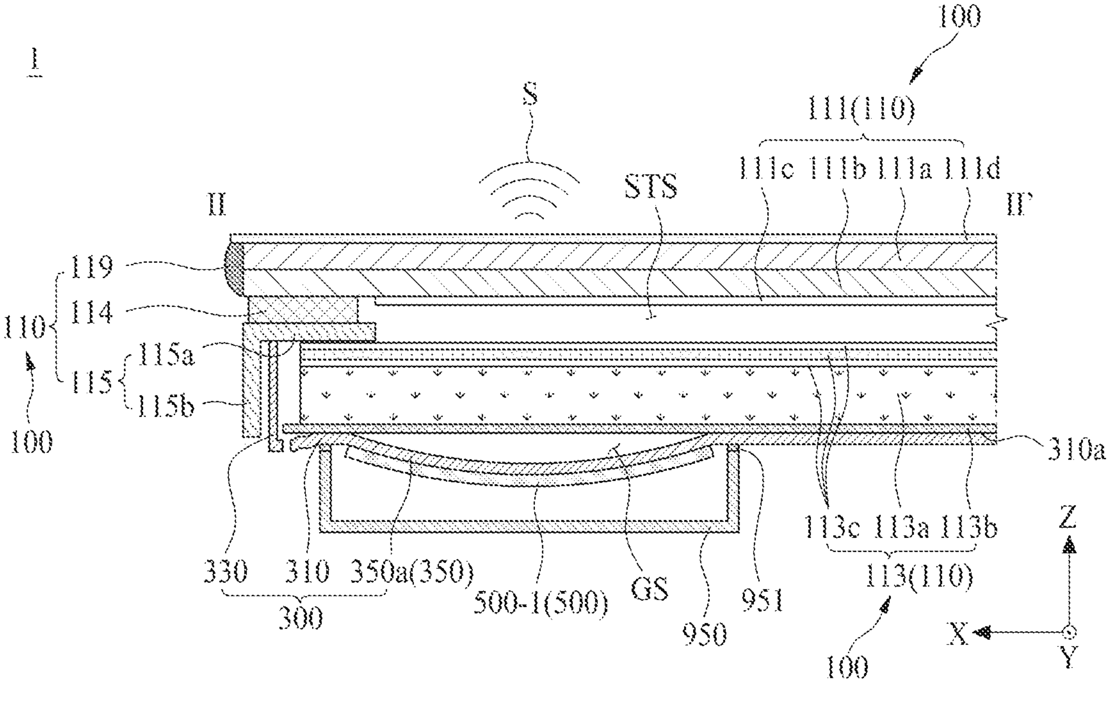
FIG. 10 is another example cross-sectional view taken along line II-II' illustrated in FIG. 2.

FIG. 10 is another example cross-sectional view taken along line II-II' illustrated in FIG. 2. FIG. 10 illustrates an example embodiment where an enclosure is added to the apparatus 1 illustrated in FIGS. 2 to 9. In describing FIG. 10, therefore, the other elements except an enclosure and relevant elements are referred to by like reference numerals, and their repetitive descriptions may be omitted for brevity.

With reference to FIG. 10, the apparatus 1 according to the first example embodiment of the present disclosure may further include an enclosure 950.

The enclosure 950 may be connected or coupled to a rear surface of the supporting member 300 to cover the vibration apparatus 500. For example, the enclosure 950 may be connected or coupled to the rear surface of the rear portion 310 of the supporting member 300 by a coupling member 951. The enclosure 950 may configure a closed space which covers or surrounds the vibration apparatus 500, in the rear surface of the supporting member 300. For example, the enclosure 950 may configure a closed space which covers or surrounds the vibration apparatus 500, in the rear surface of the rear portion 310 of the supporting member 300. For example, the enclosure 950 may be a closed member, a closed cap, a closed box, or a sound box, but embodiments of the present disclosure are not limited thereto. The closed space may be an air gap, a vibration space, a sound space, or a sounding box, but embodiments of the present disclosure are not limited thereto.

The enclosure 950 may include one or more materials of a metal material and a nonmetal material (or a composite nonmetal material). For example, the enclosure 950 may include one or more materials of a metal material, plastic, and wood, but embodiments of the present disclosure are not limited thereto.

The enclosure 950 according to an example embodiment of the present disclosure may maintain an impedance component based on air acting on the curved portion 350 of the supporting member 300 when the curved portion 350 of the supporting member 300 or the vibration apparatus 500 is vibrating. For example, air around the supporting member 300 may resist a vibration of the curved portion 350 of the supporting member 300 and may act as an impedance component having a reactance component and a resistance based on a frequency. Therefore, the enclosure 950 may configure a closed space which surrounds the vibration apparatus 500, in the rear surface of the supporting member 300, and thus, may maintain an impedance component (or an air impedance or an elastic impedance) acting on the curved portion 350 of the supporting member 300 based on air, thereby enhancing a sound characteristic and/or a sound pressure level characteristic of the low-pitched sound band and enhancing the quality of a sound of a high-pitched sound band. For example, the high-pitched sound band may be 3 kHz or more, or 5 kHz or more, but embodiments of the present disclosure are not limited thereto.

In the apparatus 1 according to the first example embodiment of the present disclosure, by the enclosure 950, a sound characteristic and/or a sound pressure level characteristic of the low-pitched sound band may be enhanced, and the quality of a sound of the high-pitched sound band may be enhanced.

Figure 11A:
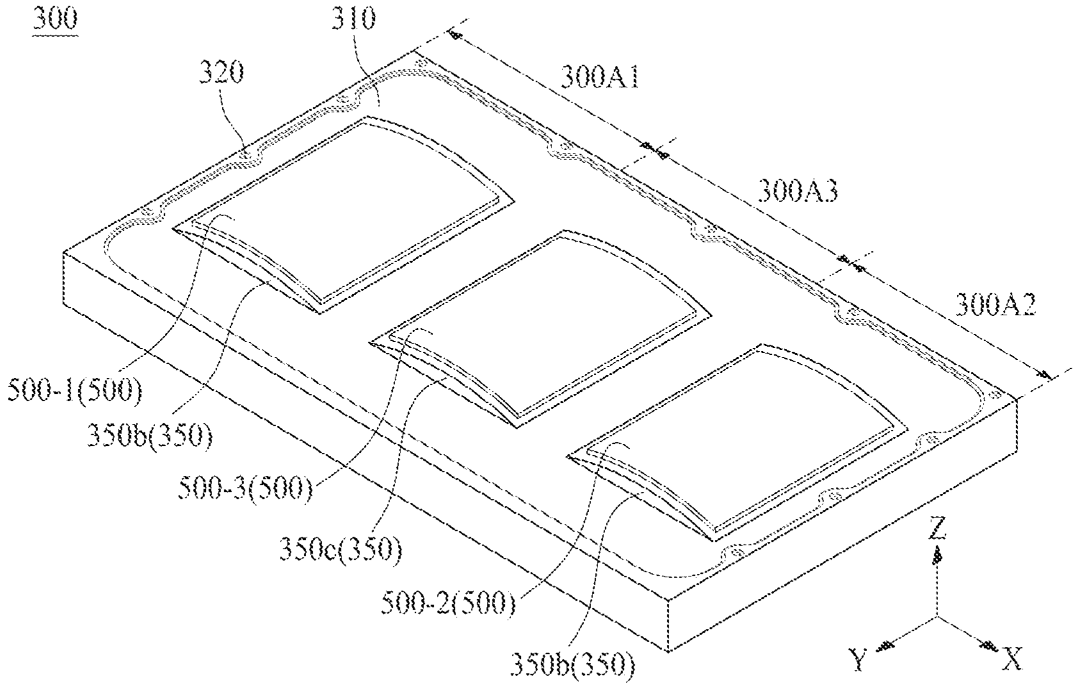
FIGS. 11A and 11B are rear perspective views illustrating a supporting member according to another example embodiment of the present disclosure.
Figure 11B:
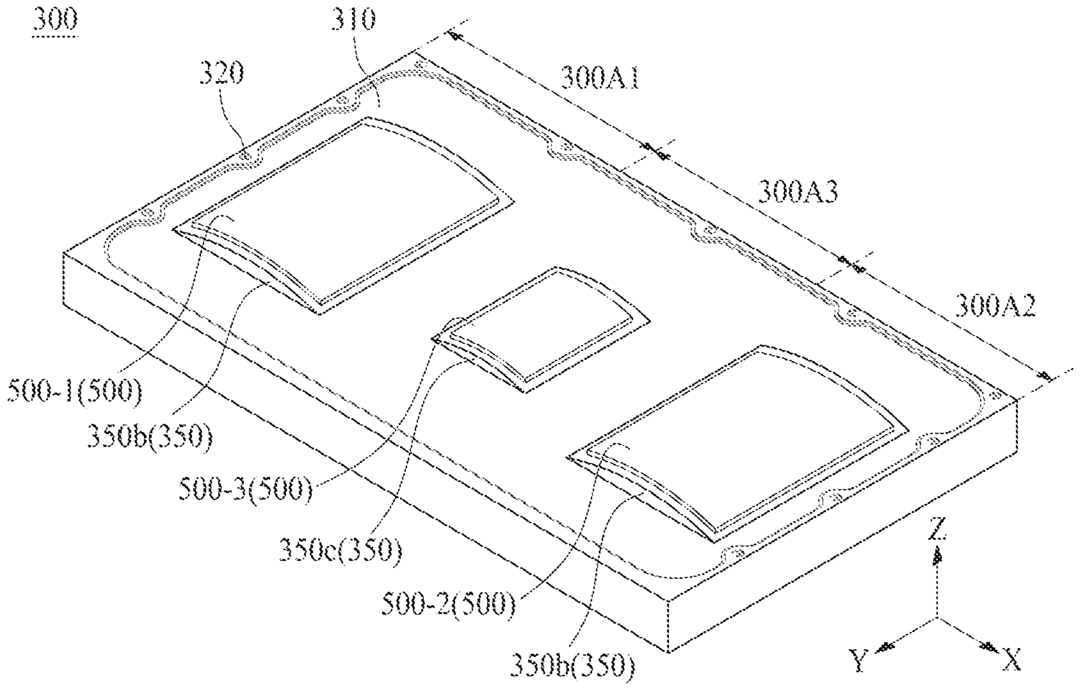

FIGS. 11A and 11B are rear perspective views illustrating a supporting member according to another example embodiment of the present disclosure. FIGS. 11A and 11B illustrate an example embodiment implemented by modifying the curved portion of the supporting member illustrated in FIGS. 2 to 5.

With reference to FIGS. 11A and 11B, a rear portion 310 of a supporting member 300 according to another example embodiment of the present disclosure may include a first region 300A1, a second region 300A2, and a third region 300A3. For example, the rear portion 310 of the supporting member 300 may include the first to third regions 300A1, 300A2, and 300A3, with respect to a first length (or a widthwise length) parallel to the first direction X.

The first region 300A1 may be a first rear region, a left region, or a rear left region. The second region 300A2 may be a second rear region, a right region, or a rear right region. The third region 300A3 may be a region between the first region 300A1 and the second region 300A2. For example, the third region 300A3 may be a center region including a center line having a first length of a supporting member 300.

The supporting member 300 may include a curved portion 350 disposed in each of the first to third regions 300A1, 300A2, and 300A3.

With reference to FIG. 11A, a curved portion 350 according to an example embodiment of the present disclosure may include first to third curved portions 350*a*, 350*b*, and 350*c* respectively disposed in the first to third regions 300A1, 300A2, and 300A3.

Each of the first to third curved portions 350*a*, 350*b*, and 350*c* may protrude from the rear portion 310 to have the same size and the same shape. Each of the first to third curved portions 350*a*, 350*b*, and 350*c* may protrude from the rear portion 310 to have the same curvature. A protrusion structure and a curvature of each of the first to third curved portions 350*a*, 350*b*, and 350*c* may be the same or substantially the same as described above with reference to FIG. 3, and thus, their repetitive descriptions may be omitted for brevity.

Each of the first to third curved portions 350*a*, 350*b*, and 350*c*, as described above with reference to FIGS. 4A to 4C, may have a square shape or a rectangular shape, and thus, their repetitive descriptions may be omitted for brevity.

The vibration apparatus 500 may include a first vibration apparatus 500-1 disposed at the first curved portion 350*a*, a second vibration apparatus 500-2 disposed at the second curved portion 350*b*, and a third vibration apparatus 500-3 disposed at the third curved portion 350*c*. Each of the first to third vibration apparatuses 500-1, 500-2, and 500-3, as described above, may vibrate in a state where each of the first to third vibration apparatuses 500-1, 500-2, and 500-3 receives a pre-stress (or a pre-tension stress) or is bent in a curved shape, and thus, as described above, a second moment of inertia may increase, or a vibration direction may be implemented as a single direction.

With reference to FIG. 11B, according to an example embodiment of the present disclosure, one or more of the first to third curved portions 350*a*, 350*b*, and 350*c* may protrude from the rear portion 310 to have different sizes and different shapes. One or more of the first to third curved portions 350*a*, 350*b*, and 350*c* may protrude from the rear portion 310 to have different curvatures. For example, the third curved portion 350*c* may have a size which is smaller than that of each of the first and second curved portions 350*a* and 350*b*. Except that the third curved portion 350*c* has a size which is smaller than each of the first and second curved portions 350*a* and 350*b*, the curved portion 350 illustrated in FIG. 11B may be substantially the same, and thus, the repetitive description thereof may be omitted for brevity.

The third vibration apparatus 500-3 may be disposed at the third curved portion 350*c* and may have a size corresponding to that of the third curved portion 350*c*, and thus, may have a size which is smaller than each of the first vibration apparatus 500-1 and the second vibration apparatus 500-2.

With reference to FIGS. 11A and 11B, each of the first to third vibration apparatuses 500-1, 500-2, and 500-3 according to an example embodiment of the present disclosure may be configured to generate or output a sound of the same pitched sound band. Therefore, the apparatus 1 according to an example embodiment of the present disclosure may output a stereo sound based on a sound which is output from each of a left portion, a right portion, and a center portion (or a middle portion) of the vibration member 100 based on a vibration of the vibration member 100 based on each of the first to third vibration apparatuses 500-1, 500-2, and 500-3 and may have a 3-channel sound output characteristic.

According to another example embodiment of the present disclosure, one or more of the first to third vibration apparatuses 500-1, 500-2, and 500-3 may be configured to generate or output sounds of different pitched sound bands. For example, the third vibration apparatus 500-3 may be configured to generate or output a sound of the low-pitched sound band, and each of the first and second vibration apparatuses 500-1 and 500-2 may be configured to generate or output a sound of a pitched sound band which is broader than that of the third vibration apparatus 500-3, but embodiments of the present disclosure are not limited thereto. Therefore, the apparatus 1 according to the first example embodiment of the present disclosure may implement a sound, for example, a stereo sound through a left sound and a right sound which are output based on a vibration of the vibration member 100 based on driving of each of the first vibration apparatus 500-1 and the second vibration apparatus 500-2, and a sound characteristic and/or a sound pressure level characteristic of the low-pitched sound band may be enhanced due to a sound of the low-pitched sound band output based on a vibration of the vibration member 100 based on driving of the third vibration apparatus 500-3.

Figure 12:
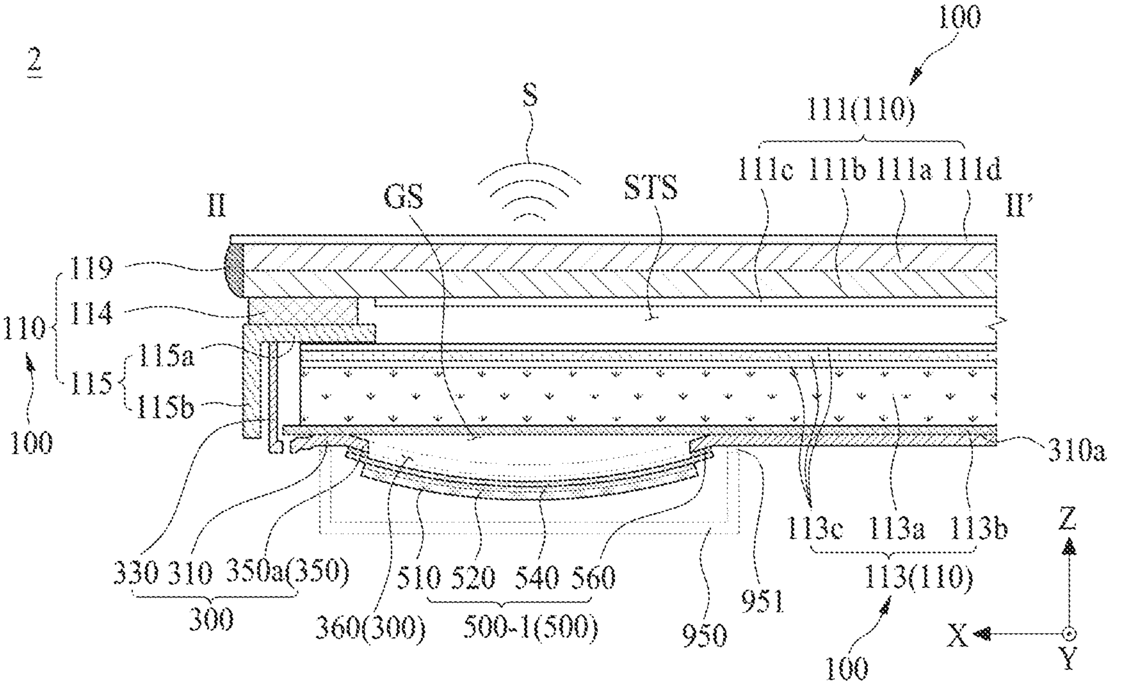
FIG. 12 is another example cross-sectional view taken along line II-II' illustrated in FIG. 2.
Figure 13:
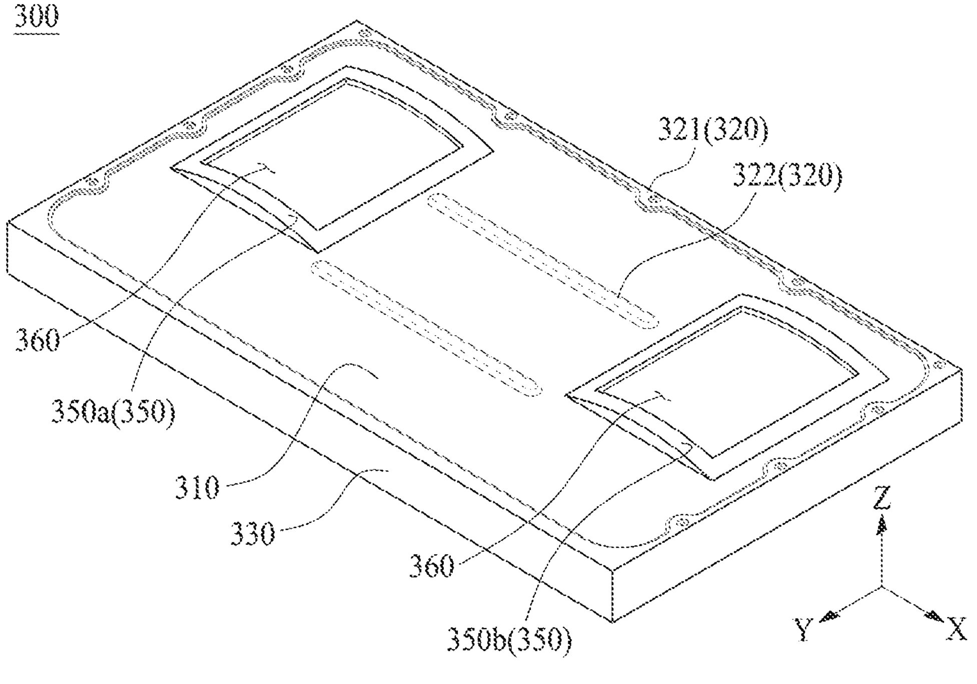
FIG. 13 is an example rear perspective view illustrating a supporting member illustrated in FIG. 12.
Figure 14:
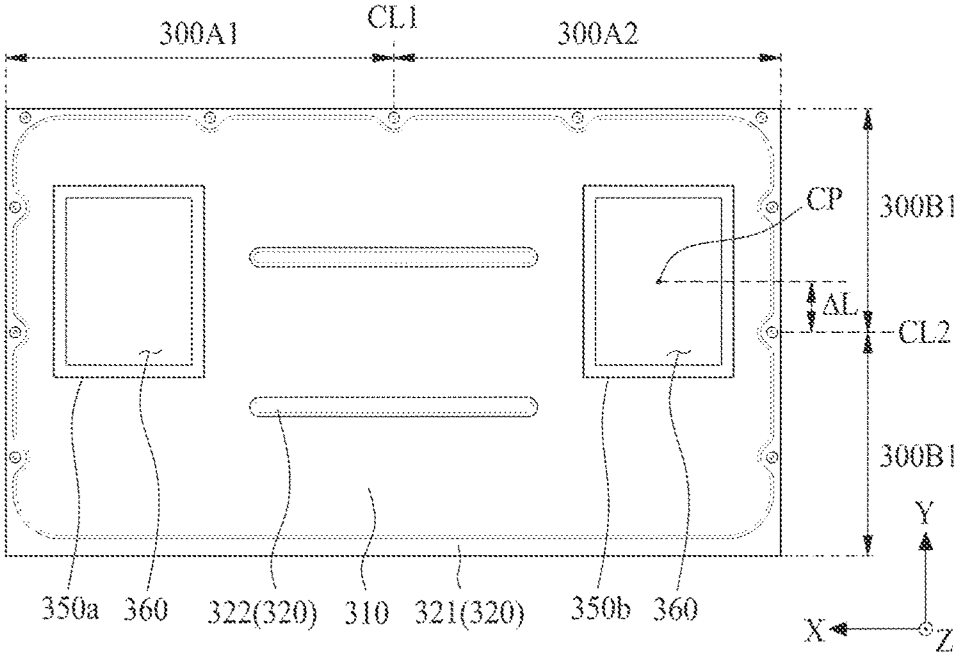
FIG. 14 is an example rear view illustrating a supporting member illustrated in FIG. 13.

FIG. 12 is another example cross-sectional view taken along line II-II' illustrated in FIG. 2, FIG. 13 is an example rear perspective view illustrating a supporting member illustrated in FIG. 12, and FIG. 14 is an example rear view illustrating a supporting member illustrated in FIG. 13. FIGS. 12 to 14 illustrate an example embodiment where a hole is added to a curved portion of a supporting member, in the apparatus described above with reference to FIGS. 1 to 5.

With reference to FIGS. 12 to 14, an apparatus 2 according to a second example embodiment of the present disclosure may include a vibration member 100, a supporting member 300, and a vibration apparatus 500.

The vibration member 100 may be the same or substantially the same as described above with reference to FIGS. 1 to 5, and thus, like reference numeral refer to like element and the repetitive description thereof may be omitted for brevity.

The supporting member 300 may be configured to support the vibration member 100. The supporting member 300 may include a rear portion 310, a lateral portion 330, a curved portion 350, and a hole 360. Each of the rear portion 310 and the lateral portion 330 may be the same or substantially the same as each of the rear portion 310 and the lateral portion 330 described above with reference to FIGS. 3 to 5, and thus, their repetitive descriptions may be omitted for brevity. Further, except that the curved portion 350 includes a hole 360, the curved portion 350 may be the same or substantially the same as the curved portion 350 described above with reference to FIGS. 3 to 5, and thus, the repetitive description thereof may be omitted for brevity.

The supporting member 300 may further include one or more holes 360 which are formed at the curved portion 350. The supporting member 300 may include one or more holes 360 which are formed at each of the first curved portion 350*a* and the second curved portion 350*b*.

The one or more holes 360 may be formed at the curved portion 350. For example, the one or more holes 360 may be formed to pass through the curved portion 350 along a third direction Z. Therefore, the one or more holes 360 may be an opening portion, a communication portion, an opening hole, a communication hole, a through portion, a through port, a through hole, a supporting hole, a slit, a slot, or a sound through portion, but embodiments of the present disclosure are not limited thereto. For example, the third direction Z may be a thickness direction or a height direction of the supporting member 300, or may be a Z-axis direction in an XYZ-axis direction.

The one or more holes 360 according to an example embodiment of the present disclosure may be formed at a portion (or a center portion), other than a periphery portion, of the curved portion 350. For example, the one or more holes 360 may be formed to pass through the portion (or the center portion), other than a periphery portion, of the curved portion 350 in the third direction Z. For example, the supporting member 300 may include the one or more holes 360 formed at the portion (or the center portion), other than a periphery portion, of the curved portion 350.

The one or more holes 360 may be formed at the curved portion 350 and may have the same shape as that of the vibration apparatus 500. For example, when the vibration apparatus 500 has a square shape, the one or more holes 360 may have a square shape, and when the vibration apparatus 500 has a rectangular shape, the one or more holes 360 may have a rectangular shape, but embodiments of the present disclosure are not limited thereto.

The one or more holes 360 may be formed at each of the first curved portion 350*a* and the second curved portion 350*b*. The one or more holes 360 may have a size which is smaller than that of each of the first and second vibration apparatuses 500-1 and 500-2. For example, when a total size (or a total width) of the one or more holes 360 is greater than a total size of the first and second vibration apparatuses 500-1 and 500-2, the first and second vibration apparatuses 500-1 and 500-2 may be inserted into (or pass through or accommodated into) the one or more holes 360, and thus, the first and second vibration apparatuses 500-1 and 500-2 may not be disposed at the curved portion 350 without a separate mechanism. Accordingly, when a total size (or a total width) of the one or more holes 360 is smaller than a total size of the first and second vibration apparatuses 500-1 and 500-2, the first and second vibration apparatuses 500-1 and 500-2 may be disposed at the curved portion 350 to cover or overlap the holes one or more 360 without a separate mechanism.

The one or more holes 360 formed at each of the first curved portion 350*a* and the second curved portion 350*b* may be disposed between the vibration member 100 and the first and second vibration apparatuses 500-1 and 500-2. Therefore, the one or more holes 360 may provide a gap space GS between the vibration member 100 and the first and second vibration apparatuses 500-1 and 500-2. Accordingly, comparing with the apparatus 1 illustrated in FIG. 5, the gap space GS between the vibration member 100 and the first and second curved portions 350*a* and 350*b* may extend by a space corresponding to a thickness of the first and second curved portions 350*a* and 350*b*. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

The one or more holes 360 formed in each of the first curved portion 350*a* and the second curved portion 350*b* may be disposed between the backlight 113 of the vibration member 100 and the first and second vibration apparatuses 500-1 and 500-2. Accordingly, the one or more holes 360 may provide the gap space GS between the backlight 113 and the first and second vibration apparatuses 500-1 and 500-2. For example, the one or more holes 360 may provide the gap space GS between the reflective sheet 113*b* of the backlight 113 and the first and second vibration apparatuses 500-1 and 500-2.

Each of the first and second vibration apparatuses 500-1 and 500-2 of the vibration apparatus 500 may be connected to or attached on the first and second curved portions 350*a* and 350*b* to cover the one or more holes 360 and may vibrate in a state where the first and second vibration apparatuses 500-1 and 500-2 receive a pre-stress (or a pre-tension stress) or are bent in a curved shape, and thus, a second moment of inertia may increase, or a vibration direction may be implemented as a single direction.

Each of the first and second vibration apparatuses 500-1 and 500-2 of the vibration apparatus 500 may face a rear surface of the vibration member 100 or directly face a rear surface of the vibration member 100 through the one or more holes 360. For example, each of the first and second vibration apparatuses 500-1 and 500-2 may face the backlight 113 or directly face the backlight 113 of the vibration member 100 through the one or more holes 360. For example, each of the first and second vibration apparatuses 500-1 and 500-2 may face the reflective sheet 113*b* of the backlight 113 or directly face the reflective sheet 113*b* through the one or more holes 360. Therefore, a sound (or a sound wave) generated based on driving of each of the first and second vibration apparatuses 500-1 and 500-2 may be directly transferred to the vibration member 100 through the one or more holes 360 or the gap space GS. For example, the sound (or the sound wave) generated based on driving of each of the first and second vibration apparatuses 500-1 and 500-2 may be directly transferred to the backlight 113 of the vibration member 100 through the one or more holes 360 or the gap space GS. Accordingly, a vibration of each of the first and second vibration apparatuses 500-1 and 500-2 may be efficiently transferred to the vibration member 100, and thus, a sound characteristic and/or a sound pressure level characteristic generated based on a vibration of the vibration member 100 may be enhanced. For example, each of the first and second vibration apparatuses 500-1 and 500-2 may vibrate based on a driving signal to output a sound (or a sound wave) to the gap space GS, a sound generated based on a vibration of the backlight 113 based on a sound of the gap space GS may be output to a sound transfer space STS, and a sound and/or a haptic feedback may be generated based on a vibration of the display panel 111 based on the sound of the gap space GS.

The apparatus 2 according to the second example embodiment of the present disclosure may vibrate in a state where the vibration apparatus 500 receives a pre-stress (or a pre-tension stress) or is bent in a curved shape, and thus, a second moment of inertia in the vibration apparatus 500 may increase, or a vibration direction of the vibration apparatus 500 may be implemented as a single direction. Accordingly, a sound characteristic and/or a sound pressure level characteristic generated by a vibration of the vibration member 100 based on a vibration of the vibration apparatus 500 may be enhanced. In addition, the apparatus 2 according to the second example embodiment of the present disclosure may include the hole 360 which is formed in the curved portion 350 of the supporting member 300, and thus, a sound (or a sound wave) generated based on a vibration of the vibration apparatus 500 may be directly transferred to the vibration member 100. Accordingly, the transfer efficiency of a vibration may increase, and a sound characteristic and/or a sound pressure level characteristic generated based on a vibration of the vibration member 100 may be further enhanced.

The apparatus 2 according to the second example embodiment of the present disclosure may further include an enclosure 950.

The enclosure 950 may be disposed at a rear surface of the vibration apparatus 500. For example, the enclosure 950 may be connected or coupled to a rear surface of the supporting member 300 to cover the vibration apparatus 500. For example, the enclosure 950 may be connected or coupled to the rear surface of the rear portion 310 of the supporting member 300 by a coupling member 951. The enclosure 950 may configure (or form) a closed space which covers or surrounds the vibration apparatus 500, in the rear surface of the rear portion 310 of the supporting member 300. For example, the enclosure 950 may configure a closed space which covers or surrounds the vibration apparatus 500, in the rear surface of the rear portion 310 of the supporting member 300. For example, the enclosure 950 may be a closed member, a closed cap, a closed box, or a sound box, but embodiments of the present disclosure are not limited thereto. The closed space may be an air gap, a vibration space, a sound space, or a sounding box, but embodiments of the present disclosure are not limited thereto.

The enclosure 950 may include one or more materials of a metal material and a nonmetal material (or a composite nonmetal material). For example, the enclosure 950 may include one or more materials of a metal material, plastic, and wood, but embodiments of the present disclosure are not limited thereto.

The enclosure 950 according to an example embodiment of the present disclosure may maintain an impedance component based on air acting on the vibration apparatus 500 when vibration apparatus 500 is vibrating. For example, air around the vibration apparatus 500 may resist a vibration of the vibration apparatus 500 and may act as an impedance component having a reactance component and a resistance based on a frequency. Therefore, the enclosure 950 may configure a closed space which surrounds the vibration apparatus 500, in the rear surface of the supporting member 300, and thus, may maintain an impedance component (or an air impedance or an elastic impedance) acting on the vibration apparatus 500 based on air. Accordingly, a sound characteristic and/or a sound pressure level characteristic of the low-pitched sound band may be enhanced and the quality of a sound of a high-pitched sound band may be enhanced.

In the apparatus 2 according to the second example embodiment of the present disclosure, by the enclosure 950, a sound characteristic and a sound pressure level characteristic of the low-pitched sound band may be enhanced, and the quality of a sound of the high-pitched sound band may be enhanced.

Figure 15:
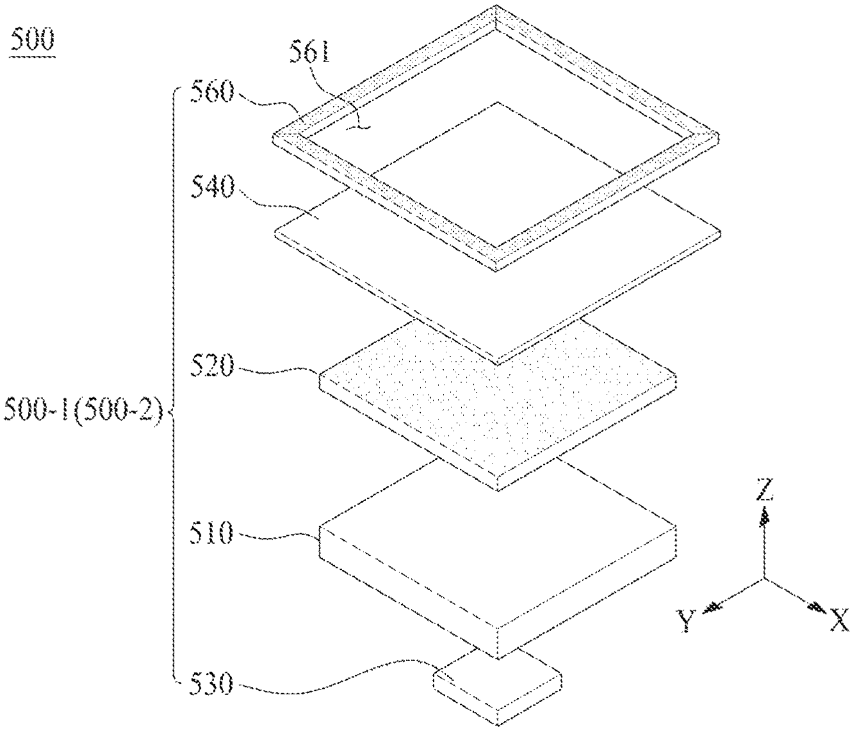
FIG. 15 is an example rear perspective view illustrating a vibration apparatus according to a fifth example embodiment of the present disclosure.

FIG. 15 is an example rear perspective view illustrating a vibration apparatus according to a fifth example embodiment of the present disclosure. FIG. 15 is an example diagram for describing the vibration apparatus illustrated in FIG. 12.

With reference to FIGS. 12, 13, and 15, a vibration apparatus 500 or first and second vibration apparatuses 500-1 and 500-2 according to the fifth example embodiment of the present disclosure may include a vibration generator 510, a first connection member 520, a plate 540, and a second connection member 560.

Each of the vibration generator 510, the first connection member 520, and the plate 540 may be the same or substantially the same as described above with reference to FIG. 8 or 9, and thus, like reference numerals refer to like elements and their repetitive descriptions may be omitted for brevity.

A plate 540 according to an example embodiment of the present disclosure may have a size which is smaller than or equal to that of the curved portion 350 of the supporting member 300. The plate 540 may have a size which is greater than that of the one or more holes 360 formed at the curved portion 350. Accordingly, the plate 540 which supports or is coupled to the vibration generator 510 by the first connection member 520 may cover the one or more holes 360 of the supporting member 300.

A second connection member 560 may be disposed between the curved portion 350 of the supporting member 300 and the plate 540. For example, a second connection member 560 may be disposed between the curved portion 350 of the supporting member 300 and a front periphery portion of the plate 540.

The second connection member 560 may include an adhesive layer (or a tacky layer) or an adhesive material, which is the same as that of the second connection member 550 described above with reference to FIG. 8 or 9.

The second connection member 560 according to an example embodiment of the present disclosure may include an opening portion 561 which corresponds to or overlaps the one or more holes 360. Therefore, the second connection member 560 may be disposed or provided between the curved portion 350 of the supporting member 300 and the front periphery portion of the plate 540. For example, the second connection member 560 may be configured in a tetragonal band shape including the opening portion 561.

The second connection member 560 according to another example embodiment of the present disclosure may have a structure where the second connection member 560 is divided into four or more portions to correspond to or overlap the front periphery portion of the plate 540.

A vibration generator 510 of a vibration apparatus 500 or each of first and second vibration apparatuses 500-1 and 500-2 according to a fifth example embodiment of the present disclosure may vibrate in a state in which the vibration generator 510 receives a pre-stress (or a pre-tension stress) or is bent in a curved shape, based on the curved portion 350, and thus, may output a sound (or a sound wave) through the one or more holes 360 or a gap space GS. Accordingly, a vibration of the vibration generator 510 may be efficiently transferred to the vibration member 100, and thus, a sound characteristic and/or a sound pressure level characteristic generated based on a vibration of the vibration member 100 may be enhanced.

Figure 16A:
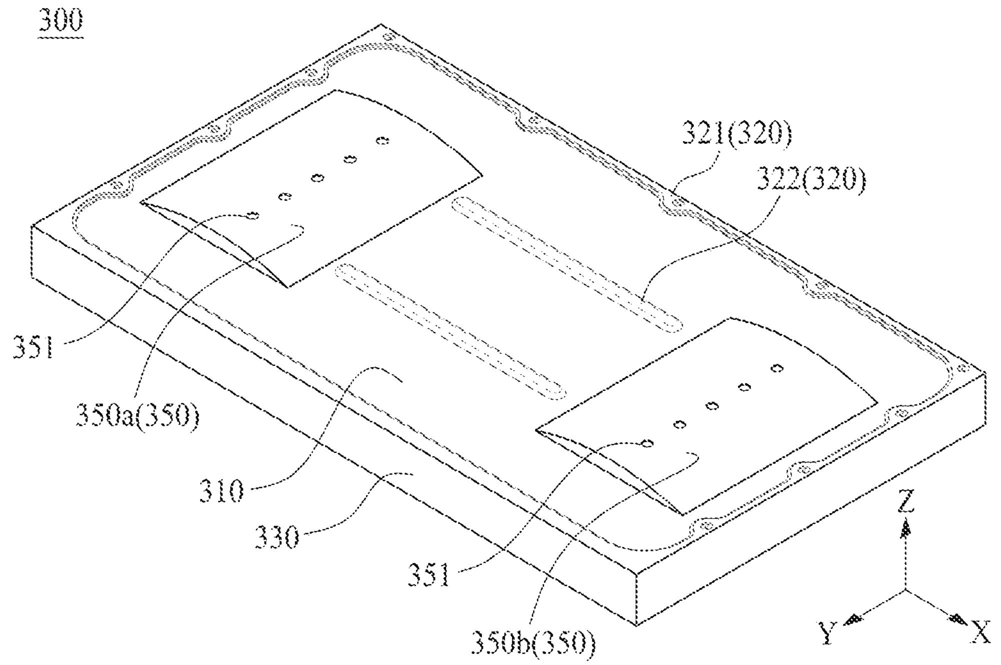
FIGS. 16A and 16B are rear perspective views illustrating a supporting member according to another example embodiment of the present disclosure.
Figure 16B:
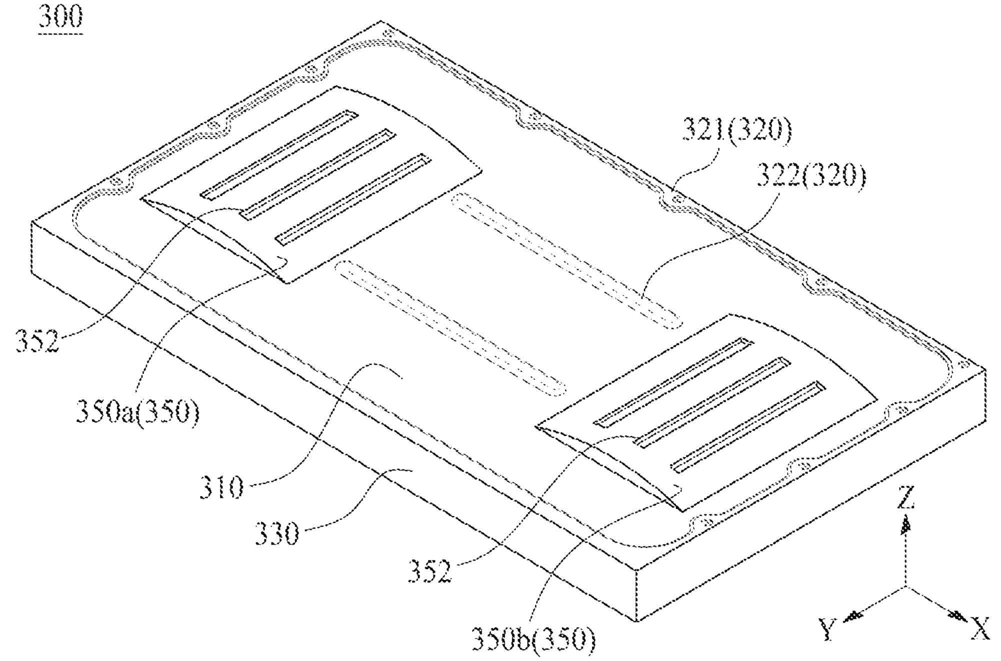

FIGS. 16A and 16B are rear perspective views illustrating a supporting member according to another example embodiment of the present disclosure. FIGS. 16A and 16B illustrate an example embodiment implemented by modifying the curved portion of the supporting member illustrated in FIG. 13.

With reference to FIGS. 12 and 16A, a supporting member 300 according to another example embodiment of the present disclosure may include a plurality of holes 351 formed at the curved portion 350.

The plurality of holes 351 may be formed at the curved portion 350 to have a predetermined interval in a first direction X, but embodiments of the present disclosure are not limited thereto. For example, the plurality of holes 351 may be formed at the curved portion 350 to have a predetermined interval in one or more directions of the first direction X, a second direction Y, and a direction between the first direction X and the second direction Y.

The plurality of holes 351 may be formed at the first and second curved portions 350*a* and 350*b* of the curved portion 350 to have a predetermined interval in the first direction X, but embodiments of the present disclosure are not limited thereto. For example, the plurality of holes 351 may be formed at the first and second curved portions 350*a* and 350*b* to have a predetermined interval in one or more directions of the first direction X, the second direction Y, and a direction between the first direction X and the second direction Y.

The plurality of holes 351 may form a path through which a sound (or a sound wave) generated based on a vibration of the vibration generator 510 is transferred (or propagated) to the gap space GS or the vibration member 100. Accordingly, a vibration of the vibration generator 510 may be efficiently transferred to the vibration member 100, and thus, a sound characteristic and/or a sound pressure level characteristic generated based on a vibration of the vibration member 100 may be enhanced.

With reference to FIGS. 12 and 16B, a supporting member 300 according to another example embodiment of the present disclosure may include a plurality of slits (or slots) 352 or one or more slits (or slots) 352 at the curved portion 350.

The plurality of slits 352 may be formed at the curved portion 350 to have a predetermined interval in the first direction X, but embodiments of the present disclosure are not limited thereto. For example, the plurality of slits 352 may be formed at the curved portion 350 to have a predetermined interval in one or more directions of the first direction X, the second direction Y, and a direction between the first direction X and the second direction Y.

The plurality of slits 352 may be formed at the first and second curved portions 350*a* and 350*b* of the curved portion 350 to have a predetermined interval in the first direction X, but embodiments of the present disclosure are not limited thereto. For example, the plurality of slits 352 may be formed at the first and second curved portions 350*a* and 350*b* to have a predetermined interval in one or more directions of the first direction X, the second direction Y, and a direction between the first direction X and the second direction Y.

The plurality of slits 352 may form a path through which a sound (or a sound wave) generated based on a vibration of the vibration generator 510 is transferred (or propagated) to the gap space GS or the vibration member 100. Accordingly, a vibration of the vibration generator 510 may be efficiently transferred to the vibration member 100, and thus, a sound characteristic and/or a sound pressure level characteristic generated based on a vibration of the vibration member 100 may be enhanced.

In the supporting member 300 according to another example embodiment of the present disclosure, one or more of the first and second curved portions 350*a* and 350*b* of the curved portion 350 may be surrounded by the enclosure 950 illustrated in FIG. 12.

FIGS. 17A to 17D are rear perspective views illustrating a supporting member according to another example embodiment of the present disclosure. FIGS. 17A to 17D illustrate an example embodiment implemented by modifying the curved portion of the supporting member illustrated in FIG. 13.

Figure 17A:
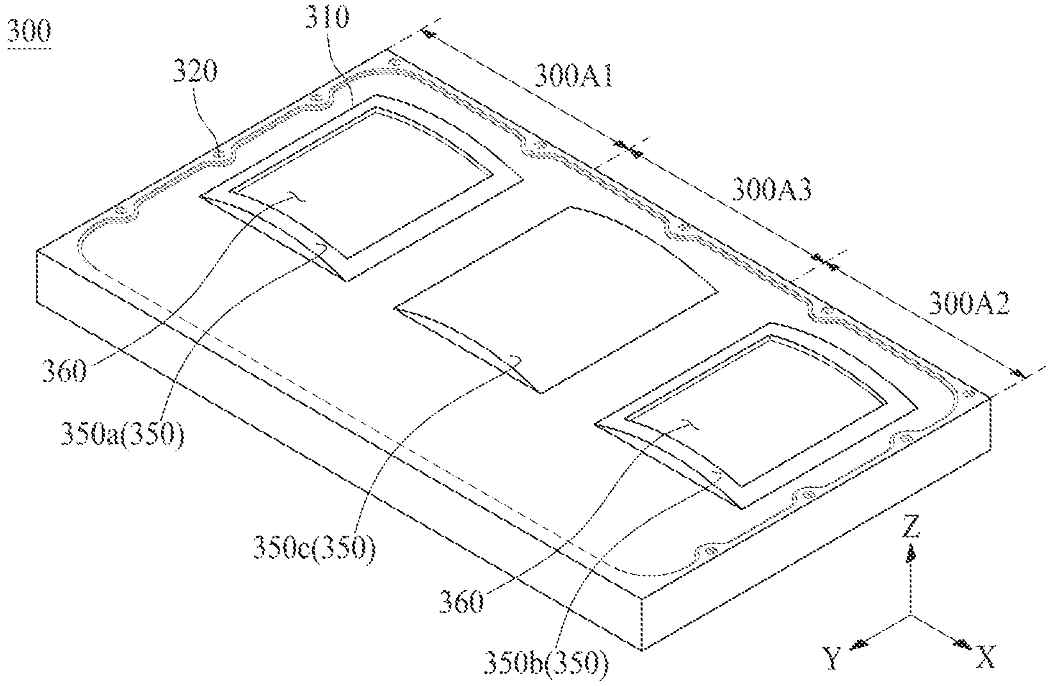
FIGS. 17A to 17D are rear perspective views illustrating a supporting member according to another example embodiment of the present disclosure.
Figure 17B:
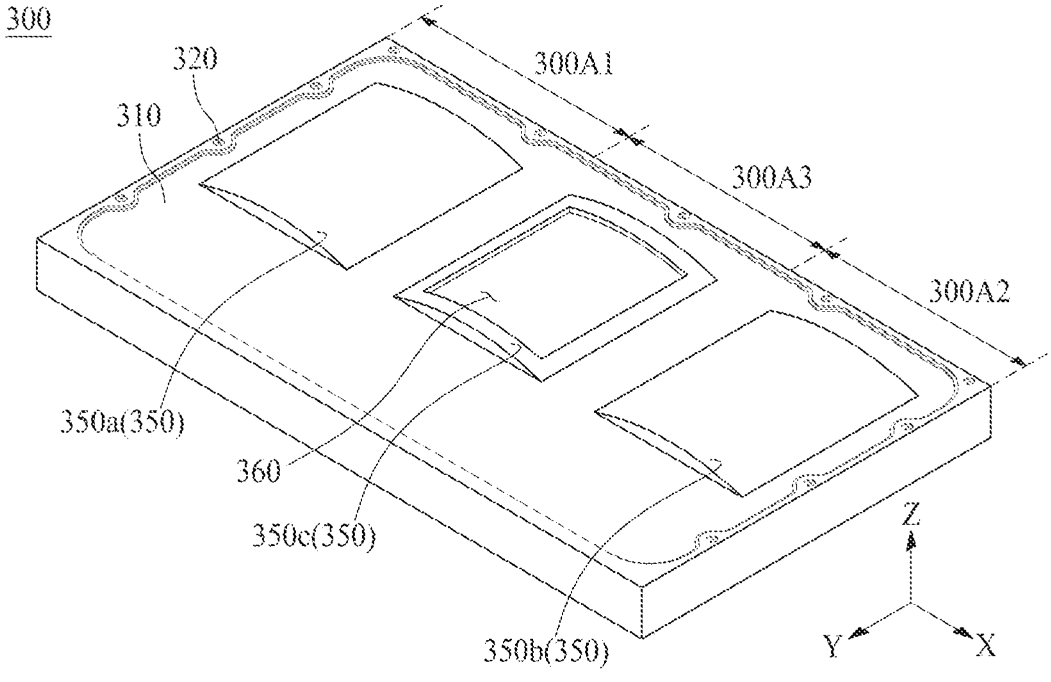
Figure 17C:
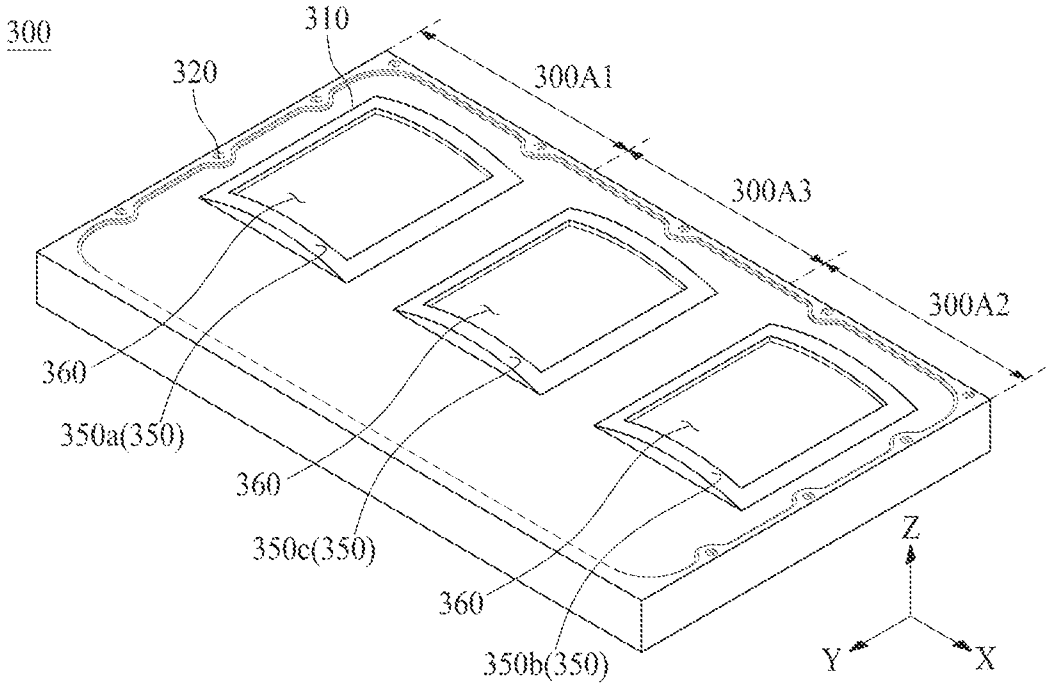

With reference to FIGS. 17A to 17C, a curved portion 350 of a supporting member 300 according to another example embodiment of the present disclosure may include first to third curved portions 350*a*, 350*b*, and 350*c* respectively disposed at the first to third regions 300A1, 300A2, and 300A3 of the rear portion 310.

The first to third curved portions 350*a*, 350*b*, and 350*c* may substantially be the same or substantially the same as the first to third curved portions 350*a*, 350*b*, and 350*c* described above with reference to FIG. 11A, and thus, like reference numerals refer to like elements and their repetitive descriptions may be omitted for brevity.

The supporting member 300 according to another example embodiment of the present disclosure may include one or more holes 360 which are formed at one or more of the first to third curved portions 350*a*, 350*b*, and 350*c*.

According to an example embodiment of the present disclosure, the one or more holes 360, as illustrated in FIG. 17A, may be formed at each of first and second curved portions 350*a* and 350*b* of first to third curved portions 350*a*, 350*b*, and 350*c*. Except that the one or more holes 360 are formed at each of the first and second curved portions 350*a* and 350*b*, the one or more holes 360 may be substantially the same as the one or more holes 360 described above with reference to FIGS. 12 and 13, and thus, like reference numerals refer to like elements and their repetitive descriptions may be omitted for brevity. The third curved portion 350*c* may be substantially the same as the third curved portion 350*c* described above with reference to FIG. 11A, and thus, like reference numeral refer to like element and the repetitive description thereof may be omitted for brevity.

According to another example embodiment of the present disclosure, the one or more holes 360, as illustrated in FIG. 17B, may be formed at the third curved portion 350*c* of the first to third curved portions 350*a*, 350*b*, and 350*c*. Except that the one or more holes 360 are formed at the third curved portion 350*c*, the one or more holes 360 may be substantially the same as the one or more holes 360 described above with reference to FIGS. 12 and 13, and thus, like reference numerals refer to like elements and their repetitive descriptions may be omitted for brevity. The first and second curved portions 350*a* and 350*b* may be substantially the same as the first and second curved portions 350*a* and 350*b* described above with reference to FIG. 11A, and thus, like reference numerals refer to like elements and their repetitive descriptions may be omitted for brevity.

According to another example embodiment of the present disclosure, the one or more holes 360, as illustrated in FIG. 17C, may be formed at each of the first to third curved portions 350*a*, 350*b*, and 350*c*. Except that the one or more holes 360 are formed at each of the first to third curved portions 350*a*, 350*b*, and 350*c*, the one or more holes 360 may be substantially the same as the one or more holes 360 described above with reference to FIGS. 12 and 13, and thus, like reference numerals refer to like elements and their repetitive descriptions may be omitted for brevity.

Figure 17D:
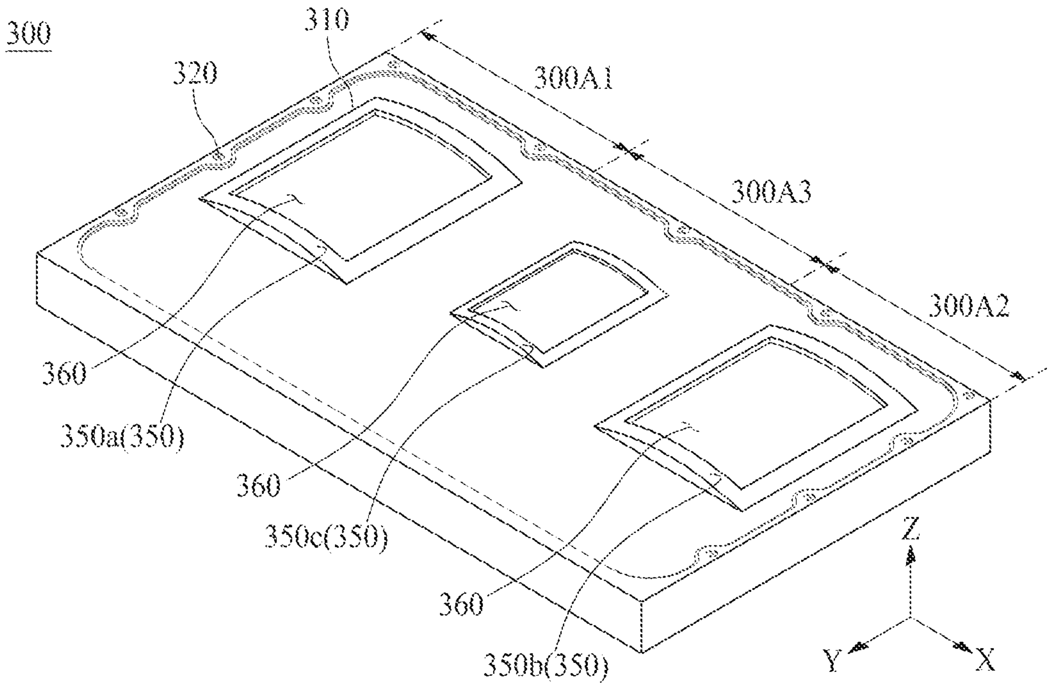

With reference to FIG. 17D, a curved portion 350 of a supporting member 300 according to another example embodiment of the present disclosure may include first to third curved portions 350*a*, 350*b*, and 350*c* respectively disposed at the first to third regions 300A1, 300A2, and 300A3 of the rear portion 310.

The third curved portion 350*c* disposed at the third region 300A3 of the first to third curved portions 350*a*, 350*b*, and 350*c* may have a size which is smaller than that of each of the first and second curved portions 350*b* and 350*c*. The first to third curved portions 350*a*, 350*b*, and 350*c* may be the same or substantially the same as the first to third curved portions 350*a*, 350*b*, and 350*c* described above with reference to FIG. 11B, and thus, like reference numerals refer to like elements and their repetitive descriptions may be omitted for brevity.

A supporting member 300 according to another example embodiment of the present disclosure may include one or more holes 360 formed in each of the first to third curved portions 350*a*, 350*b*, and 350*c*, but embodiments of the present disclosure are not limited thereto. One or more holes 360 illustrated in FIG. 17D may be formed in the other curved portion as illustrated in FIGS. 17A and 17B, except one curved portion of the first to third curved portions 350*a*, 350*b*, and 350*c*.

The one or more holes 360 illustrated in FIGS. 17A to 17D may form a path through which a sound (or a sound wave) generated based on a vibration of the vibration generator 510 is transferred (or propagated) to the gap space GS or the vibration member 100. Accordingly, a vibration of the vibration generator 510 may be efficiently transferred to the vibration member 100, and thus, a sound characteristic and/or a sound pressure level characteristic generated based on a vibration of the vibration member 100 may be enhanced. In addition, the one or more holes 360 may form a path through which a sound (or a sound wave) generated based on a vibration of the vibration generator 510 is transferred (or propagated) to the gap space GS or the vibration member 100, and thus, a mono sound or a stereo sound may be implemented. In addition, in a case where one hole 360 is formed as in FIG. 17B, an apparatus for reproducing a mono sound by using a cost-reduced apparatus may be provided.

In the supporting member 300 according to another example embodiment of the present disclosure, one or more of the first to third curved portions 350*a*, 350*b*, and 350*c* of the curved portion 350 may be surrounded by the enclosure 950 illustrated in FIG. 12.

Figure 18:
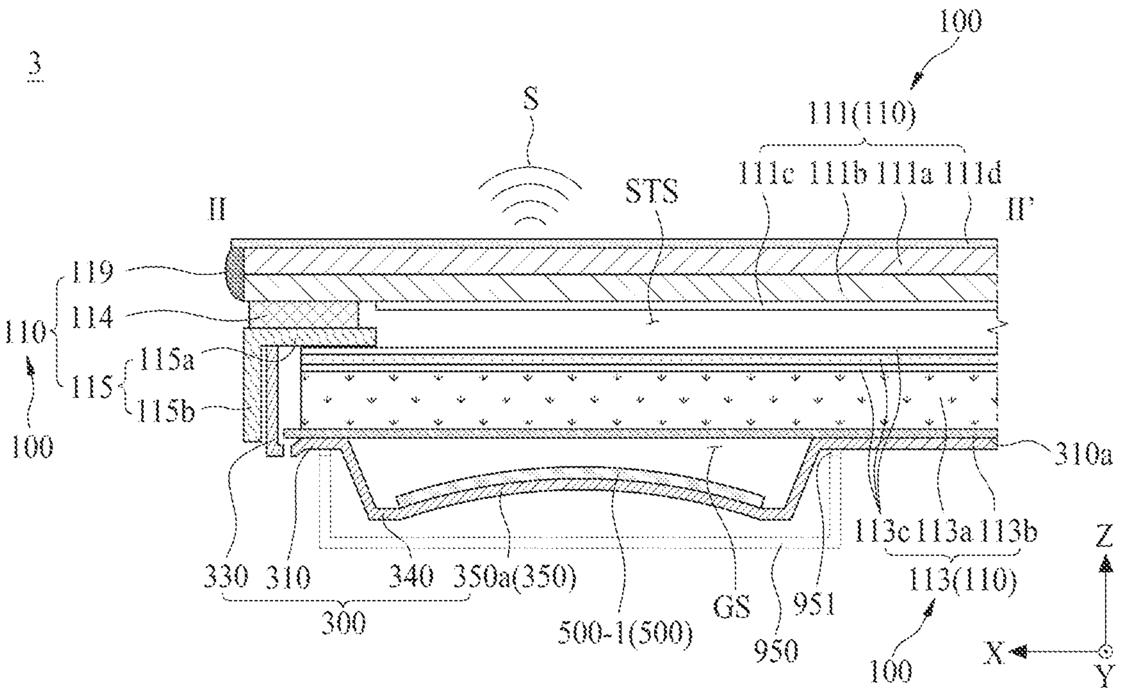
FIG. 18 is another example cross-sectional view taken along line II-II' illustrated in FIG. 2.
Figure 19:
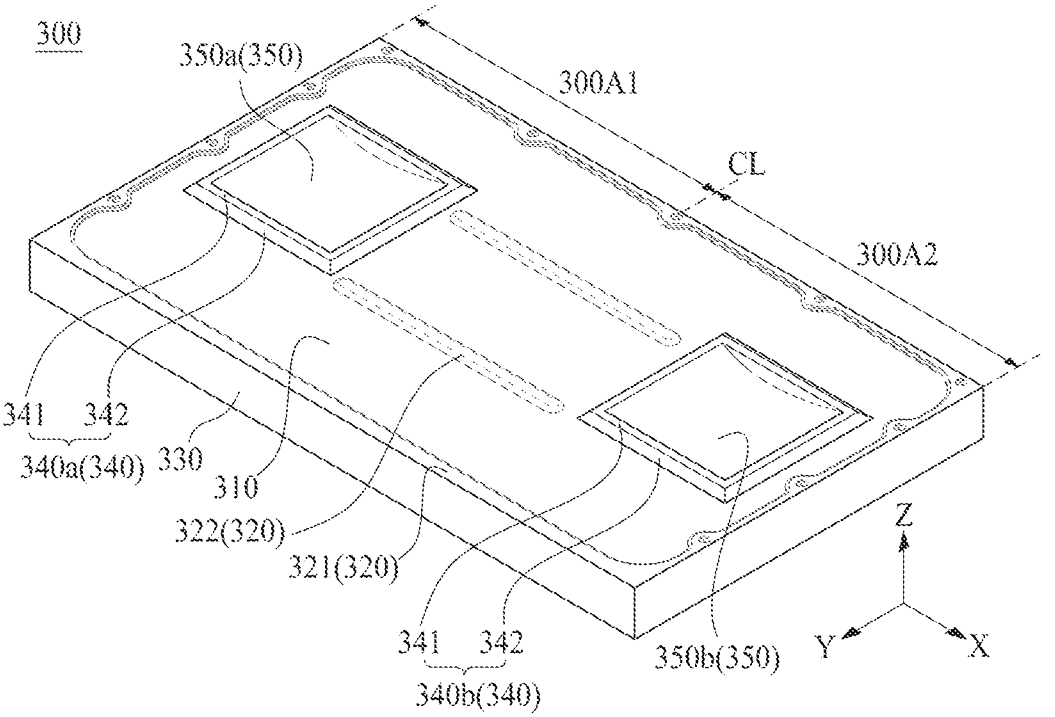
FIG. 19 is an example rear perspective view illustrating a supporting member illustrated in FIG. 18.

FIG. 18 is another example cross-sectional view taken along line II-II' illustrated in FIG. 2, and FIG. 19 is an example rear perspective view illustrating a supporting member illustrated in FIG. 18. FIGS. 18 and 19 illustrate an example embodiment implemented by modifying the curved portion of the supporting member in the apparatus described above with reference to FIGS. 1 to 5.

With reference to FIGS. 18 and 19, an apparatus 3 according to a third example embodiment of the present disclosure may include a vibration member 100, a supporting member 300, and a vibration apparatus 500.

The vibration member 100 may be the same or substantially the same as described above with reference to FIGS. 1 to 5, and thus, like reference numeral refer to like element and the repetitive description thereof may be omitted for brevity.

A supporting member 300 may be configured to support a vibration member 100. The supporting member 300 may include a rear portion 310, a lateral portion 330, a protrusion portion 340, and a curved portion 350. The rear portion 310 and the lateral portion 330 may be respectively the same as the lateral portion 310 and the lateral portion 330 described above with reference to FIGS. 3 to 5, and thus, their repetitive descriptions may be omitted for brevity.

The protrusion portion 340 may be implemented at the rear portion 310. The protrusion portion 340 may protrude in a direction from the rear portion 310 to a rear surface of the supporting member 300. For example, the protrusion portion 340 may protrude in a direction from the rear portion 310 to the rear surface of the supporting member 300 to have a tetragonal shape. For example, the protrusion portion 340 may include a trapezoid shape, a pyramid shape, or a five-sided shape. For example, the protrusion portion 340 may be an accommodating portion, a receiving portion, a pocket portion, or a groove portion, but embodiments of the present disclosure are not limited thereto.

The protrusion portion 340 may include a protrusion surface (or a protrusion floor surface), which is parallel to the rear portion 310 and faces a vibration member 100, and a plurality of lateral surfaces (or protrusion walls) 342 connected between the rear portion 310 and the protrusion surface 341. The plurality of lateral surfaces 342 may be vertical or inclined between the rear portion 310 and the protrusion surface 341. Accordingly, an apparatus 3 according to a third example embodiment of the present disclosure may further include a gap space GS provided between the protrusion portion 340 of the supporting member 300 and the vibration member 100. The gap space GS may be provided between the protrusion portion 340 of the supporting member 300 and a rear surface of the vibration member 100. For example, the gap space GS may be provided between the protrusion surface 341 of the protrusion portion 340 and the backlight 113 of the vibration member 100. For example, the gap space GS may be provided between the protrusion surface 341 of the protrusion portion 340 and the reflective sheet 113*b* of the backlight 113.

The curved portion 350 may be implemented at the protrusion portion 340. The curved portion 350 may be implemented at the protrusion surface 341 of the protrusion portion 340. The curved portion 350 may vibrate together with a vibration of the vibration apparatus 500 to vibrate the vibration member 100. For example, the curved portion 350 may vibrate based on a vibration of the vibration apparatus 500 to indirectly vibrate the vibration member 100.

According to another example embodiment of the present disclosure, the curved portion 350 may be implemented at the protrusion portion 340 to include a predetermined curvature. For example, the curved portion 350 may include a curved structure which protrudes in a direction from the protrusion surface 341 of the protrusion portion 340 to the vibration member 100. For example, the curved portion 350 may protrude from the protrusion surface 341 of the protrusion portion 340 to have a curved shape having one curvature (or a single curvature). For example, the curved portion 350 may have a curved structure having one curvature (or a single curvature) having no inflection point. For example, the curved portion 350 may protrude convexly in the direction from the protrusion surface 341 of the protrusion portion 340 to the vibration member 100. For example, the curved portion 350 may have a single convex curved shape having a certain curvature. For example, the curved portion 350 may be a rear protrusion portion, a curved protrusion portion, a floor protrusion portion, a rear curved portion, a curved structure, a curvature structure, a forming portion, or a stress application portion, but embodiments of the present disclosure are not limited thereto. For example, the curved portion 350 may be a curved portion, a convex portion, a convex protrusion portion, a convex curved portion, a convex arch portion, a projection portion, or an uplift portion having a second shape, with respect to the protrusion surface 341 of the protrusion portion 340 facing the vibration member 100.

According to another example embodiment of the present disclosure, a center portion of the curved portion 350 may be spaced apart from the rear surface of the vibration member 100. For example, a height (or a distance) between the rear surface of the vibration member 100 and the curved portion 350 may decrease toward a center portion of the curved portion 350 from a periphery portion of the curved portion 350. According to an example embodiment of the present disclosure, the curved portion 350 may be implemented to have a first height from the protrusion surface 341 of the protrusion portion 340. The first height of the curved portion 350, as described above with reference to FIG. 3, may be about 2 mm to about 200 mm so as to enable a pre-stress to be applied to a vibration apparatus 500, but embodiments of the present disclosure are not limited thereto and the first height H1 may vary based on a size of the vibration apparatus 500. The first height H1 of the curved portion 350 may be smaller than a second height H2 of the vibration member 100.

The protrusion portion 340 according to an example embodiment of the present disclosure may include a first protrusion portion 340*a* disposed in a first region 300A1 of the supporting member 300 and a second protrusion portion 340*b* disposed in a second region 300A2 of the supporting member 300. Each of the first protrusion portion 340*a* and the second protrusion portion 340*b* may include the above-described protrusion surface 341 and the plurality of lateral surfaces 342.

The curved portion 350 according to an example embodiment of the present disclosure may include a first curved portion 350*a* and a second curved portion 350*b*.

The first curved portion 350*a* may be implemented at the first protrusion portion 340*a*. The first curved portion 350*a* may be implemented at the protrusion surface 341 of the first protrusion portion 340*a*. For example, the first curved portion 350*a* may support the first vibration apparatus 500-1. The first curved portion 350*a* may be implemented to vibrate together with a vibration of the first vibration apparatus 500-1.

The second curved portion 350*b* may be implemented at the second protrusion portion 340*b*. The second curved portion 350*b* may be implemented at the protrusion surface 341 of the second protrusion portion 340*b*. For example, the second curved portion 350*b* may support the second vibration apparatus 500-2. The second curved portion 350*b* may be implemented to vibrate together with a vibration of the second vibration apparatus 500-2.

The vibration apparatus 500 may be coupled to or attached on the curved portion 350. The vibration apparatus 500 may be coupled to or attached on the curved portion 350 between the vibration member 100 and the curved portion 350 and may face or directly face a rear surface of the vibration member 100. For example, the vibration apparatus 500 may be coupled to or attached on an inner surface (or an inner curved surface) of the curved portion 350 facing or directly facing the rear surface of the vibration member 100. For example, the vibration apparatus 500 may be coupled to or attached on the curved portion 350 within a gap space GS provided by the protrusion portion 340. For example, the vibration apparatus 500 may be coupled to or attached on an inner surface (or an inner curved surface) of the curved portion 350 within the gap space GS. For example, the vibration apparatus 500 may have a size which is smaller than that of the curved portion 350. The vibration apparatus 500 may be coupled to or attached on the curved portion 350 to have an equiangular shape (or a conformal shape) based on a curvature of the curved portion 350, but embodiments of the present disclosure are not limited thereto. For example, the vibration apparatus 500 may be coupled to or attached on the curved portion 350 to have a non-equiangular shape (or a non-conformal shape) which is not based on a curvature of the curved portion 350 or have a curvature which differs from that of the curved portion 350.

According to another example embodiment of the present disclosure, the vibration apparatus 500 may be the same or substantially the same as the vibration apparatus 500 described above with reference to FIGS. 4A to 9, and thus, the repetitive description thereof may be omitted for brevity.

According to another example embodiment of the present disclosure, the vibration apparatus (or the vibration generator) 500 may be coupled to or attached on the curved portion 350, and thus, may have a pre-stress or receive the pre-stress based on the curved portion 350. For example, the vibration apparatus 500 may be coupled to or attached on the curved portion 350, and thus, may be maintained in a state where the vibration apparatus 500 has the pre-stress or receives the pre-stress based on the curved portion 350. For example, the vibration apparatus 500 may receive a tension stress or include the tension stress based on a curvature of the curved portion 350. For example, the curved portion 350 may be implemented to apply only the tension stress to the vibration apparatus 500, to enhance a vibration characteristic of the vibration apparatus 500.

According to another example embodiment of the present disclosure, the vibration apparatus 500, as described above with reference to FIG. 3, may vibrate in a state where the vibration apparatus 500 receives a pre-stress (or a pre-tension stress) or is bent in a curved shape, based on the curved portion 350 implemented at the protrusion portion 340, and thus, as described above, a second moment of inertia may increase, or a vibration direction may be implemented as a single direction. Therefore, the repetitive description thereof may be omitted for brevity.

The vibration apparatus 500 may include a first vibration apparatus 500-1 and a second vibration apparatus 500-2. The first vibration apparatus 500-1 and the second vibration apparatus 500-2 may be the same or substantially the same as the vibration apparatus described above with reference to FIGS. 4A to 9, and thus, their repetitive descriptions may be omitted for brevity.

The first vibration apparatus 500-1 (or the vibration generator) of the vibration apparatus 500 may be coupled to or attached on the first curved portion 350*a*. The first vibration apparatus 500-1 may be coupled to or attached on the first curved portion 350*a* between the vibration member 100 and the first curved portion 350*a* and may face the rear surface of the vibration member 100 or directly face the rear surface of the vibration member 100. For example, the first vibration apparatus 500-1 may be coupled to or attached on an inner surface (or an internal surface) of the first curved portion 350*a* facing the rear surface of the vibration member 100 or directly facing the rear surface of the vibration member 100. For example, the first vibration apparatus 500-1 may be coupled to or attached on the first curved portion 350*a* within a gap space GS provided by the first protrusion portion 340*a*. For example, the first vibration apparatus 500-1 may be coupled to or attached on an inner surface (or an inner curved surface) of the first curved portion 350*a* within the gap space GS.

The first vibration apparatus 500-1 (or the vibration generator) may be coupled to or attached on the first curved portion 350*a* to have an equiangular shape based on a curvature of the first curved portion 350*a*, but embodiments of the present disclosure are not limited thereto. For example, the first vibration apparatus 500-1 may be coupled to or attached on the first curved portion 350*a* to have a non-equiangular shape which is not based on a curvature of the first curved portion 350*a* or have a curvature which differs from that of the first curved portion 350*a*. Therefore, the first vibration apparatus 500-1 may vibrate in a state in which the first vibration apparatus 500-1 receives a pre-stress (or a pre-tension stress) or is bent in a curved shape, based on the first curved portion 350*a*, and thus, may generate a sound or a sound wave. A sound (or a sound wave) generated based on a vibration of the first vibration apparatus 500-1 may be directly transferred to the vibration member 100 through the gap space GS, and thus, a vibration of the first vibration apparatus 500-1 may be efficiently transferred to the vibration member 100, whereby a sound characteristic and/or a sound pressure level characteristic generated based on a vibration of the vibration member 100 may be enhanced. For example, a first region of the vibration member 100 overlapping the first vibration apparatus 500-1 may vibrate based on receiving a sound or a sound wave generated based on a vibration of the first vibration apparatus 500-1, and thus, may generate or output a sound and/or a haptic feedback.

The second vibration apparatus 500-2 (or the vibration generator) of the vibration apparatus 500 may be coupled to or attached on the second curved portion 350*b*. The second vibration apparatus 500-2 may be coupled to or attached on the second curved portion 350*b* between the vibration member 100 and the second curved portion 350*b* and may face the rear surface of the vibration member 100 or directly face the rear surface of the vibration member 100. For example, the second vibration apparatus 500-2 may be coupled to or attached on an inner surface (or an internal surface) of the second curved portion 350*b* facing the rear surface of the vibration member 100 or directly facing the rear surface of the vibration member 100. For example, the second vibration apparatus 500-2 may be coupled to or attached on the second curved portion 350*b* within a gap space GS provided by the second protrusion portion 340*b*. For example, the second vibration apparatus 500-2 may be coupled to or attached on an inner surface (or an inner curved surface) of the second curved portion 350*b* within the gap space GS.

The second vibration apparatus 500-2 (or the vibration generator) may be coupled to or attached on the second curved portion 350*b* to have an equiangular shape based on a curvature of the second curved portion 350*b*, but embodiments of the present disclosure are not limited thereto. For example, the second vibration apparatus 500-2 may be coupled to or attached on the second curved portion 350*b* to have a non-equiangular shape which is not based on a curvature of the second curved portion 350*b* or have a curvature which differs from that of the second curved portion 350*b*. Therefore, the second vibration apparatus 500-2 may vibrate in a state in which the second vibration apparatus 500-2 receives a pre-stress (or a pre-tension stress) or is bent in a curved shape, based on the second curved portion 350*b*, and thus, may generate a sound or a sound wave. A sound (or a sound wave) generated based on a vibration of the second vibration apparatus 500-2 may be directly transferred to the vibration member 100 through the gap space GS, and thus, a vibration of the second vibration apparatus 500-2 may be efficiently transferred to the vibration member 100, whereby a sound characteristic and/or a sound pressure level characteristic generated based on a vibration of the vibration member 100 may be enhanced. For example, a second region of the vibration member 100 overlapping the second vibration apparatus 500-2 may vibrate based on receiving a sound or a sound wave generated based on a vibration of the second vibration apparatus 500-2, and thus, may generate or output a sound and/or a haptic feedback.

The apparatus 3 according to the third example embodiment of the present disclosure may include the vibration apparatus 500 (or the vibration generator) which vibrates in a state in which the vibration apparatus 500 receives a pre-stress (or a pre-tension stress) or is bent in a curved shape, and thus, a second moment of inertia may increase, or a vibration direction of the vibration apparatus 500 may be implemented as a single direction, thereby enhancing a sound characteristic and a sound pressure level characteristic of a sound generated by the vibration member 100 which vibrates based on a vibration of the vibration apparatus 500. In addition, the apparatus 3 according to the third example embodiment of the present disclosure may be slimmed because the vibration apparatus 500 is disposed in the gap space GS between the vibration member 100 and the supporting member 300, and in this example, the vibration apparatus 500 is not exposed to the outside, thereby enhancing a sense of beauty in design of an outermost rear surface. The apparatus 3 according to the third example embodiment of the present disclosure may further include an enclosure 950.

The enclosure 950 may be disposed to cover the protrusion portion 340 and the curved portion 350 of the supporting member 300. The enclosure 950 may be connected or coupled to a rear surface of the supporting member 300 to cover the protrusion portion 340 and the curved portion 350 of the supporting member 300. For example, the enclosure 950 may be connected or coupled to the rear surface of the rear portion 310 of the supporting member 300 by the coupling member 951. The enclosure 950 may configure a closed space which covers or surrounds the vibration apparatus 500, in the rear surface of the supporting member 300. For example, the enclosure 950 may be a closed member, a closed cap, a closed box, or a sound box, but embodiments of the present disclosure are not limited thereto. The closed space may be an air gap, a vibration space, a sound space, or a sounding box, but embodiments of the present disclosure are not limited thereto.

The enclosure 950 may include one or more materials of a metal material and a nonmetal material (or a composite nonmetal material). For example, the enclosure 950 may include one or more materials of a metal material, plastic, and wood, but embodiments of the present disclosure are not limited thereto.

The enclosure 950 according to an example embodiment of the present disclosure may maintain an impedance component based on air acting on the curved portion 350 of the supporting member 300 when the curved portion 350 of the supporting member 300 or the vibration apparatus 500 is vibrating. For example, air around the supporting member 300 may resist a vibration of the curved portion 350 of the supporting member 300 and may act as an impedance component having a reactance component and a resistance based on a frequency. Therefore, the enclosure 950 may configure a closed space which surrounds the protrusion portion 340 and the curved portion 350 of the supporting member 300 in the rear surface of the supporting member 300, and thus, may maintain an impedance component (or an air impedance or an elastic impedance) acting on the curved portion 350 of the supporting member 300 based on air. Accordingly, a sound characteristic and a sound pressure level characteristic of the low-pitched sound band may be enhanced and the quality of a sound of a high-pitched sound band may be enhanced.

In the apparatus 3 according to the third example embodiment of the present disclosure, by the enclosure 950, a sound characteristic and/or a sound pressure level characteristic of the low-pitched sound band may be enhanced, and the quality of a sound of the high-pitched sound band may be enhanced.

Figure 20:
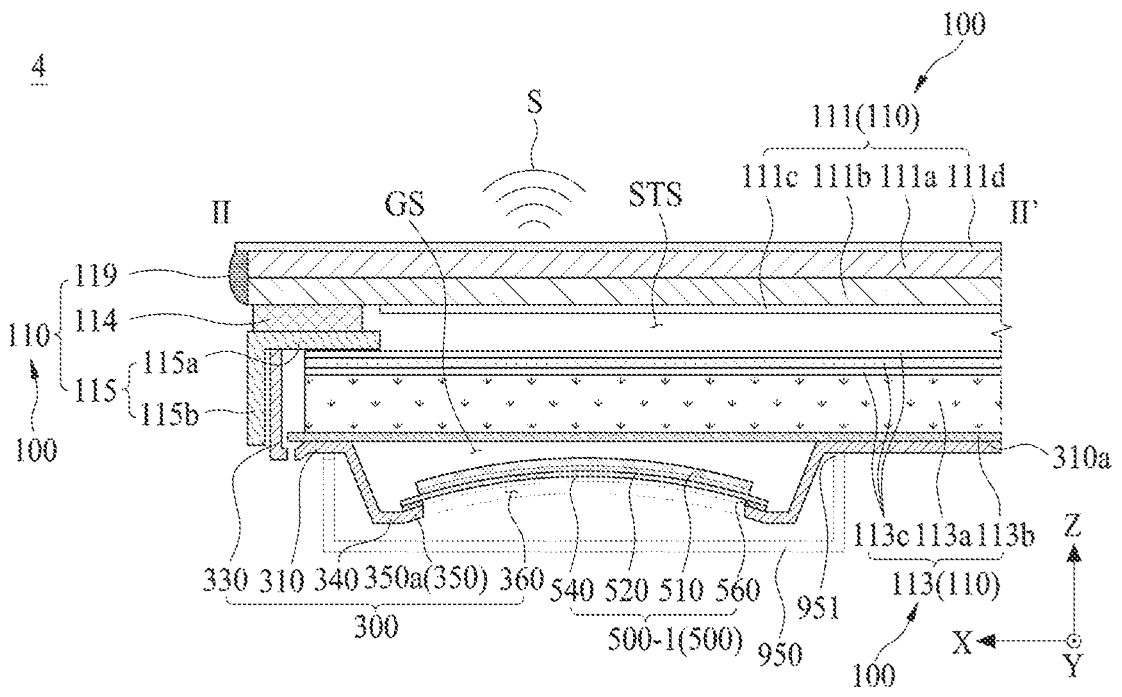
FIG. 20 is another example cross-sectional view taken along line II-II' illustrated in FIG. 2.
Figure 21:
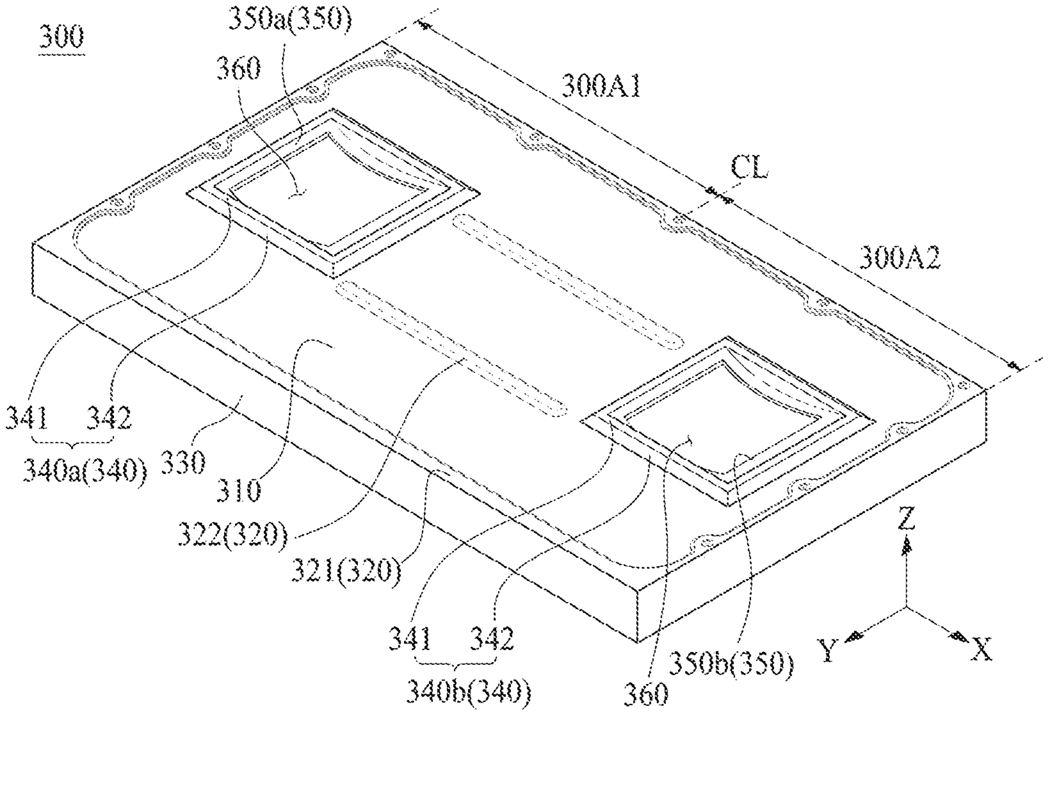
FIG. 21 is an example rear perspective view illustrating a supporting member illustrated in FIG. 20.

FIG. 20 is another example cross-sectional view taken along line II-II' illustrated in FIG. 2, and FIG. 21 is an example rear perspective view illustrating a supporting member illustrated in FIG. 20. FIGS. 20 and 21 illustrate an apparatus according to a fourth example embodiment of the present disclosure. FIGS. 20 and 21 illustrate an example embodiment where a hole is added to a curved portion of a supporting member, in the apparatus described above with reference to FIGS. 18 and 19. With reference to FIGS. 20 and 21, an apparatus 4 according to a fourth example embodiment of the present disclosure may include a vibration member 100, a supporting member 300, and a vibration apparatus 500.

The vibration member 100 may be the same or substantially the same as described above with reference to FIGS. 18 and 19, and thus, like reference numeral refer to like element and the repetitive description thereof may be omitted for brevity.

The supporting member 300 may be configured to support the vibration member 100. The supporting member 300 may include a rear portion 310, a lateral portion 330, a protrusion portion 340, a curved portion 350, and a hole 360. Each of the rear portion 310, the lateral portion 330, and the protrusion portion 340 may be the same or substantially the same as each of the rear portion 310, the lateral portion 330, and the protrusion portion 340 described above with reference to FIGS. 18 and 19, and thus, their repetitive descriptions may be omitted for brevity. Further, except that the curved portion 350 includes a hole 360, the curved portion 350 may be the same or substantially the same as the curved portion 350 described above with reference to FIGS. 18 and 19, and thus, the repetitive description thereof may be omitted for brevity.

The supporting member 300 may further include one or more holes 360 which are formed at the curved portion 350. The supporting member 300 may include one or more holes 360 which are formed at each of the first curved portion **350*a* and the second curved portion 350*b*. Except for that one or more holes 360 are formed at a curved portion 350 which is formed at the protrusion portion 340, the one or more holes 360 may be substantially the same as the one or more holes 360 described above with reference to FIGS. 12 to 14, and thus, their repetitive descriptions may be omitted for brevity. The one or more holes 360 may be formed at each of the first curved portion 350*a* and the second curved portion 350*b* of the curved portion 350 and may have a size which is smaller than that of the vibration apparatuses 500-1 and 500-2**.

Each of the first and second vibration apparatuses 500-1 and 500-2 of the vibration apparatus 500 may be connected to or attached on the first and second curved portions **350*a* and 350*b* to cover the one or more holes 360 and may vibrate in a state where the first and second vibration apparatuses 500-1 and 500-2** receive a pre-stress (or a pre-tension stress) or are bent in a curved shape, and thus, a second moment of inertia may increase, or a vibration direction may be implemented as a single direction.

The one or more holes 360 formed at each of a first curved portion **350*a* and a second curved portion 350*b* may be disposed at a rear surface of each of the first and second vibration apparatuses 500-1 and 500-2. Therefore, a vibration (or displacement) of each of the first and second vibration apparatuses 500-1 and 500-2 may be smoothly performed, and thus, a vibration width (or a displacement width) of each of the first and second vibration apparatuses 500-1 and 500-2 may increase. Therefore, a sound pressure level generated in the gap space GS based on a vibration of each of the first and second vibration apparatuses 500-1 and 500-2 may increase, and thus, a vibration width (or a displacement width) of the vibration member 100 vibrating based on a sound pressure level of the gap space GS may increase. Accordingly, a sound characteristic and/or a sound pressure level characteristic generated based on a vibration of the vibration member 100** may be enhanced.

The apparatus 4 according to the fourth example embodiment of the present disclosure may include the vibration apparatus (or the vibration generator) 500 which vibrates in a state in which the vibration apparatus 500 receives a pre-stress (or a pre-tension stress) or is bent in a curved shape, and thus, a second moment of inertia may increase or a vibration direction of the vibration apparatus 500 may be implemented as a single direction, thereby enhancing a sound characteristic and/or a sound pressure level characteristic of a sound generated by the vibration member 100 which vibrates based on a vibration of the vibration apparatus 500. In addition, the apparatus 4 according to the fourth example embodiment of the present disclosure may include one or more holes 360 formed in the curved portion 350 of the supporting member 300, and thus, a vibration of the vibration apparatus 500 may be more smoothly performed, whereby a vibration width (or a displacement width) of each of the first and second vibration apparatuses 500-1 and 500-2 may increase. Therefore, a vibration width (or a displacement width) of the vibration member 100 may increase, and thus, a sound characteristic and/or a sound pressure level characteristic generated based on a vibration of the vibration member 100 may be further enhanced.

The apparatus 4 according to the fourth example embodiment of the present disclosure may further include an enclosure 950. The enclosure 950 may be substantially the same as the enclosure 950 described above with reference to FIG. 18, and thus, the repetitive description thereof may be omitted for brevity. In the apparatus 4 according to the fourth example embodiment of the present disclosure, a sound characteristic and/or a sound pressure level characteristic of the low-pitched sound band may be enhanced by the enclosure 950, and the quality of a sound of the high-pitched sound band may be enhanced by the enclosure 950.

FIGS. 22A to 22E are rear perspective views illustrating a supporting member according to another example embodiment of the present disclosure. FIGS. 22A to 22E illustrate an example embodiment implemented by modifying the curved portion of the supporting member illustrated in FIGS. 18 and 19.

With reference to FIGS. 22A to 22E, a protrusion portion 340 of a supporting member 300 according to another example embodiment of the present disclosure may include first to third protrusion portions **340*a*, 340*b*, and 340*c* which are respectively disposed in first to third regions 300A1, 300A2, and 300A3 of a rear portion 310. Except that the protrusion portion 340 further includes the third protrusion portion 340*c* disposed in the third region 300A3 of the rear portion 310, the protrusion portion 340 may be substantially the same as the protrusion portion 340 described above with reference to FIG. 19**, and thus, the repetitive description thereof may be omitted for brevity.

A curved portion 350 of a supporting member 300 according to another example embodiment of the present disclosure may include first to third curved portions 350*a*, 350*b*, and 350*c* which are respectively formed at the first to third protrusion portions 340*a*, 340*b*, and 340*c* respectively disposed in the first to third regions 300A1, 300A2, and 300A3 of the rear portion 310.

A protrusion structure and a curvature of each of the first to third curved portions 350*a*, 350*b*, and 350*c* may be the same or substantially the same as described above with reference to FIG. 19, and thus, their repetitive descriptions may be omitted for brevity.

The vibration apparatus 500 may include a first vibration apparatus 500-1 disposed at the first curved portion 350*a*, a second vibration apparatus 500-2 disposed at the second curved portion 350*b*, and a third vibration apparatus 500-3 disposed at the third curved portion 350*c*. Each of the first to third vibration apparatuses 500-1, 500-2, and 500-3, as described above, may vibrate in a state where the first to third vibration apparatuses 500-1, 500-2, and 500-3 receive a pre-stress (or a pre-tension stress) or are bent in a curved shape, based on a curvature of each of the first to third curved portions 350*a*, 350*b*, and 350*c*, and thus, a second moment of inertia may increase, or a vibration direction may be implemented as a single direction.

The supporting member 300 according to another example embodiment of the present disclosure may include one or more holes 360 at one or more of the first to third curved portions 350*a*, 350*b*, and 350*c*.

Figure 22A:
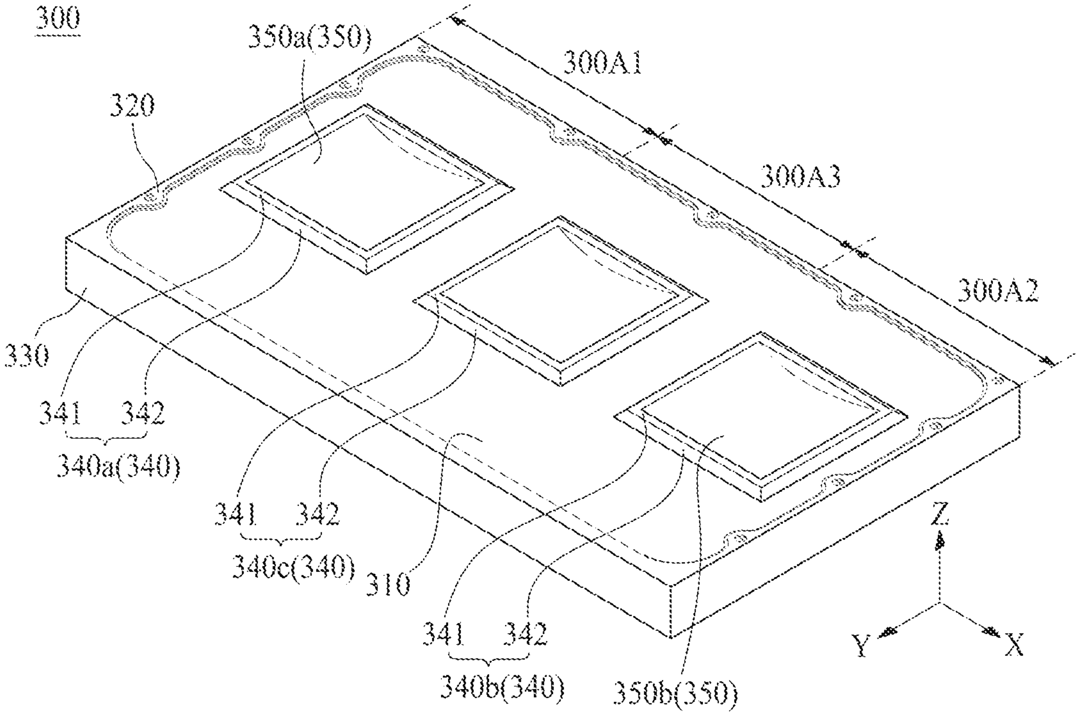
FIGS. 22A to 22E are rear perspective views illustrating a supporting member according to another example embodiment of the present disclosure.
Figure 22B:
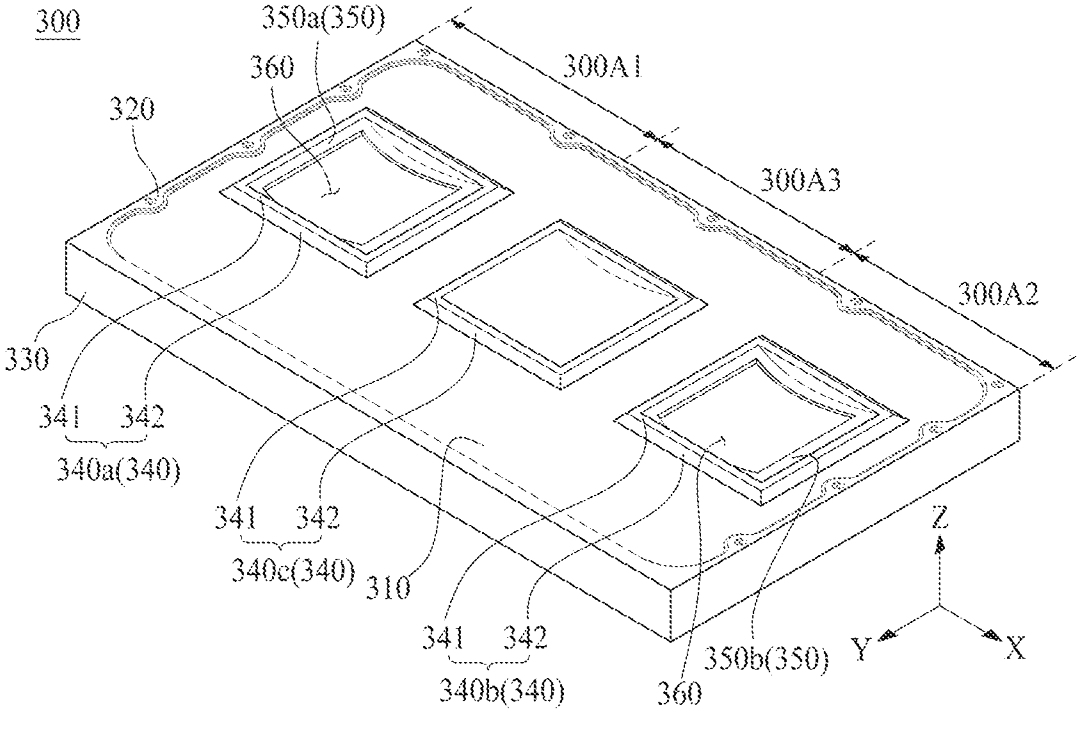

According to an example embodiment of the present disclosure, as illustrated in FIG. 22B, the one or more holes 360 may be formed at each of the first and second curved portions 350*a* and 350*b* of the first to third curved portions 350*a*, 350*b*, and 350*c*. Except for that one or more holes 360 are formed at each of the first and second curved portions 350*a* and 350*b*, the one or more holes 360 may be substantially the same as the one or more holes 360 described above with reference to FIGS. 20 and 21, and thus, like reference numerals refer to like elements and their repetitive descriptions may be omitted for brevity.

Figure 22C:
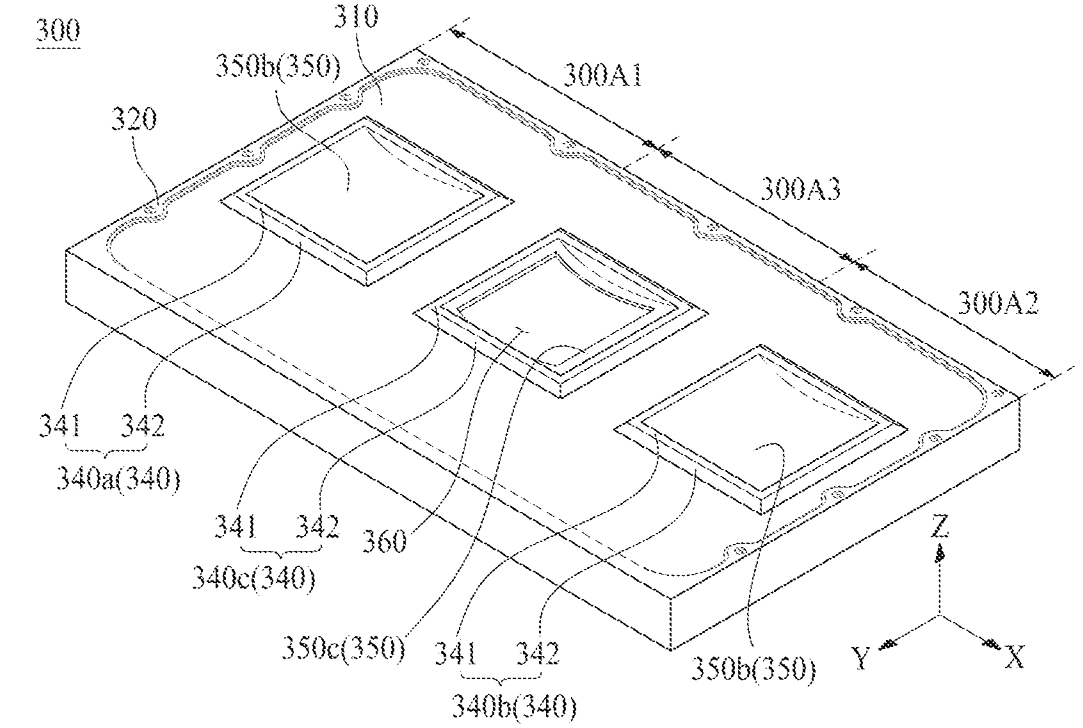

According to another example embodiment of the present disclosure, the one or more holes 360, as illustrated in FIG. 22C, may be formed at the third curved portion 350*c* of the first to third curved portions 350*a*, 350*b*, and 350*c*. Except that the one or more holes 360 are formed at the third curved portion 350*c*, the one or more holes 360 may be substantially the same as the one or more holes 360 described above with reference to FIGS. 20 and 21, and thus, like reference numerals refer to like elements and their repetitive descriptions may be omitted for brevity.

Figure 22D:
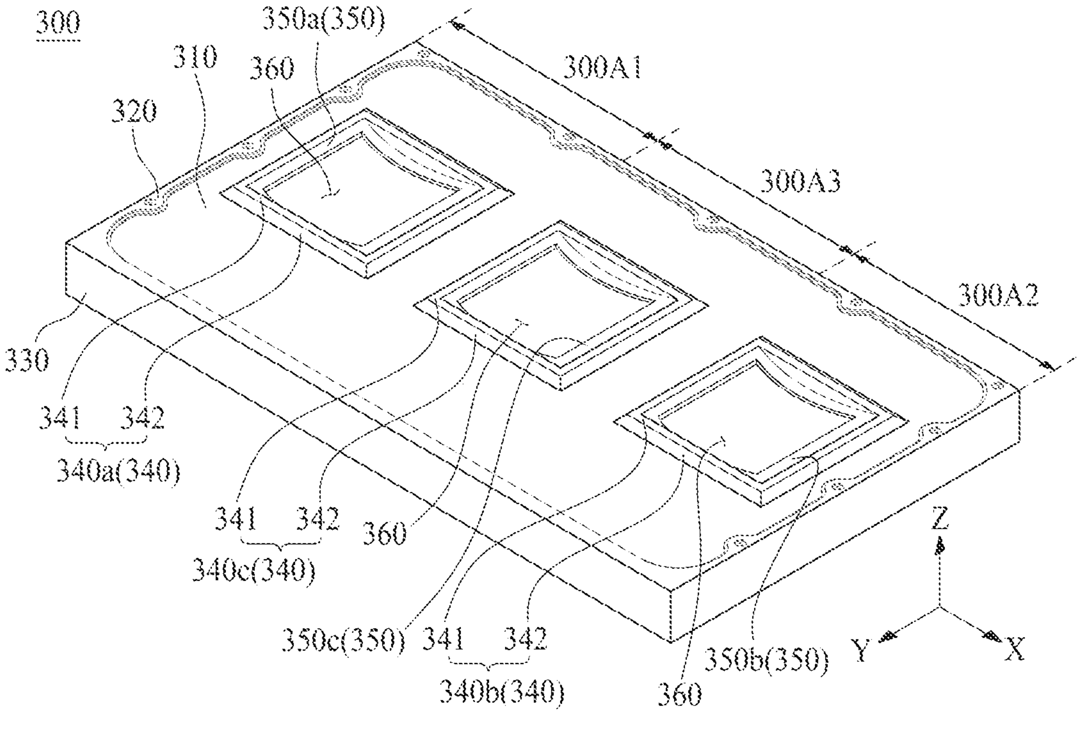

According to another example embodiment of the present disclosure, the one or more holes 360, as illustrated in FIG. 22D, may be formed at each of the first to third curved portions 350*a*, 350*b*, and 350*c*. Except that the one or more holes 360 are formed at each of the first to third curved portions 350*a*, 350*b*, and 350*c*, the one or more holes 360 may be substantially the same as the one or more holes 360 described above with reference to FIGS. 20 and 21, and thus, like reference numerals refer to like elements and their repetitive descriptions may be omitted for brevity.

Figure 22E:
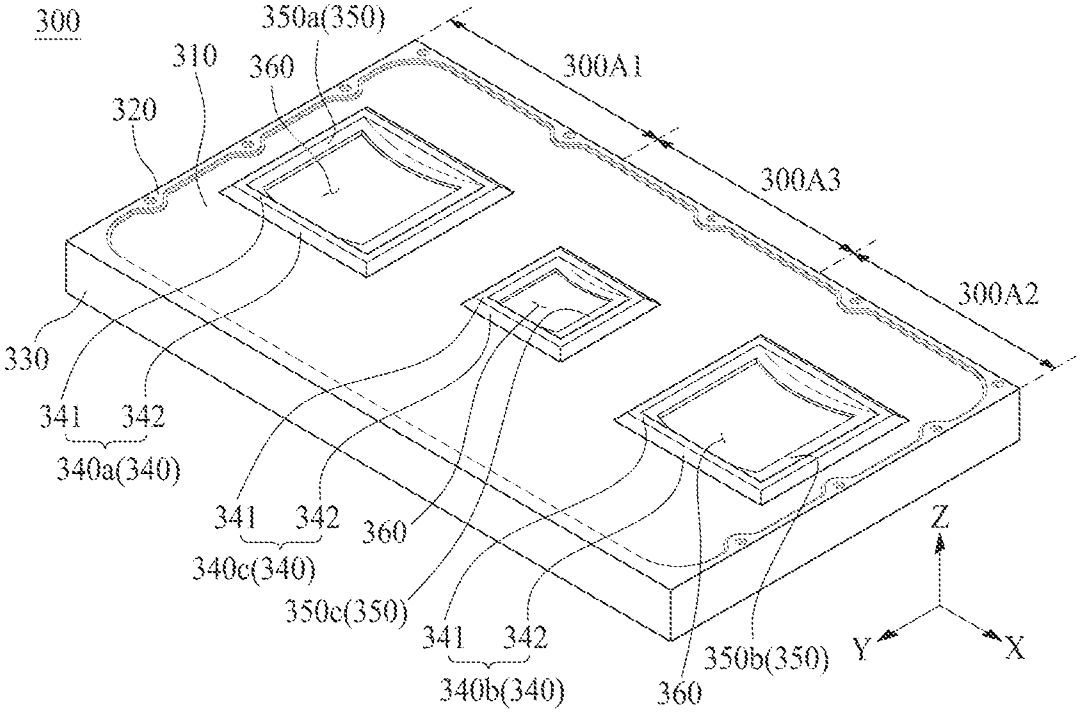

With reference to FIG. 22E, according to an example embodiment of the present disclosure, one or more of the first to third protrusion portions 340*a*, 340*b*, and 340*c* may protrude from a rear portion 310 to have different sizes. One or more of the first to third protrusion portions 340*a*, 340*b*, and 340*c* may protrude from the rear portion 310 to have a small size. For example, the third protrusion portion 340*c* may have a size which is smaller than that of each of the first and second protrusion portions 340*a* and 340*b*. In the protrusion portion 340 illustrated in FIG. 22E, except that the third protrusion portion 340*c* has a size which is smaller than that of each of the first and second protrusion portions 340*a* and 340*b*, the third protrusion portion 340*c* may be substantially the same as each of the first and second protrusion portions 340*a* and 340*b*, and thus, the repetitive description thereof may be omitted for brevity.

According to an example embodiment of the present disclosure, one or more of the first to third curved portions 350*a*, 350*b*, and 350*c* may protrude from the protrusion portion 340 to have different sizes and different shapes. One or more of the first to third curved portions 350*a*, 350*b*, and 350*c* may protrude from the protrusion portion 340 to have different curvatures. For example, the third curved portion 350*c* may have a size which is smaller than that of each of the first and second curved portions 350*a* and 350*b*. In the third curved portion 350 illustrated in FIG. 22E, except that the third curved portion 350*c* has a size which is smaller than that of each of the first and second curved portions 350*a* and 350*b*, the third curved portion 350*c* may be substantially the same as each of the first and second curved portions 350*a* and 350*b*, and thus, the repetitive description thereof may be omitted for brevity.

The third vibration apparatus 500-3 may be disposed at the third curved portion 350*c* and may have a size corresponding to that of the third curved portion 350*c*, and thus, may have a size which is smaller than that of each of the first vibration apparatus 500-1 and the second vibration apparatus 500-2.

A supporting member 300 according to another example embodiment of the present disclosure may include one or more holes 360 formed at one or more of the first to third curved portions 350*a*, 350*b*, and 350*c*. For example, the one or more holes 360 may be formed at each of the first to third curved portions 350*a*, 350*b*, and 350*c*, but embodiments of the present disclosure are not limited thereto, and the one or more holes 360 illustrated in FIG. 22E may be formed at the other curved portion as illustrated in FIGS. 22B and 22C, except one curved portion of the first to third curved portions 350*a*, 350*b*, and 350*c*.

With reference to FIGS. 22A to 22E, each of the first to third vibration apparatuses 500-1, 500-2, and 500-3 according to an example embodiment of the present disclosure may be configured to generate or output a sound of the same pitched sound band. Therefore, the apparatus 4 according to the fourth example embodiment of the present disclosure may output a sound, for example, a stereo sound based on a sound which is output from each of a left portion, a right portion, and a center portion (or a middle portion) of the vibration member 100 by a vibration of the vibration member 100 based on each of the first to third vibration apparatuses 500-1, 500-2, and 500-3 and may have a 3-channel sound output characteristic.

According to another example embodiment of the present disclosure, one or more of the first to third vibration apparatuses 500-1, 500-2, and 500-3 may be configured to generate or output sounds of different pitched sound bands. For example, the third vibration apparatus 500-3 may be configured to generate or output a sound of the low-pitched sound band and each of the first and second vibration apparatuses 500-1 and 500-2 may be configured to generate or output a sound of a pitched sound band which is broader than that of the third vibration apparatus 500-3, but embodiments of the present disclosure are not limited thereto. Therefore, the apparatus 4 according to the fourth example embodiment of the present disclosure may implement a sound, for example, a stereo sound through a left sound and a right sound which are output by a vibration of the vibration member 100 based on driving of each of the first vibration apparatus 500-1 and the second vibration apparatus 500-2, and a sound characteristic and/or a sound pressure level characteristic of the low-pitched sound band may be enhanced due to a sound of the low-pitched sound band output based on a vibration of the vibration member 100 based on driving of the third vibration apparatus 500-3.

In the apparatus 4 including the supporting member 300 illustrated in FIGS. 22B to 22E, a vibration of the vibration apparatus 500 may be more smoothly performed by the one or more holes 360 formed at one or more of the first to third curved portions 350*a*, 350*b*, and 350*c* of the supporting member 300, and thus, a vibration width (or a displacement width) of the vibration apparatus 500 may increase. Therefore, a vibration width (or a displacement width) of the vibration member 100 may increase, and thus, a sound characteristic and/or a sound pressure level characteristic generated based on a vibration of the vibration member 100 may be further enhanced. In addition, the one or more holes 360 may form a path through which a sound (or a sound wave) generated based on a vibration of the vibration generator 510 is transferred (or propagated) to the gap space GS or the vibration member 100, and thus, a mono sound or a stereo sound may be implemented. In addition, in a case where the one or more hole 360 are configured as in FIG. 22C, an apparatus for reproducing a mono sound by a cost-reduced apparatus may be provided.

In the supporting member 300 according to another example embodiment of the present disclosure, one or more of the first to third curved portions 350*a*, 350*b*, and 350*c* of the curved portion 350 may be surrounded by the enclosure 950 illustrated in FIG. 20.

Figure 23A:
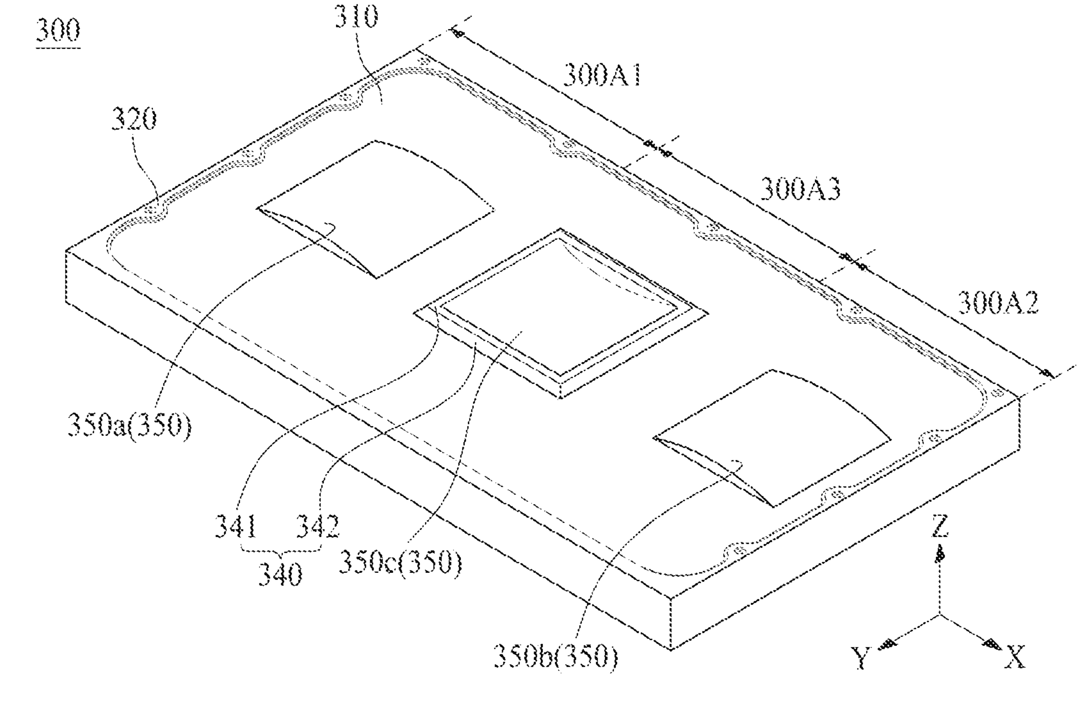
FIGS. 23A to 23C are rear perspective views illustrating a supporting member according to another example embodiment of the present disclosure.
Figure 23B:
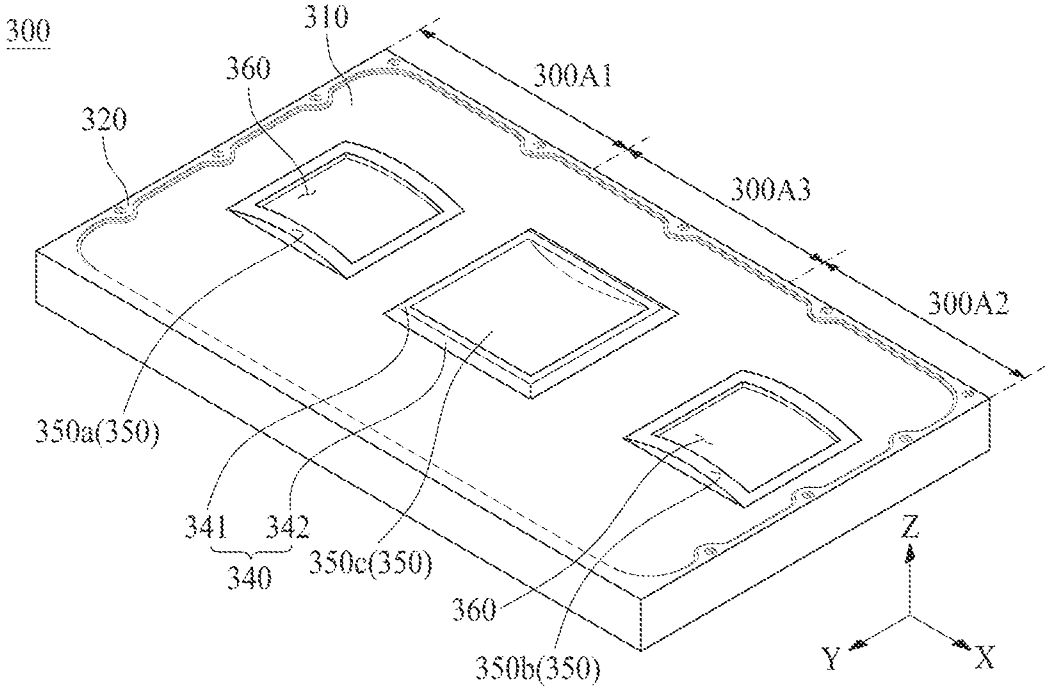
Figure 23C:
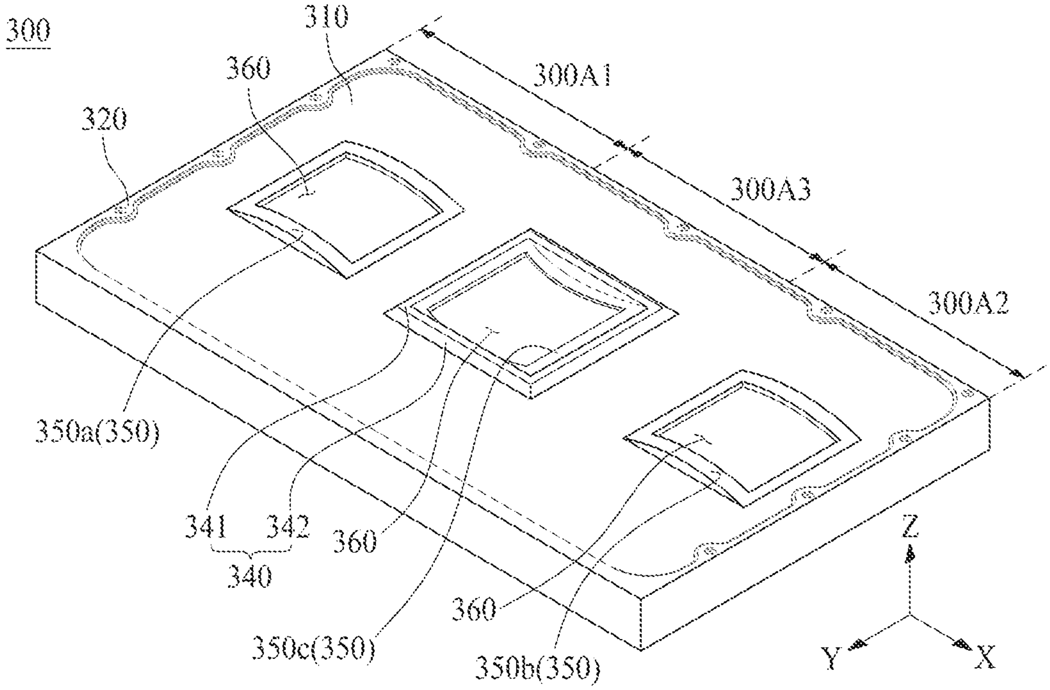

FIGS. 23A to 23C are example rear perspective views illustrating a supporting member according to another example embodiment of the present disclosure. FIGS. 23A to 23C illustrate an example embodiment implemented by modifying the curved portion of the supporting member illustrated in FIGS. 22A to 22C.

With reference to FIGS. 23A to 23C, a supporting member 300 according to another example embodiment of the present disclosure may include first and second curved portions 350*a* and 350*b*, a protrusion portion 340, and a third curved portion 350*c*.

First and second curved portions 350*a* and 350*b* may protrude from a rear portion 310 in first and second regions 300A1 and 300A2 of the supporting member 300. The first and second curved portions 350*a* and 350*b* may be substantially the same as the first and second curved portions 350*a* and 350*b* described above with reference to FIGS. 2 to 5, 11A, 11B, and 17B, and thus, like reference numerals refer to like elements and their repetitive descriptions may be omitted for brevity.

The protrusion portion 340 may protrude from the rear portion 310 in a third region 300A3 of the supporting member 300. The protrusion portion 340 may be substantially the same as the third protrusion portion 340*c* described above with reference to FIGS. 22A and 22B, and thus, the repetitive description thereof may be omitted for brevity.

The third curved portion 350*c* may protrude from the protrusion portion 340. The third curved portion 350*c* may be substantially the same as the third curved portion 350*c* described above with reference to FIGS. 22A and 22B, and thus, like reference numeral refer to like element and the repetitive description thereof may be omitted for brevity.

With reference to FIGS. 23B and 23C, a supporting member 300 according to another example embodiment of the present disclosure may include one or more holes 360 formed at one or more of the first to third curved portions 350*a*, 350*b*, and 350*c*.

According to an example embodiment of the present disclosure, the one or more holes 360 may be formed at each of the first and second curved portions 350*a* and 350*b* of the first to third curved portions 350*a*, 350*b*, and 350*c*, as illustrated in FIG. 23B. The one or more holes 360 which are formed at each of the first and second curved portions 350*a* and 350*b* may be substantially the same as the one or more holes 360 described above with reference to FIGS. 12 and 13, 17A, 17C, and 17D, and thus, like reference numerals refer to like elements and their repetitive descriptions may be omitted for brevity. The third curved portion 350*c* may be substantially the same as the third curved portion 350*c* described above with reference to FIGS. 22A, 22B, and 23A, and thus, like reference numeral refer to like element and the repetitive description thereof may be omitted for brevity.

According to another example embodiment of the present disclosure, the one or more holes 360 may be formed at each of the first to third curved portions 350*a*, 350*b*, and 350*c*, as illustrated in FIG. 23C. The one or more holes 360 which are formed at each of the first and second curved portions 350*a* and 350*b* may be substantially the same as the illustrated in FIG. 23B, and thus, their repetitive descriptions may be omitted for brevity. The one or more holes 360 which are formed at the third curved portion 350*c* may be substantially the same as the illustrated in FIGS. 22C and 22D, and thus, their repetitive descriptions may be omitted for brevity.

The apparatus 4 including the supporting member 300 illustrated in FIGS. 23A to 23C may implement a sound, for example, a stereo sound through a left sound and a right sound which are output by a vibration of a vibration member 100 based on driving of each of the first vibration apparatus 500-1 and the second vibration apparatus 500-2, and a sound characteristic and a sound pressure level characteristic of the low-pitched sound band may be enhanced due to a sound of the low-pitched sound band output based on a vibration of the vibration member 100 based on driving of the third vibration apparatus 500-3. In addition, the apparatus 4 including the supporting member 300 illustrated in FIGS. 23B and 23C may include one or more holes 360 formed at a curved portion 350 of a supporting member 300, and thus, a vibration of the vibration apparatus 500 may be more smoothly performed, whereby a vibration width (or a displacement width) of each of the first to third vibration apparatuses 500-1, 500-2, and 500-3 may increase. Therefore, a vibration width (or a displacement width) of the vibration member 100 may increase, and thus, a sound characteristic and/or a sound pressure level characteristic generated based on a vibration of the vibration member 100 may be further enhanced. In addition, the one or more holes 360 may form a path through which a sound (or a sound wave) generated based on a vibration of the vibration generator 510 is transferred (or propagated) to the gap space GS or the vibration member 100, and thus, a mono sound or a stereo sound may be implemented. In addition, when one or more holes 360 are configured as in FIGS. 23B and 23C, an apparatus for reproducing a mono sound by a cost-reduced apparatus may be provided.

In the supporting member 300 according to another example embodiment of the present disclosure, one or more of the first to third curved portions 350*a*, 350*b*, and 350*c* of the curved portion 350 may be surrounded by the enclosure 950 illustrated in FIG. 20.

Figure 24:
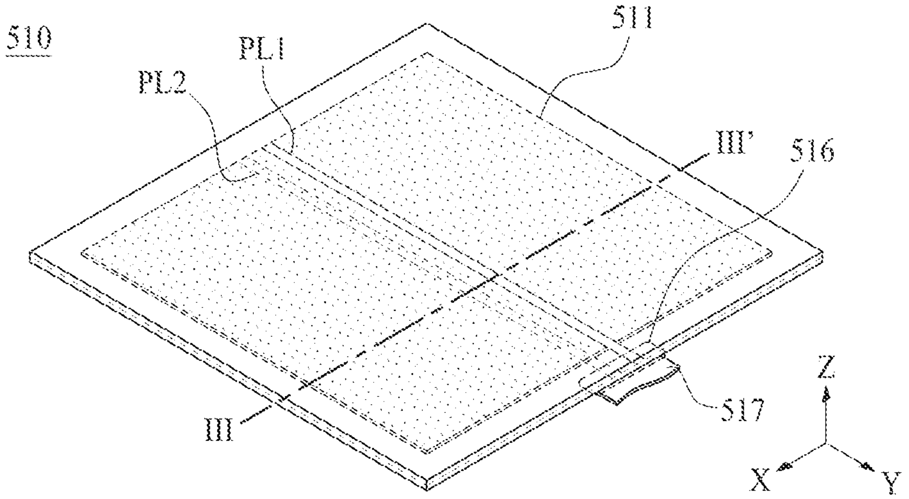
FIG. 24 illustrates a vibration generator according to an example embodiment of the present disclosure.
Figure 25:
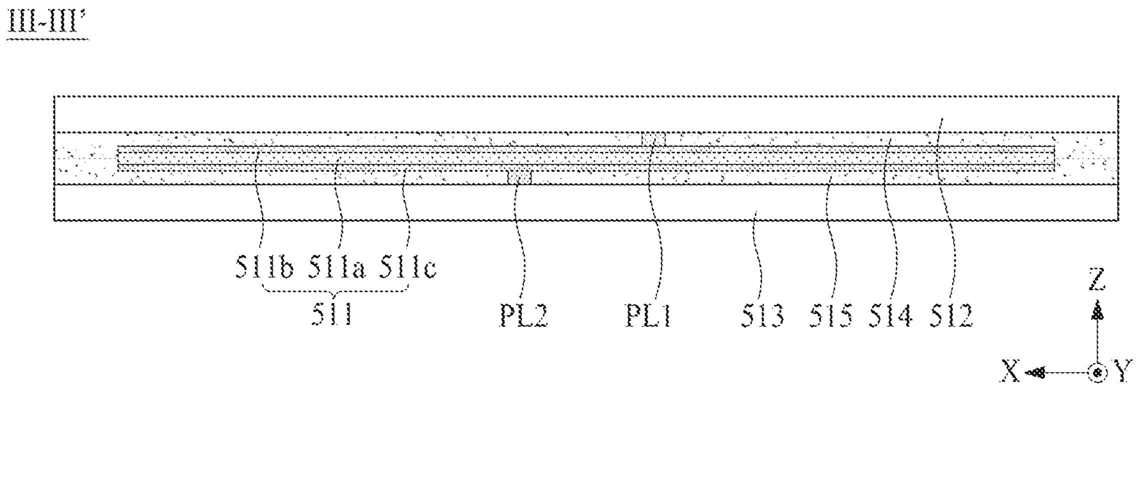
FIG. 25 is an example cross-sectional view taken along line III-III' illustrated in FIG. 24.
Figure 26:
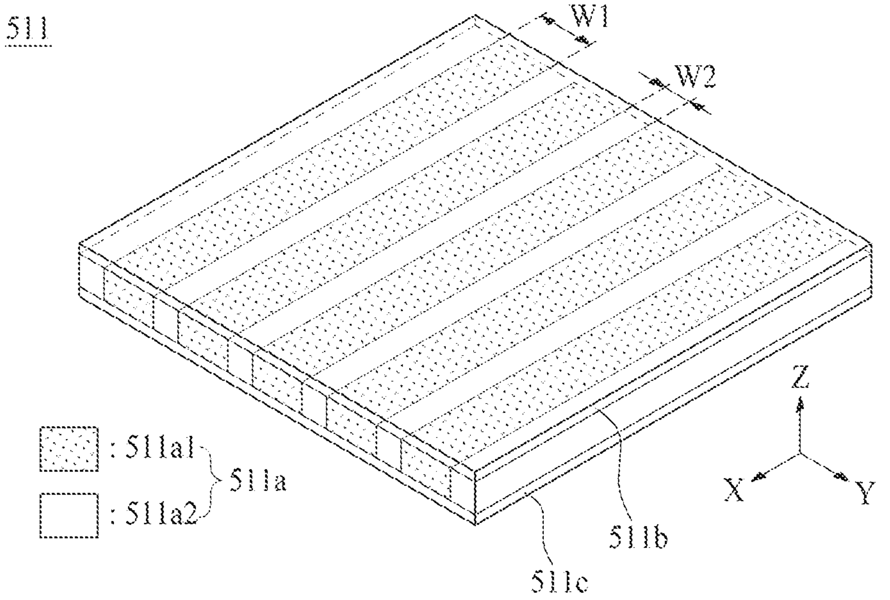
FIG. 26 is an example rear perspective view illustrating a vibration portion illustrated in FIG. 25.

FIG. 24 illustrates a vibration generator according to an example embodiment of the present disclosure, FIG. 25 is an example cross-sectional view taken along line III-III' illustrated in FIG. 24, and FIG. 26 is an example rear perspective view illustrating a vibration portion illustrated in FIG. 25. FIGS. 24 to 26 illustrate another example embodiment of a vibration generator described above with reference to FIGS. 1 to 23C.

With reference to FIGS. 24 to 26, a vibration generator 510 according to a first example embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration generator 510 according to the first example embodiment of the present disclosure may include a vibration portion 511. The vibration portion 511 may include a vibration layer 511*a*, a first electrode layer 511*b*, and a second electrode layer 511*c*.

The vibration layer 511*a* may include a piezoelectric material (or an electroactive material) which includes a piezoelectric effect. For example, the piezoelectric material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. The vibration layer 511*a* may be referred to as a piezoelectric layer, a piezoelectric material layer, an electroactive layer, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto. The vibration layer 511*a* may be formed of a transparent, semitransparent, or opaque piezoelectric material. The vibration layer 511*a* may be transparent, semitransparent, or opaque.

The vibration layer 511*a* according to an example embodiment of the present disclosure may include a plurality of first portions 511*a*1 and a plurality of second portions 511*a*2. For example, the plurality of first portions 511*a*1 and the plurality of second portions 511*a*2 may be alternately and repeatedly arranged in a first direction X (or a second direction Y). For example, the first direction X may be a widthwise direction of the vibration layer 511*a*, the second direction Y may be a lengthwise direction of the vibration layer 511*a*, but embodiments of the present disclosure are not limited thereto, the first direction X may be the lengthwise direction of the vibration layer 511*a*, and the second direction Y may be the widthwise direction of the vibration layer 511*a*.

Each of the plurality of first portions 511*a*1 may be configured as an inorganic material portion. The inorganic material portion may include a piezoelectric material, a composite piezoelectric material, or an electroactive material which includes a piezoelectric effect.

Each of the plurality of first portions 511*a*1 may be configured as a ceramic-based material for generating a relatively high vibration, or may be configured as a piezoelectric ceramic having a perovskite crystalline structure. The perovskite crystalline structure may have a piezoelectric effect and an inverse piezoelectric effect, and may be a structure having orientation. The perovskite crystalline structure may be represented by a chemical formula "$ABO_3$." In the chemical formula, "A" may include a divalent metal element, and "B" may include a tetravalent metal element. For example, in the chemical formula "$ABO_3$," "A" and "B" may be cations, and "O" may be anions. For example, each of the plurality of first portions 511*a*1 may include at least one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

When the perovskite crystalline structure includes a center ion (for example, $PbTiO_3$), a position of a titanium (Ti) ion may be changed by an external stress or a magnetic field. Thus, polarization may be changed, thereby generating a piezoelectric effect. For example, in the perovskite crystalline structure, a cubic shape corresponding to a symmetric structure may be changed to a tetragonal (e.g., quadrilateral), orthorhombic, or rhombohedral structure corresponding to an unsymmetric structure, and thus, a piezoelectric effect may be generated. In a tetragonal (e.g., quadrilateral), orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

The vibration layer 511*a* or first portions 511*a*1 according to an example embodiment of the present disclosure may include one or more of lead (Pb), zirconium (Zr), titanium (Ti), zinc (Zn), nickel (Ni), and niobium (Nb), but embodiments of the present disclosure are not limited thereto.

The vibration layer 511*a* or first portions 511*a*1 according to another example embodiment of the present disclosure may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto. In another example, the vibration layer 511*a* or first portions 511*a*1 may include at least one or more of calcium titanate ($CaTiO_3$), $BaTiO_3$, and $SrTiO_3$, each without lead (Pb), but embodiments of the present disclosure are not limited thereto.

Each of the plurality of first portions 511*a*1 according to an example embodiment of the present disclosure may be disposed between the plurality of second portions 511*a*2 and may have a first width W1 parallel to the first direction X (or the second direction Y) and a length parallel to the second direction Y (or the first direction X). Each of the plurality of second portions 511*a*2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 511*a*1 and the second portion 511*a*2 may include a line shape or a stripe shape which has the same size or different sizes. Therefore, the vibration layer 511*a* may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the vibration layer 511*a* may vary based on at least one or more of a shape, a length, and a thickness, or the like.

In an example of the vibration layer 511*a*, each of the plurality of first portions 511*a*1 and the plurality of second portions 511*a*2 may be disposed (or arranged) at the same plane (or the same layer) in parallel. Each of the plurality of second portions 511*a*2 may be configured to fill a gap between two adjacent first portions of the plurality of first portions 511*a*1 and may be connected to or attached on a second portion 511*a*2 adjacent thereto. Therefore, the vibration layer 511*a* may extend by a desired size or length based on the side coupling (or connection) of the first portion 511*a*1 and the second portion 511*a*2.

In an example of the vibration layer 511*a*, a width (or a size) W2 of each of the plurality of second portions 511*a*2 may progressively decrease in a direction from a center portion to both peripheries (or both ends) of the vibration layer 511*a* or the vibration generator 510.

According to an example embodiment of the present disclosure, a second portion 511*a*2, having a largest width W2 among the plurality of second portions 511*a*2, may be located at a portion at which a highest stress may concentrate when the vibration layer 511*a* or the vibration generator 510 is vibrating in a vertical direction Z (or a thickness direction). A second portion 511*a*2, having a smallest width W2 among the plurality of second portions 511*a*2, may be located at a portion where a relatively low stress may occur when the vibration layer 511*a* or the vibration generator 510 is vibrating in the vertical direction Z. For example, the second portion 511*a*2, having the largest width W2 among the plurality of second portions 511*a*2, may be disposed at the center portion of the vibration layer 511*a*, and the second portion 511*a*2, having the smallest width W2 among the plurality of second portions 511*a*2 may be disposed at each of the both peripheries of the vibration layer 511*a*. Therefore, when the vibration layer 511*a* or the vibration generator 510 is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure level and a lowest sound pressure level.

In the vibration layer 511*a*, each of the plurality of first portions 511*a*1 may have different sizes (or widths). For example, a size (or a width) of each of the plurality of first portions 511*a*1 may progressively decrease or increase in a direction from the center portion to the both peripheries (or both ends) of the vibration layer 511*a* or the vibration generator 510. For example, in the vibration layer 511*a*, a sound pressure level characteristic of a sound may be enhanced and a sound reproduction band may increase, based on various natural vibration frequencies according to a vibration of each of the plurality of first portions 511*a*1 having different sizes.

The plurality of second portions 511*a*2 may be disposed between the plurality of first portions 511*a*1. Therefore, in the vibration layer 511*a* or the vibration generator 510, vibration energy by a link in a unit lattice of each first portion 511*a*1 may increase by a corresponding second portion 511*a*2, and thus, a vibration characteristic may increase, and a piezoelectric characteristic and flexibility may be secured. For example, the second portion 511*a*2 may include one or more of an epoxy-based polymer, an acrylic-based polymer, and a silicone-based polymer, but embodiments of the present disclosure are not limited thereto.

The plurality of second portions 511*a*2 according to an example embodiment of the present disclosure may be configured as an organic material portion. For example, the organic material portion may be disposed between the inorganic material portions, and thus, may absorb an impact applied to the inorganic material portion (or the first portion), may release a stress concentrating on the inorganic material portion to enhance the total durability of the vibration layer 511*a* or the vibration generator 510, and may provide flexibility to the vibration layer 511*a* or the vibration generator 510. Thus, the vibration generator 510 may have flexibility, and thus, may be bent in a shape which matches a shape of a curved portion of a supporting member. For example, the vibration generator 510 may have flexibility, and thus, may be disposed along a shape corresponding to a shape of the curved portion of the support member.

The plurality of second portions 511*a*2 according to an example embodiment of the present disclosure may have modulus (or Young's modulus) and viscoelasticity that are lower than those of each first portion 511*a*1, and thus, the second portion 511*a*2 may enhance the reliability of each first portion 511*a*1 vulnerable to an impact due to a fragile characteristic. For example, the second portion 511*a*2 may be configured as a material having a loss coefficient of about 0.01 to about 1 and modulus of about 0.1 GPa (Giga Pascal) to about 10 GPa (Giga Pascal).

The organic material portion configured at the second portion 511*a*2 may include one or more of an organic material, an organic polymer, an organic piezoelectric material, or an organic non-piezoelectric material that has a flexible characteristic in comparison with the inorganic material portion of the first portions 511*a*1. For example, the second portion 511*a*2 may be referred to as an adhesive portion, an elastic portion, a bending portion, a damping portion, or a flexible portion, or the like each having flexibility, but embodiments of the present disclosure are not limited thereto.

The plurality of first portions 511*a*1 and the second portion 511*a*2 may be disposed on (or connected to) the same plane, and thus, the vibration layer 511*a* according to an example embodiment of the present disclosure may be of a single thin film or a single thin film type. For example, the vibration layer 511*a* may have a structure in which a plurality of first portions 511*a*1 are connected to one side. For example, the plurality of first portions 511*a*1 may have a connection structure throughout the vibration layer 511*a*. For example, the vibration layer 511*a* may be vibrated in a vertical direction by the first portion 511*a*1 having a vibration characteristic and may be bent in a curved shape by the second portion 511*a*2 having flexibility. In addition, in the vibration layer 511*a* according to an example embodiment of the present disclosure, a size of the first portion 511*a*1 and a size of the second portion 511*a*2 may be adjusted based on a piezoelectric characteristic and flexibility needed for the vibration layer 511*a* or the vibration generator 510. As an example embodiment of the present disclosure, when the vibration layer 511*a* needs a piezoelectric characteristic rather than flexibility, a size of the first portion 511*a*1 may be adjusted to be greater than that of the second portion 511*a*2. As another example embodiment of the present disclosure, when the vibration layer 511*a* needs flexibility rather than a piezoelectric characteristic, a size of the second portion 511*a*2 may be adjusted to be greater than that of the first portion 511*a*1. Accordingly, a size of the vibration layer

511*a* may be adjusted based on a characteristic needed therefor, and thus, the vibration layer 511*a* may be easy to design.

The first electrode layer 511*b* may be disposed at a first surface (or an upper surface) of the vibration layer 511*a*. The first electrode layer 511*b* may be disposed at or coupled to a first surface of each of the plurality of first portions 511*a*1 and a first surface of each of the plurality of second portions 511*a*2 in common and may be electrically connected to the first surface of each of the plurality of first portions 511*a*1. For example, the first electrode layer 511*b* may be a single-body electrode (or one electrode) shape which is disposed at the entire first surface of the vibration layer 511*a*. For example, the first electrode layer 511*b* may have substantially the same shape as that of the vibration layer 511*a*, but embodiments of the present disclosure are not limited thereto.

The second electrode layer 511*c* may be disposed at a second surface (or a rear surface) different from (or opposite to) the first surface of the vibration layer 511*a*. The second electrode layer 511*c* may be disposed at or coupled to a second surface of each of the plurality of first portions 511*a*1 and a second surface of each of the plurality of second portions 511*a*2 in common and may be electrically connected to the second surface of each of the plurality of first portions 511*a*1. For example, the second electrode layer 511*c* may be a single-body electrode (or one electrode) shape which is disposed at the entire second surface of the vibration layer 511*a*. The second electrode layer 511*c* may have the same shape as the vibration layer 511*a*, but embodiments of the present disclosure are not limited thereto.

One or more of the first electrode layer 511*b* and the second electrode layer 511*c* according to an example embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), a magnesium (Mg), or the like, or an alloy thereof, but embodiments of the present disclosure are not limited thereto.

The vibration layer 511*a* may be polarized (or poling) by a certain voltage applied to the first electrode layer 511*b* and the second electrode layer 511*c* in a certain temperature atmosphere, or a temperature atmosphere that may be changed from a high temperature to a room temperature, but embodiments of the present disclosure are not limited thereto. For example, the vibration layer 511*a* may alternately and repeatedly contract and/or expand based on an inverse piezoelectric effect according to a sound signal (or a voice signal or a driving signal) applied to the first electrode layer 511*b* and the second electrode layer 511*c* from the outside to vibrate. For example, the vibration layer 511*a* may vibrate based on a vertical-direction vibration d33 and a planar direction vibration d31 by the sound signal applied to the first electrode layer 511*b* and the second electrode layer 511*c*. The vibration layer 511*a* may increase the displacement of a vibration member by contraction and/or expansion of the planar direction, thereby further improving the vibration of the vibration member.

The vibration generator 510 according to the first example embodiment of the present disclosure may further include a first cover member 512 and a second cover member 513.

The first cover member 512 may be disposed at a first surface of the vibration portion 511. For example, the first cover member 512 may be configured to cover the first electrode layer 511*b*. Accordingly, the first cover member 512 may protect the first electrode layer 511*b*.

The second cover member 513 may be disposed at a second surface of the vibration portion 511. For example, the second cover member 513 may be configured to cover the second electrode layer 511*c*. Accordingly, the second cover member 513 may protect the second electrode layer 511*c*.

The first cover member 512 and the second cover member 513 according to an example embodiment of the present disclosure may each include one or more material of plastic, fiber, cloth, paper, leather, rubber, and wood, but embodiments of the present disclosure are not limited thereto. For example, each of the first cover member 512 and the second cover member 513 may include the same material or different material. For example, each of the first cover member 512 and the second cover member 513 may be a polyimide (PI) film or a polyethylene terephthalate (PET) film, but embodiments of the present disclosure are not limited thereto.

The first cover member 512 according to an example embodiment of the present disclosure may be connected or coupled to the first electrode layer 511*b* by a first adhesive layer 514. For example, the first cover member 512 may be connected or coupled to the first electrode layer 511*b* by a film laminating process using the first adhesive layer 514.

The second cover member 513 according to an example embodiment of the present disclosure may be connected or coupled to the second electrode layer 511*c* by a second adhesive layer 515. For example, the second cover member 513 may be connected or coupled to the second electrode layer 511*c* by a film laminating process using the second adhesive layer 515. For example, the vibration generator 510 may be implemented as one film by the first cover member 512 and the second cover member 513.

The first adhesive layer 514 may be disposed between the first electrode layer 511*b* and the first cover member 512. The second adhesive layer 515 may be disposed between the second electrode layer 511*c* and the second cover member 513. For example, the first adhesive layer 514 and second adhesive layer 515 may be configured between the first cover member 512 and the second cover member 513 to completely surround the vibration layer 511*a*, the first electrode layer 511*b*, and the second electrode layer 511*c*. For example, the vibration layer 511*a*, the first electrode layer 511*b*, and the second electrode layer 511*c* may be embedded or built-in between the first adhesive layer 514 and the second adhesive layer 515.

Each of the first adhesive layer 514 and second adhesive layer 515 according to an example embodiment of the present disclosure may include an electrically insulating material which has adhesiveness and is capable of compression and decompression. For example, each of the first adhesive layer 514 and the second adhesive layer 515 may include an epoxy resin, an acrylic resin, a silicone resin, or a urethane resin, but embodiments of the present disclosure are not limited thereto.

According to an example embodiment of the present disclosure, any one of the first cover member 512 and the second cover member 513 may be coupled to or attached on the curved portion 350 of the supporting member 300 by the connection member 520, as illustrated in FIGS. 5 and 6.

According to an example embodiment of the present disclosure, any one of the first cover member 512 and the second cover member 513 may be coupled to or attached on the curved portion 350 of the supporting member 300 by the first connection member 520, the plate 540, and the second connection members 550 and 560, as illustrated in FIGS. 5, 7 to 9, 12 and 15.

The vibration generator 510 according to an example embodiment of the present disclosure may further include a first power supply line PL1 disposed at the first cover member 512, a second power supply line PL2 disposed at the second cover member 513, and a pad part 516 electrically connected to the first power supply line PL1 and the second power supply line PL2.

The first power supply line PL1 may be disposed between the first electrode layer 511*b* and the first cover member 512 and may be electrically connected to the first electrode layer 511*b*. The first power supply line PL1 may be extended long in the second direction Y and may be electrically connected to a central portion of the first electrode layer 511*b*. As an example embodiment of the present disclosure, the first power supply line PL1 may be electrically connected to the first electrode layer 511*b* by an anisotropic conductive film. As another example embodiment of the present disclosure, the first power supply line PL1 may be electrically connected to the first electrode layer 511*b* through a conductive material (or particle) included in the first adhesive layer 514.

The second power supply line PL2 may be disposed between the second electrode layer 511*c* and the second cover member 513 and may be electrically connected to the second electrode layer 511*c*. The second power supply line PL2 may be extended long in the second direction Y and may be electrically connected to a central portion of the second electrode layer 511*c*. As an example embodiment of the present disclosure, the second power supply line PL2 may be electrically connected to the second electrode layer 511*c* by an anisotropic conductive film. As another example embodiment of the present disclosure, the second power supply line PL2 may be electrically connected to the second electrode layer 511*c* through a conductive material (or particle) included in the second adhesive layer 515.

For example, the first power supply line PL1 may be disposed not to overlap the second power supply line PL2. When the first power supply line PL1 is disposed not to overlap the second power supply line PL2, a short circuit between the first power supply line PL1 and the second power supply line PL2 may be prevented.

The pad part 516 may be configured at one periphery portion of any one of the first cover member 512 and the second cover member 513 to be electrically connected to one portion (or one end) of each of the first power supply line PL1 and the second power supply line PL2.

The pad part 516 according to an example embodiment of the present disclosure may include a first pad electrode electrically connected to one end of the first power supply line PL1, and a second pad electrode electrically connected to one end of the second power supply line PL2.

The first pad electrode may be disposed at one periphery portion of any one of the first cover member 512 and the second cover member 513 to be electrically connected to one portion of the first power supply line PL1. For example, the first pad electrode may pass through any one of the first cover member 512 and the second cover member 513 to be electrically connected to one portion of the first power supply line PL1.

The second pad electrode may be disposed in parallel with the first pad electrode to be electrically connected to one portion of the second power supply line PL2. For example, the second pad electrode may pass through any one of the first cover member 512 and the second cover member 513 to be electrically connected to one portion of the second power supply line PL2.

According to an example embodiment of the present disclosure, each of the first power supply line PL1, the second power supply line PL2, and the pad part 516 may be configured to be transparent, translucent, or opaque.

The pad part 516 according to another example embodiment of the present disclosure may be electrically connected to a signal cable 517.

The signal cable 517 may be electrically connected to the pad part 516 disposed at the vibration generator 510 and may supply the vibration generator 510 with a vibration driving signal (or a sound signal or a voice signal) provided from a sound processing circuit. The signal cable 517 according to an example embodiment of the present disclosure may include a first terminal electrically connected to the first pad electrode of the pad part 516 and a second terminal electrically connected to the second pad electrode of the pad part 516. For example, the signal cable 517 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data provided from an external sound data generating circuit part. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode layer 511*b* through the first terminal of the signal cable 517, the first pad electrode of the pad part 516, and the first power supply line PL1. The second vibration driving signal may be supplied to the second electrode layer 511*c* through the second terminal of the signal cable 517, the second pad electrode of the pad part 516, and the second power supply line PL2.

According to an example embodiment of the present disclosure, the signal cable 517 may be configured to be transparent, semitransparent, or opaque.

The vibration generator 510 according to the first example embodiment of the present disclosure may be implemented as a thin film or a thin film type, where the first portion 511*a*1 having a piezoelectric characteristic and a second portion 511*a*2 having flexibility are alternately repeated and connected. Accordingly, the vibration generator 510 may be bent in a shape corresponding to a shape of the curved portion of the supporting member or a shape of the vibration member. For example, when the vibration generator 510 is connected or coupled to the vibration member including various curved portions by the connection member, the vibration generator 510 may be bent in a curved shape along a shape of a curved portion of the vibration member and reliability against damage or breakdown may not be reduced despite being bent in a curved shape. In addition, in the vibration generator 510 according to the first example embodiment of the present disclosure, a vibration width (or a displacement width) may be increased due to the flexible second portion 511*a*2 having flexibility. Thus, a sound characteristic and/or a sound pressure level characteristic generated based on a vibration of the vibration member may be enhanced.

Figure 27:
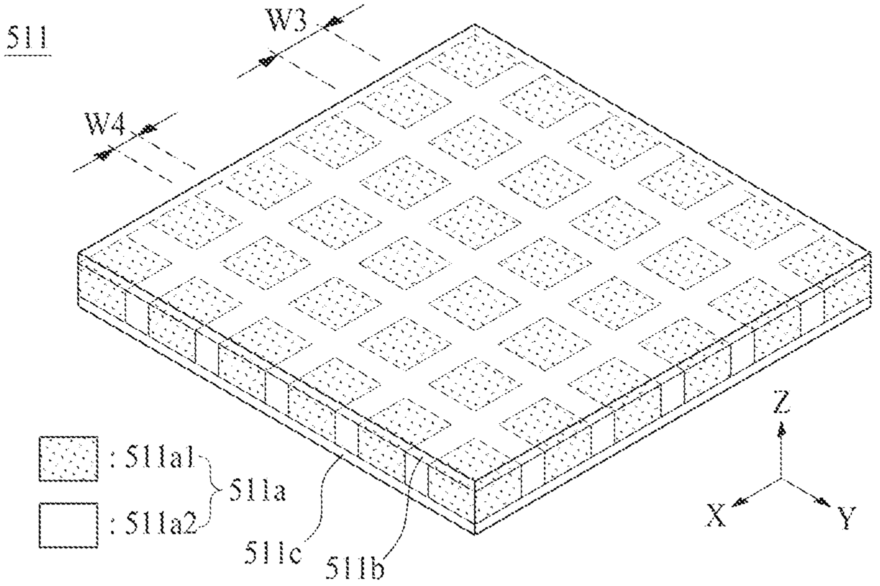
FIG. 27 is a rear perspective view illustrating another example embodiment of a vibration portion illustrated in FIG. 26.

FIG. 27 is an example rear perspective view illustrating another embodiment of a vibration portion illustrated in FIG. 25.

With reference to FIG. 27, the vibration layer 511*a* according to another example embodiment of the present disclosure may include a plurality of first portions 511*a*1, which are spaced apart from one another along a first direction X and a second direction Y, and a second portion 511*a*2 disposed between the plurality of first portions 511*a*1.

Each of the plurality of first portions 511*a*1 may be disposed to be spaced apart from one another along the first direction X and the second direction Y. For example, each of the plurality of first portions 511*a*1 may have a hexahedral shape (or a six-sided object shape) having the same size and may be disposed in a lattice shape. Each of the plurality of first portions 511*a*1 may include a piezoelectric material which may be substantially the same as the first portion 511*a*1 described above with reference to FIGS. 24 to 26, and thus, like reference numeral refer to like element and the repetitive description thereof may be omitted for brevity.

The second portion 511*a*2 may be disposed between the plurality of first portions 511*a*1 along each of the first direction X and the second direction Y. The second portion 511*a*2 may be configured to fill a gap or a space between two adjacent first portions 511*a*1 or to surround each of the plurality of first portions 511*a*1, and thus, may be connected to or attached on an adjacent first portion 511*a*1. According to an example embodiment of the present disclosure, a width W4 of a second portion 511*a*2 disposed between two first portions 511*a*1 adjacent to each other along the first direction X may be the same as or different from that of a width W3 of the first portion 511*a*1, and the width W4 of a second portion 511*a*2 disposed between two first portions 511*a*1 adjacent to each other along the second direction Y may be the same as or different from that of the width W3 of the first portion 511*a*1. The second portion 511*a*2 may include an organic material which may be substantially the same as the second portion 511*a*2 described above with reference to FIGS. 24 to 26, and thus, like reference numeral refer to like element and the repetitive description thereof may be omitted for brevity.

The vibration layer 511*a* according to another example embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the vibration layer 511*a* may vary based on at least one or more of a shape, a length, and a thickness, or the like.

Figure 28:
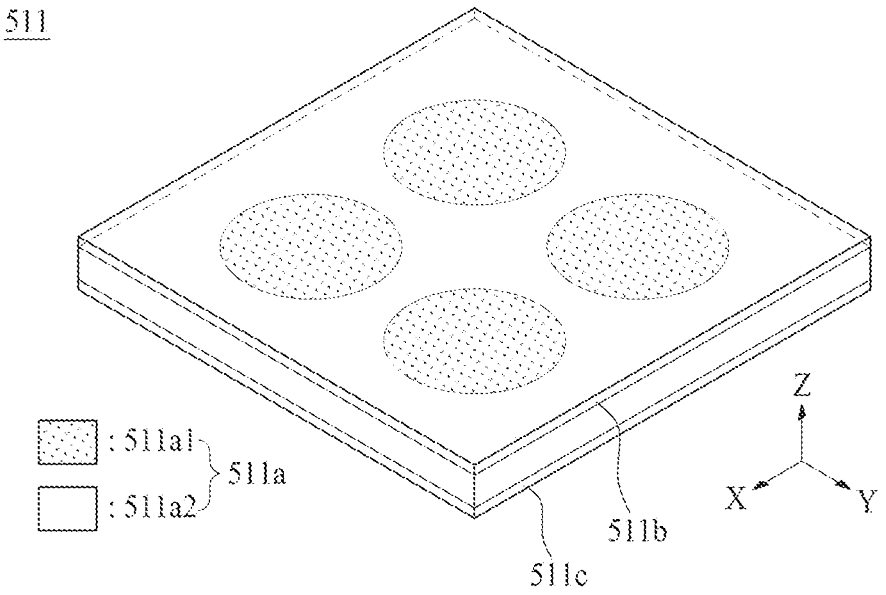
FIG. 28 is a rear perspective view illustrating another example embodiment of a vibration portion illustrated in FIG. 26.

FIG. 28 is a rear perspective view illustrating another example embodiment of a vibration portion illustrated in FIG. 26.

With reference to FIG. 28, the vibration layer 511*a* according to another example embodiment of the present disclosure may include a plurality of first portions 511*a*1, which are spaced apart from one another along a first direction X and a second direction Y, and a second portion 511*a*2 disposed between the plurality of first portions 511*a*1.

Each of the plurality of first portions 511*a*1 may have a flat structure of a circular shape. For example, each of the plurality of first portions 511*a*1 may have a circular plate shape, but embodiments of the present disclosure are not limited thereto. For example, each of the plurality of first portions 511*a*1 may have a dot shape including an oval shape, a polygonal shape, or a donut shape. Each of the plurality of first portions 511*a*1 may include a piezoelectric material which may be substantially the same as the first portion 511*a*1 described above with reference to FIGS. 24 to 26, and thus, like reference numeral refer to like element and the repetitive description thereof may be omitted for brevity.

The second portion 511*a*2 may be disposed between the plurality of first portions 511*a*1 along each of the first direction X and the second direction Y. The second portion 511*a*2 may be configured to surround each of the plurality of first portions 511*a*1, and thus, may be connected to or attached on a side surface of each of the plurality of first portions 511*a* 1. Each of the plurality of first portions 511*a*1 and the second portion 511*a*2 may be disposed (or arranged) in parallel on the same plane (or the same layer). The second portion 511*a*2 may include an organic material which may be substantially the same as the second portion 511*a*2 described above with reference to FIGS. 24 to 26, and thus, like reference numeral refer to like element and the repetitive description thereof may be omitted for brevity.

Figure 29:
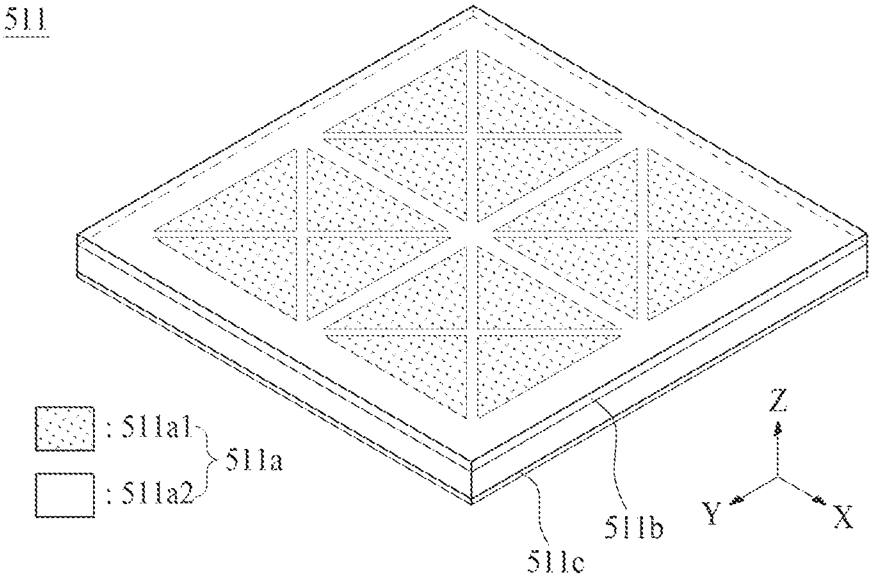
FIG. 29 is a rear perspective view illustrating another example embodiment of a vibration portion illustrated in FIG. 26.

FIG. 29 is a rear perspective view illustrating another example embodiment of a vibration portion illustrated in FIG. 26.

With reference to FIG. 29, the vibration layer 511*a* according to another example embodiment of the present disclosure may include a plurality of first portions 511*a*1, which are spaced apart from one another along a first direction X and a second direction Y, and a second portion 511*a*2 disposed between the plurality of first portions 511*a*1.

Each of the plurality of first portions 511*a*1 may have a flat structure of a triangular shape. For example, each of the plurality of first portions 511*a*1 may have a triangular plate shape, but embodiments of the present disclosure are not limited thereto. Each of the plurality of first portions 511*a*1 may include a piezoelectric material which may be substantially the same as the first portion 511*a*1 described above with reference to FIGS. 24 to 26, and thus, like reference numeral refer to like element and the repetitive description thereof may be omitted for brevity.

According to an example embodiment of the present disclosure, four adjacent first portions 511*a*1 among the plurality of first portions 511*a*1 may be adjacent to one another to form a tetragonal (or quadrilateral shape or a square shape). Vertices of the four adjacent first portions 511*a*1 forming a tetragonal shape may be adjacent to one another in a center portion (or a central portion) of the tetragonal shape.

The second portion 511*a*2 may be disposed between the plurality of first portions 511*a*1 along each of the first direction X and the second direction Y. The second portion 511*a*2 may be configured to surround each of the plurality of first portions 511*a* 1, and thus, may be connected to or attached on a side surface of each of the plurality of first portions 511*a* 1. Each of the plurality of first portions 511*a*1 and the second portion 511*a*2 may be disposed (or arranged) in parallel on the same plane (or the same layer). The second portion 511*a*2 may include an organic material which may be substantially the same as the second portion 511*a*2 described above with reference to FIGS. 24 to 26, and thus, like reference numeral refer to like element and the repetitive description thereof may be omitted for brevity.

According to another example embodiment of the present disclosure, 2N (where N is a natural number greater than or equal to 2) adjacent first portions 511*a*1 of the plurality of first portions 511*a*1 having the triangular shape may be disposed adjacent to one another to form a 2N-angular shape. For example, six adjacent first portions 511*a*1 of the plurality of first portions 511*a*1 may be adjacent to one another to form a hexagonal shape (or a regularly hexagonal shape). Vertices of the six adjacent first portions 511a1 forming a hexagonal shape may be adjacent to one another in a center portion (or a central portion) of the hexagonal shape. The second portion 511a2 may be configured to surround each of the plurality of first portions 511a1, and thus, may be connected to or attached on a side surface of each of the plurality of first portions 511a1. Each of the plurality of first portions 511a1 and the second portion 511a2 may be disposed (or arranged) in parallel on the same plane (or the same layer).

Figure 30:
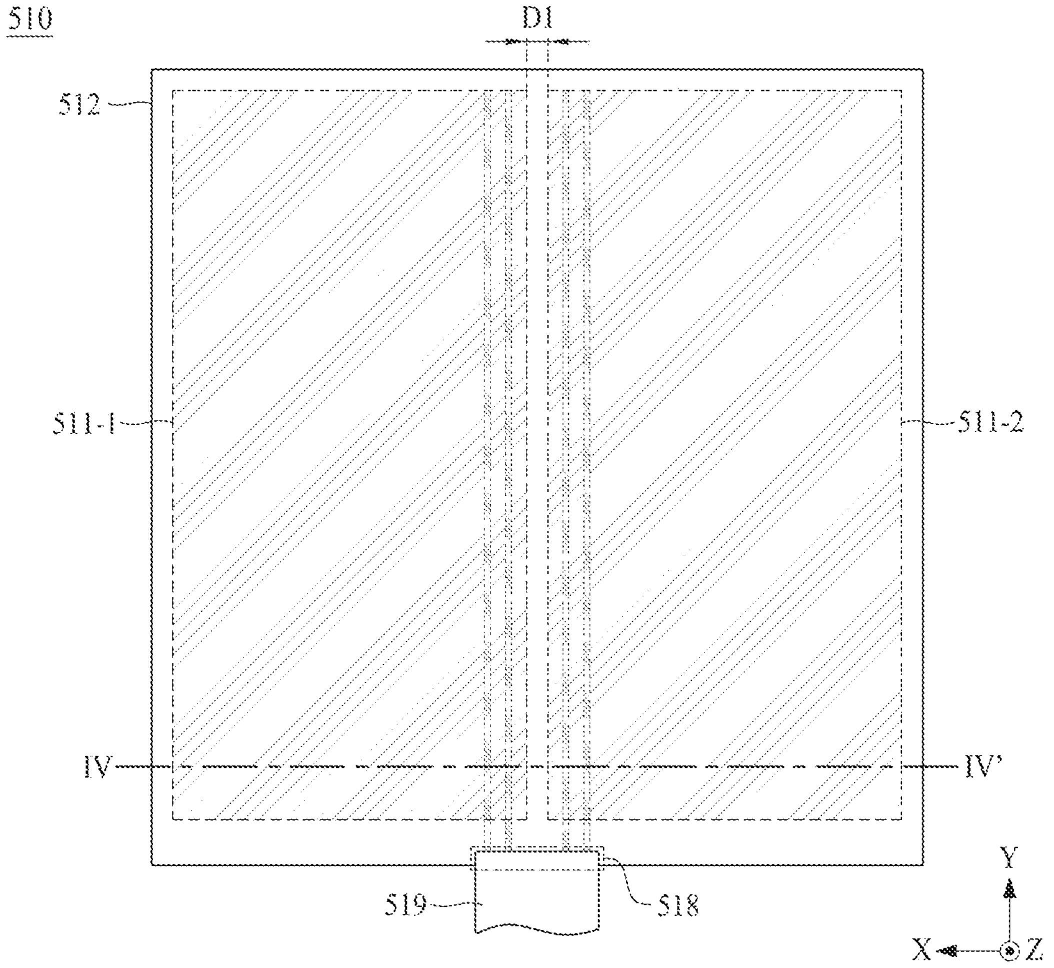
FIG. 30 illustrates a vibration generator according to another example embodiment of the present disclosure.
Figure 31:
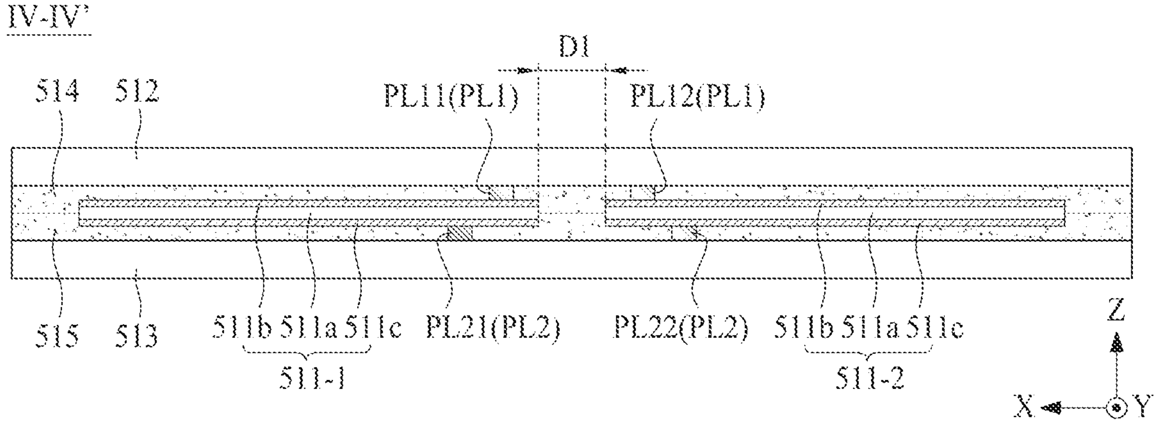
FIG. 31 is an example cross-sectional view taken along line IV-IV' illustrated in FIG. 30.

FIG. 30 illustrates a vibration generator according to another example embodiment of the present disclosure. FIG. 31 is an example cross-sectional view taken along line IV-IV' illustrated in FIG. 30. FIGS. 30 and 31 illustrate another example embodiment of the vibration generator described with reference to FIGS. 1 to 23C.

With reference to FIGS. 30 and 31, the vibration generator 510 according to another example embodiment of the present disclosure may include first and second vibration portions 511-1 and 511-2.

Each of the first and second vibration portions 511-1 and 511-2 may be electrically separated and disposed while being spaced apart from each other along a first direction X. Each of the first and second vibration portions 511-1 and 511-2 may alternately and repeatedly contract and/or expand based on a piezoelectric effect to vibrate. The first and second vibration portions 511-1 and 511-2 may be disposed or tiled at a certain interval (or distance) D1. Thus, the vibration generator 510 in which the first and second vibration portions 511-1 and 511-2 are arranged or tiled may be referred to as a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration portions 511-1 and 511-2 according to an example embodiment of the present disclosure may have a tetragonal shape. For example, each of the first and second vibration portions 511-1 and 511-2 may have a tetragonal shape having a width of about 5 cm or more. For example, each of the first and second vibration portions 511-1 and 511-2 may have a square shape having a size of 5 cm×5 cm or more, but embodiments of the present disclosure are not limited thereto.

Each of the first and second vibration portions 511-1 and 511-2 may be arranged or tiled on the same plane, and thus, the vibration generator 510 may have an enlarged area based on tiling of the first and second vibration portions 511-1 and 511-2 having a relatively small size.

Each of the first and second vibration portions 511-1 and 511-2 may be arranged or tiled at a certain interval (or distance), and thus, may be implemented as one vibration apparatus (or a single vibration apparatus) which is driven as one complete single-body without being independently driven. According to an example embodiment of the present disclosure, with respect to the first direction X, a first separation distance (or first distance or first interval) D1 between the first and second vibration portions 511-1 and 511-2 may be 0.1 mm or more and less than 3 cm, but embodiments of the present disclosure are not limited thereto.

According to an example embodiment of the present disclosure, each of the first and second vibration portions 511-1 and 511-2 may be disposed or tiled to have the separation distance (or an interval) D1 of 0.1 mm or more and less than 3 cm, and thus, may be driven as one vibration apparatus, thereby increasing a reproduction band of a sound and a sound pressure level characteristic of a sound which is generated based on a single-body vibration of the first and second vibration portions 511-1 and 511-2. For example, the first and second vibration portions 511-1 and 511-2 may be disposed in an interval D1 of 0.1 mm or more and less than 5 mm, in order to increase a reproduction band of a sound generated based on a single-body vibration of the first and second vibration portions 511-1 and 511-2 and to increase a sound of a low-pitched sound band (for example, a sound pressure level characteristic in 500 Hz or less).

According to an example embodiment of the present disclosure, when the first and second vibration portions 511-1 and 511-2 are disposed in the interval D1 of less than 0.1 mm or without the interval D1, the reliability of the first and second vibration portions 511-1 and 511-2 or the vibration generator 510 may be reduced due to damage or a crack caused by a physical contact therebetween which occurs when each of the first and second vibration portions 511-1 and 511-2 vibrates.

According to an example embodiment of the present disclosure, when the first and second vibration portions 511-1 and 511-2 are disposed in the interval D1 of 3 cm or more, the first and second vibration portions 511-1 and 511-2 may not be driven as one vibration apparatus due to an independent vibration of each of the first and second vibration portions 511-1 and 511-2. Therefore, a reproduction band of a sound and a sound pressure level characteristic of a sound which is generated based on vibrations of the first and second vibration portions 511-1 and 511-2 may be reduced. For example, when the first and second vibration portions 511-1 and 511-2 are disposed in the interval D1 of 3 cm or more, a sound characteristic and a sound pressure level characteristic of the low-pitched sound band (for example, in 500 Hz or less) may each be reduced.

According to an example embodiment of the present disclosure, when the first and second vibration portions 511-1 and 511-2 are disposed in an interval of 5 mm, each of the first and second vibration portions 511-1 and 511-2 may not be perfectly driven as one vibration apparatus, and thus, a sound characteristic and a sound pressure level characteristic of the low-pitched sound band (for example, in 200 Hz or less) may each be reduced.

According to another example embodiment of the present disclosure, when the first and second vibration portions 511-1 and 511-2 are disposed in an interval of 1 mm, each of the first and second vibration portions 511-1 and 511-2 may be driven as one vibration apparatus, and thus, a reproduction band of a sound may increase and a sound of the low-pitched sound band (for example, a sound pressure level characteristic in 500 Hz or less) may increase. For example, when the first and second vibration portions 511-1 and 511-2 are disposed in an interval of 1 mm, the vibration generator 510 may be implemented as a large-area vibrator which is enlarged based on optimization of a separation distance between the first and second vibration portions 511-1 and 511-2. Therefore, the vibration generator 510 may be driven as a large-area vibrator based on a single-body vibration of the first and second vibration portions 511-1 and 511-2, and thus, a sound characteristic and a sound pressure level characteristic may each increase a reproduction band of a sound and in the low-pitched sound band generated based on a large-area vibration of the vibration generator 510.

Therefore, to implement a single-body vibration (or one vibration apparatus) of the first and second vibration portions 511-1 and 511-2, a separation distance D1 between the first and second vibration portions 511-1 and 511-2 may be adjusted to 0.1 mm or more and less than 3 cm. In addition, to implement a single-body vibration (or one vibration apparatus) of the first and second vibration portions 511-1 and 511-2 and to increase a sound pressure level characteristic of a sound of the low-pitched sound band, the separation distance D1 between the first and second vibration portions 511-1 and 511-2 may be adjusted to 0.1 mm or more and less than 5 mm.

Each of the first and second vibration portions 511-1 and 511-2 according to an example embodiment of the present disclosure may include a vibration layer 511*a*, a first electrode layer 511*b*, and a second electrode layer 511*c*.

The vibration layer 511*a* of each of the first and second vibration portions 511-1 and 511-2 may include a piezoelectric material (or an electroactive material) which includes a piezoelectric effect. For example, the vibration layer 511*a* of each of the first and second vibration portions 511-1 and 511-2 may be configured substantially the same as any one of the vibration layer 511*a* described above with reference to FIGS. 26 to 29, and thus, like reference numeral refer to like element and the repetitive description thereof may be omitted for brevity.

According to an example embodiment of the present disclosure, each of the first and second vibration portions 511-1 and 511-2 may include any one vibration portion 511 of the vibration portion 511 described above with reference to FIGS. 26 to 29, or may include different vibration portion 511.

The first electrode layer 511*b* may be disposed at a first surface of the vibration layer 511*a* and electrically connected to the first surface of the vibration layer 511*a*. The first electrode layer 511*b* may be substantially the same as the first electrode layer 511*b* described above with reference to FIG. 26, and thus, like reference numeral refer to like element and the repetitive description thereof may be omitted for brevity.

The second electrode layer 511*c* may be disposed at a second surface of the vibration layer 511*a* and electrically connected to the second surface of the vibration layer 511*a*. The second electrode layer 511*c* may be substantially the same as the second electrode layer 511*c* described above with reference to FIG. 26, and thus, like reference numeral refer to like element and the repetitive description thereof may be omitted for brevity.

The vibration generator 510 according to another example embodiment of the present disclosure may further include a first cover member 512 and a second cover member 513.

The first cover member 512 may be disposed at the first surface of the vibration generator 510. For example, the first cover member 512 may cover the first electrode layer 511*b* which is disposed at a first surface of each of the first and second vibration portions 511-1 and 511-2, and thus, the first cover member 512 may be connected to the first surface of each of the first and second vibration portions 511-1 and 511-2 in common or may support the first surface of each of the first and second vibration portions 511-1 and 511-2 in common. Accordingly, the first cover member 512 may protect the first surface or the first electrode layer 511*b* of each of the first and second vibration portions 511-1 and 511-2.

The second cover member 513 may be disposed at the second surface of the vibration generator 510. For example, the second cover member 513 may cover the second electrode layer 511*c* which is disposed at a second surface of each of the first and second vibration portions 511-1 and 511-2, and thus, the second cover member 513 may be connected to the second surface of each of the first and second vibration portions 511-1 and 511-2 in common or may support the second surface of each of the first and second vibration portions 511-1 and 511-2 in common. Accordingly, the second cover member 513 may protect the second surface or the second electrode layer 511*c* of each of the first and second vibration portions 511-1 and 511-2.

The first cover member 512 and the second cover member 513 according to an example embodiment of the present disclosure may each include one or more material of plastic, fiber, leather, rubber, wood, cloth, and paper, but embodiments of the present disclosure are not limited thereto. For example, each of the first cover member 512 and the second cover member 513 may include the same material or different material. For example, each of the first cover member 512 and the second cover member 513 may be a polyimide (PI) film or a polyethylene terephthalate (PET) film, but embodiments of the present disclosure are not limited thereto.

The first cover member 512 according to an example embodiment of the present disclosure may be disposed at the first surface of each of the first and second vibration portions 511-1 and 511-2 by a first adhesive layer 514. For example, the first cover member 512 may be directly disposed at the first surface of each of the first and second vibration portions 511-1 and 511-2 by a film laminating process using the first adhesive layer 514. Accordingly, each of the first and second vibration portions 511-1 and 511-2 may be integrated (or disposed) or tiled with the first cover member 512 to have the certain interval D1.

The second cover member 513 according to an example embodiment of the present disclosure may be disposed at the second surface of each of the first and second vibration portions 511-1 and 511-2 by a second adhesive layer 515. For example, the second cover member 513 may be directly disposed at the second surface of each of the first and second vibration portions 511-1 and 511-2 by a film laminating process using the second adhesive layer 515. Accordingly, each of the first and second vibration portions 511-1 and 511-2 may be integrated (or disposed) or tiled with the second cover member 513 to have the certain interval D1. For example, the vibration generator 510 may be implemented as one film by the first cover member 512 and the second cover member 513.

The first adhesive layer 514 may be disposed between the first and second vibration portions 511-1 and 511-2 and disposed at the first surface of each of the first and second vibration portions 511-1 and 511-2. For example, the first adhesive layer 514 may be formed at a rear surface (or an inner surface) of the first cover member 512 facing the first surface of each of the first and second vibration portions 511-1 and 511-2, filled between the first and second vibration portions 511-1 and 511-2, and disposed between at the first cover member 512 and the first surface of each of the first and second vibration portions 511-1 and 511-2.

The second adhesive layer 515 may be disposed between the first and second vibration portions 511-1 and 511-2 and disposed at the second surface of each of the first and second vibration portions 511-1 and 511-2. For example, the second adhesive layer 515 may be formed at a front surface (or an inner surface) of the second cover member 513 facing the second surface of each of the first and second vibration portions 511-1 and 511-2, filled between the first and second vibration portions 511-1 and 511-2, and disposed between at the first cover member 512 and the second surface of each of the first and second vibration portions 511-1 and 511-2.

The first and second adhesive layers 514 and 515 may be connected or coupled to each other between the first and second vibration portions 511-1 and 511-2. Therefore, each of the first and second vibration portions 511-1 and 511-2 may be surrounded by the first and second adhesive layers 514 and 515. For example, the first and second adhesive layers 514 and 515 may be configured between the first cover member 512 and the second cover member 513 to completely surround the first and second vibration portions 511-1 and 511-2. For example, each of the first and second vibration portions 511-1 and 511-2 may be embedded or built-in between the first adhesive layer 514 and the second adhesive layer 515.

Each of the first and second adhesive layers 514 and 515 according to an example embodiment of the present disclosure may include an electrically insulating material which has adhesiveness and is capable of compression and decompression. For example, each of the first and second adhesive layers 514 and 515 may include an epoxy resin, an acrylic resin, a silicone resin, or a urethane resin, but embodiments of the present disclosure are not limited thereto. Each of the first and second adhesive layers 514 and 515 may be configured to be transparent, translucent, or opaque.

The vibration generator 510 according to another example embodiment of the present disclosure may further include a first power supply line PL1 disposed at the first cover member 512, a second power supply line PL2 disposed at the second cover member 513, and a pad part 518 electrically connected to the first power supply line PL1 and the second power supply line PL2.

The first power supply line PL1 may be disposed at a rear surface of the first cover member 512 facing the first surface of each of the first and second vibration portions 511-1 and 511-2. The first power supply line PL1 may be connected or electrically and directly connected to the first electrode layer 511*b* of each of the first and second vibration portions 511-1 and 511-2. For example, the first power supply line PL1 may be electrically connected to the first electrode layer 511*b* of each of the first and second vibration portions 511-1 and 511-2 through an anisotropic conductive film or a conductive material (or particle) included in the first adhesive layer 514.

The first power supply line PL1 according to an example embodiment of the present disclosure may include first and second upper power lines PL11 and PL12 disposed in a second direction Y. For example, the first upper power line PL11 may be connected or electrically and directly connected to the first electrode layer 511*b* of the first vibration portion 511-1. The second upper power line PL12 may be connected or electrically and directly connected to the first electrode layer 511*b* of the second vibration portion 511-2.

The second power supply line PL2 may be disposed at a front surface of the second cover member 513 facing the second surface of each of the first and second vibration portions 511-1 and 511-2. The second power supply line PL2 may be connected or electrically and directly connected to the second electrode layer 511*c* of each of the first and second vibration portions 511-1 and 511-2. For example, the second power supply line PL2 may be electrically connected to the second electrode layer 511*c* of each of the first and second vibration portions 511-1 and 511-2 through an anisotropic conductive film or a conductive material (or particle) included in the second adhesive layer 515.

The second power supply line PL2 according to an example embodiment of the present disclosure may include first and second lower power lines PL21 and PL22 disposed in a second direction Y. The first lower power line PL21 may be electrically connected to the second electrode layer 511*c* of the first vibration portion 511-1. For example, the first lower power line PL21 may be disposed not to overlap the first upper power line PL11. When the first lower power line PL21 is disposed not to overlap the first upper power line PL11, a short circuit between the first power supply line PL1 and the second power supply line PL2 may be prevented. The second lower power line PL22 may be electrically connected to the second electrode layer 511*c* of the second vibration portion 511-2. For example, the second lower power line PL22 may be disposed not to overlap the second upper power line PL12. When the second lower power line PL22 is disposed not to overlap the second upper power line PL12, a short circuit between the first power supply line PL1 and the second power supply line PL2 may be prevented.

The pad part 518 may be configured at one periphery portion of any one of the first cover member 512 and the second cover member 513 to be electrically connected to one portion (or one end) of each of the first power supply line PL1 and the second power supply line PL2.

The pad part 518 according to an example embodiment of the present disclosure may include a first pad electrode electrically connected to one end of the first power supply line PL1, and a second pad electrode electrically connected to one end of the second power supply line PL2.

The first pad electrode may be connected to one portion of each of the first and second upper power lines PL11 and PL12 of the first power supply line PL1 in common. For example, the one portion of each of the first and second upper power lines PL11 and PL12 may branch from the first pad electrode. The second pad electrode may be connected to one portion of each of the first and second lower power lines PL21 and PL22 of the second power supply line PL2 in common. For example, the one portion of each of the first and second lower power lines PL21 and PL22 may branch from the second pad electrode.

The vibration generator 510 according to another example embodiment of the present disclosure may further include a signal cable 519.

The signal cable 519 may be electrically connected to the pad part 518 disposed at the vibration generator 510 and may supply the vibration generator 510 with a vibration driving signal (or a sound signal or a voice signal) provided from a sound processing circuit. The signal cable 519 according to an example embodiment of the present disclosure may include a first terminal electrically connected to the first pad electrode of the pad part 518 and a second terminal electrically connected to the second pad electrode of the pad part 518. For example, the signal cable 519 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode layer 511*b* of each of the first and second vibration portions 511-1 and 511-2 through the first terminal of the signal cable 519, the first pad electrode of the pad part 518, and the first power supply line PL1. The second vibration driving signal may be supplied to the second electrode layer 511*c* of each of the first and second vibration portions 511-1 and 511-2 through the second terminal of the signal cable 519, the second pad electrode of the pad part 518, and the second power supply line PL2.

The vibration generator 510 according to another example embodiment of the present disclosure may be implemented as a thin film or a thin film type, and thus, may be bent in a shape corresponding to a shape of the vibration member or the vibration object and may easily vibrate the vibration member including various curved portions, thereby enhancing a sound characteristic and/or a sound pressure level characteristic in the low-pitched sound band generated based on a vibration of the vibration member. In addition, the vibration generator 510 according to another example embodiment of the present disclosure may include the first and second vibration portions 511-1 and 511-2 which are arranged (or tiled) at a certain interval D1, so as to be implemented as one single vibration body without being independently driven, and thus, may be driven as a large-area vibration body based on a single-body vibration of the first and second vibration portions 511-1 and 511-2.

Figure 32:
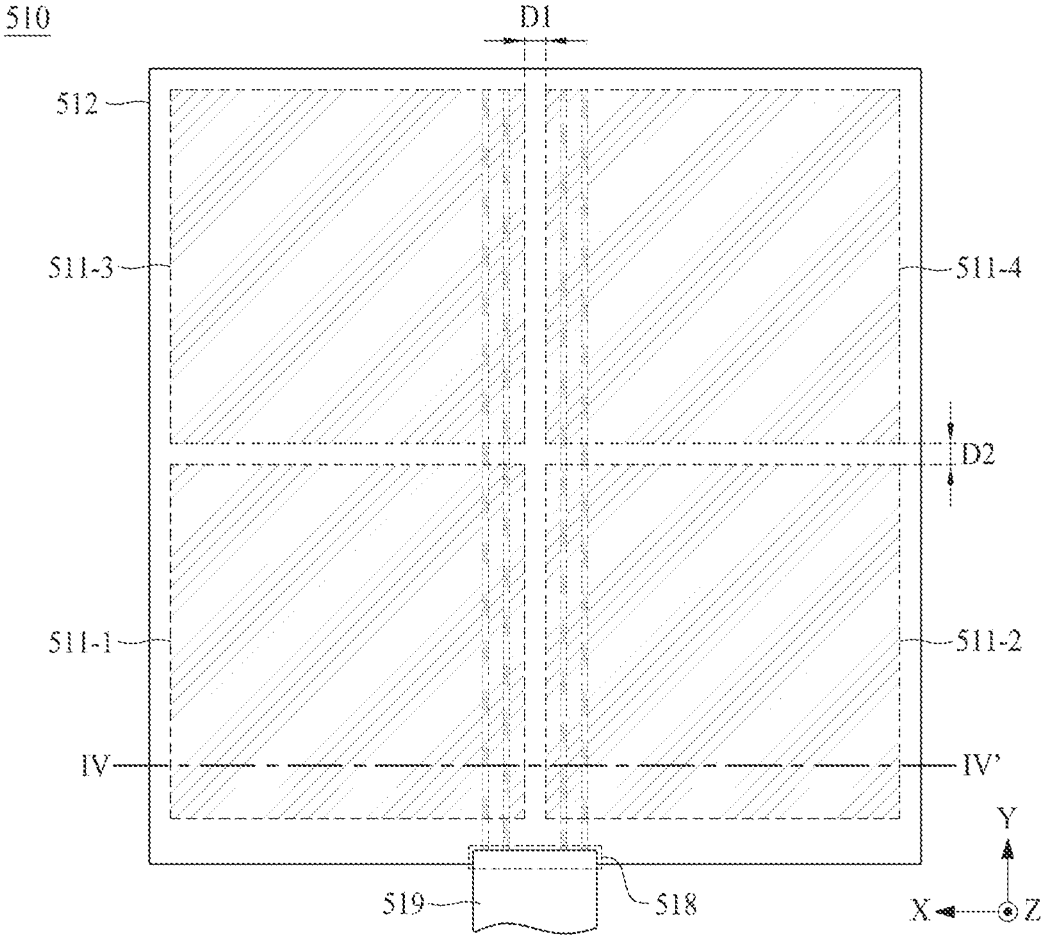
FIG. 32 illustrates a vibration generator according to another example embodiment of the present disclosure.

FIG. 32 illustrates a vibration generator according to another example embodiment of the present disclosure. FIG. 32 illustrates an example embodiment where four vibration portions are provided in the vibration generator illustrated in FIGS. 30 and 31. Hereinafter, therefore, the other elements except four vibration portions and relevant elements are referred to by like reference numerals, and the repetitive description thereof may be omitted or will be briefly given. A cross-sectional surface taken along line IV-IV' illustrated in FIG. 32 is illustrated in FIG. 31.

With reference to FIGS. 31 and 32, the vibration generator 510 according to another example embodiment of the present disclosure may include a plurality of vibration portions 511-1 to 511-4.

The plurality of vibration portions 511-1 to 511-4 may be electrically disconnected and disposed spaced apart from one another in a first direction X and a second direction Y. For example, the plurality of vibration portions 511-1 to 511-4 may be disposed or tiled in an i×j form on the same plane, and thus, the vibration generator 510 may be implemented to have a large area, based on tiling of the plurality of vibration portions 511-1 to 511-4 having a relatively small size. For example, i may be the number of vibration generators disposed along the first direction X and may be a natural number of 2 or more, and j may be the number of vibration generators disposed along the second direction Y and may be a natural number of 2 or more which is the same as or different from i. For example, the plurality of vibration portions 511-1 to 511-4 may be arranged or tiled in a 2×2 form, but embodiments of the present disclosure are not limited thereto. In the following description, an example where the vibration generator 510 includes the plurality of vibration portions 511-1 to 511-4 will be described.

According to an example embodiment of the present disclosure, the first and second vibration portions 511-1 and 511-2 may be spaced apart from each other along the first direction X. The third and fourth vibration portions 511-3 and 511-4 may be spaced apart from each other along the first direction X and may be spaced apart from each of the first and second vibration portions 511-1 and 511-2 along the second direction Y. The first and third vibration portions 511-1 and 511-3 may be spaced apart from each other along the second direction Y to face each other. The second and fourth vibration portions 511-2 and 511-4 may be spaced apart from each other along the second direction Y to face each other.

The first to fourth vibration portions 511-1 to 511-4 may be disposed between the first cover member 512 and the second cover member 513. For example, each of the first cover member 512 and the second cover member 513 may be connected to the first to fourth vibration portions 511-1 to 511-4 in common or may support the first to fourth vibration portions 511-1 to 511-4 in common, and thus, may drive the first to fourth vibration portions 511-1 to 511-4 as one vibration apparatus (or a single vibration apparatus). For example, the first to fourth vibration portions 511-1 to 511-4 may be tiled in a certain interval by the cover members 512 and 513, and thus, may be driven as one vibration apparatus (or a single vibration apparatus).

According to an example embodiment of the present disclosure, as described above with reference to FIGS. 30 and 31, in order to implement a complete single-body vibration or a large-area vibration, the first to fourth vibration portions 511-1 to 511-4 may be disposed (or tiled) at the intervals of 0.1 mm or more and less than 3 cm or may be disposed (or tiled) at 0.1 mm or more and less than 5 mm in each of the first direction X and the second direction Y.

Each of the first to fourth vibration portions 511-1 to 511-4 according to an example embodiment of the present disclosure may include a vibration layer 511*a*, a first electrode layer 511*b*, and a second electrode layer 511*c*.

The vibration layer 511*a* of each of the first to fourth vibration portions 511-1 to 511-4 may include a piezoelectric material (or an electroactive material) which includes a piezoelectric effect. For example, the vibration layer 511*a* of each of the first to fourth vibration portions 511-1 to 511-4 may be configured substantially the same as any one of the vibration layer 511*a* described above with reference to FIGS. 26 to 29, and thus, like reference numeral refer to like element and the repetitive description thereof may be omitted for brevity.

According to an example embodiment of the present disclosure, each of the first to fourth vibration portions 511-1 to 511-4 may include any one vibration layer 511*a* of the vibration layer 511*a* described above with reference to FIGS. 26 to 29, or may include different vibration layer 511*a*. According to another example embodiment of the present disclosure, one or more of the first to fourth vibration portions 511-1 to 511-4 may include a different vibration layer 511*a* described above with reference to FIGS. 26 to 29.

The first electrode layer 511*b* may be disposed at a first surface of the corresponding vibration layer 511*a* and electrically connected to the first surface of the vibration layer 511*a*. The first electrode layer 511*b* may be substantially the same as the first electrode layer 511*b* described above with reference to FIG. 26, and thus, like reference numeral refer to like element and the repetitive description thereof may be omitted for brevity.

The second electrode layer 511*c* may be disposed at a second surface of the corresponding vibration layer 511*a* and electrically connected to the second surface of the vibration layer 511*a*. The second electrode layer 511*c* may be substantially the same as the second electrode layer 511*c* described above with reference to FIG. 26, and thus, like reference numeral refer to like element and the repetitive description thereof may be omitted for brevity.

According to an example embodiment of the present disclosure, the first and second adhesive layers 514 and 515 may be connected or coupled to each other between the first to fourth vibration portions 511-1 to 511-4. Therefore, each of the first to fourth vibration portions 511-1 to 511-4 may be surrounded by the first and second adhesive layers 514 and 515. For example, the first and second adhesive layers

514 and 515 may be configured between the first cover member 512 and the second cover member 513 to completely surround the first to fourth vibration portions 511-1 to 511-4. For example, each of the first to fourth vibration portions 511-1 to 511-4 may be embedded or built-in between the first adhesive layer 514 and the second adhesive layer 515.

The vibration generator 510 according to another example embodiment of the present disclosure may further include a first power supply line PL1, a second power supply line PL2, and a pad part 518.

Except for an electrical connection structure between the first and second power supply lines PL1 and PL2 and the first to fourth vibration portions 511-1 to 511-4, the first power supply line PL1 and the second power supply line PL2 may be substantially the same as each of the first power supply line PL1 and the second power supply line PL2 described above with reference to FIGS. 30 and 31, and thus, in the following description, only the electrical connection structure between the first and second power supply lines PL1 and PL2 and the first to fourth vibration portions 511-1 to 511-4 will be briefly described below.

The first power supply line PL1 according to an example embodiment of the present disclosure may include first and second upper power lines PL11 and PL12 disposed along a second direction Y. For example, the first upper power line PL11 may be electrically connected to the first electrode layer 511*b* of each of the first and third vibration portions 511-1 and 511-3 disposed at a first row parallel to a second direction Y among the first to fourth vibration portions 511-1 to 511-4. The second upper power line PL12 may be electrically connected to the first electrode layer 511*b* of each of the second and fourth vibration portions 511-2 and 511-4 disposed at a second row parallel to the second direction Y among the first to fourth vibration portions 511-1 to 511-4.

The second power supply line PL2 according to an example embodiment of the present disclosure may include first and second lower power lines PL21 and PL22 disposed along a second direction Y. For example, the first lower power line PL21 may be electrically connected to the second electrode layer 511*c* of each of the first and third vibration portions 511-1 and 511-3 disposed at a first row parallel to a second direction Y among the first to fourth vibration portions 511-1 to 511-4. The second lower power line PL22 may be electrically connected to the second electrode layer 511*c* of each of the second and fourth vibration portions 511-2 and 511-4 disposed at a second row parallel to the second direction Y among the first to fourth vibration portions 511-1 to 511-4.

The pad part 518 may be configured at one edge portion of one of the first cover member 512 and the second cover member 513 so as to be electrically connected to one side (or one end) of each of the first and second power supply lines PL1 and PL2. The pad part 518 may be substantially the same as the pad part 518 illustrated in FIGS. 30 and 31, and thus, like reference numeral refer to like element and the repetitive description thereof may be omitted for brevity.

The vibration generator 510 according to another example embodiment of the present disclosure may have the same effect as that of the vibration generator 510 described above with reference to FIGS. 30 and 31, and thus, the repetitive description thereof may be omitted for brevity.

Figure 33:
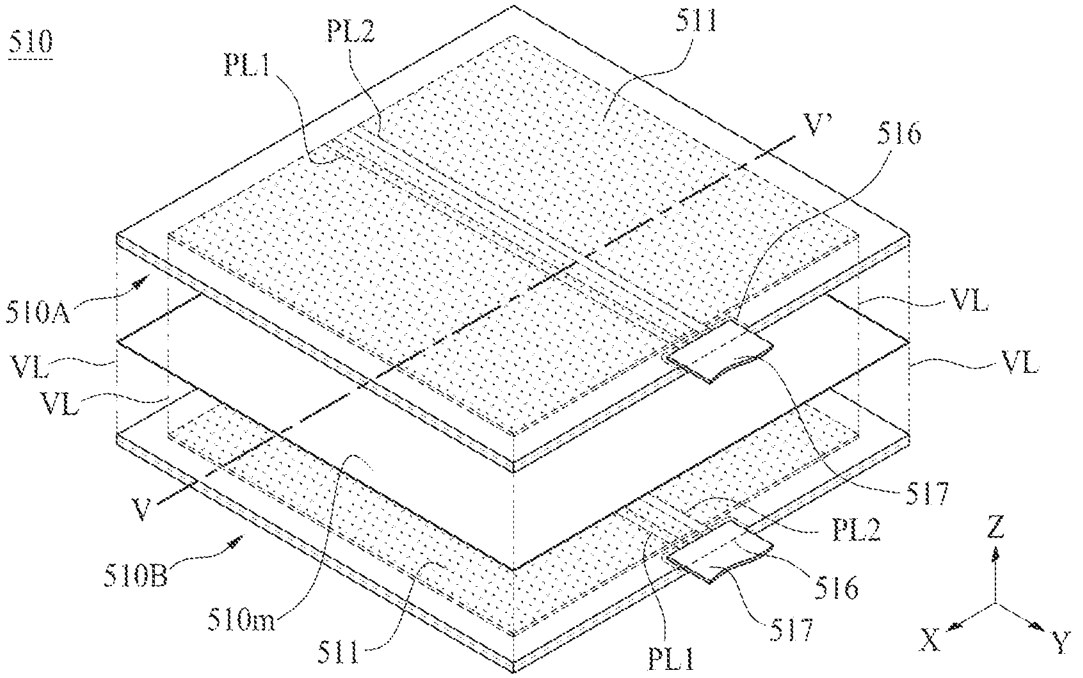
FIG. 33 illustrates a vibration generator according to another example embodiment of the present disclosure.
Figure 34:
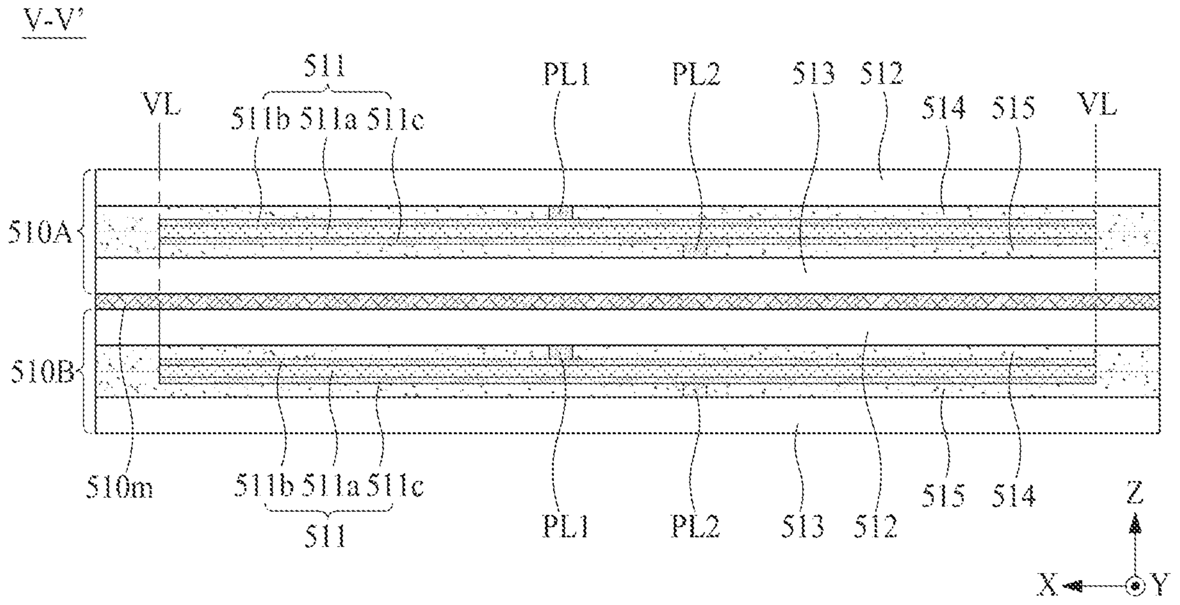
FIG. 34 is an example cross-sectional view taken along line V-V' illustrated in FIG. 33.

FIG. 33 illustrates a vibration generator according to another example embodiment of the present disclosure, and FIG. 34 is an example cross-sectional view taken along line V-V' illustrated in FIG. 33. FIGS. 33 and 34 illustrate another example embodiment of the vibration generator described with reference to FIGS. 1 to 23C.

With reference to FIGS. 33 and 34, the vibration generator 510 according to another example embodiment of the present disclosure may include a plurality of vibration generators 510A and 510B and an intermediate member (or a middle member) 510*m*. For example, the vibration generator 510 according to another example embodiment of the present disclosure may include a first vibration generating portion 510A, a second vibration generating portion 510B, and an intermediate member 510*m* between the first vibration generating portion 510A and the second vibration generating portion 510B.

The plurality of vibration generating portions (or the first and second vibration generating portions) 510A and 510B may overlap or be stacked to be displaced (or driven or vibrated) in the same direction in order to maximize an amplitude displacement of the vibration member and/or an amplitude displacement of the vibration generator 510. One sides (or end portions, or end, or outer surfaces, or each corner portion) of each of the plurality of vibration generating portions (or the first and second vibration generating portions) 510A and 510B may be aligned on a virtual extension line VL extending along a third direction Z, or may be located at the virtual extension line VL. For example, the first vibration generating portion 510A may be disposed at a front surface or a rear surface of the second vibration generating portion 510B.

The plurality of vibration generating portions (or the first and second vibration generating portions) 510A and 510B may be any one of the vibration generator 510 described above with reference to FIGS. 24 to 32, and thus, their repetitive descriptions may be omitted for brevity.

The plurality of vibration generating portions 510A and 510B may overlap or be stacked to be displaced (or driven or vibrated) in the same direction based on a polarization direction of the vibration layer 511*a*. For example, when the vibration layer 511*a* of each of the first and second vibration generating portions 510A and 510B has the same polarization direction, the second vibration generating portion 510B may be disposed at a front surface or a rear surface of the first vibration generating portion 510A. For example, when the vibration layer 511*a* of each of the first and second vibration generating portions 510A and 510B has the opposite polarization direction to each other, the second vibration generating portion 510B may be disposed at the front surface or the rear surface of the first vibration generating portion 510A as a vertically reversed type.

The intermediate member 510*m* may be disposed or interposed between the plurality of vibration generating portions 510A and 510B. For example, the intermediate member 510*m* may be disposed between the second cover member 513 of the first vibration generating portion 510A and the first cover member 512 of the second vibration generating portion 510B. For example, the intermediate member 510*m* may be configured as an adhesive material including an adhesive layer which is good in adhesive force or attaching force with respect to each of the plurality of vibration generators 210 and 230 overlapping vertically.

The intermediate member 510*m* according to an example embodiment of the present disclosure may include a foam pad, a single-sided tape, a double-sided tape, a single-sided foam pad, a double-sided foam pad, a single-sided foam tape, a double-sided foam tape, or an adhesive, or the like, but embodiments of the present disclosure are not limited thereto. For example, an adhesive layer of the intermediate member 510*m* may include epoxy-based, acrylic-based, silicone-based, or urethane-based, but embodiments of the present disclosure are not limited thereto. The adhesive layer of the intermediate member 510*m* may include a urethane-based material which relatively has a ductile characteristic compared to acrylic of acrylic and urethane. Accordingly, in the vibration generator 510 according to another example embodiment of the present disclosure, the vibration loss of the vibration generator 510 caused by displacement interference between the plurality of vibration generating portions 510A and 510B may be minimized, or each of the plurality of vibration generating portions 510A and 510B may be freely displaced.

The intermediate member 510*m* according to another example embodiment of the present disclosure may include one or more of a thermo-curable adhesive, a photo-curable adhesive, and a thermal bonding adhesive. For example, the intermediate member 510*m* may include the thermal bonding adhesive. The thermal bonding adhesive may be a heat-active type or a thermo-curable type. For example, the intermediate member 510*m* including the thermal bonding adhesive may attach or couple two adjacent vibration generating portions 510A and 510B by heat and pressure. For example, the intermediate member 510*m* including the thermal bonding adhesive may minimize or reduce the loss of vibration of the vibration generator 510.

The plurality of vibration generating portions 510A and 510B may be integrated as one structure (or an element or a component) by a laminating process using the intermediate member 510*m*. For example, the plurality of vibration generating portions 510A and 510B may be integrated as one structure by a laminating process using a roller.

FIGS. 35A to 35D are example perspective views illustrating a stack structure between the vibration layers of the plurality of vibration generating portions illustrated in FIGS. 33 and 34.

Figure 35A:
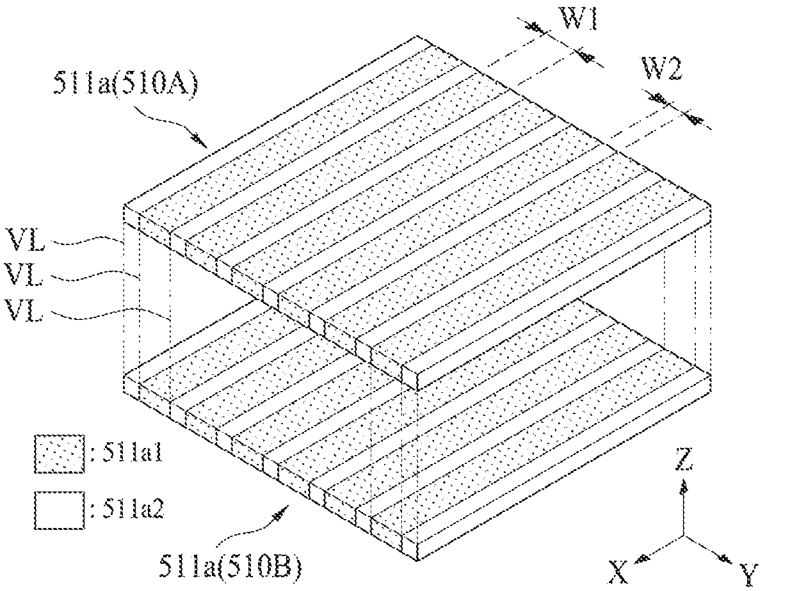
FIGS. 35A to 35D are example perspective views illustrating a stack structure between the vibration layers of each of the plurality of vibration generating portions illustrated in FIGS. 33 and 34.
Figure 35B:
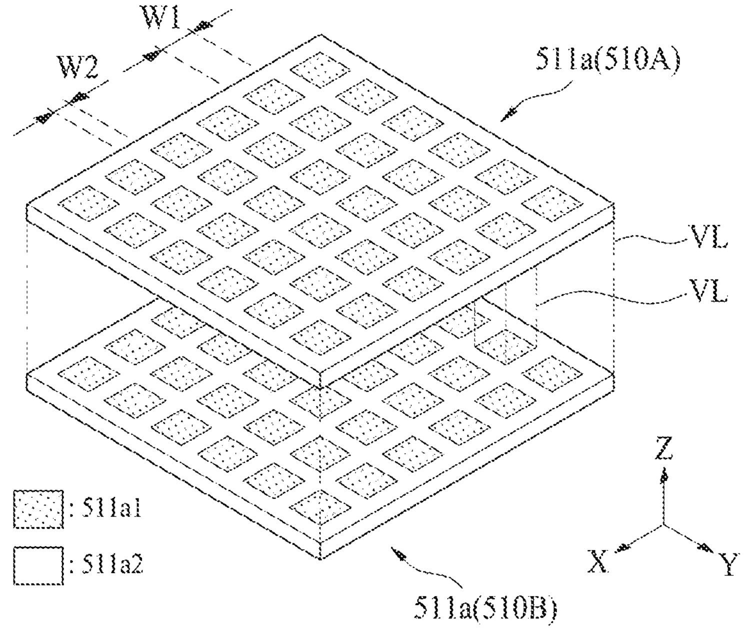
Figure 35C:
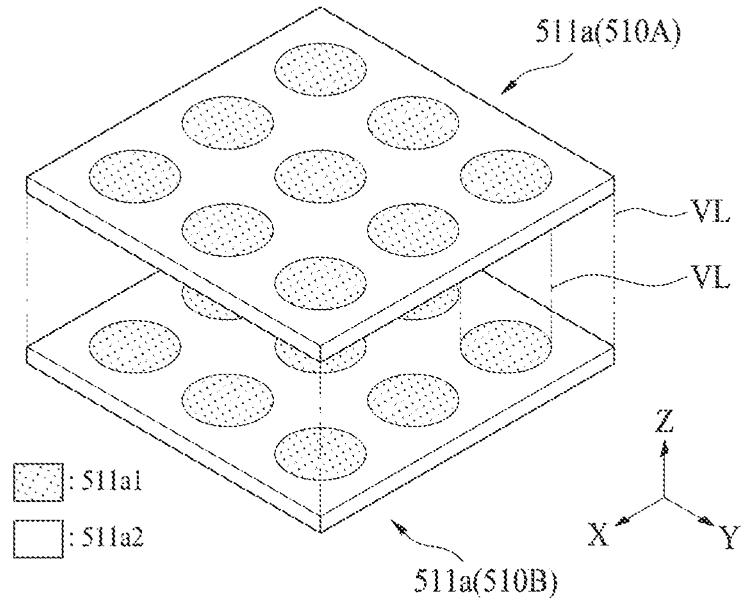
Figure 35D:
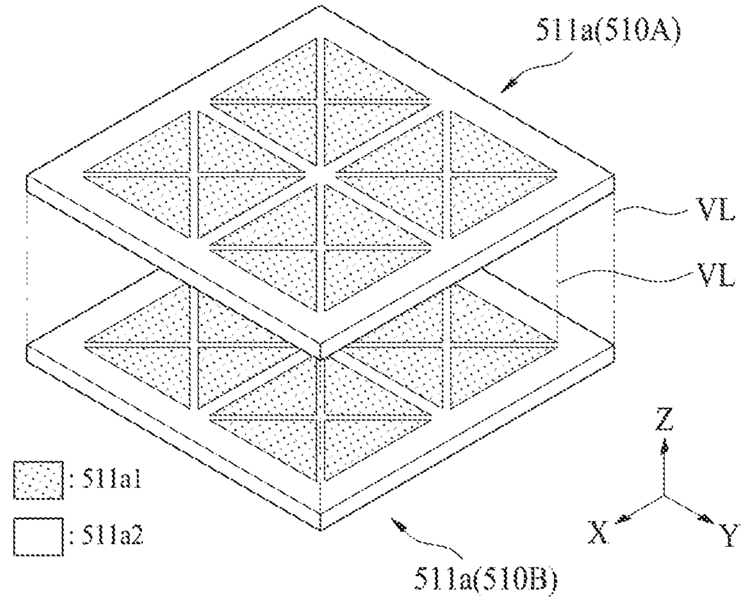

With reference to FIGS. 33 and 35A, a vibration layer 511*a* of each of a plurality of vibration generating portions 510A and 510B may include a plurality of first portions 511*a*1 and a plurality of second portions 511*a*2 disposed between the plurality of first portions 511*a*1. The vibration layer 511*a* may be substantially the same as the vibration layer 511*a* described above with reference to FIG. 26, and thus, the repetitive description thereof may be omitted for brevity.

A first portion 511*a*1 of a vibration generating portion 510B disposed at a lower layer and a first portion 511*a*1 of a vibration generating portion 510A disposed at an upper layer among the plurality of vibration generating portions 510A and 510B may substantially overlap or stack to each other without being staggered, or may be aligned on a virtual extension line VL extending along a third direction Z, or may be disposed at the virtual extension line VL. A second portion 511*a*2 of the vibration generating portion 510B disposed at the lower layer and a second portion 511*a*2 of the vibration generating portion 510A disposed at the upper layer among the plurality of vibration generating portions 510A and 510B may substantially overlap or stack to each other without being staggered, or may be aligned on a virtual extension line VL extending along a third direction Z, or may be disposed at the virtual extension line VL. Therefore, the first portions 511*a*1 of the plurality of vibration generating portions 510A and 510B may substantially overlap or stack to each other without being staggered and may displace (or drive or vibrate) in the same direction, and thus, an amplitude displacement of a vibration generator 510 and/or an amplitude displacement of a vibration member may be increased or maximized by a combination vibration of the plurality of vibration generating portions 510A and 510B, thereby enhancing a sound characteristic and/or a sound pressure level characteristic of the low-pitched sound band generated based on a vibration of the vibration member.

With reference to FIGS. 33 and 35B to 35D, a vibration layer 511*a* of each of a plurality of vibration generating portions 510A and 510B may include a plurality of first portions 511*a*1 and a second portion 511*a*2 disposed to surround each of the plurality of first portions 511*a*1. The vibration layer 511*a* may be substantially the same as the vibration layer 511*a* described above with reference to FIGS. 27 to 29, and thus, the repetitive description thereof may be omitted for brevity.

A first portion 511*a*1 of a vibration generating portion 510B disposed at a lower layer and a first portion 511*a*1 of a vibration generating portion 510A disposed at an upper layer among the plurality of vibration generating portions 510A and 510B may substantially overlap or stack to each other without being staggered, or may be aligned on a virtual extension line VL extending along a third direction Z, or may be located at the virtual extension line VL. A second portion 511*a*2 of the vibration generating portion 510B disposed at the lower layer and a second portion 511*a*2 of the vibration generating portion 510A disposed at the upper layer among the plurality of vibration generating portions 510A and 510B may substantially overlap or stack to each other without being staggered, or may be aligned on a virtual extension line VL extending along a third direction Z, or may be located at the virtual extension line VL. Therefore, the first portions 511*a*1 of the plurality of vibration generating portions 510A and 510B may substantially overlap or stack to each other without being staggered and may displace (or drive or vibrate) in the same direction, and thus, an amplitude displacement of a vibration generator 510 and/or an amplitude displacement of a vibration member may be increased or maximized by a combination vibration of the plurality of vibration generating portions 510A and 510B, thereby enhancing a sound characteristic and/or a sound pressure level characteristic of the low-pitched sound band generated based on a vibration of the vibration member.

Figure 36:
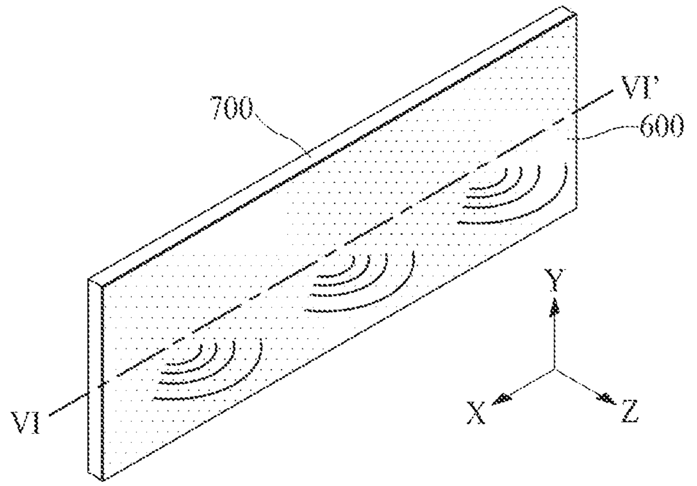
FIG. 36 is a perspective view illustrating an apparatus according to another example embodiment of the present disclosure.
Figure 37:
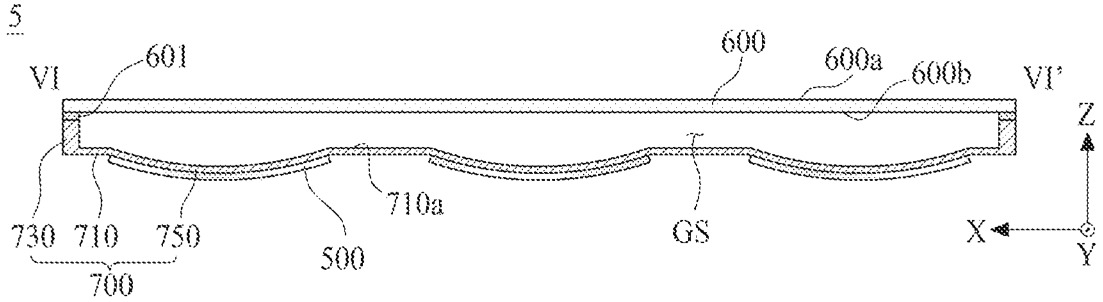
FIG. 37 is an example cross-sectional view taken along line VI-VI' illustrated in FIG. 36.
Figure 38:
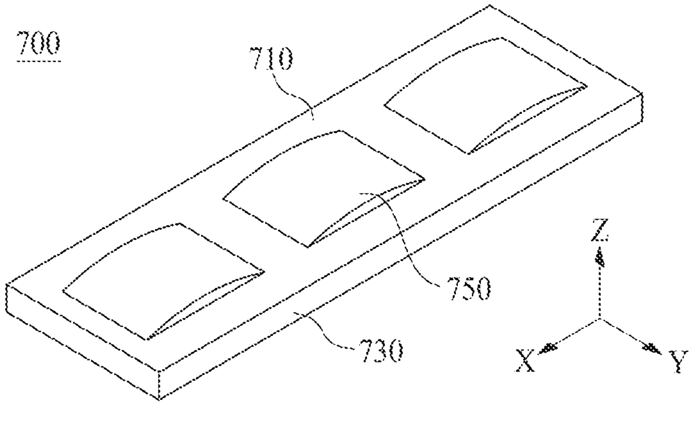
FIG. 38 is an example perspective view illustrating a rear surface of a supporting member illustrated in FIGS. 36 and 37.

FIG. 36 is a perspective view illustrating an apparatus according to another example embodiment of the present disclosure, FIG. 37 is an example cross-sectional view taken along line VI-VI' illustrated in FIG. 36, and FIG. 38 is an example perspective view illustrating a rear surface of a supporting member illustrated in FIGS. 36 and 37.

With reference to FIGS. 36 to 38, an apparatus 5 according to a fifth example embodiment of the present disclosure may be applied to implement a sound apparatus, a sound output apparatus, a sound bar, a sound system, a sound apparatus for vehicular apparatuses, a sound output apparatus for vehicular apparatuses, or a sound bar for vehicular apparatuses, or the like. For example, the vehicular apparatus may include one or more seats and one or more glass windows. For example, the vehicular apparatus may include a vehicle, a train, a ship, or an aircraft, but embodiments of the present disclosure are not limited thereto. In addition, the apparatus 5 according to the fifth example embodiment of the present disclosure may implement an analog signage or a digital signage, or the like such as an advertising signboard, a poster, or a noticeboard, or the like.

The apparatus 5 according to the fifth example embodiment of the present disclosure may include a vibration member 600, a supporting member 700, and a vibration apparatus 500.

The vibration member 600 may output a sound based on a vibration of the vibration apparatus 500. Accordingly, the vibration member 600 may be a passive vibration member, a front member, a forward member, a vibration object, a vibration plate, a vibration panel, a sound plate, a sound output member, a sound panel, or a sound output panel, but embodiments of the present disclosure are not limited thereto.

The vibration member 600 may be configured to be transparent, translucent, or opaque. The vibration member 600 according to an example embodiment of the present disclosure may include a metal material or a nonmetal material (or a composite nonmetal material) having a material characteristic suitable for outputting a sound based on a vibration. The a metal material of the vibration member 600 according to an example embodiment of the present disclosure may include any one or more materials of stainless steel, aluminum (Al), an Al alloy, a magnesium (Mg), a Mg alloy, and a magnesium-lithium (Mg-Li) alloy, but embodiments of the present disclosure are not limited thereto. The nonmetal material (or the composite nonmetal material) of the vibration member 600 may include one or more of glass, plastic, fiber, leather, wood, cloth, rubber, and paper, but embodiments of the present disclosure are not limited thereto.

The vibration member 600 according to an example embodiment of the present disclosure may implement a signage panel such as an analog signage of an advertising signboard, a poster, a noticeboard, or the like. For example, when vibration member 600 implements the signage panel, the analog signage may include signage content such as a sentence, a picture, and a sign, or the like. The signage content may be disposed at the vibration member 600 to be visible. For example, the signage content may be directly attached on one or more of a first surface (or a front surface) 600*a* of the vibration member 600 and a second surface (or a rear surface) 600*b* which differs from (or opposite to) the first surface 600*a*. For example, the signage content may be printed on a medium such as paper, and the medium with the signage content printed thereon may be directly attached on one or more of the first surface 600*a* and the second surface 600*b* of the vibration member 600. For example, when the signage content is attached on the second surface 600*b* of the vibration member 600, the vibration member 600 may be configured as a transparent material.

A vibration member 600 according to an example embodiment of the present disclosure may include a plate structure having a tetragonal shape. For example, the vibration member 600 may include a plate structure having a tetragonal shape. The vibration member 600 may include a widthwise length parallel to a first direction X and a lengthwise length parallel to a second direction Y. For example, the vibration member 600 may include a rectangular shape where a widthwise length is relatively longer than a lengthwise length, but embodiments of the present disclosure are not limited thereto. For example, the vibration member 600 may include a square shape where a widthwise length is the same as a lengthwise length.

The supporting member 700 may be disposed at a rear surface of the vibration member 600. The supporting member 700 may be implemented to cover a rear surface of the vibration member 600. The supporting member 700 may include a rear portion 710, a lateral portion 730, and a curved portion 750. The supporting member 700 may include a rear portion 710 covering the rear surface of the vibration member 600, a lateral portion 730 which is connected to the rear portion 710 and supports the vibration member 600, and one or more curved portions 750 implemented at the rear portion 710. The rear portion 710, the lateral portion 730, and the curved portion 750 may be respectively substantially the same as or substantially similar to the rear portion 310, the lateral portion 330, and the curved portion 350 described above with reference to FIGS. 2 and 3, and thus, a description (or details) of the supporting member 300 illustrated in FIGS. 2 to 11B may be included in the description of the supporting member 300 illustrated in FIGS. 36 to 38. Therefore, their repetitive descriptions may be omitted or will be briefly given below.

The lateral portion 730 of the supporting member 700 may be connected or coupled to a rear periphery portion of the vibration member 600 by a coupling member 601.

The coupling member 601 may be configured to minimize or prevent the transfer of a vibration of the vibration member 600 to the supporting member 700. The coupling member 601 may include a material characteristic suitable for blocking a vibration. For example, the coupling member 601 may include a material having elasticity for vibration absorption (or impact absorption). The coupling member 601 according to an example embodiment of the present disclosure may be configured as polyurethane materials or polyolefin materials, but embodiments of the present disclosure are not limited thereto. For example, the coupling member 601 may include one or more of an adhesive, a double-sided tape, a double-sided foam tape, and a double-sided cushion tape, but embodiments of the present disclosure are not limited thereto.

The coupling member 601 may prevent a physical contact (or friction) between the vibration member 600 and the lateral portion 730 of the supporting member 700, and thus, may prevent the occurrence of noise (or a noisy sound) caused by the physical contact (or friction) between the vibration member 600 and the supporting member 700. For example, the coupling member 601 may be a buffer member, an elastic member, a damping member, a vibration absorption member, or a vibration blocking member, but embodiments of the present disclosure are not limited thereto.

The curved portion 750 of the supporting member 700 may include a plurality of curved portion 750. The curved portion 750 may be implemented at the rear portion 710 to have a predetermined interval along one or more directions of the first direction X and the second direction Y.

Each of the plurality of curved portion 750 may vibrate together with a vibration of the vibration apparatus 500 to vibrate the vibration member 600. For example, each of the plurality of curved portion 750 may vibrate based on a vibration of the vibration apparatus 500 to indirectly vibrate the vibration member 600. Each of the plurality of curved portion 750 may be substantially the same as or substantially similar to the curved portion 350 described above with reference to FIGS. 2 and 11B, and thus, a description (or details) of the curved portion 350 illustrated in FIGS. 2 to 11B may be included in or applicable to the description of the curved portion 350 illustrated in FIGS. 36 to 38. Therefore, their repetitive descriptions may be omitted or will be briefly given below.

According to an example embodiment of the present disclosure, each of the plurality of curved portion 750 may be implemented at the rear portion 710 to have a predetermined curvature. For example, each of the plurality of curved portion 750 may include a curved structure which protrudes in a direction from the rear portion 710 to the rear surface of the supporting member 700. For example, each of the plurality of curved portion 750 may protrude from the rear portion 710 to have a curved shape having one curvature (or a single curvature). For example, each of the plurality of curved portion 750 may have a curved structure having one curvature (or a single curvature) having no inflection point. For example, each of the plurality of curved portion 750 may protrude convexly in the direction from the rear portion 710 to the rear surface of the supporting member 700. For example, each of the plurality of curved portion 750 may have a single convex curved shape having a certain curvature.

According to another example embodiment of the present disclosure, one or more of a plurality of curved portions 750 may have different sizes. For example, any one of the plurality of curved portions 750 may have a size which is smaller than that of the other curved portion 750, as in the third curved portion 350*c* described above with reference to FIG. 11B.

The apparatus 5 according to the fifth example embodiment of the present disclosure may further include a gap space GS provided between the curved portion 750 of the supporting member 700 and the vibration member 600.

The gap space GS may be provided between the curved portion 750 of the supporting member 700 and a rear surface of the vibration member 600. The gap space GS may include a space where a sound or a sound pressure level is generated based on a vibration of the curved portion 750, a space where a vibration of the curved portion 750 is smoothly performed, or a space where a sound wave generated based on a vibration of the vibration apparatus 500 is propagated to the vibration member 600. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

The vibration apparatus 500 may be coupled to or attached on each of the plurality of curved portions 750 implemented at the supporting member 700. The vibration apparatus 500 may vibrate each of the plurality of curved portions 750 to output a sound (or a sound wave) to a gap space GS, and thus, the vibration member 600 may vibrate based on the sound (or the sound wave) transferred through the gap space GS to generate or output a sound.

The vibration apparatus 500 according to an example embodiment of the present disclosure may be individually coupled to or attached on each of the plurality of curved portions 750.

The vibration apparatus 500 may have a size which is smaller than that of the curved portion 750. The vibration apparatus 500 may be coupled to or attached on the curved portion 750 to have an equiangular shape based on a curvature of the curved portion 750, but embodiments of the present disclosure are not limited thereto. For example, the vibration apparatus 500 may be coupled to or attached on the curved portion 750 to have a non-equiangular shape which is not based on a curvature of the curved portion 750 or have a curvature which differs from that of the curved portion 750.

According to another example embodiment of the present disclosure, the vibration apparatus 500 may be coupled to or attached on the curved portion 750, and thus, may have a pre-stress or receive the pre-stress based on the curved portion 750. For example, the vibration apparatus 500 may be coupled to or attached on the curved portion 750, and thus, may be maintained in a state where the vibration apparatus 500 has the pre-stress or receives the pre-stress based on the curved portion 750. For example, the vibration apparatus 500 may receive a tension stress or include the tension stress based on a curvature of the curved portion 750. For example, the curved portion 750 may be implemented to apply only the tension stress to the vibration apparatus 500, in order to enhance a vibration characteristic of the vibration apparatus 500. Therefore, the vibration apparatus 500 may vibrate in a state where the vibration apparatus 500 receive a pre-stress (or a pre-tension stress) or is bent in a curved shape, and thus, a second moment of inertia may increase, or a vibration direction may be implemented as a single direction.

The vibration apparatus 500 may include the vibration apparatus described above with reference to FIGS. 6 to 9 and the vibration generator described above with reference to FIGS. 24 to 35D. Therefore, the description of the vibration apparatus described above with reference to FIGS. 6 to 9 and the description of the vibration generator described above with reference to FIGS. 24 to 35D may be included in or applicable to a description of each of the plurality of vibration apparatuses 500 illustrated in FIG. 37, and thus, the repetitive description thereof may be omitted for brevity.

The vibration apparatus 500 disposed at each of the plurality of curved portions 750 may be configured to generate a sound of the same pitched sound band, or may be configured to generate sounds of different pitched sound bands. For example, an apparatus 5 according to a fifth example embodiment of the present disclosure may include a plurality of vibration apparatuses 500 respectively disposed at the plurality of curved portions 750, and the plurality of vibration apparatuses 500 may be configured to generate a sound of the same pitched sound band, or may be configured to generate sounds of different pitched sound bands.

One or more of the plurality of vibration apparatuses 500 may be configured to generate sounds of different pitches sound bands or a sound of the low-pitched sound band. Therefore, the apparatus 5 according to the fifth example embodiment of the present disclosure may output a sound, for example, a stereo sound or a stereophonic sound and may have a sound output characteristic of a multichannel, based on a sound generated or output based on a region-based vibration of the vibration member 600 based on each of the plurality of vibration apparatuses 500.

The apparatus 5 according to the fifth example embodiment of the present disclosure may include the vibration apparatus 500 which vibrates in a state in which the vibration apparatus 500 receives a pre-stress (or a pre-tension stress) or is bent in a curved shape, and thus, a second moment of inertia may increase or a vibration direction of the vibration apparatus 500 may be implemented as a single direction, thereby enhancing a sound characteristic and/or a sound pressure level characteristic of a sound generated by the vibration member 600 which vibrates based on a vibration of the vibration apparatus 500. The apparatus 5 according to the fifth example embodiment of the present disclosure may vibrate the vibration member 600 based on a vibration of each of the plurality of vibration apparatuses 500 to output a sound, and thus, may output a sound, for example, a stereo sound or a stereophonic sound where a sound characteristic and/or a sound pressure level characteristic are/is enhanced and may have a sound output characteristic of a multichannel.

Figure 39:
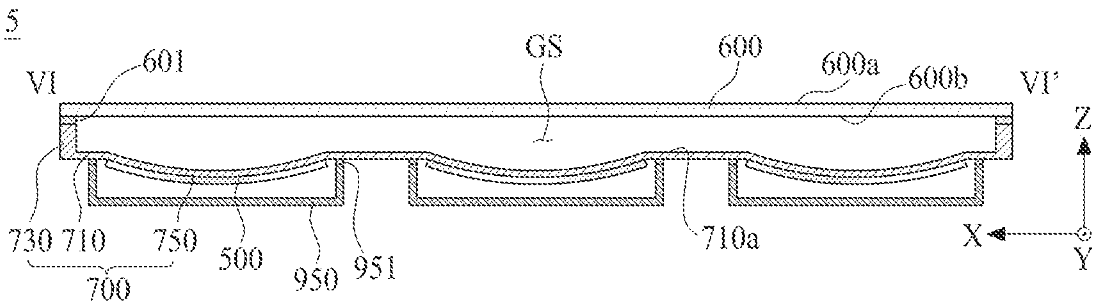
FIG. 39 is another example cross-sectional view taken along line VI-VI' illustrated in FIG. 36.

FIG. 39 is another example cross-sectional view taken along line VI-VI' illustrated in FIG. 36. FIG. 39 illustrates an example embodiment where an enclosure is added to the apparatus 5 illustrated in FIGS. 36 to 38. In describing FIG. 39, therefore, the other elements except an enclosure and relevant elements are referred to by like reference numerals, and their repetitive descriptions may be omitted for brevity.

With reference to FIG. 39, the apparatus 5 according to the fifth example embodiment of the present disclosure may further include an enclosure 950.

The enclosure 950 may be disposed at a rear surface of the supporting member 300. The enclosure 950 may be connected or coupled to the rear surface of the supporting member 700 to cover the vibration apparatus 500. For example, the enclosure 950 may be connected or coupled to the rear surface of the rear portion 710 of the supporting member 700 by the coupling member 951. The enclosure 950 may configure a closed space which covers or surrounds the vibration apparatus 500, in the rear surface of the supporting member 700. For example, the enclosure 950 may configure a closed space which covers or surrounds the vibration apparatus 500, in the rear surface of the rear portion 710 of the supporting member 700. For example, the enclosure 950 may be a closed member, a closed cap, a closed box, or a sound box, but embodiments of the present disclosure are not limited thereto. The closed space may be an air gap, a vibration space, a sound space, or a sounding box, but embodiments of the present disclosure are not limited thereto.

The enclosure 950 may include one or more materials of a metal material and a nonmetal material (or a composite nonmetal material). For example, the enclosure 950 may include one or more materials of a metal material, plastic, and wood, but embodiments of the present disclosure are not limited thereto.

The enclosure 950 according to an example embodiment of the present disclosure may maintain an impedance component based on air acting on the curved portion 750 of the supporting member 700 when the curved portion 750 of the supporting member 700 or the vibration apparatus 500 is vibrating. For example, air around the supporting member 700 may resist a vibration of the curved portion 750 of the supporting member 700 and may act as an impedance component having a reactance component and a resistance based on a frequency. Therefore, the enclosure 950 may configure a closed space which surrounds the vibration apparatus 500, in the rear surface of the supporting member 700, and thus, may maintain an impedance component (or an air impedance or an elastic impedance) acting on the curved portion 750 of the supporting member 700 based on air. Accordingly, a sound characteristic and/or a sound pressure level characteristic of the low-pitched sound band may be enhanced and the quality of a sound of a high-pitched sound band may be enhanced.

In the apparatus 5 according to the fifth example embodiment of the present disclosure, by the enclosure 950, a sound characteristic and/or a sound pressure level characteristic of the low-pitched sound band may be enhanced, and the quality of a sound of the high-pitched sound band may be enhanced.

Figure 40:
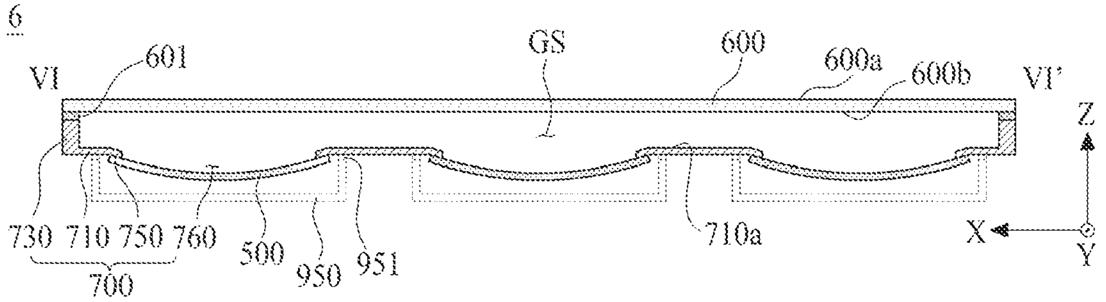
FIG. 40 is another example cross-sectional view taken along line VI-VI' illustrated in FIG. 36.
Figure 41:
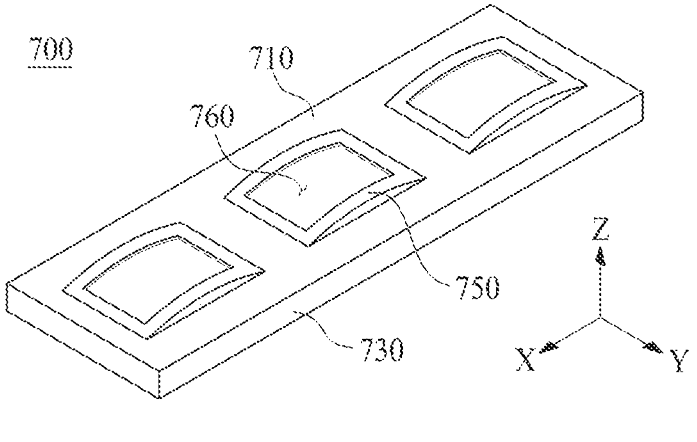
FIG. 41 is an example perspective view illustrating a rear surface of a supporting member illustrated in FIG. 40.

FIG. 40 is another example cross-sectional view taken along line VI-VI' illustrated in FIG. 36, and FIG. 41 is an example perspective view illustrating a rear surface of a supporting member illustrated in FIG. 40. FIGS. 40 and 41 illustrate an example embodiment where a hole is added to a curved portion of a supporting member, in the apparatus 5 described above with reference to FIGS. 36 to 39. In describing FIGS. 40 and 41, therefore, the other elements except a hole and relevant elements are referred to by like reference numerals, and their repetitive descriptions may be omitted for brevity.

With reference to FIGS. 40 and 41, in an apparatus 6 according to a sixth example embodiment of the present disclosure, a supporting member 700 may further include one or more holes 760 which are formed at one or more of a plurality of curved portions 750.

The one or more holes 760 may be formed at one or more of the plurality of curved portions 750, or may be formed at each of the plurality of curved portions 750. For example, the one or more holes 760 may be formed to pass through the curved portion 750 along a third direction Z. Therefore, the hole 760 may be an opening portion, a communication portion, an opening hole, a communication hole, a through portion, a through port, a through hole, a supporting hole, a slit, a slot, or a sound through portion, but embodiments of the present disclosure are not limited thereto. The one or more holes 760 may be substantially the same as the hole 360 described above with reference to FIGS. 12 and 13, and thus, their repetitive descriptions may be omitted for brevity, and the description of the hole 360 illustrated in FIGS. 12 and 13 may be included in or applicable to a description of the hole 760 illustrated in FIGS. 40 and 41.

According to an example embodiment of the present disclosure, each of the one or more holes 760 may have a circular shape, an oval shape, a tetragonal shape, a slit shape, a slot shape, or a dotted-line shape, but embodiments of the present disclosure are not limited thereto.

The apparatus 6 according to the sixth example embodiment of the present disclosure may vibrate in a state where the vibration apparatus 500 receives a pre-stress (or a pre-tension stress) or is bent in a curved shape, and thus, a second moment of inertia in the vibration apparatus 500 may increase, or a vibration direction of the vibration apparatus 500 may be implemented as a single direction. Accordingly, a sound characteristic and/or a sound pressure level characteristic generated by a vibration of the vibration member 600 based on a vibration of the vibration apparatus 500 may be enhanced. In addition, the apparatus 5 according to the sixth example embodiment of the present disclosure may include the hole 760 which is formed in the curved portion 750 of the supporting member 700, and thus, a sound (or a sound wave) generated based on a vibration of the vibration apparatus 500 may be directly transferred to the vibration member 600. Accordingly, the transfer efficiency of a vibration may increase, and a sound characteristic and/or a sound pressure level characteristic generated based on a vibration of the vibration member 600 may be further enhanced.

The apparatus 6 according to the sixth example embodiment of the present disclosure may further include an enclosure 950. The enclosure 950 may be disposed at a rear surface of the supporting member 700. The enclosure 950 may be connected or coupled to the rear surface of the supporting member 700 to cover the vibration apparatus 500. For example, the enclosure 950 may be connected or coupled to the rear surface of the rear portion 710 of the supporting member 700 by a coupling member 951. The enclosure 950 may configure a closed space which covers or surrounds the vibration apparatus 500, in the rear surface of the rear portion 710 of the supporting member 700. The enclosure 950 may be the same or substantially the same as described above with reference to FIG. 39, and thus, the repetitive description thereof may be omitted for brevity.

Figure 42:
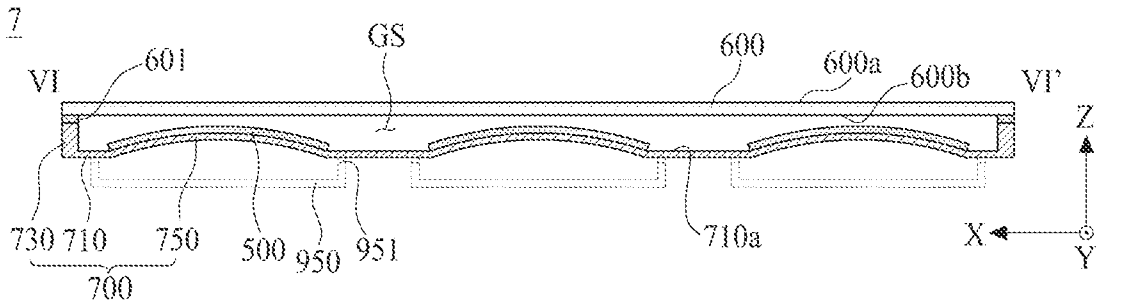
FIG. 42 is another example cross-sectional view taken along line VI-VI' illustrated in FIG. 36.
Figure 43:
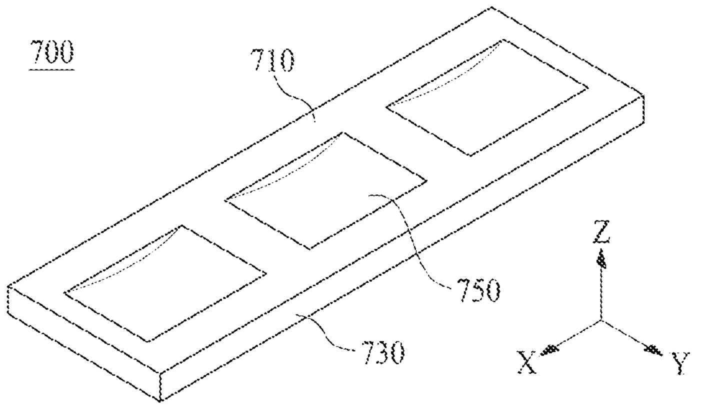
FIG. 43 is an example perspective view illustrating a rear surface of a supporting member illustrated in FIG. 42.

FIG. 42 is another example cross-sectional view taken along line VI-VI' illustrated in FIG. 36, and FIG. 43 is an example perspective view illustrating a rear surface of a supporting member illustrated in FIG. 42. FIGS. 42 and 43 illustrate an example embodiment implemented by modifying the curved portion of the supporting member in the apparatus 5 described above with reference to FIGS. 36 to 39. In describing FIGS. 42 and 43, therefore, the other elements except a curved portion and relevant elements are referred to by like reference numerals, and their repetitive descriptions may be omitted for brevity.

With reference to FIGS. 42 and 43, a supporting member 700 of an apparatus 7 according to a seventh example embodiment of the present disclosure may include a plurality of curved portions 750. The plurality of curved portions 750 may be implemented at a rear portion 710 to have a predetermined interval in one or more directions of a first direction X and a second direction Y.

Each of the plurality of curved portion 750 may vibrate along with a vibration of the vibration apparatus 500 to vibrate the vibration member 600. Each of the plurality of curved portion 750 may be implemented to apply only a tension stress to the vibration apparatus 500, in order to enhance a vibration characteristic of the vibration apparatus 500.

According to an example embodiment of the present disclosure, each of the plurality of curved portion 750 may be implemented at the rear portion 710 to include a predetermined curvature. For example, each of the plurality of curved portion 750 may include a curved structure which protrudes in a direction from the rear portion 710 to the rear surface of the vibration member 600. For example, each of the plurality of curved portion 750 may protrude from the rear portion 710 to the rear surface of the vibration member 600 to have a curved shape having one curvature (or a single curvature). For example, each of the plurality of curved portion 750 may have a curved structure having one curvature (or a single curvature) having no inflection point. For example, each of the plurality of curved portion 750 may protrude convexly in the direction from the rear portion 710 to the rear surface of the vibration member 600. For example, each of the plurality of curved portion 750 may have a single convex curved shape having a certain curvature.

According to one or more example embodiments of the present disclosure, except for that each of the plurality of curved portions 750 is configured to be convex toward the rear surface of a vibration member 600, the plurality of curved portions 750 may be the same or substantially the same as the curved portion 750 illustrated in FIGS. 37 and 38. For example, each of the plurality of curved portions 750 may have a structure opposite to each of the plurality of curved portions 750 illustrated in FIG. 37, with respect to a floor surface 710*a* of the rear portion 710 of the supporting member 700. For example, each of the plurality of curved portion 750 may be a curved portion, a convex portion, a convex protrusion portion, a convex curved portion, a convex arch portion, a projection portion, or an uplift portion having a second shape, with respect to the floor surface 710*a* of the rear portion 710 facing the vibration member 600, but embodiments of the present disclosure are not limited thereto.

According to another example embodiment of the present disclosure, one or more of a plurality of curved portions 750 may have different sizes. For example, any one of the plurality of curved portions 750 may have a size which is smaller than that of the other curved portion 750, as in the third curved portion 350*c* described above with reference to FIG. 11B.

The vibration apparatus 500 may be coupled to or attached on each of the plurality of curved portions 750 implemented at the supporting member 700. The vibration apparatus 500 may be coupled to or attached on the curved portion 750 between the vibration member 600 and the curved portion 750 and may face the rear surface of the vibration member 600 or directly face the rear surface of the vibration member 600. The vibration apparatus 500 may vibrate in a state in which the vibration apparatus 500 receives a pre-stress (or a pre-tension stress) or is bent in a curved shape, based on the curved portion 750, and thus, may generate a sound or a sound wave. A sound (or a sound wave) generated based on a vibration of the vibration apparatus 500 may be directly transferred to the vibration member 600 through the gap space GS, and thus, a vibration of the vibration apparatus 500 may be efficiently transferred to the vibration member 600, whereby a sound characteristic and/or a sound pressure level characteristic generated based on a vibration of the vibration member 600 may be enhanced.

The vibration apparatus 500 according to an example embodiment of the present disclosure may be individually coupled to or attached on each of the plurality of curved portions 750.

The vibration apparatus 500 may be coupled to or attached on the curved portion 750 between the vibration member 600 and the curved portion 750 and may face the rear surface of the vibration member 600 or directly face the rear surface of the vibration member 600. For example, the vibration apparatus 500 may be coupled to or attached on an inner surface (or an inner curved surface) of the curved portion 750 in the gap space GS. For example, the vibration apparatus 500 may be coupled to or attached on an inner surface (or an internal surface) of the curved portion 750 facing the rear surface of the vibration member 600 or directly facing the rear surface of the vibration member 600.

According to an example embodiment of the present disclosure, the vibration apparatus 500 may be coupled to or attached on the curved portion 750, and thus, may have a pre-stress or receive the pre-stress based on the curved portion 750. For example, the vibration apparatus 500 may be coupled to or attached on the curved portion 750, and thus, may be maintained in a state where the vibration apparatus 500 has a pre-stress or receives the pre-stress based on the curved portion 750. For example, the vibration apparatus 500 may receive a tension stress or include the tension stress based on a curvature of the curved portion 750. Accordingly, the vibration apparatus 500 may vibrate in a state where the vibration apparatus 500 receives the pre-stress (or a pre-tension stress) or is bent in a curved shape, and thus, a second moment of inertia may increase, or a vibration direction may be implemented as a single direction.

The apparatus 7 according to the seventh example embodiment of the present disclosure may include the vibration apparatus (or the vibration generator) 500 which vibrates in a state in which the vibration apparatus 500 receives the pre-stress (or the pre-tension stress) or is bent in a curved shape, and thus, a second moment of inertia may increase or a vibration direction of the vibration apparatus 500 may be implemented as a single direction, thereby enhancing a sound characteristic and a sound pressure level characteristic of a sound generated by the vibration member 600 which vibrates based on a vibration of the vibration apparatus 500. In addition, the apparatus 7 according to the seventh example embodiment of the present disclosure may be slimmed because the vibration apparatus 500 is disposed in the gap space GS between the vibration member 600 and the supporting member 700, and in this example, the vibration apparatus 500 is not exposed to the outside, thereby enhancing a sense of beauty in design of an outermost rear surface.

The apparatus 7 according to the seventh example embodiment of the present disclosure may further include an enclosure 950. The enclosure 950 may be disposed at the rear surface of the supporting member 700. The enclosure 950 may be connected or coupled to a rear surface of the supporting member 700 to cover the vibration apparatus 500. For example, the enclosure 950 may be connected or coupled to a rear surface of the rear portion 710 of the supporting member 700 by the coupling member 951. The enclosure 950 may configure a closed space covering or surrounding the vibration apparatus 500 at the rear surface of the rear portion 710 of the supporting member 710. The enclosure 950 may be the same or substantially the same as described above with reference to FIG. 39, and thus, the repetitive description thereof may be omitted for brevity.

Figure 44:
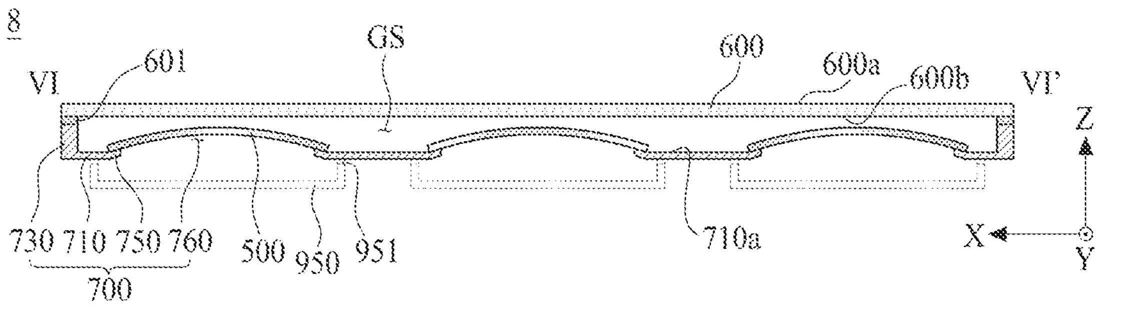
FIG. 44 is another example cross-sectional view taken along line VI-VI' illustrated in FIG. 36.
Figure 45:
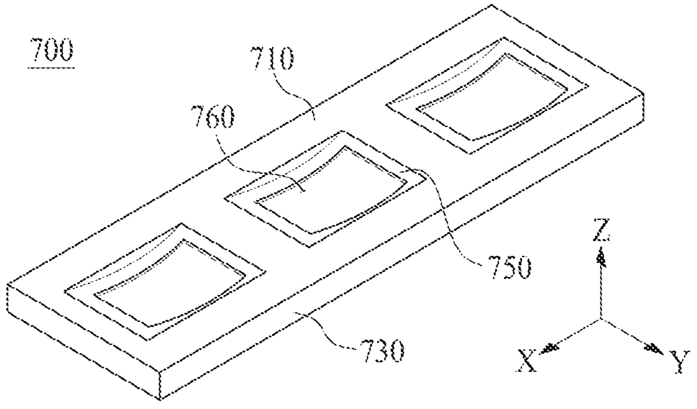
FIG. 45 is an example perspective view illustrating a rear surface of a supporting member illustrated in FIG. 44.

FIG. 44 is another example cross-sectional view taken along line VI-VI' illustrated in FIG. 36, and FIG. 45 is an example perspective view illustrating a rear surface of a supporting member illustrated in FIG. 44. FIGS. 44 and 45 illustrate an example embodiment where a hole is added to a curved portion of a supporting member, in the apparatus 7 described above with reference to FIGS. 42 to 43. In describing FIGS. 44 and 45, therefore, the other elements except a hole and relevant elements are referred to by like reference numerals, and their repetitive descriptions may be omitted for brevity.

With reference to FIGS. 44 and 45, in an apparatus 8 according to an eighth example embodiment of the present disclosure, a supporting member 700 may further include one or more holes 760.

The one or more holes 760 may be formed at one or more of the plurality of curved portions 750, or may be formed at each of the plurality of curved portions 750. For example, the one or more holes 760 may be formed to pass through the curved portion 750 along a third direction Z. Therefore, the hole 760 may be an opening portion, a communication portion, an opening hole, a communication hole, a through portion, a through port, a through hole, a supporting hole, a slit, a slot, or a sound through portion, but embodiments of the present disclosure are not limited thereto. Except that the one or more holes 760 are formed at the curved portion 350 formed from the rear portion 710 of the supporting member 700 toward the vibration member 600, the one or more holes 760 may be the same or substantially the same as the one or more holes 360 described above with reference to FIGS. 40 and 41, and thus, their repetitive descriptions may be omitted for brevity.

The vibration apparatus 500 may be connected to or attached on the curved portion 750 to cover the hole 760 and may vibrate in a state where the vibration apparatus 500 receive a pre-stress (or a pre-tension stress) or are bent in a curved shape, and thus, a second moment of inertia may increase, or a vibration direction may be implemented as a single direction.

The hole 360 formed at each of the plurality of curved portions 750 may be disposed at a rear surface of each of the plurality of vibration apparatuses 500. Therefore, a vibration (or displacement) of each of the plurality of vibration apparatuses 500 may be smoothly performed, and thus, a vibration width (or a displacement width) of each of the plurality of vibration apparatuses 500 may increase. Therefore, a sound pressure level generated in the gap space GS based on a vibration of each of the plurality of vibration apparatuses 500 may increase, and thus, a vibration width (or a displacement width) of the vibration member 600 vibrating based on a sound pressure level of the gap space GS may increase. Accordingly, a sound characteristic and/or a sound pressure level characteristic of a sound generated based on a vibration of the vibration member 600 may be further enhanced.

The apparatus 8 according to the eighth example embodiment of the present disclosure may include the vibration apparatus 500 which vibrates in a state in which the vibration apparatus (or the vibration generator) 500 receives a pre-stress (or a pre-tension stress) or is bent in a curved shape, and thus, a second moment of inertia may increase or a vibration direction of the vibration apparatus 500 may be implemented as a single direction, thereby enhancing a sound characteristic and a sound pressure level characteristic of a sound generated by the vibration member 600 which vibrates based on a vibration of the vibration apparatus 500. In addition, the apparatus 8 according to the eighth example embodiment of the present disclosure may include the one or more holes 760 formed at the curved portion 750 of the supporting member 700, and thus, a vibration of the vibration apparatus 500 may be more smoothly performed, whereby a vibration width (or a displacement width) of the vibration apparatus 500 may increase. Therefore, a vibration width (or a displacement width) of the vibration member 600 may increase, and thus, a sound characteristic and/or a sound pressure level characteristic generated based on a vibration of the vibration member 600 may be further enhanced.

The apparatus 8 according to the eighth example embodiment of the present disclosure may further include an enclosure 950. The enclosure 950 may be disposed at the rear surface of the supporting member 700. The enclosure 950 may be connected or coupled to a rear surface of the supporting member 700 to cover the vibration apparatus 500. For example, the enclosure 950 may be connected or coupled to a rear surface of the rear portion 710 of the supporting member 700 by the coupling member 951. The enclosure 950 may configure a closed space covering or surrounding the vibration apparatus 500 at the rear surface of the rear portion 710 of the supporting member 700. The enclosure 950 may be the same or substantially the same as described above with reference to FIG. 39, and thus, the repetitive description thereof may be omitted for brevity.

Figure 46:
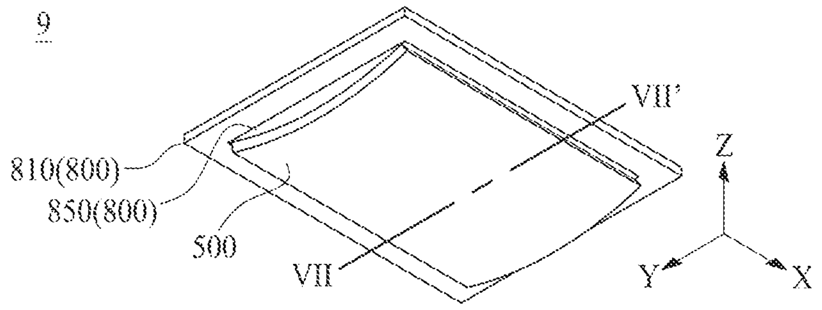
FIG. 46 is an example perspective view illustrating an apparatus according to a ninth example embodiment of the present disclosure.
Figure 47:
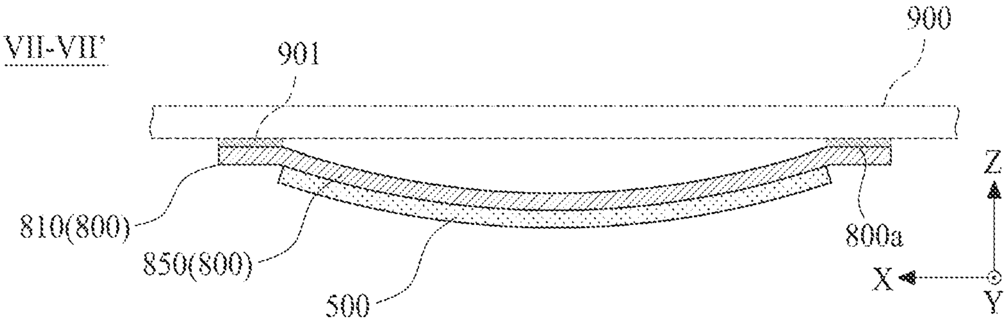
FIG. 47 is an example cross-sectional view taken along line VII-VII' illustrated in FIG. 46.
Figure 48:
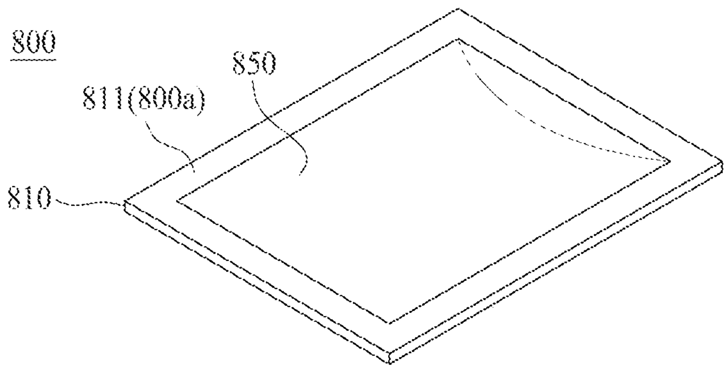
FIG. 48 is an example perspective view illustrating a supporting member illustrated in FIGS. 46 and 47.

FIG. 46 is a perspective view illustrating an apparatus according to a ninth example embodiment of the present disclosure, FIG. 47 is an example cross-sectional view taken along line VII-VII' illustrated in FIG. 46, and FIG. 48 is an example perspective view illustrating a supporting member illustrated in FIGS. 46 and 47.

With reference to FIGS. 46 to 48, an apparatus 9 according to a ninth example embodiment of the present disclosure may be one (or single) vibration element (or component) which is coupled to or attached on a vibration member 900 and implemented to vibrate the vibration member 900 to output a vibration or a sound. Therefore, the apparatus 9 according to the ninth example embodiment of the present disclosure may be a vibration generating apparatus, a vibration generating device, a vibration source, a vibration generating unit, a vibration unit, a vibration module, a vibration generating element, a passive vibration member, a sound generating device, a sound generating unit, a transparent vibration generating apparatus, a transparent sound generating unit, a semitransparent sound generating unit, an opaque sound generating unit, a transparent sound generating device, a transparent vibration source, a semitransparent vibration source, an opaque vibration source, or a vibration structure, but embodiments of the present disclosure are not limited thereto.

The apparatus 9 according to the ninth example embodiment of the present disclosure may be applied to implement a sound apparatus, a sound output apparatus, a sound bar, a sound system, a sound apparatus for vehicular apparatuses, a sound output apparatus for vehicular apparatuses, or a sound bar for vehicular apparatuses, or the like. For example, the vehicular apparatus may include one or more seats and one or more glass windows. For example, the vehicular apparatus may include a vehicle, a train, a ship, or an aircraft, but embodiments of the present disclosure are not limited thereto. In addition, the apparatus 9 according to the ninth example embodiment of the present disclosure may implement an analog signage or a digital signage, or the like such as an advertising signboard, a poster, or a noticeboard, or the like.

The apparatus 9 according to the ninth example embodiment of the present disclosure may include a supporting member 800 and a vibration apparatus 500.

Figure 49:
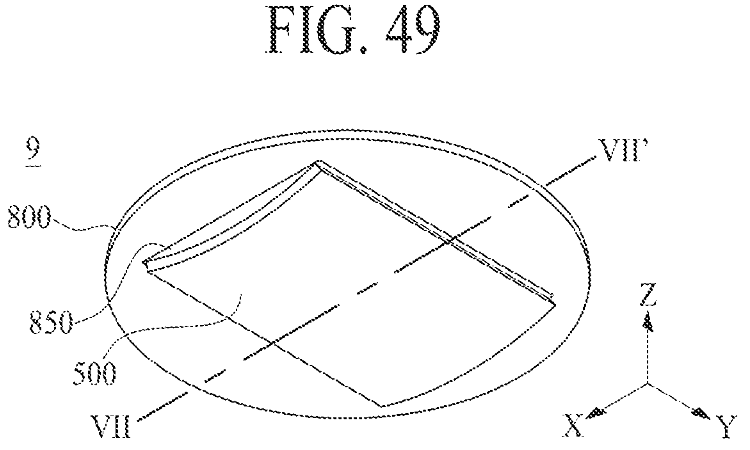
FIG. 49 is a rear perspective view illustrating another embodiment of an apparatus according to a ninth example embodiment of the present disclosure.

The supporting member 800 may include a three or more-angled polygonal shape or a three or more-angled non-tetragonal shape including one or more curved surfaces. For example, the supporting member 800 may include a square shape or a rectangular shape. For example, as illustrated in FIG. 49, the supporting member 800 may include a circular shape or an oval shape. A cross-sectional surface taken along line VII-VII' illustrated in FIG. 49 is illustrated in FIG. 47.

The supporting member 800 according to an example embodiment of the present disclosure may include a curved portion 850. The curved portion 850 may protrude toward a rear surface of the supporting member 800. The curved portion 850 may protrude convexly toward the rear surface of the supporting member 800 from a center portion, other than a periphery portion 811, of the supporting member 800. For example, the curved portion 850 may be implemented concavely to have a predetermined curvature from a front surface 800*a* of the supporting member 800. For example, the curved portion 850 may be substantially the same as the curved portion 350 described above with reference to FIG. 5 or the curved portion 750 described above with reference to FIGS. 37 and 38, and thus, the repetitive description thereof may be omitted for brevity, and the description of the curved portion 350 illustrated in FIG. 5 or the description of the curved portion 750 illustrated in FIGS. 37 and 38 may be included in or applicable to a description of the curved portion 850 illustrated in FIGS. 46 to 48.

The supporting member 800 according to an example embodiment of the present disclosure may include a base plate 810 and a curved portion 850.

The base plate 810 may include a three or more-angled polygonal shape or a three or more-angled non-tetragonal shape including one or more curved surfaces. For example, the base plate 810 may include a square shape or a rectangular shape. For example, as illustrated in FIG. 49, the base plate 810 may include a circular shape or an oval shape. For example, the base plate 810 may be a base member, a base frame, or a supporting frame, but embodiments of the present disclosure are not limited thereto.

The supporting member 800 or the base plate 810 may include a metal material or a nonmetal material (or a composite nonmetal material) having a material characteristic suitable for outputting a sound based on a vibration. For example, the supporting member 800 or the base plate 810 may include a transparent plastic material, an opaque plastic material, wood, or a metal material, but embodiments of the present disclosure are not limited thereto.

The curved portion 850 may protrude toward a rear surface of the base plate 810. The curved portion 850 may protrude convexly toward the rear surface of the base plate 810 from a center portion, other than a periphery portion 811, of the base plate 810. For example, the curved portion 850 may be implemented concavely to have a predetermined curvature from a front surface 800*a* of the supporting member 800. For example, the curved portion 850 may be substantially the same as the curved portion 350 described above with reference to FIGS. 1 to 5 or the curved portion 750 described above with reference to FIGS. 37 and 38, and thus, the repetitive description thereof may be omitted for brevity, and the description of the curved portion 350 illustrated in FIGS. 1 to 5 or the description of the curved portion 750 illustrated in FIGS. 37 and 38 may be included in or applicable to a description of the curved portion 850 illustrated in FIGS. 46 to 48. For example, the curved portion 850 may be a convex curved portion, a convex arch portion, or a convex protrusion portion, but embodiments of the present disclosure are not limited thereto.

The vibration apparatus 500 may be coupled to or attached on the curved portion 850 implemented at the supporting member 800. The vibration apparatus 500 may vibrate the curved portion 850 of the supporting member 800 to output a sound (or sound wave) to the forward of the supporting member 800.

The vibration apparatus 500 may have a size which is smaller than that of the curved portion 850. The vibration apparatus 500 may be coupled to or attached on the curved portion 850 to have an equiangular shape based on a curvature of the curved portion 850, but embodiments of the present disclosure are not limited thereto. For example, the vibration apparatus 500 may be coupled to or attached on the curved portion 850 to have a non-equiangular shape which is not based on a curvature of the curved portion 850 or have a curvature which differs from that of the curved portion 850.

According to an example embodiment of the present disclosure, the vibration apparatus 500 may be coupled to or attached on the curved portion 850, and thus, may have a pre-stress or receive the pre-stress based on the curved portion 850. For example, the vibration apparatus 500 may be coupled to or attached on the curved portion 850, and thus, may be maintained in a state where the vibration apparatus 500 has the pre-stress or receives the pre-stress based on the curved portion 850. For example, the vibration apparatus 500 may receive a tension stress or include the tension stress based on a curvature of the curved portion 850. For example, the curved portion 850 may be implemented to apply only the tension stress to the vibration apparatus 500, in order to enhance a vibration characteristic of the vibration apparatus 500. Accordingly, the vibration apparatus 500 may vibrate in a state where the vibration apparatus 500 receives the pre-stress (or a pre-tension stress) or is bent in a curved shape, and thus, a second moment of inertia may increase, or a vibration direction may be implemented as a single direction.

The vibration apparatus 500 may include the vibration apparatus 500 described above with reference to FIGS. 6 to 9 and the vibration generator described above with reference to FIGS. 24 to 35D. Therefore, the description of the vibration apparatus described above with reference to FIGS. 6 to 9 and the description of the vibration generator described above with reference to FIGS. 24 to 35D may be included in or applicable to a description of the vibration apparatus 500 illustrated in FIGS. 46 to 48, and thus, the repetitive description thereof may be omitted for brevity.

The apparatus 9 according to the ninth example embodiment of the present disclosure may be coupled to a vibration member 900 by the coupling member 901 and may vibrate the vibration member 900 by a sound (or a sound wave) generated based on a vibration of the vibration apparatus 500. Accordingly, a sound characteristic and/or a sound pressure level characteristic of the low-pitched sound band generated based on a vibration of the vibration member 900 may be enhanced. For example, the vibration member 900 may be a vibration plate, a vibration object, a sound output plate, a sound vibration plate, or an image screen, or the like, but embodiments of the present disclosure are not limited thereto.

The vibration member 900 may be a vibration plate which includes a metal material or a nonmetal material (or a composite nonmetal material) having a material characteristic suitable for being vibrated by the apparatus 9 to output sound.

The vibration member 900 according to an example embodiment of the present disclosure may include a vibration plate which includes one or more materials of metal, plastic, paper, fiber, cloth, leather, wood, rubber, glass, and a mirror. For example, the paper may be conge for speakers. For example, the conge may be pulp or foamed plastic, or the like, but embodiments of the present disclosure are not limited thereto.

The vibration member 900 according to another example embodiment of the present disclosure may include a display panel including a pixel displaying an image, or may include a non-display panel. For example, the vibration member 900 may include one or more of a display panel including a pixel displaying an image, a screen panel on which an image is to be projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the non-display panel may be a light emitting diode lighting panel (or apparatus), an organic light emitting lighting panel (or apparatus), or an inorganic light emitting lighting panel (or apparatus), but embodiments of the present disclosure are not limited thereto.

The coupling member 901 may be configured to minimize or prevent the transfer of a vibration of the vibration member 900 to the supporting member 800. The coupling member 901 may include a material characteristic suitable for blocking a vibration. For example, the coupling member 901 may include a material having elasticity for vibration absorption (or impact absorption). The coupling member 901 according to an example embodiment of the present disclosure may be configured as polyurethane materials or polyolefin materials, but embodiments of the present disclosure are not limited thereto. For example, the coupling member 901 may include one or more of an adhesive, a double-sided tape, a double-sided foam tape, and a double-sided cushion tape, but embodiments of the present disclosure are not limited thereto.

The apparatus 9 according to the ninth example embodiment of the present disclosure may vibrate in a state where the vibration apparatus 500 receives a pre-stress (or a pre-tension stress) or is bent in a curved shape, and thus, a second moment of inertia in the vibration apparatus 500 may increase, or a vibration direction of the vibration apparatus 500 may be implemented as a single direction. Accordingly, a sound characteristic and/or a sound pressure level characteristic generated based on a vibration of the vibration apparatus 500 may be enhanced, and a sound generated based on a vibration of the vibration apparatus 500 may concentrate in a forward direction of a center portion of the curved portion 850. Thus, a sound characteristic and/or a sound pressure level characteristic generated based on a vibration of the vibration member 900 may be further enhanced.

Figure 50A:
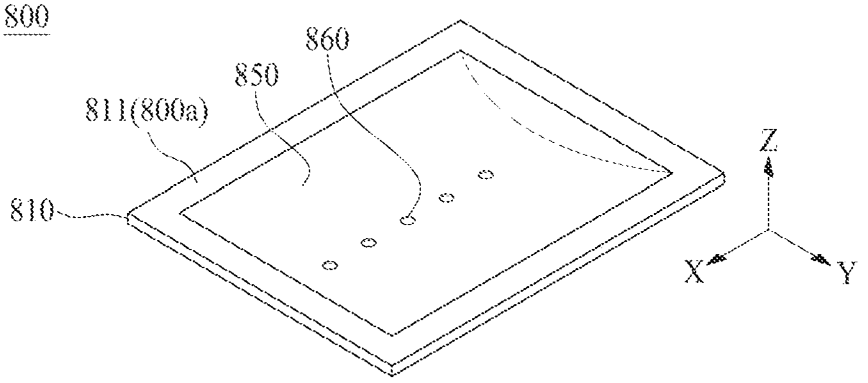
FIGS. 50A and 50B are perspective views illustrating another example embodiment of a supporting member illustrated in FIGS. 46 to 49.
Figure 50B:
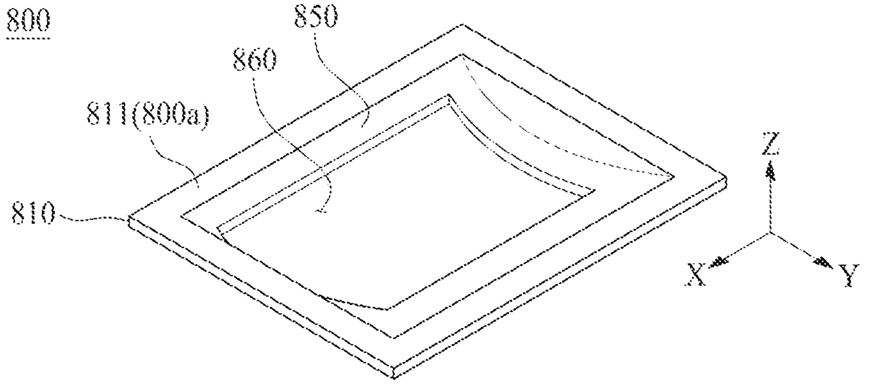

FIGS. 50A and 50B are example perspective views illustrating a modification embodiment of a supporting member illustrated in FIGS. 46 to 49. FIGS. 50A and 50B illustrate an example embodiment where one or more holes are added to the supporting member illustrated in FIGS. 46 to 49. In describing FIGS. 50A and 50B, therefore, the other elements except one or more holes and relevant elements are referred to by like reference numerals, and their repetitive descriptions may be omitted for brevity.

With reference to FIGS. 50A and 50B, in an apparatus 9 according to the ninth example embodiment of the present disclosure, the supporting member 800 may further include one or more holes 860.

The one or more holes 860 may be formed at the curved portion 850. The one or more holes 860 8 may be formed to pass through the curved portion 850 along a third direction Z. Therefore, the hole 860 may be an opening portion, a communication portion, an opening hole, a communication hole, a through portion, a through port, a through hole, a supporting hole, a slit, a slot, or a sound through portion, but embodiments of the present disclosure are not limited thereto. The one or more holes 860 may be substantially the same as the hole 351 and 352 illustrated in FIGS. 16A and 16B, and thus, their repetitive descriptions may be omitted for brevity, and the description of the hole 351 and 352 illustrated in FIGS. 16A and 16B may be included in or applicable to a description of the hole 860 illustrated in FIGS. 50A and 50B.

According to an example embodiment of the present disclosure, the one or more holes 860 may have a circular shape, an oval shape, a tetragonal shape, a slit shape, a slot shape, or a dotted-line shape, or the like, but embodiments of the present disclosure are not limited thereto.

The apparatus 9 according to the ninth example embodiment of the present disclosure may further include the one or more holes 860 which are formed at the curved portions 850 of the supporting member 800, and thus, a sound (or a sound wave) generated based on a vibration of the vibration apparatus 500 may concentrate in a forward direction of the center portion of the curved portion 850. Thus, a sound characteristic and/or a sound pressure level characteristic generated based on a vibration of the vibration member 900 may be enhanced.

Figure 51:
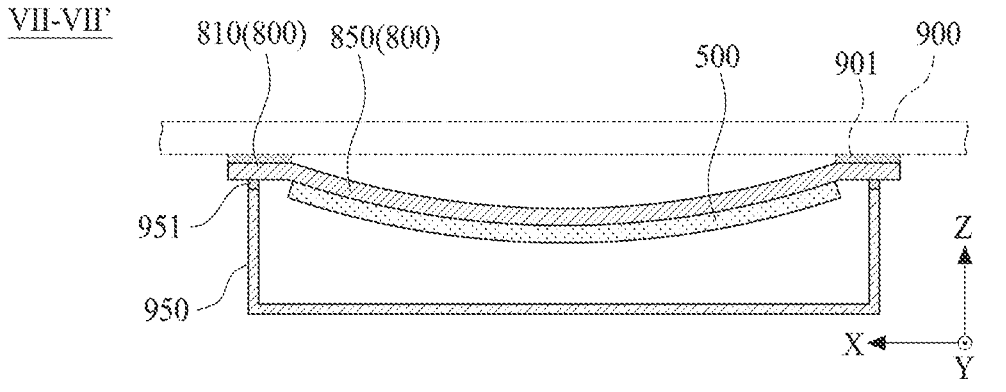
FIG. 51 is another example cross-sectional view taken along line VII-VII' illustrated in FIG. 46 or 49.

FIG. 51 is another example cross-sectional view taken along line VII-VII' illustrated in FIG. 46 or 49. FIG. 51 illustrates an example embodiment where an enclosure is added to the apparatus 9 illustrated in FIGS. 46 to 50B. In describing FIG. 51, therefore, the other elements except an enclosure and relevant elements are referred to by like reference numerals, and their repetitive descriptions may be omitted for brevity.

With reference to FIG. 51, the apparatus 9 according to the ninth example embodiment of the present disclosure may further include an enclosure 950.

The enclosure 950 may be disposed at the rear surface of the supporting member 800. The enclosure 950 may be disposed to cover the vibration apparatus 500. The enclosure 950 may be connected or coupled to a rear surface of the supporting member 800 to cover the vibration apparatus 500. For example, the enclosure 950 may be connected or coupled to a rear periphery portion of the supporting member 800 by the coupling member 951. The enclosure 950 may configure a closed space which covers or surrounds the vibration apparatus 500, in the rear surface of the supporting member 800. For example, the enclosure 950 may configure a closed space which covers or surrounds the vibration apparatus 500, in the rear surface of the supporting member 800. For example, the enclosure 950 may be a closed member, a closed cap, a closed box, or a sound box, but embodiments of the present disclosure are not limited thereto. The closed space may be an air gap, a vibration space, a sound space, or a sounding box, but embodiments of the present disclosure are not limited thereto.

The enclosure 950 may include one or more materials of a metal material and a nonmetal material (or a composite nonmetal material). For example, the enclosure 950 may include one or more materials of a metal material, plastic, and wood, but embodiments of the present disclosure are not limited thereto.

The enclosure 950 according to an example embodiment of the present disclosure may maintain an impedance component based on air acting on the curved portion 850 of the supporting member 800 when the curved portion 850 of the supporting member 800 or the vibration apparatus 500 is vibrating. For example, air around the supporting member 800 may resist a vibration of the curved portion 850 of the supporting member 800 and may act as an impedance component having a reactance component and a resistance based on a frequency. Therefore, the enclosure 950 may configure a closed space which surrounds the vibration apparatus 500, in the rear surface of the supporting member 800, and thus, may maintain an impedance component (or an air impedance or an elastic impedance) acting on the curved portion 850 of the supporting member 800 on the basis of air. Accordingly, a sound characteristic and/or a sound pressure level characteristic of the low-pitched sound band may be enhanced and the quality of a sound of a high-pitched sound band may be enhanced.

In the apparatus 9 according to the ninth example embodiment of the present disclosure, by the enclosure 950, a sound characteristic and/or a sound pressure level characteristic of the low-pitched sound band may be enhanced, and the quality of a sound of the high-pitched sound band may be enhanced.

Figure 52:
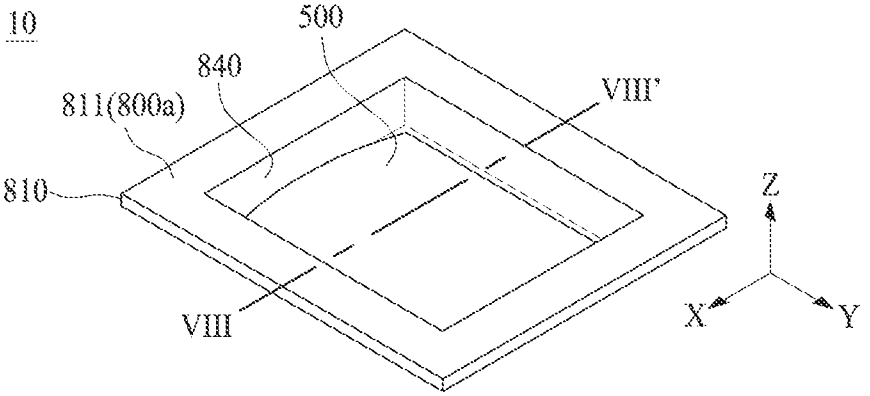
FIG. 52 is a perspective view illustrating an apparatus according to a tenth example embodiment of the present disclosure.
Figure 53:
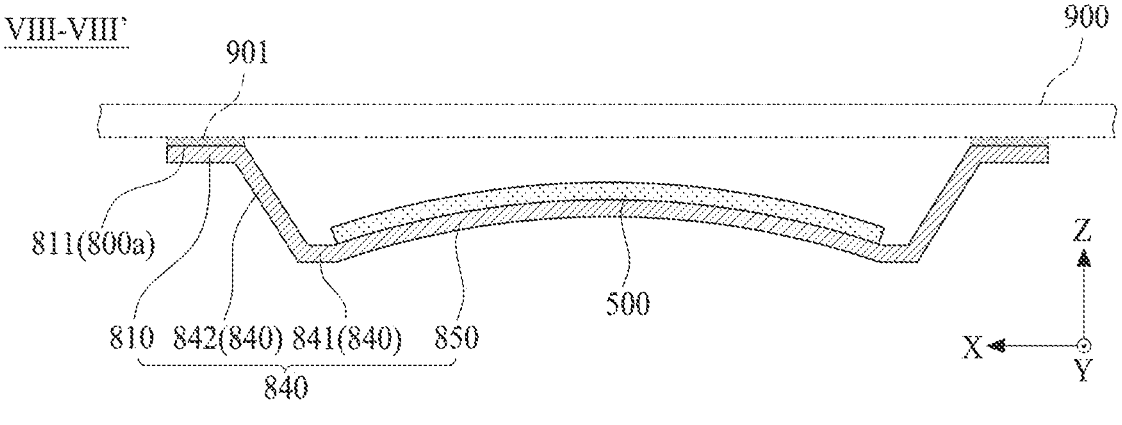
FIG. 53 is an example cross-sectional view taken along line VIII-VIII' illustrated in FIG. 52.
Figure 54:
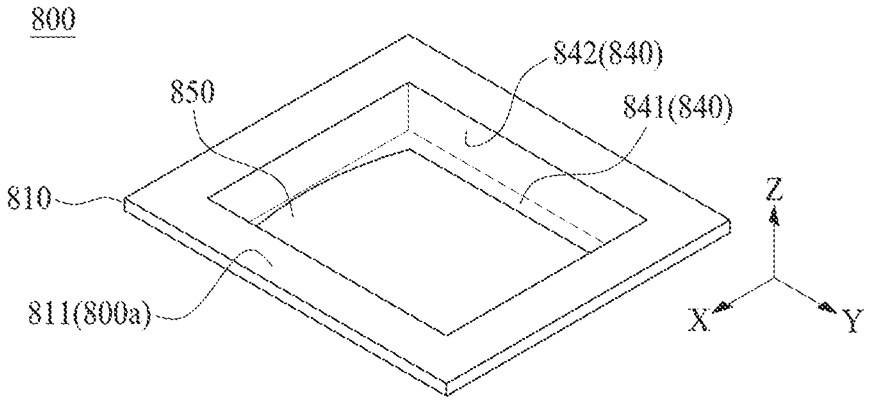
FIG. 54 is an example perspective view illustrating a supporting member illustrated in FIGS. 52 and 53.

FIG. 52 is a perspective view illustrating an apparatus according to a tenth example embodiment of the present disclosure, FIG. 53 is an example cross-sectional view taken along line VIII-VIII' illustrated in FIG. 52, and FIG. 54 is an example perspective view illustrating a supporting member illustrated in FIGS. 52 and 53. FIGS. 52 to 54 illustrate an example embodiment implemented by modifying the curved portion of the supporting member in the apparatus 9 described above with reference to FIGS. 46 to 48. In describing FIGS. 52 to 54, therefore, the other elements except a curved portion and relevant elements are referred to by like reference numerals, and their repetitive descriptions may be omitted for brevity.

With reference to FIGS. 52 to 54, the apparatus 10 according to a tenth example embodiment of the present disclosure may include a supporting member 800 and a vibration apparatus 500.

Figure 55:
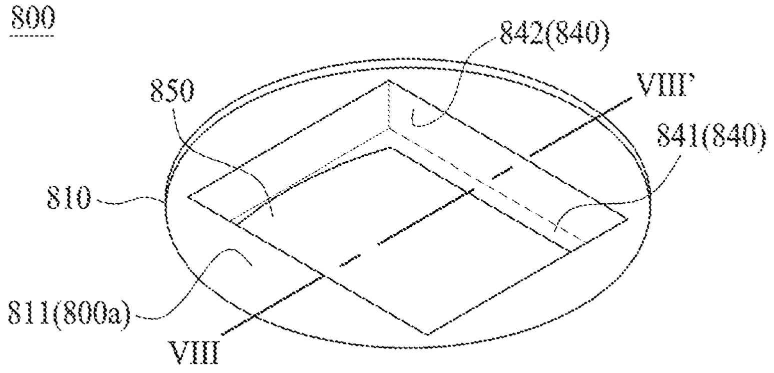
FIG. 55 is a rear perspective view illustrating another embodiment of an apparatus according to a tenth example embodiment of the present disclosure.

The supporting member 800 may include a three or more-angled polygonal shape or a three or more-angled non-tetragonal shape including one or more curved surfaces. For example, the supporting member 800 may include a square shape or a rectangular shape. For example, as illustrated in FIG. 49, the supporting member 800 may include a circular shape or an oval shape. A cross-sectional surface taken along line VIII-VIII' illustrated in FIG. 55 is illustrated in FIG. 53.

The supporting member 800 may include a protrusion portion 840 and a curved portion 850.

The protrusion portion 840 may protrude toward a rear surface of the supporting member 800. The protrusion portion 840 may protrude convexly toward the rear surface of the supporting member 800 from a center portion, other than a periphery portion 811, of the supporting member 800. For example, the protrusion portion 840 may protrude to have a tetragonal shape toward the rear surface of the supporting member 800 from the front surface 800*a* of the supporting member 800. For example, the protrusion portion 840 may include a trapezoid shape, a pyramid shape, or a five-sided shape, but embodiments of the present disclosure are not limited thereto. For example, the protrusion portion 840 may be substantially the same as the protrusion portion 340 described above with reference to FIGS. 18 and 19, and thus, the repetitive description thereof will be briefly given below and the description of the protrusion portion 340 illustrated in FIGS. 18 and 19 may be included in or applicable to a description of the protrusion portion 840 illustrated in FIGS. 52 to 55.

The curved portion 850 may be implemented at the protrusion portion 840. The curved portion 850 may protrude in a direction from the protrusion portion 840 to the front surface of the supporting member 800. The curved portion 850 may protrude convexly toward the front surface of the supporting member 800 from a center portion, other than a periphery portion, of the protrusion portion 840. For example, the curved portion 850 may be implemented convexly to have a predetermined curvature from the protrusion portion 840. For example, the curved portion 850 may be substantially the same as the curved portion 350 described above with reference to FIGS. 18 and 19, and thus, the repetitive description thereof will be briefly given below and the description of the curved portion 350 illustrated in FIGS. 18 and 19 may be included in or applicable to a description of the curved portion 850 illustrated in FIGS. 52 to 55.

The supporting member 800 according to an example embodiment of the present disclosure may include a base plate 810, a protrusion portion 840, and a curved portion 850.

The base plate 810 may include a three or more-angled polygonal shape or a three or more-angled non-tetragonal shape including one or more curved surfaces. For example, the base plate 810 may include a square shape or a rectangular shape. For example, as illustrated in FIG. 49, the base plate 810 may include a circular shape or an oval shape. For example, the base plate 810 may be a base member, a base frame, or a supporting frame, but embodiments of the present disclosure are not limited thereto.

The supporting member 800 or the base plate 810 may include a metal material or a nonmetal material (or a composite nonmetal material) having a material characteristic suitable for outputting a sound based on a vibration. For example, the supporting member 800 or the base plate 810 may include a transparent plastic material, an opaque plastic material, wood, or a metal material, but embodiments of the present disclosure are not limited thereto.

The protrusion portion 840 may include a protrusion surface (or a protrusion floor surface) which is parallel to the front surface 800*a* of the base plate 810, and a plurality of lateral surfaces (or protrusion walls) 842 connected between the base plate 810 and the protrusion surface 841. The plurality of lateral surfaces 842 may be vertical or inclined between the base plate 810 and the protrusion surface 841.

The curved portion 850 may be implemented at the protrusion portion 840. The curved portion 850 may be implemented at the protrusion surface 841 of the protrusion portion 840. The curved portion 850 may vibrate together with a vibration of the vibration apparatus 500. The curved portion 850 may be implemented at the protrusion portion 840 to have a shape which enables only a tension stress to be applied to the vibration apparatus 500, so as to enhance a vibration characteristic of the vibration apparatus 500.

According to another example embodiment of the present disclosure, the curved portion 850 may be implemented at the protrusion portion 840 to have a predetermined curvature. For example, the curved portion 850 may include a curved structure which protrudes in a direction from the protrusion surface 841 of the protrusion portion 840 to a forward surface of the base plate 810. For example, the curved portion 850 may protrude from the protrusion surface 841 of the protrusion portion 840 to have a curved shape having one curvature (or a single curvature). For example, the curved portion 850 may have a curved structure having one curvature (or a single curvature) having no inflection point. For example, the curved portion 850 may protrude convexly in the direction from the protrusion surface 841 of the protrusion portion 840 to the forward surface of the base plate 810. For example, the curved portion 850 may have a single convex curved shape having a certain curvature. For example, the curved portion 850 may be a curved portion, a convex portion, a convex protrusion portion, a convex curved portion, a convex arch portion, a projection portion, or an uplift portion having a second shape, with respect to the protrusion surface 841 of the protrusion portion 840.

The vibration apparatus 500 may be coupled to or attached on the curved portion 850 which is implemented at the protrusion portion 840 of the supporting member 800. For example, the vibration apparatus 500 may be coupled to or attached at the curved portion 850 inside a space provided by the protrusion portion 840. For example, the vibration apparatus 500 may be coupled to or attached at an inner surface (or an internal surface) of the curved portion 850 inside the space provided by the protrusion portion 840. The vibration apparatus 500 may be coupled to or attached on the curved portion 850 inside the space provided by the protrusion portion 840, and thus, may be maintained in a state where the vibration apparatus 500 has a pre-stress or receive the pre-stress based on the curved portion 350. For example, the vibration apparatus 500 may receive a tension stress or include the tension stress based on a curvature of the curved portion 850. For example, the curved portion 850 may be implemented to apply only the tension stress to the vibration apparatus 500, in order to enhance a vibration characteristic of the vibration apparatus 500. Accordingly, the vibration apparatus 500 may vibrate in a state where the vibration apparatus 500 receives a pre-stress (or a pre-tension stress) or is bent in a curved shape, and thus, a second moment of inertia may increase, or a vibration direction may be implemented as a single direction.

The vibration apparatus 500 may include the vibration apparatus 500 described above with reference to FIGS. 6 to 9 and the vibration generator described above with reference to FIGS. 24 to 35D. Therefore, the description of the vibration apparatus described above with reference to FIGS. 6 to 9 and the description of the vibration generator described above with reference to FIGS. 24 to 35D may be included in or applicable to a description of each of the plurality of vibration apparatuses 500 illustrated in FIGS. 52 to 55, and thus, the repetitive description thereof may be omitted for brevity.

The apparatus 10 according to the tenth example embodiment of the present disclosure may vibrate in a state where the vibration apparatus 500 receives a pre-stress (or a pre-tension stress) or is bent in a curved shape, and thus, a second moment of inertia in the vibration apparatus 500 may increase, or a vibration direction of the vibration apparatus 500 may be implemented as a single direction. Accordingly, a sound characteristic and/or a sound pressure level characteristic generated based on a vibration of the vibration apparatus 500 may be enhanced, and a sound generated based on a vibration of the vibration apparatus 500 may concentrate in a forward direction of a center portion of the curved portion 850. Thus, a sound characteristic and/or a sound pressure level characteristic generated based on a vibration of the vibration member 900 may be enhanced. In addition, the apparatus 10 according to the tenth example embodiment of the present disclosure may be slimmed because the vibration apparatus 500 is accommodated into the protrusion portion 840 or is surrounded by the protrusion portion 840, and in this example, the vibration apparatus 500 is not exposed to the outside, thereby enhancing a sense of beauty in design of an outermost rear surface of the apparatus 10.

Figure 56A:
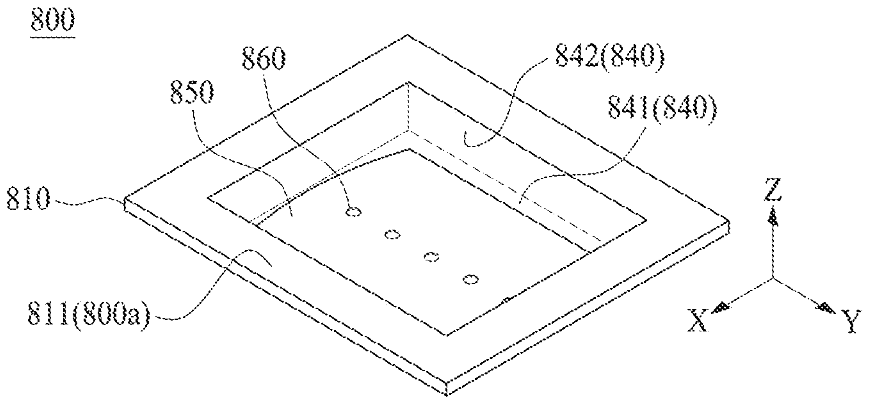
FIGS. 56A and 56B are perspective views illustrating another example embodiment of a supporting member illustrated in FIGS. 52 to 55.
Figure 56B:
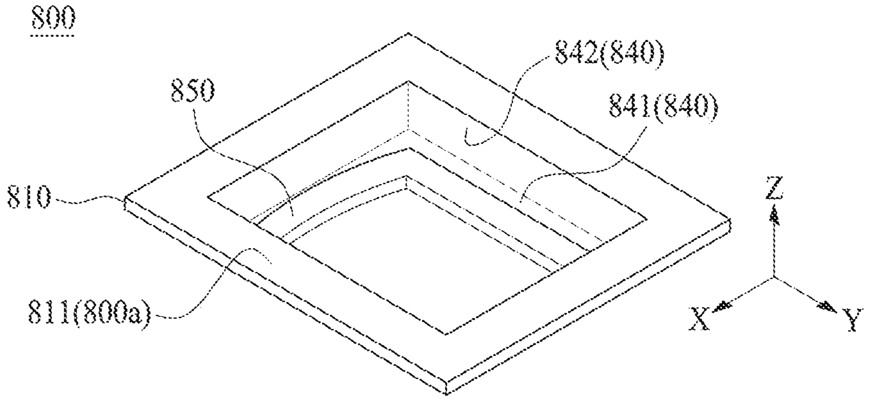

FIGS. 56A and 56B are a perspective view illustrating another example embodiment of a supporting member illustrated in FIGS. 52 to 55. FIGS. 56A and 56B illustrate an example embodiment where one or more holes are added to the supporting member illustrated in FIGS. 52 to 55. In describing FIGS. 56A and 56B, therefore, the other elements except one or more holes and relevant elements are referred to by like reference numerals, and their repetitive descriptions may be omitted for brevity.

With reference to FIGS. 56A and 56B, in an apparatus 10 according to the tenth example embodiment of the present disclosure, the supporting member 800 may further include one or more holes 860.

The one or more holes 860 may be formed at the curved portion 850. The one or more holes 860 may be formed to pass through the curved portion 850 along a third direction Z. Therefore, the hole 860 may be an opening portion, a communication portion, an opening hole, a communication hole, a through portion, a through port, a through hole, a supporting hole, a slit, a slot, or a sound through portion, but embodiments of the present disclosure are not limited thereto. The one or more holes 860 may be substantially the same as the one or more holes 860 illustrated in FIGS. 50A and 50B, and thus, their repetitive descriptions may be omitted for brevity.

According to an example embodiment of the present disclosure, the one or more holes 860 may have a circular shape, an oval shape, a tetragonal shape, a slit shape, a slot shape, or a dotted-line shape, or the like, but embodiments of the present disclosure are not limited thereto.

The apparatus 10 according to the tenth example embodiment of the present disclosure may further include the one or more holes 860 which are formed at the curved portions 850 of the supporting member 800, and thus, a sound generated based on a vibration of the vibration apparatus 500 may concentrate in a forward direction of the center portion of the curved portion 850. Thus, a sound characteristic and/or a sound pressure level characteristic generated based on a vibration of the vibration member 900 may be enhanced.

Figure 57:
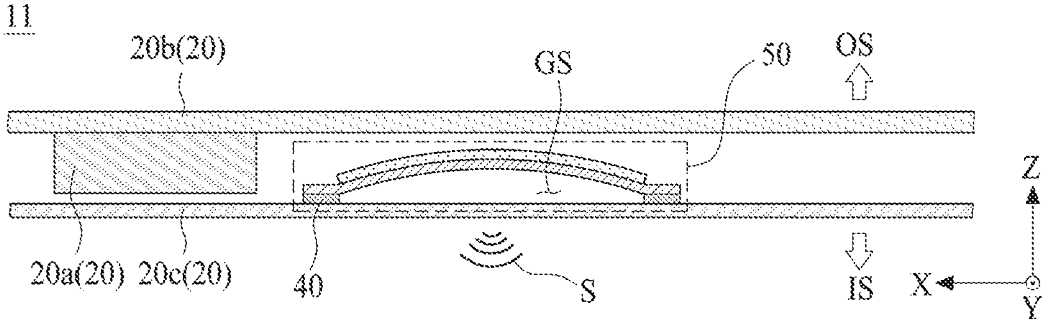
FIG. 57 illustrates an apparatus according to an eleventh example embodiment of the present disclosure.

FIG. 57 illustrates an apparatus according to an eleventh example embodiment of the present disclosure. FIG. 57 illustrates an apparatus applying or including the apparatus illustrated in one or more of FIGS. 46 to 56B.

With reference to FIG. 57, the apparatus 11 according to the eleventh example embodiment of the present disclosure may implement a vibration apparatus for vehicular apparatuses, a vibration generating apparatus for vehicular apparatuses, a vibration generating device for vehicular apparatuses, a sound apparatus for vehicular apparatuses, a sound generating apparatus for vehicular apparatuses, a sound generating device for vehicular apparatuses, a speaker for vehicular apparatuses, a sound apparatus for vehicles, a sound device for vehicles, a sound generating apparatus for vehicles, a sound generating device for vehicles, or a speaker for vehicles, or the like, but embodiments of the present disclosure are not limited thereto.

The apparatus 11 according to the eleventh example embodiment of the present disclosure may include one or more vibration generating apparatuses 50 which are configured to output a sound to one or more of an indoor space IS and an outdoor space OS of a vehicular apparatus 20.

The vehicular apparatus 20 may include one or more seats and one or more glass windows. For example, the vehicular apparatus 20 may include a vehicle, a train, a ship, or an aircraft, or the like, but embodiments of the present disclosure are not limited thereto.

The vehicular apparatus 20 according to an example embodiment of the present disclosure may include a main structure 20*a*, an exterior material 20*b*, and an interior material 20*c*.

The main structure (or a frame structure) 20*a* may include a main frame, a sub-frame, a side frame, a door frame, an under frame, and a seat frame, or the like, but embodiments of the present disclosure are not limited thereto.

The exterior material 20*b* may be configured to cover the main structure 20*a*. For example, the exterior material 20*b* may be configured to cover an outer portion of the main structure 20*a*. The exterior material 20*b* according to an example embodiment of the present disclosure may include a hood panel, a front fender panel, a dash panel, a filler panel, a trunk panel, a roof panel, a floor panel, a door inner panel, and a door outer panel, or the like, but embodiments of the present disclosure are not limited thereto. The exterior material 20*b* according to an example embodiment of the present disclosure may include at least one or more of a planar portion and a curved portion. For example, the exterior material 20*b* may have a surface structure corresponding to a surface structure of a corresponding main structure 20*a*, or may have a surface structure which differs from the surface structure of the corresponding main structure 20*a*.

The interior material 20*c* may include all elements configuring an inner portion of the vehicular apparatus 20, or may include all elements disposed at the indoor space IS of the vehicular apparatus 20. For example, the interior material 20*c* may be an interior member or an inner finish material of the vehicular apparatus 20, but embodiments of the present disclosure are not limited thereto.

The interior material 20*c* according to an example embodiment of the present disclosure may cover one or more of the main structure 20*a* and the exterior material 20*b* in the indoor space IS of the vehicular apparatus 20 and may be configured to be exposed at the indoor space IS of the vehicular apparatus 20. For example, the interior material 20*c* may include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, or the like, but embodiments of the present disclosure are not limited thereto.

The interior material 20*c* according to an example embodiment of the present disclosure may include one or more material of plastic, fiber, leather, cloth, wood, rubber, and metal, but embodiments of the present disclosure are not limited thereto.

The interior material 20*c* according to another example embodiment of the present disclosure may include a base member and a surface member. For example, the base member may be an injection material, a first interior material, an inner interior material, or a rear interior material, but embodiments of the present disclosure are not limited thereto. The surface member may be a second interior material, an outer interior material, a front interior material, an outer surface member, a reinforcement member, or a decoration member, but embodiments of the present disclosure are not limited thereto.

The interior material 20*c* or the base member may include a plastic material. For example, the interior material 20*c* or the base member may be an injection material which is implemented by an injection process (or injection molding process) using a thermoplastic resin or a thermosetting resin, but embodiments of the present disclosure are not limited thereto. The interior material 20*c* or the base member may be configured to cover one or more of the main structure 20*a* and the exterior material 20*b* in the indoor space IS of the vehicular apparatus 20. For example, the interior material 20*c* or the base member may be configured to cover one or more one surfaces (or an inner surface) of at least one or more of a main frame, a side frame, a door frame, and a handle frame, which are exposed at the indoor space IS of the vehicular apparatus 20.

The surface member may be disposed on the base member. The surface member may cover the base member in the indoor space IS of the vehicular apparatus 20 and may be configured to be exposed at the indoor space IS. For example, the surface member may be disposed at or coupled to a front surface of the base member exposed at the indoor space IS of the vehicular apparatus 20. For example, the surface member may include one or more materials of plastic, fiber, leather, cloth, wood, rubber, and metal, but embodiments of the present disclosure are not limited thereto.

The interior material 20*c* or the surface member including a fiber material may include at least one or more of a synthetic fiber, a carbon fiber (or an aramid fiber), and a natural fiber. For example, the interior material 20*c* or the surface member including a fiber material may be a textile sheet, a knit sheet, or a nonwoven fabric, but embodiments of the present disclosure are not limited thereto. For example, the interior material 20*c* or the surface member including a fiber material may be a fabric member, but embodiments of the present disclosure are not limited thereto. The synthetic fiber may be a thermoplastic resin and may include a polyolefin-based fiber which is an eco-friendly material which does not relatively release a harmful substance, but embodiments of the present disclosure are not limited thereto. For example, the polyolefin-based fiber may include a polyethylene fiber, a polypropylene fiber, or a polyethylene terephthalate fiber, but embodiments of the present disclosure are not limited thereto. The polyolefin-based fiber may be a fiber of a single resin or a fiber of a core-shell structure. The natural fiber may be a composite fiber of any one or two or more of a jute fiber, a kenaf fiber, an abaca fiber, a coconut fiber, and a wood fiber, but embodiments of the present disclosure are not limited thereto.

The one or more vibration generating apparatuses 50 may be configured to output a sound between the exterior material 20*b* and the interior material 20*c*. For example, the one or more vibration generating apparatuses 50 may be disposed between the exterior material 20*b* and the interior material 20*c*, and may indirectly or directly vibrate one or more of the exterior material 20*b* and the interior material 20*c* to output sound. Accordingly, one or more of the exterior material 20*b* and the interior material 20*c* may be a vibration member or a passive vibration member which generates or outputs a sound.

The one or more vibration generating apparatuses 50 may be coupled to or attached on the exterior material 20*b* or the interior material 20*c* in a space between the exterior material 20*b* and the interior material 20*c*. One or more of the exterior material 20*b* and the interior material 20*c* of the vehicular apparatus 20 may be a vibration plate, a sound vibration plate, or a sound generating plate, or the like for outputting a sound. For example, each of the exterior material 20*b* and the interior material 20*c* for outputting the sound may have a size which is greater than that of the one or more vibration generating apparatuses 50, and thus, may perform a function of a large-area vibration plate, a large-area sound vibration plate, or a large-area sound generating plate, thereby enhancing a sound characteristic and/or a sound pressure level characteristic of a low-pitched sound band generated by the one or more vibration generating apparatuses 50. For example, a frequency of a sound of the low-pitched sound band may be 500 Hz or less, but embodiments of the present disclosure are not limited thereto.

The one or more vibration generating apparatuses 50 according to an example embodiment of the present disclosure may output a sound between the exterior material 20*b* and the interior material 20*c*. For example, the one or more vibration generating apparatuses 50 may be connected to or coupled to one or more of the exterior material 20*b* and the interior material 20*c* between the exterior material 20*b* and the interior material 20*c*, and may indirectly or directly vibrate one or more of the exterior material 20*b* and the interior material 20*c* to output sound.

The one or more vibration generating apparatuses 50 according to an example embodiment of the present disclosure may be configured to include the apparatus 9 and 10 according to the ninth example embodiment or the tenth example embodiment of the present disclosure described above with reference to FIGS. 46 to 56B. Accordingly, the repetitive description of the one or more vibration generating apparatuses 50 may be omitted for brevity.

The one or more vibration generating apparatuses 50 may be coupled to or attached on the exterior material 20*b* or the interior material 20*c* by a coupling member 40 in a space between the exterior material 20*b* and the interior material 20*c*. For example, when the one or more vibration generating apparatuses 50 include the apparatus 9 and 10 described above with reference to FIGS. 46 to 56B, the supporting member 800 may be coupled to or attached on the interior material 20*c* by the coupling member 40 in the space between the exterior material 20*b* and the interior material 20*c*. Therefore, a gap space GS may be provided between the one or more vibration generating apparatuses 50 and the interior material 20*c*, a sound S generated based on vibrations of the one or more vibration generating apparatuses 50 may be output to the gap space GS, and the interior material 20*c* may vibrate based on a sound (or a sound wave) transferred through the gap space GS to output a sound S to one or more of an indoor space IS and an outdoor space OS of the vehicular apparatus 20. Accordingly, the apparatus 11 according to the eleventh example embodiment of the present disclosure may vibrate the interior material 20*c* based on a vibration of the vibration apparatus 500 to output a sound to one or more of the indoor space IS and the outdoor space OS of the vehicular apparatus 20.

The apparatus 11 according to the eleventh example embodiment of the present disclosure may indirectly or directly vibrate one or more of the exterior material 20*b* and the interior material 20*c*, thereby outputting a sound to one or more of the indoor space IS and the outdoor space OS of the vehicular apparatus 20.

Figure 58:
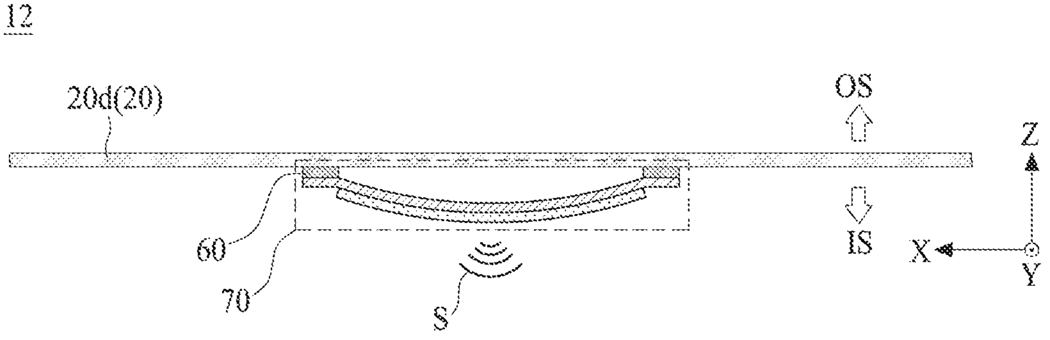
FIG. 58 illustrates an apparatus according to a twelfth example embodiment of the present disclosure.

FIG. 58 illustrates an apparatus according to a twelfth example embodiment of the present disclosure. FIG. 58 illustrates an apparatus applying or including the apparatus illustrated in one or more of FIGS. 46 to 56B.

With reference to FIG. 58, the apparatus 12 according to the twelfth example embodiment of the present disclosure may include one or more vibration generating apparatuses 70 which are disposed at a glass window 20*d* of a vehicular apparatus 20 to output a sound.

The glass window 20*d* of the vehicular apparatus 20 may include at least one or more of a front glass window and a side glass window. The glass window 20*d* of the vehicular apparatus 20 may further include at least one or more of a rear glass window and a roof glass window.

The glass window 20*d* according to an example embodiment of the present disclosure may be configured to be wholly transparent. The glass window 20*d* according to another example embodiment of the present disclosure may include a transparent portion and a semitransparent portion surrounding the transparent portion. The glass window 20*d* according to another example embodiment of the present disclosure may include a transparent portion and an opaque portion surrounding the transparent portion.

The one or more vibration generating apparatuses 70 may be configured to be transparent or semitransparent. For example, when the glass window 20*d* is wholly transparent, the one or more vibration generating apparatuses 70 may be configured to be transparent and may be disposed at a middle region or a peripheral region of the glass window 20*d*. When the glass window 20*d* includes the semitransparent portion or the opaque portion, the one or more vibration generating apparatuses 70 may be configured to be semitransparent or opaque and may be disposed at the semitransparent portion or the opaque portion of the glass window 20*d*. For example, the one or more vibration generating apparatuses 70 may be referred to as a transparent vibration generating apparatus, a semitransparent vibration generating apparatus, an opaque vibration generating apparatus, a transparent sound generating apparatus, a semitransparent sound generating apparatus, or an opaque sound generating apparatus, or the like, but embodiments of the present disclosure are not limited thereto.

The one or more vibration generating apparatuses 70 may be connected to or coupled to one surface (or an indoor surface) of the glass window 20*d* exposed at the indoor space IS of the vehicular apparatus 20. For example, the one or more vibration generating apparatuses 70 may be disposed at at least one or more of the front glass window and the side glass window, and may be additionally disposed at at least one or more of the rear glass window and the roof glass window.

The one or more vibration generating apparatuses 70 may indirectly or directly vibrate the glass window 20*d* to output a sound. For example, the one or more vibration generating apparatuses 70 may be configured to output the sound toward the indoor space IS by vibrating itself, or may vibrate the glass window 20*d* to output the sound toward the indoor space IS.

The one or more vibration generating apparatuses 70 according to an example embodiment of the present disclosure may be configured to include the apparatus 9 and 10 according to the ninth example embodiment or the tenth example embodiment of the present disclosure described above with reference to FIGS. 46 to 56B and may be configured to be transparent, semitransparent, or opaque. For example, the supporting member 800 and the vibration apparatus 500 described above with reference to FIGS. 46 to 56B may be configured to be transparent, semitransparent, or opaque, and thus, their repetitive descriptions may be omitted for brevity.

The one or more vibration generating apparatuses 70 according to an example embodiment of the present disclosure may be coupled to or attached on one surface (or an indoor surface) of the glass window 20*d* by a coupling member 60. For example, when one or more vibration generating apparatuses 70 include the apparatus 9 and 10 described above with reference to FIGS. 46 to 56B, a supporting member 800 may be coupled to or attached on one surface (or an indoor surface) of a glass window 20*d* by the coupling member 60. For example, the apparatus 12 according to the twelfth example embodiment of the present disclosure may output a sound S, generated based on a vibration of a curved portion 850 of a supporting member 800 based on a vibration of a vibration apparatus 500, to one or more of the indoor space IS and the outdoor space OS. In addition, the apparatus 12 according to the twelfth example embodiment of the present disclosure may vibrate a glass window 20*d* based on a vibration of the curved portion 850 of the supporting member 800 based on a vibration of the vibration apparatus 500 to output the sound S to one or more of the indoor space IS and the outdoor space OS of the vehicular apparatus 20.

The one or more vibration generating apparatuses 70 according to another example embodiment of the present disclosure may be covered by an optical film attached on one surface (or an indoor surface) of the glass window 20*d*. The optical film may be attached on the one surface (or the indoor surface) of the glass window 20*d* to cover the one or more vibration generating apparatuses 70, and thus, may protect the one or more vibration generating apparatuses 70 or may fix the one or more vibration generating apparatuses 70 to the glass window 20*d*. The optical film may include one or more of an infrared ray blocking film for blocking an infrared ray, a light block film for blocking light, and a heat blocking film for blocking heat, but embodiments of the present disclosure are not limited thereto.

Therefore, the apparatus 12 according to the twelfth example embodiment of the present disclosure may be connected to the glass window 20*d* and may output a sound toward one or more of the indoor space IS and the outdoor space OS of the vehicular apparatus 20 by vibrating itself or by the glass window 240 as a sound vibration plate.

Figure 59:
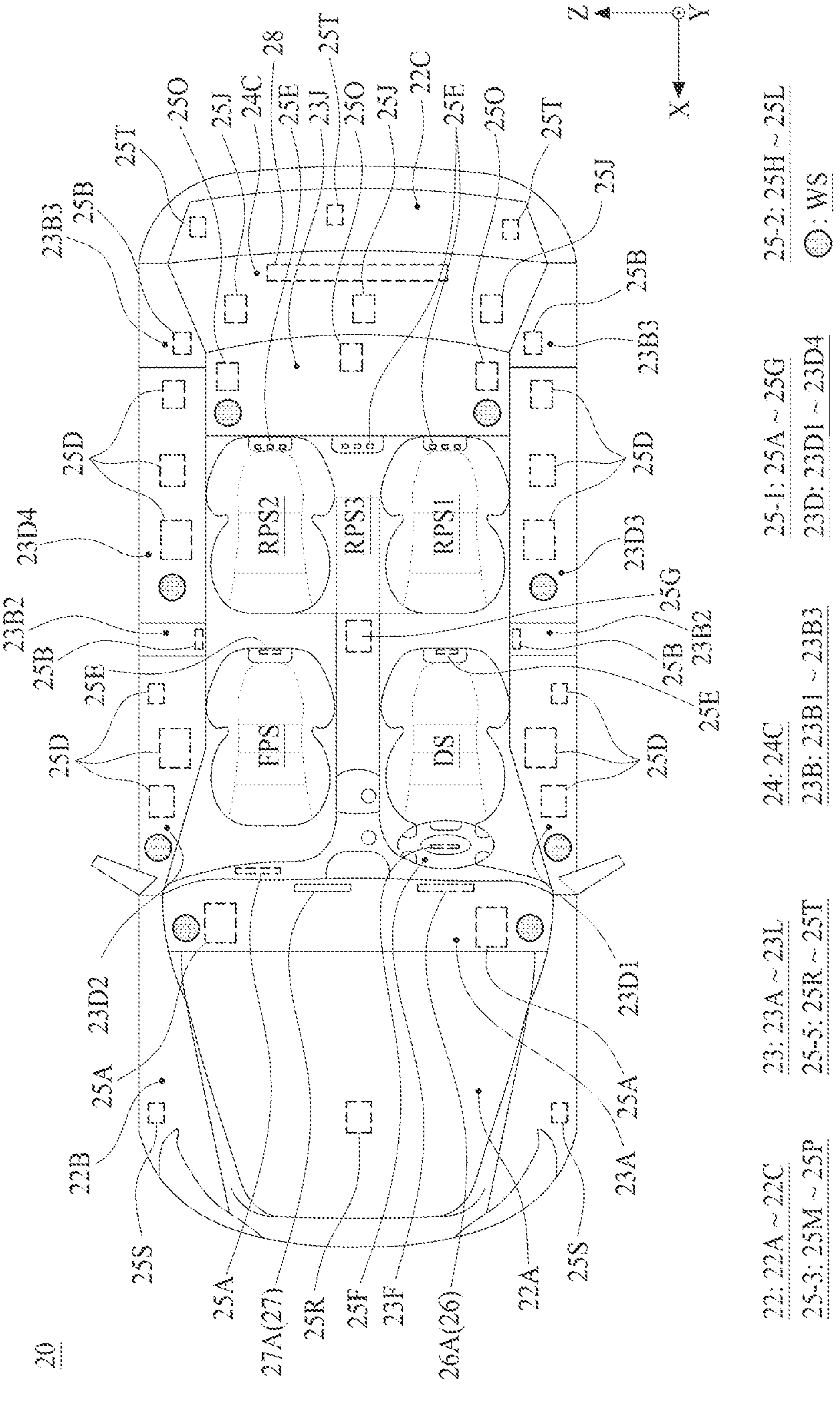
FIG. 59 a plan view illustrating an apparatus according to a thirteenth example embodiment of the present disclosure.
Figure 60:
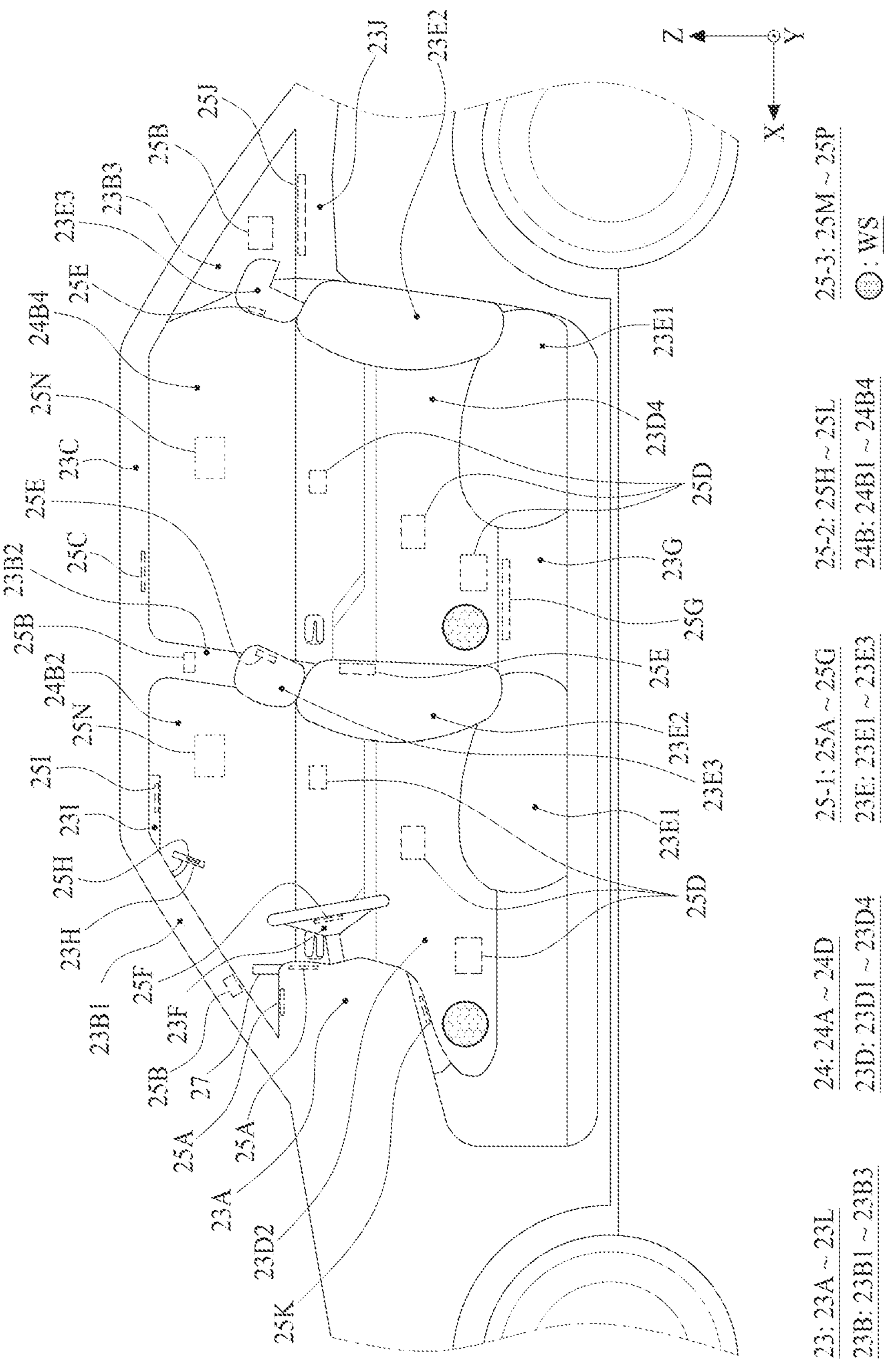
FIG. 60 is a cross-sectional view illustrating an apparatus according to a fourteenth example embodiment of the present disclosure.
Figure 61:
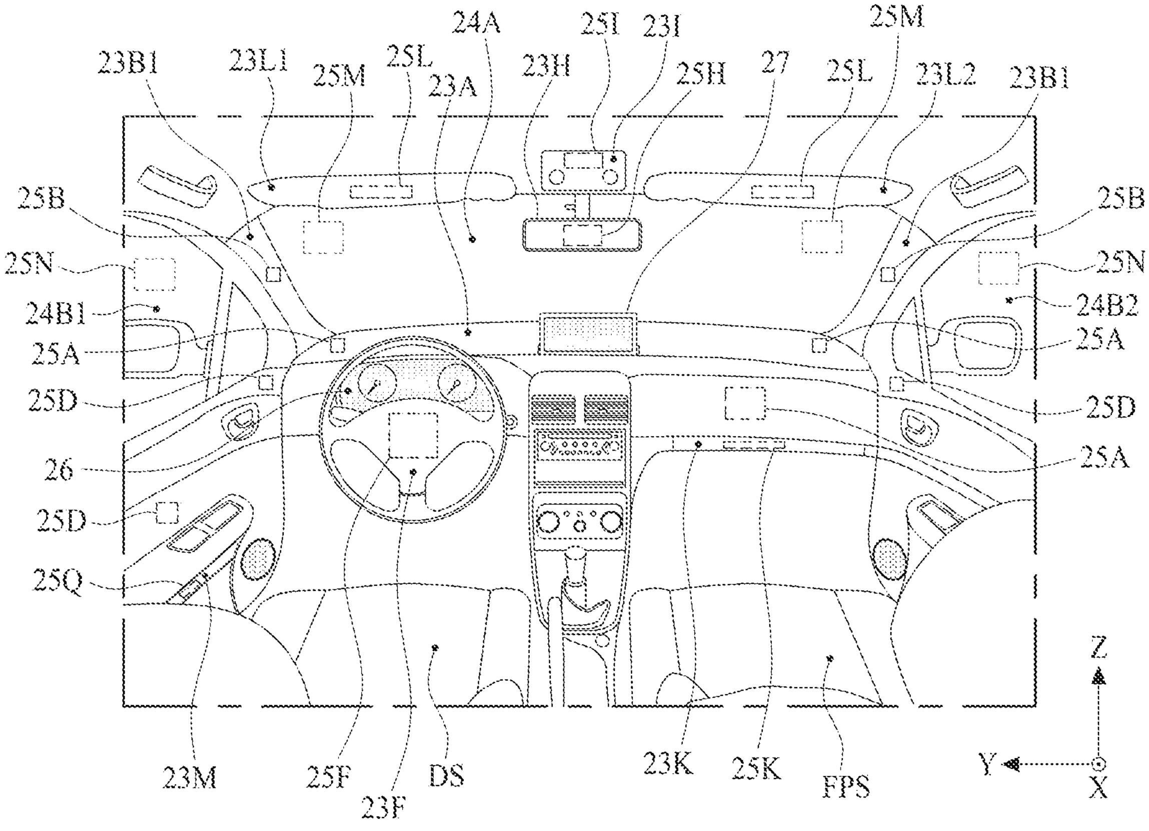
FIG. 61 illustrates an example of a sound generating apparatus disposed near a driver seat and a front passenger seat of FIGS. 59 and 60.
Figure 62:
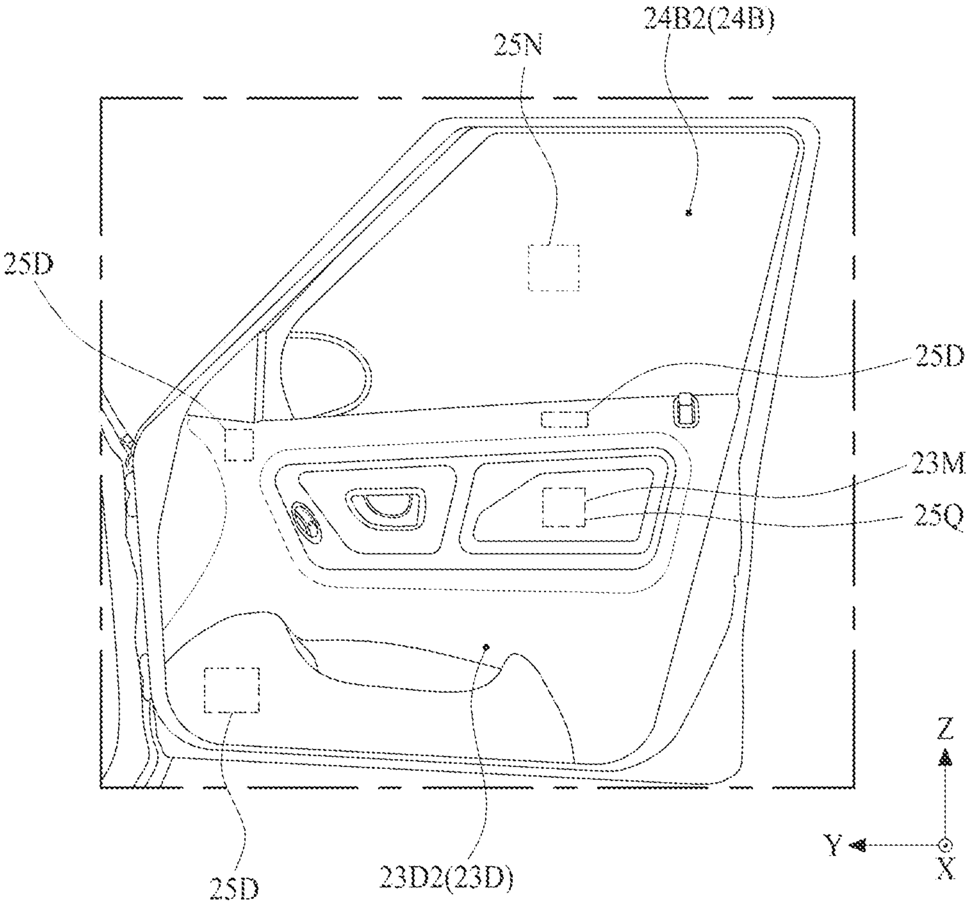
FIG. 62 illustrates an example of a sound generating apparatus disposed at a door and a glass window of FIGS. 59 and 60.
Figure 63:
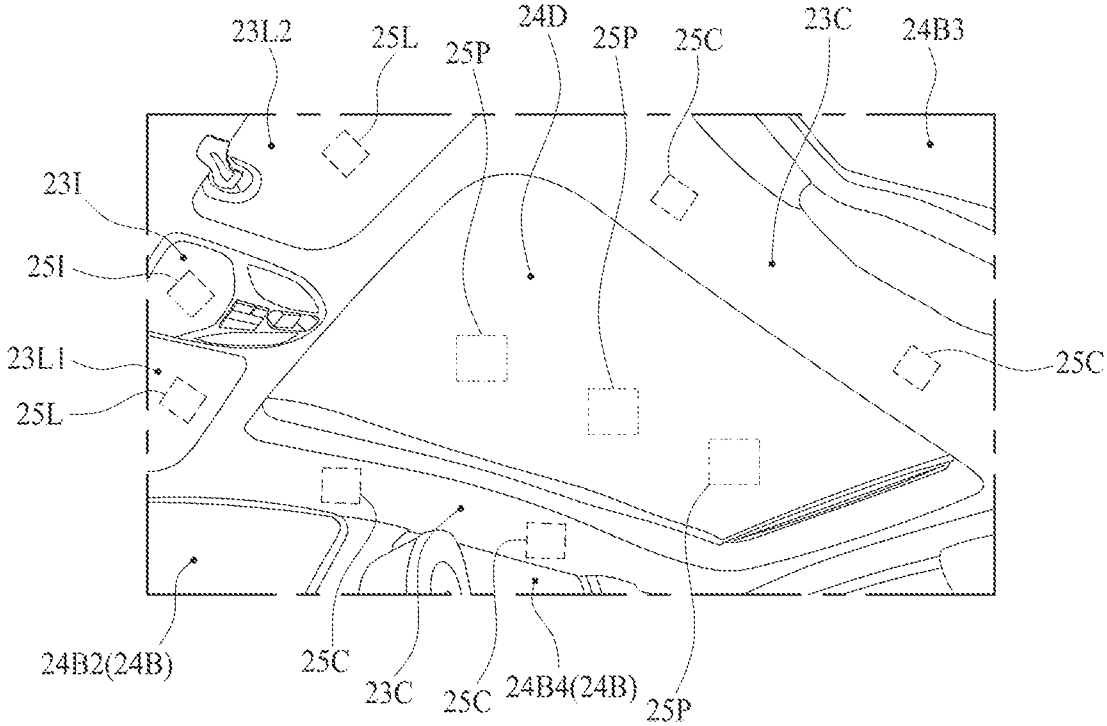
FIG. 63 illustrates an example of a sound generating apparatus disposed at a roof panel of FIGS. 59 and 60.
Figure 64:
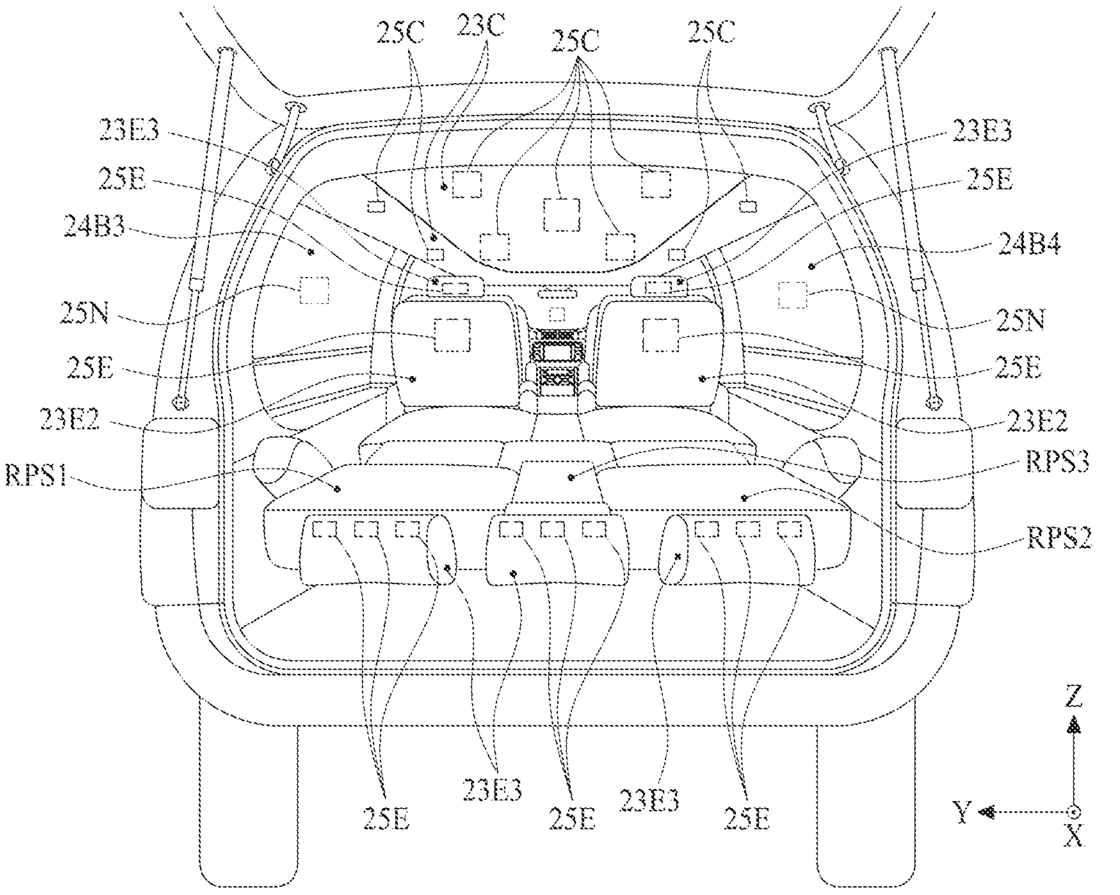
FIG. 64 illustrates an example of a sound generating apparatus disposed at a roof panel, a glass window, and a seat of FIGS. 59 and 60.

FIG. 59 a plan view illustrating an apparatus according to a thirteenth example embodiment of the present disclosure, and FIG. 60 is a cross-sectional view illustrating an apparatus according to a fourteenth example embodiment of the present disclosure. FIG. 61 illustrates an example of a sound generating apparatus disposed near a driver seat and a front passenger seat of FIGS. 59 and 60. FIG. 62 illustrates an example of a sound generating apparatus disposed at a door and a glass window of FIGS. 59 and 60. FIG. 63 illustrates an example of a sound generating apparatus disposed at a roof panel of FIGS. 59 and 60. FIG. 64 illustrates an example of a sound generating apparatus disposed at a roof panel, a glass window, and a seat of FIGS. 59 and 60.

With reference to FIGS. 59 to 64, the apparatus 20 according to the thirteenth example embodiment of the present disclosure may include or may be a vehicular apparatus which includes one or more seats and one or more glass windows. For example, the vehicular apparatus may include a vehicle, a train, a ship, or an aircraft, or the like, but embodiments of the present disclosure are not limited thereto.

The apparatus 20 according to the thirteenth example embodiment of the present disclosure may include a first sound generating apparatus 25-1 configured to output a sound between the main structure, the exterior material, and the interior material of the vehicular apparatus. For example, the first sound generating apparatus 25-1 may be disposed in a region between the main structure and the exterior material, a region between the main structure and the interior material, or a region between the exterior material and the interior material of the vehicular apparatus and may output a sound.

The first sound generating apparatus 25-1 may include at least one or more vibration generating devices 25A to 25G which are disposed between the main structure (or the exterior material) and one or more of a dashboard interior material 23A, a pillar interior material 23B, a roof interior material 23C, a door interior material 23D, a seat interior material 23E, a handle interior material 23F, and a floor interior material 23G. For example, the first sound generating apparatus 25-1 may include at least one or more of the first to seventh vibration generating devices 25A to 25G and may output sounds of one or more channels by the one or more vibration generating devices.

With reference to FIGS. 59 to 61, the first vibration generating device 25A according to an example embodiment of the present disclosure may be disposed between the dashboard 23A and a dash panel and may be configured to indirectly or directly vibrate the dashboard 23A to output a sound. For example, the first vibration generating device 25A may include the apparatus 9 and 10 according to the ninth example embodiment or the tenth example embodiment of the present disclosure described above with reference to FIGS. 46 to 56B, and thus, the repetitive description thereof may be omitted for brevity. For example, the first vibration generating device 25A may be referred to as the term such as a dashboard speaker or a first speaker, or the like, but embodiments of the present disclosure are not limited thereto.

According to an example embodiment of the present disclosure, at least one or more of the dash panel and the dashboard 23A may include a first region corresponding to a driver seat DS, a second region corresponding to a passenger seat FPS, and a third region (or a middle region) between the first region and the second region. At least one or more of the dash panel and the dashboard 23A may further include a fourth region which is inclined to face the passenger seat FPS.

According to an example embodiment of the present disclosure, the first vibration generating device 25A may be configured to vibrate at least one or more of the first to fourth regions of the dashboard 23A. For example, the first vibration generating device 25A may be disposed at each of the first and second regions of the dashboard 23A, or may be disposed at each of the first to fourth regions of the dashboard 23A. For example, the first vibration generating device 25A may be disposed at each of the first and second regions of the dashboard 23A, or may be disposed at at least one or more of the first to fourth regions of the dashboard 23A. For example, the first vibration generating device 25A may be configured to output a sound of about 150 Hz to about 20 kHz. For example, the first vibration generating device 25A configured to vibrate at least one or more of the first to fourth regions of the dashboard 23A may have the same sound output characteristic or different sound output characteristics. For example, the first vibration generating device 25A configured to vibrate each of the first to fourth regions of the dashboard 23A may have the same sound output characteristic or different sound output characteristics.

The second vibration generating device 25B according to an example embodiment of the present disclosure may be disposed between the pillar interior material 23B and a pillar panel and may be configured to indirectly or directly vibrate the pillar interior material 23B to output a sound. For example, the second vibration generating device 25B may include the apparatus 9 and 10 according to the ninth example embodiment or the tenth example embodiment of the present disclosure described above with reference to FIGS. 46 to 56B, and thus, the repetitive description thereof may be omitted for brevity. For example, the second vibration generating device 25B may be referred to as the term such as a pillar speaker, a tweeter speaker, or a second speaker, or the like, but embodiments of the present disclosure are not limited thereto.

According to an example embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 23B may include a first pillar interior material 23B1 covering the first pillar, a second pillar interior material 23B2 covering the second pillar, and a third pillar interior material 23B3 covering the third pillar.

According to an example embodiment of the present disclosure, the second vibration generating device 25B may be disposed in at least one or more of a region between the first pillar and the first pillar interior material 23B1, a region between the second pillar and the second pillar interior material 23B2, and a region between the third pillar and the third pillar interior material 23B3, and thus, may vibrate at least one or more of the first to third pillar interior materials 23B1 to 23B3. For example, the second vibration generating device 25B may be configured to output a sound at about 2 kHz to about 20 kHz, but embodiments of the present disclosure are not limited thereto. For example, the second vibration generating device 25B may be configured to output a sound at about 150 Hz to about 20 kHz. For example, the second vibration generating device 25B configured to vibrate at least one or more of the first to third pillar interior materials 23B1 to 23B3 may have the same sound output characteristic or different sound output characteristics.

With reference to FIGS. 60, 63, and 64, the third vibration generating device 25C according to an example embodiment of the present disclosure may be disposed between the roof interior material 23C and a roof panel and may be configured to indirectly or directly vibrate the pillar interior material 23B to output a sound. For example, the third vibration generating device 25C may include the apparatus 9 and 10 according to the ninth example embodiment or the tenth example embodiment of the present disclosure described above with reference to FIGS. 46 to 56B, and thus, the repetitive description thereof may be omitted for brevity. For example, the third vibration generating device 25C may be referred to as the term such as a roof speaker or a third speaker, or the like, but embodiments of the present disclosure are not limited thereto.

According to an example embodiment of the present disclosure, at least one or more of the roof panel and the roof interior material 23C covering the roof panel may include the first region corresponding to the driver seat DS, the second region corresponding to the passenger seat FPS, a third region corresponding to a region between the driver seat DS and the passenger seat FPS, a fourth region corresponding to a first rear seat RPS1 behind the driver seat DS, a fifth region corresponding to a second rear seat RPS2 behind the passenger seat FPS, a sixth region corresponding to a region between the first rear seat RPS1 and the second rear seat RPS2, and a seventh region between the third region and the sixth region.

According to an example embodiment of the present disclosure, the third vibration generating device 25C may be configured to vibrate at least one or more of the first to seventh regions of the roof interior material 23C. For example, the third vibration generating device 25C may be configured to output a sound of about 150 Hz to about 20 kHz. For example, the third vibration generating device 25C configured to vibrate at least one or more of the first to seventh regions of the roof interior material 23C may have the same sound output characteristic or different sound output characteristics. For example, the third vibration generating device 25C configured to vibrate each of the first to seventh regions of the roof interior material 23C may have the same sound output characteristic or different sound output characteristics. For example, at least one or more third vibration generating devices 25C configured to vibrate at least one or more of the first to seventh regions of the roof interior material 23C may be configured to output a sound of about 2 kHz to about 20 kHz, and the other third vibration generating devices 25C may be configured to output a sound at about 150 Hz to about 20 kHz. For example, at least one or more of third vibration generating devices 25C configured to vibrate each of the first to seventh regions of the roof interior material 23C may be configured to output a sound of about 2 kHz to about 20 kHz, and the other third vibration generating devices 25C may be configured to output a sound at about 150 Hz to about 20 kHz.

With reference to FIGS. 59 to 62, the fourth vibration generating device 25D according to an example embodiment of the present disclosure may be disposed between the door frame and the interior material 23D and may be configured to indirectly or directly vibrate the interior material 23D to output a sound. For example, the fourth vibration generating device 25D may include the apparatus 9 and 10 according to the ninth example embodiment or the tenth example embodiment of the present disclosure described above with reference to FIGS. 46 to 56B, and thus, the repetitive description thereof may be omitted for brevity. For example, the fourth vibration generating device 25D may be referred to as the term such as a door speaker or a fourth speaker, or the like, but embodiments of the present disclosure are not limited thereto.

According to an example embodiment of the present disclosure, at least one or more of the door frame and the door interior material 23D may include an upper region, a middle region, and a lower region with respect to a height direction Z of the apparatus 20. For example, the fourth vibration generating device 25D may be disposed at at least one or more of an upper region, a middle region, and a lower region between the door frame and the door interior material 23D, and thus, may vibrate at least one or more of an upper region, a middle region, and a lower region of the door interior material 23D.

According to an example embodiment of the present disclosure, the door frame may include a first door frame (or a left front door frame), a second door frame (or a right front door frame), a third door frame (or a left rear door frame), and a fourth door frame (or a right rear door frame). According to an example embodiment of the present disclosure, the door interior material 23D may include a first door interior material (or a left front door interior material) 23D1 covering the first door frame, a second door interior material (or a right front door interior material) 23D2 covering the second door frame, a third door interior material (or a left rear door interior material) 23D3 covering the third door frame, and a fourth door interior material (or a right rear door interior material) 23D4 covering the fourth door frame. For example, the fourth vibration generating device 25D may be disposed at at least one or more of an upper region, a middle region, and a lower region between each of the first to fourth door frames and the first to fourth door interior materials 23D1 to 23D4 and may vibrate at least one or more of an upper region, a middle region, and a lower region of each of the first to fourth door interior materials 23D1 to 23D4.

According to an example embodiment of the present disclosure, the fourth vibration generating device 25D configured to vibrate the upper region of each of the first to fourth door interior materials 23D1 to 23D4 may be configured to output a sound of about 2 kHz to about 20 kHz, or may be configured to output a sound of about 150 Hz to about 20 kHz. For example, the fourth vibration generating device 25D configured to vibrate the upper regions of at least one or more of the first to fourth door interior materials 23D1 to 23D4 may be configured to output a sound of about 2 kHz to about 20 kHz, or may be configured to output a sound of about 150 Hz to about 20 kHz.

According to an example embodiment of the present disclosure, the fourth vibration generating device 25D configured to vibrate the middle regions or/and the lower regions of at least one or more of the first to fourth door interior materials 23D1 to 23D4 may be configured to output a sound of about 150 Hz to about 20 kHz. For example, the fourth vibration generating device 25D configured to vibrate the middle region or/and the lower region of each of the first to fourth door interior materials 23D1 to 23D4 may be configured to output a sound of about 150 Hz to about 20 kHz. For example, the fourth vibration generating device 25D configured to vibrate the middle regions or/and the lower regions of at least one or more of the first to fourth door interior materials 23D1 to 23D4 may be one or more of a woofer, a mid-woofer, and a sub-woofer, but embodiments of the present disclosure are not limited thereto. For example, the fourth vibration generating device 25D configured to vibrate the middle region or/and the lower region of each of the first to fourth door interior materials 23D1 to 23D4 may be referred to as the term such as one or more of a woofer, a mid-woofer, and a sub-woofer, but embodiments of the present disclosure are not limited thereto.

Sounds, which are respectively output from the fourth vibration generating device 25D disposed at the first door interior material 23D1 and the fourth vibration generating device 25D disposed at the second door interior material 23D2, may be combined and output. For example, sounds, which are output from at least one or more of the fourth vibration generating device 25D disposed at the first door interior material 23D1 and the fourth vibration generating device 25D disposed at the second door interior material 23D2, may be combined and output. In addition, a sound output from the fourth vibration generating device 25D disposed at the third door interior material 23D3 and a sound output from the fourth vibration generating device 25D disposed at the fourth door interior material 23D4 may be combined and output.

According to an example embodiment of the present disclosure, an upper region of each of the first to fourth door interior materials 23D1 to 23D4 may include a first upper region adjacent to the dashboard 23A, a second upper region adjacent to the rear seats RPS1, RPS2, and RPS3, and a third upper region between the first upper region and the second upper region. For example, the fourth vibration generating device 25D may be disposed at one or more of the first to third upper regions of each of the first to fourth door interior materials 23D1 to 23D4.

According to an example embodiment of the present disclosure, the fourth vibration generating device 25D may be disposed at the first upper region of each of the first and second door interior materials 23D1 and 23D2 and may be disposed at one or more of the second and third upper regions of each of the first and second door interior materials 23D1 and 23D2. For example, the fourth vibration generating device 25D may be disposed at one or more of the first to third upper regions of one or more of the first to fourth door interior materials 23D1 to 23D4. For example, the fourth vibration generating device 25D configured to vibrate the first upper regions of one or more of the first and second door interior materials 23D1 and 23D2 may be configured to output a sound of about 2 kHz to about 20 kHz, and the fourth vibration generating device 25D configured to vibrate one or more of the second and third upper regions of each of the first and second door interior materials 23D1 and 23D2 may be configured to output a sound of about 2 kHz to about 20 kHz, or may be configured to output a sound of about 150 Hz to about 20 kHz. For example, the fourth vibration generating device 25D configured to vibrate one or more of the second and third upper regions of one or more of the first and second door interior materials 23D1 and 23D2 may be configured to output a sound of about 2 kHz to about 20 kHz, or may be configured to output a sound of about 150 Hz to about 20 kHz.

With reference to FIGS. 59, 60, and 64, the fifth vibration generating device 25E according to an example embodiment of the present disclosure may be disposed between a seat frame and the seat interior material 23E and may be configured to indirectly or directly vibrate the seat interior material 23E to output a sound. For example, the fifth vibration generating device 25E may include the apparatus 9 and 10 according to the ninth example embodiment or the tenth example embodiment of the present disclosure described above with reference to FIGS. 46 to 56B, and thus, the repetitive description thereof may be omitted for brevity. For example, the fifth vibration generating device 25E may be referred to as the term such as a sheet speaker, a headrest speaker, or a fifth speaker, or the like, but embodiments of the present disclosure are not limited thereto.

According to an example embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an example embodiment of the present disclosure, the seat interior material 23E may include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an example embodiment of the present disclosure, at least one or more of the first to fifth seat frames may include a seat bottom frame, a seat back frame, and a headrest frame. The seat interior material 23E may include a seat bottom interior material 23E1 surrounding the seat bottom frame, a seat back interior material 23E2 surrounding the seat back frame, and a headrest interior material 23E3 surrounding the headrest frame. At least one or more of the seat bottom interior material 23E1, the seat back interior material 23E2, and the headrest interior material 23E3 may include a seat inner interior material and a seat outer interior material. The seat inner interior material may include a foam layer. The seat outer interior material may include a surface layer including a fiber or leather. The outer seat interior material may further include a base layer including a plastic material which supports the surface layer.

According to an example embodiment of the present disclosure, the fifth vibration generating device 25E may be disposed at at least one or more of a region between the seat back frame and the seat back interior material 23E2 and a region between the headrest frame and the headrest interior material 23E3, and thus, may vibrate at least one or more of the seat outer interior material of the seat back interior material 23E2 and the seat outer interior material of the headrest interior material 23E3.

According to an example embodiment of the present disclosure, the fifth vibration generating device 25E disposed at at least one or more of the driver seat DS and the passenger seat FPS may be disposed at at least one or more of the region between the seat back frame and the seat back interior material 23E2 and the region between the headrest frame and the headrest interior material 23E3.

According to an example embodiment of the present disclosure, the fifth vibration generating device 25E disposed at at least one or more of the first to third rear seats RPS1, RPS2, and RPS3 may be disposed between the headrest frame and the headrest interior material 23E3. For example, at least one or more of the first to third rear seats RPS1, RPS2, and RPS3 may include at least one or more fifth vibration generating devices 25E disposed between the headrest frame and the headrest interior material 23E3.

According to an example embodiment of the present disclosure, the fifth vibration generating device 25E vibrating the seat back interior materials 23E2 of at least one or more of the driver seat DS and the passenger seat RPS may be configured to output a sound of about 150 Hz to about 20 kHz.

According to an example embodiment of the present disclosure, the fifth vibration generating device 25E vibrating the headrest interior materials 23E3 of at least one or more of the driver seat DS, the passenger seat FPS, and the first to third rear seats RPS1, RPS2, and RPS3 may be configured to output a sound of about 2 kHz to about 20 kHz, or may be configured to output a sound of about 150 Hz to about 20 kHz.

With reference to FIGS. 59 to 61, the sixth vibration generating device 25F according to an example embodiment of the present disclosure may be disposed between a handle frame and the handle interior material 23F and may be configured to indirectly or directly vibrate the handle interior material 23F to output a sound. For example, the sixth vibration generating device 25F may include the apparatus 9 and 10 according to the ninth example embodiment or the tenth example embodiment of the present disclosure described above with reference to FIGS. 46 to 56B, and thus, the repetitive description thereof may be omitted for brevity. For example, the sixth vibration generating device 25F may be referred to as the term such as a handle speaker, a steering speaker, or a sixth speaker, or the like, but embodiments of the present disclosure are not limited thereto.

According to an example embodiment of the present disclosure, the sixth vibration generating device 25F may be configured to indirectly or directly vibrate the handle interior material 23F to provide a driver with a sound. For example, a sound output by the sixth vibration generating device 25F may be a sound which is the same as or different from a sound output from each of the first to fifth vibration generating devices 25A to 25E. For example, a sound output by the sixth vibration generating device 25F may be a sound which is the same as or different from sounds output from at least one or more of the first to fifth vibration generating devices 25A to 25E.

In an example embodiment of the present disclosure, the sixth vibration generating device 25F may output a sound which is to be provided to only the driver. In another example embodiment of the present disclosure, the sound output by the sixth vibration generating device 25F and a sound output by each of the first to fifth vibration generating devices 25A to 25E may be combined and output. For example, the sound output by the sixth vibration generating device 25F and the sound output by at least one or more of the first to fifth vibration generating devices 25A to 25E may be combined and output.

With reference to FIGS. 59 and 60, the seventh vibration generating device 25G may be disposed between the floor panel and the floor interior material 23G and may be configured to indirectly or directly vibrate the floor internal material 23G to output a sound. The seventh vibration generating device 25G may be disposed between the floor interior material 23G and the floor panel disposed between the front seats DS and FPS and the third rear seat RPS3. For example, the seventh vibration generating device 25G may include the apparatus 9 and 10 according to the ninth example embodiment or the tenth example embodiment of the present disclosure described above with reference to FIGS. 46 to 56B, and thus, the repetitive description thereof may be omitted for brevity. For example, the seventh vibration generating device 25G may be configured to output a sound of about 150 Hz to about 20 kHz. For example, the seventh vibration generating device 25G may be referred to as the term such as a floor speaker, a bottom speaker, an under speaker, or a seventh speaker, or the like, but embodiments of the present disclosure are not limited thereto.

With reference to FIGS. 59 to 63, the apparatus 20 according to an example embodiment of the present disclosure may further include a second sound generating apparatus 25-2 which is disposed in the interior material exposed at an indoor space. For example, the apparatus 20 according to an example embodiment of the present disclosure may include only the second sound generating apparatus 25-2 instead of the first sound generating apparatus 25-1, or may include all of the first sound generating apparatus 25-1 and the second sound generating apparatus 25-2.

According to an example embodiment of the present disclosure, the interior material may further include a rear view mirror 23H, an overhead console 23I, a rear package interior material 23J, a glove box 23K, and a sun visor 23L, or the like.

The second sound generating apparatus 25-2 according to an example embodiment of the present disclosure may include at least one or more vibration generating devices 25H to 25L which are disposed at at least one of the rear view mirror 23H, the overhead console 23I, the rear package interior material 23J, the glove box 23K, and the sun visor 23L. For example, the second sound generating apparatus 25-2 may include at least one or more of eighth to twelfth sound generating devices 25H to 25L, and thus, may output sounds of one or more channels.

With reference to FIGS. 59 to 63, the eighth vibration generating device 25H may be disposed at the rear view mirror 23H and may be configured to indirectly or directly vibrate the rear view mirror 23H to output a sound. The eighth vibration generating device 25H may be disposed between a mirror housing connected to the main structure and the rear view mirror 23H supported by the mirror housing. For example, the eighth vibration generating device 25H may include the vibration generating device 50 described above with reference to FIG. 57, and thus, repetitive description thereof may be omitted for brevity. For example, the eighth vibration generating device 25H may be configured to output a sound of about 150 Hz to about 20 kHz. For example, the eighth vibration generating device 25H may be referred to as the term such as a mirror speaker or an eighth speaker, or the like, but embodiments of the present disclosure are not limited thereto.

With reference to FIGS. 60, 61, and 63, the ninth vibration generating device 25I may be disposed at the overhead console 23I and may be configured to indirectly or directly vibrate a console cover of the overhead console 23I to output a sound. According to an example embodiment of the present disclosure, the overhead console 23I may include a console box buried (or embedded) into the roof panel, a lighting device disposed at the console box, and a console cover covering the lighting device and the console box.

The ninth vibration generating device 25I may be disposed between the console box of the overhead console 23I and the console cover and may vibrate the console cover. For example, the ninth vibration generating device 25I may be disposed between the console box of the overhead console 23I and the console cover and may directly vibrate the console cover. For example, the ninth vibration generating device 25I may include the apparatus 9 and 10 according to the ninth example embodiment or the tenth example embodiment of the present disclosure described above with reference to FIGS. 46 to 56B, and thus, the repetitive description thereof may be omitted for brevity. For example, the ninth vibration generating device 25I may be configured to output a sound of about 150 Hz to about 20 kHz. For example, the ninth vibration generating device 25I may be referred to as the term such as a console speaker, a lighting speaker, or a ninth speaker, or the like, but embodiments of the present disclosure are not limited thereto.

The apparatus 20 according to the thirteenth example embodiment of the present disclosure may further include a center lighting box disposed at a center region of the roof interior material 23C, a center lighting device disposed at the center lighting box, and a center lighting cover covering the center lighting device. In this case, the ninth vibration generating device 25I may be further disposed between the center lighting box and the center lighting cover of the center lighting device and may additionally vibrate the center lighting cover.

With reference to FIGS. 59 and 60, the tenth vibration generating device 25J may be disposed at the rear package interior material 23J and may be configured to indirectly or directly vibrate the rear package interior material 23J to output a sound. The rear package interior material 23J may be disposed behind (or back portion) the first to third rear seats RPS1, RPS2, and RPS3. For example, a portion of the rear package interior material 23J may be disposed under a rear glass window 24C.

The tenth vibration generating device 25J may be disposed at a rear surface of the rear package interior material 23J and may vibrate the rear package interior material 23J. For example, the tenth vibration generating device 25J may directly vibrate the rear package interior material 23J. For example, the tenth vibration generating device 25J may include the apparatus 9 and 10 according to the ninth example embodiment or the tenth example embodiment of the present disclosure described above with reference to FIGS. 46 to 56B, and thus, the repetitive description thereof may be omitted for brevity. For example, the tenth vibration generating device 25J may be referred to as the term such as a rear speaker or a tenth speaker, or the like, but embodiments of the present disclosure are not limited thereto.

According to an example embodiment of the present disclosure, the rear package interior material 23J may include a first region corresponding to a rear portion of the first rear seat RPS1, a second region corresponding to a rear portion of the second rear seat RPS2, and a third region corresponding to a rear portion of the third passenger seat RPS3.

According to an example embodiment of the present disclosure, the tenth vibration generating device 25J may be disposed to vibrate at least one or more of the first to third regions of the rear package interior material 23J. For example, the tenth vibration generating device 25J may be disposed at each of the first and second regions of the rear package interior material 23J, or may be disposed at each of the first to third regions of the rear package interior material 23J. For example, the tenth vibration generating device 25J may be disposed at at least one or more of the first and second regions of the rear package interior material 23J, or may be disposed at at least one or more of the first to third regions of the rear package interior material 23J. For example, the tenth vibration generating device 25J may be configured to output a sound at about 150 Hz to about 20 kHz. For example, the tenth vibration generating device 25J configured to vibrate each of the first to third regions of the rear package interior material 23J may have the same sound output characteristic or different sound output characteristics. For example, the tenth vibration generating device 25J configured to vibrate at least one or more of the first to third regions of the rear package interior material 23J may have the same sound output characteristic or different sound output characteristics.

With reference to FIGS. 59 to 61, the eleventh vibration generating device 25K may be disposed at a glove box 23K and may be configured to indirectly or directly vibrate the glove box 23K to output a sound. The glove box 23K may be disposed at a dashboard 23A corresponding to a front portion of the passenger seat FPS.

The eleventh vibration generating device 25K may be disposed at an inner surface of the glove box 23K and may vibrate the glove box 23K. For example, the eleventh vibration generating device 25K may include the apparatus 9 and 10 according to the ninth example embodiment or the tenth example embodiment of the present disclosure described above with reference to FIGS. 46 to 56B, and thus, the repetitive description thereof may be omitted for brevity. For example, the eleventh vibration generating device 25K may be configured to output a sound of about 150 Hz to about 20 kHz, or may be one or more of a woofer, a mid-woofer, and a sub-woofer, but embodiments of the present disclosure are not limited thereto. For example, the eleventh vibration generating device 25K may be referred to as the term such as a glove box speaker or an eleventh speaker, or the like, but embodiments of the present disclosure are not limited thereto.

With reference to FIG. 61, the twelfth vibration generating device 25L may be disposed at the sun visor 23L and configured to indirectly or directly vibrate the sun visor 23L to output a sound. The sun visor 23L may include a first sun visor 23L1 corresponding to the driver seat DS and a second sun visor 23L2 corresponding to the passenger seat FPS.

The twelfth vibration generating device 25L may be disposed at at least one or more of the first sun visor 23L1 and the second sun visor 23L2 and may indirectly or directly vibrate at least one or more of the first sun visor 23L1 and the second sun visor 23L2. For example, the twelfth vibration generating device 25L may include the apparatus 9 and 10 according to the ninth example embodiment or the tenth example embodiment of the present disclosure described above with reference to FIGS. 46 to 56B, and thus, the repetitive description thereof may be omitted for brevity. For example, the twelfth vibration generating device 25L may be configured to output a sound of about 150 Hz to about 20 kHz. For example, the twelfth vibration generating device 25L may be referred to as the term such as a sun visor speaker or a twelfth speaker, or the like, but embodiments of the present disclosure are not limited thereto.

According to an example embodiment of the present disclosure, at least one or more of the first sun visor 23L1 and the second sun visor 23L2 may further include a sun visor mirror. In this case, the twelfth vibration generating device 25L may be configured to indirectly or directly vibrate a sun visor mirror of at least one or more of the first sun visor 23L1 and the second sun visor 23L2. The twelfth vibration generating device 25L vibrating the sun visor mirror may include the apparatus 9 and 10 according to the ninth example embodiment or the tenth example embodiment of the present disclosure described above with reference to FIGS. 46 to 56B, and thus, the repetitive description thereof may be omitted for brevity.

With reference to FIGS. 59 to 63, the apparatus 20 according to the thirteenth example embodiment of the present disclosure may further include a third sound generating apparatus 25-3 at the glass window. For example, the apparatus 20 according to the thirteenth example embodiment of the present disclosure may include the third sound generating apparatus 25-3 instead of at least one or more of the first and second sound generating apparatuses 25-1 and 25-2, or may include all of the first to third sound generating apparatuses 25-1, 25-2, and 25-3.

The third sound generating apparatus 25-3 may include at least one or more vibration generating devices 25M to 25P disposed at the glass window. For example, the third sound generating apparatus 25-3 may include at least one or more of thirteenth to sixteenth vibration generating devices 25M to 25P, and thus, may output sounds of one or more channels. For example, the third sound generating apparatus 25-3 may be referred to as the term such as a window speaker, a transparent sound generating apparatus, a transparent speaker, or an opaque speaker, or the like, but embodiments of the present disclosure are not limited thereto.

At least one or more of the thirteenth to sixteenth vibration generating devices 25M to 25P according to an example embodiment of the present disclosure may be configured to indirectly or directly vibrate the glass window. For example, at least one or more of the thirteenth to sixteenth vibration generating devices 25M to 25P may include the apparatus 9 and 10 according to the ninth example embodiment or the tenth example embodiment of the present disclosure described above with reference to FIGS. 46 to 56B, may be configured to be transparent, semitransparent, or opaque, and thus, their repetitive descriptions may be omitted for brevity.

According to an example embodiment of the present disclosure, the glass window may include a front glass window 24A, a side glass window 24B, and a rear glass window 24C. According to an example embodiment of the present disclosure, the glass window may further include a roof glass window 24D. For example, when the apparatus 20 according to the thirteenth example embodiment of the present disclosure includes the roof glass window 24D, a portion of a region of the roof frame and the roof interior material 23C may be replaced with the roof glass window 24D. For example, when the apparatus 20 according to the thirteenth example embodiment of the present disclosure includes the roof glass window 24D, the third vibration generating device 25C may be configured to indirectly or directly vibrate a periphery portion of the roof interior material 23C surrounding the roof glass window 24D.

With reference to FIGS. 59 to 61, the thirteenth vibration generating device 25M according to an example embodiment of the present disclosure may be disposed at the front glass window 24A and may be configured to output a sound by vibrating itself or may be configured to indirectly or directly vibrate the front glass window 24A to output a sound.

According to an example embodiment of the present disclosure, the front glass window 24A may include a first region corresponding to the driver seat DS, a second region corresponding to the passenger seat FPS, and a third region (or a middle region) between the first region and the second region.

According to an example embodiment of the present disclosure, the thirteenth vibration generating device 25M may be disposed at at least one or more of the first to third regions of the front glass window 24A. For example, the thirteenth vibration generating device 25M may be disposed at each of the first and second regions of the front glass window 24A, or may be disposed at each of the first to third regions of the front glass window 24A. For example, the thirteenth vibration generating device 25M may be disposed at at least one or more of the first and second regions of the front glass window 24A, or may be disposed at at least one or more of the first to third regions of the front glass window 24A. For example, the thirteenth vibration generating device 25M disposed in each of the first to third regions of the front glass window 24A may have the same sound output characteristic or different sound output characteristics. For example, the thirteenth vibration generating device 25M disposed at at least one or more of the first to third regions of the front glass window 24A may have the same sound output characteristic or different sound output characteristics. For example, the thirteenth vibration generating device 25M may be configured to output a sound of about 150 Hz to about 20 kHz. For example, the thirteenth vibration generating device 25M may be referred to as the term such as a front window speaker or a thirteenth speaker, or the like, but embodiments of the present disclosure are not limited thereto.

With reference to FIGS. 60 to 62 and 64, the fourteenth vibration generating device 25N according to an example embodiment of the present disclosure may be disposed at the side glass window 24B and may be configured to output a sound by vibrating itself or may be configured to indirectly or directly vibrate the side glass window 24B to output a sound.

According to an example embodiment of the present disclosure, the side glass window 24B may include a first side glass window (or a left front window) 24B1, a second side glass window (or a right front window) 24B2, a third side glass window (or a left rear window) 24B3, and a fourth side glass window (or a right rear window) 24B4.

According to an example embodiment of the present disclosure, the fourteenth vibration generating device 25N may be disposed at at least one or more of the first to fourth side glass windows 24B1 to 24B4. For example, at least one or more of the first to fourth side glass windows 23B1 to 24B4 may include at least one or more fourteenth sound generating devices 25N.

According to an example embodiment of the present disclosure, the fourteenth vibration generating device 25N may be disposed at at least one or more of the first to fourth side glass windows 24B1 to 24B4 and may be configured to output a sound by vibrating itself or may be configured to indirectly or directly vibrate a corresponding side glass window to output the sound S. For example, the fourteenth vibration generating device 25N may be configured to output a sound of about 150 Hz to about 20 kHz. For example, the fourteenth vibration generating device 25N disposed at at least one or more of the first to fourth side glass windows 24B1 to 24B4 may have the same sound output characteristic or different sound output characteristics. For example, the fourteenth vibration generating device 25N may be configured to output a sound of about 150 Hz to about 20 kHz. For example, the fourteenth vibration generating device 25N may be a side window speaker or a fourteenth speaker, or the like, but embodiments of the present disclosure are not limited thereto.

With reference to FIG. 59, the fifteenth vibration generating device 25O according to an example embodiment of the present disclosure may be disposed at the rear glass window 24C and may be configured to output a sound by vibrating itself or may be configured to indirectly or directly vibrate the rear glass window 24C to output a sound.

According to an example embodiment of the present disclosure, the rear glass window 24C may include a first region corresponding to a rear portion of the first rear seat RPS1, a second region corresponding to a rear portion of the second rear seat RPS2, and a third region corresponding to a rear portion of the third rear seat RPS3.

According to an example embodiment of the present disclosure, the fifteenth vibration generating device 25O may be disposed at each of first to third regions of the rear glass window 24C. For example, the fifteenth vibration generating device 25O may be disposed at at least one or more of the first to third regions of the rear glass window 24C. For example, the fifteenth vibration generating device 25O may be disposed at each of the first and second regions of the rear glass window 24C, or may be disposed at each of the first to third regions of the rear glass window 24C. For example, the fifteenth vibration generating device 25O may be disposed at at least one or more of the first and second regions of the rear glass window 24C, or may be disposed at at least one or more of the first to third regions of the rear glass window 24C. For example, the fifteenth vibration generating device 25O may be configured to output a sound of about 150 Hz to about 20 kHz. For example, the fifteenth vibration generating device 25O disposed at each of the first to third regions of the rear glass window 24C may have the same sound output characteristic or different sound output characteristics. For example, the fifteenth vibration generating device 25O disposed at at least one or more of the first to third regions of the rear glass window 24C may have the same sound output characteristic or different sound output characteristics. For example, the fifteenth vibration generating device 25O disposed at at least one or more of the first to third regions of the rear glass window 24C may be configured to output a sound of about 150 Hz to about 20 kHz, or may be one or more of a woofer, a mid-woofer, and a sub-woofer, or the like, but embodiments of the present disclosure are not limited thereto. For example, the fifteenth vibration generating device 25O may be referred to as the term such as a rear window speaker or a fifteenth speaker, or the like, but embodiments of the present disclosure are not limited thereto.

With reference to FIG. 63, the sixteenth vibration generating device 25P according to an example embodiment of the present disclosure may be disposed at the roof glass window 24D and may output a sound by vibrating itself or may be configured to indirectly or directly vibrate the roof glass window 24D to output a sound.

The roof glass window 24D according to an example embodiment of the present disclosure may be disposed over the front seats DS and FPS. For example, the sixteenth vibration generating device 25P may be disposed at a middle region of the roof glass window 24D. For example, the sixteenth vibration generating device 25P may be configured to output a sound of about 150 Hz to about 20 kHz. For example, the sixteenth vibration generating device 25P may be referred to as the term such as a roof window speaker or a sixteenth speaker, or the like, but embodiments of the present disclosure are not limited thereto.

According to another example embodiment of the present disclosure, the roof glass window 24D may be disposed on the front seats DS and FPS or may be disposed on the front seats DS and FPS and the rear seats RPS1, RPS2, and RPS3. For example, the roof glass window 24D may include a first region corresponding to the front seats DS and FPS and a second region corresponding to the rear seats RPS1, RPS2, and RPS3. In addition, the roof glass window 24D may include a third upper region between the first upper region and the second upper region.

According to another example embodiment of the present disclosure, the sixteenth vibration generating device 25P may be disposed at at least one or more of the first and second regions of the roof glass window 24D or may be disposed at at least one or more of the first to third regions of the roof glass window 24D. For example, the sixteenth vibration generating device 25P may be configured to output a sound of about 150 Hz to about 20 kHz. For example, the sixteenth vibration generating device 25P disposed at at least one or more of the first to third regions of the roof glass window 24D may have the same sound output characteristic or different sound output characteristics.

With reference to FIGS. 59 to 61, the apparatus 20 according to the thirteenth example embodiment of the present disclosure may further include a woofer speaker WS which is disposed at at least one or more of a dashboard 23A, a door frame, and a rear package interior material 23J.

The woofer speaker WS according to an example embodiment of the present disclosure may include at least one or more of a woofer, a mid-woofer, and a sub-woofer, but embodiments of the present disclosure are not limited thereto. For example, the woofer speaker WS may be referred to as the term such as a speaker or the like which outputs a sound of about 60 Hz to about 150 Hz, but embodiments of the present disclosure are not limited thereto. Therefore, the woofer speaker WS may output a sound of about 60 Hz to about 150 Hz, and thus, may enhance a low-pitched sound band characteristic of a sound which is output to an indoor space.

According to an example embodiment of the present disclosure, the woofer speaker WS may be disposed at at least one or more of first and second regions of the dashboard 23A. According to an example embodiment of the present disclosure, the woofer speaker WS may be disposed at each of first to fourth door frames of the door frame and may be exposed at a lower region among each of the first to fourth door interior materials 23D1 to 23D4 of the door interior material 23D.

According to an example embodiment of the present disclosure, the woofer speaker WS may be disposed at at least one or more of the first to fourth door frames of the door frame and may be exposed at the lower regions of at least one or more of the first to fourth door interior materials 23D1 to 23D4 of the door interior material 23D. According to another example embodiment of the present disclosure, the woofer speaker WS may be disposed at at least one or more of the first and second regions of the rear package interior material 23J. For example, the fourth vibration generating device 25D disposed at the lower region of each of the first to fourth door interior materials 23D1 to 23D4 may be replaced by the woofer speaker WS. For example, the fourth vibration generating device 25D disposed in the lower regions of at least one or more of the first to fourth door interior materials 23D1 to 23D4 may be replaced by the woofer speaker WS.

With reference to FIGS. 61 and 62, the vehicular apparatus according to the thirteenth example embodiment of the present disclosure may further include a garnish member 23M which covers a portion of the interior material exposed at the indoor space and a fourth sound generating apparatus 25-4 disposed at the interior material.

The garnish member 23M may be configured to cover a portion of the door interior material 23D exposed at an indoor space, but embodiments of the present disclosure are not limited thereto. For example, the garnish member 23M may be configured to cover a portion of one or more of the dashboard 23A, the filler interior material 23B, and the roof interior material 23C, which are exposed at the indoor space.

The garnish member 23M according to an example embodiment of the present disclosure may include a metal material or a nonmetal material (or a composite nonmetal material) having a material characteristic suitable for generating a sound based on a vibration. For example, the a metal material of the garnish member 23M may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 23M may include one or more of plastic, fiber, leather, wood, rubber, cloth, and paper, but embodiments of the present disclosure are not limited thereto. For example, the garnish member 23M may include a metal material having a material characteristic suitable for generating a sound of a high-pitched sound band, but embodiments of the present disclosure are not limited thereto. For example, the high-pitched sound band may have a frequency of 1 kHz or more or 3 kHz or more, but embodiments of the present disclosure are not limited thereto.

The fourth sound generating apparatus 25-4 may include a vibration generating apparatus 25Q disposed between the garnish member 23M and the interior material. For example, the fourth sound generating apparatus 25-4 may include a seventeenth vibration generating apparatus 25Q. For example, the fourth sound generating apparatus 25-4 or the seventeenth vibration generating apparatus 25Q may be referred to as the term such as a garnish speaker or a seventeenth speaker, or the like, but embodiments of the present disclosure are not limited thereto.

The seventeenth vibration generating apparatus 25Q may include the apparatus 9 and 10 according to the ninth example embodiment or the tenth example embodiment of the present disclosure described above with reference to FIGS. 46 to 56B, and thus, the repetitive description thereof may be omitted for brevity. The seventeenth vibration generating apparatus 25Q may be disposed between the interior material and the garnish member 23M and may be connected or coupled to the garnish member 230M through a coupling member.

The seventeenth vibration generating apparatus 25Q according to an example embodiment of the present disclosure may be configured to indirectly or directly vibrate the garnish member 23M to output a sound into the indoor space of the apparatus 20. For example, the seventeenth vibration generating apparatus 25Q may be configured to output a sound of a high-pitched sound band, but embodiments of the present disclosure are not limited thereto.

With reference to FIG. 61, the vehicular apparatus according to the thirteenth example embodiment of the present disclosure may further include a fifth sound generating apparatus 25-5 disposed at an inner surface of the exterior material.

The fifth sound generating apparatus 25-5 may include one or more vibration generating apparatuses 25R, 25S, and 25T disposed between the main structure and one or more of a hood panel 22A, a front fender panel 22B, and a trunk panel 22C. For example, the fifth sound generating apparatus 25-5 may include at least one or more of one or more eighteenth to twentieth vibration generating apparatuses 25R, 25S, and 25T, and thus, may output sounds of one or more channels.

The one or more eighteenth vibration generating apparatuses 25R according to an example embodiment of the present disclosure may be connected or coupled to an inner surface of the hood panel 22A and may indirectly or directly vibrate the hood panel 22A to output a sound into an outdoor space of the apparatus 20. For example, the one or more eighteenth vibration generating apparatuses 25R may be configured to be connected or coupled to one or more of a center portion and a periphery portion of the inner surface of the hood panel 22A.

The one or more eighteenth vibration generating apparatuses 25R according to an example embodiment of the present disclosure may include the apparatus 9 and 10 according to the ninth example embodiment or the tenth example embodiment of the present disclosure described above with reference to FIGS. 46 to 56B, and thus, the repetitive description thereof may be omitted for brevity.

The one or more eighteenth vibration generating apparatuses 25R may be connected or coupled to the inner surface of the hood panel 22A through a coupling member. For example, the one or more eighteenth vibration generating apparatuses 25R may be configured to output a sound of about 150 Hz to about 20 kHz. For example, the one or more eighteenth vibration generating apparatuses 25R may be referred to as the term such as a hood panel speaker or a eighteenth speaker, or the like, but embodiments of the present disclosure are not limited thereto.

The one or more nineteenth vibration generating apparatuses 25S according to an example embodiment of the present disclosure may be connected or coupled to an inner surface of the front fender panel 22B and may be configured to indirectly or directly vibrate the front fender panel 22B to output a sound to the outdoor space of the apparatus 20. For example, the one or more nineteenth vibration generating apparatuses 25S may be disposed to have a certain interval at the inner surface of the front fender panel 22B.

The one or more nineteenth vibration generating apparatuses 25S according to an example embodiment of the present disclosure may include the apparatus 9 and 10 according to the ninth example embodiment or the tenth example embodiment of the present disclosure described above with reference to FIGS. 46 to 56B, and thus, the repetitive description thereof may be omitted for brevity. The one or more nineteenth vibration generating apparatuses 25S may be connected or coupled to the inner surface of the front fender panel 22B through a coupling member. For example, the one or more nineteenth vibration generating apparatuses 25S may be configured to output a sound of about 150 Hz to about 20 kHz. For example, the one or more nineteenth vibration generating apparatuses 25S may be referred to as the term such as a fender panel speaker or a nineteenth speaker, or the like, but embodiments of the present disclosure are not limited thereto.

The one or more twentieth vibration generating apparatuses 25T according to an example embodiment of the present disclosure may be connected or coupled to an inner surface of the trunk panel 22C and may be configured to indirectly or directly vibrate the trunk panel 22C to output a sound to the outdoor space of the apparatus 20. For example, the one or more twentieth vibration generating apparatuses 25T may be configured to be connected or coupled to one or more of a center portion and a periphery portion of the trunk panel 22C.

The one or more twentieth vibration generating apparatuses 25T according to an example embodiment of the present disclosure may include the apparatus 9 and 10 according to the ninth example embodiment or the tenth example embodiment of the present disclosure described above with reference to FIGS. 46 to 56B, and thus, the repetitive description thereof may be omitted for brevity. The one or more twentieth vibration generating apparatuses 25T may be connected or coupled to the inner surface of the trunk panel 22C through a coupling member. For example, the one or more twentieth vibration generating apparatuses 25T may be configured to output a sound of about 150 Hz to about 20 kHz. For example, the one or more twentieth vibration generating apparatuses 25T may be referred to as the term such as a trunk panel speaker or a nineteenth speaker, or the like, but embodiments of the present disclosure are not limited thereto.

Additionally, the fifth sound generating apparatus 25-5 may further include one or more vibration generating apparatuses disposed between the main structure and at least one or more of the door inner panel and the door outer panel.

With reference to FIGS. 59 to 61, the apparatus 20 according to the thirteenth example embodiment of the present disclosure may further include an instrument panel apparatus 26 and an infotainment apparatus 27.

The instrument panel apparatus 26 according to an example embodiment of the present disclosure may be disposed in a first region of the dashboard 23A to face the driver seat DS. The instrument panel apparatus 26 may include a display (or a first display) 26A which is disposed in the first region of the dashboard 23A to face the driver seat DS.

The first display 26A may include any one of the apparatus 1 to 4 described above with reference to FIGS. 1 to 35D, and thus, the repetitive description thereof may be omitted for brevity. For example, the instrument panel apparatus 26 may output a sound, generated by a vibration of a vibration member (or a display panel) based on a vibration of one or more vibration apparatuses 500 included in the first display 26A, toward the driver seat DS. For example, the vibration apparatus 500 disposed in the first display 26A of the instrument panel apparatus 26 may be configured to output a sound of about 150 Hz to about 20 kHz.

The infotainment apparatus 27 may be disposed at a third region of the dashboard 23A.

The infotainment apparatus 27 according to an example embodiment of the present disclosure may be fixed on the third region of the dashboard 23A in an upright state.

According to another example embodiment of the present disclosure, the infotainment apparatus 27 may be installed to be raised and lowered at the third region of the dashboard 23A. For example, the infotainment apparatus 27 may be received or accommodated into the dashboard 23A based on the power turn-off of the apparatus 20 or the manipulation of a vehicle passenger and may protrude to a region on the dashboard 23A based on the power turn-on of the apparatus 20 or the manipulation of the vehicle passenger.

The infotainment apparatus 27 according to an example embodiment of the present disclosure may include a display (or a second display) 27A disposed in the third region of the dashboard 23A, and a display elevation device.

The second display 27A may include any one of the apparatus 1 to 4 described above with reference to FIGS. 1 to 35D, and thus, the repetitive description thereof may be omitted for brevity. For example, the infotainment apparatus 27 may output a sound, generated by a vibration of a vibration member (or a display panel) based on a vibration of one or more vibration apparatuses 500 included in the second display 27A toward the driver seat DS. For example, the one or more vibration apparatuses 500 disposed at the second display 27A of the infotainment apparatus 27 may be configured to output a sound of about 150 Hz to about 20 kHz.

The display elevation device may be disposed into the third region of the dashboard 23A and may support the second display 27A so as to be raised and lowered. For example, the display elevation device may raise the second display 27A based on the power turn-on of the apparatus 20 or the manipulation of the vehicle passenger, thereby allowing the second display 27A to protrude to a region on the dashboard 23A. In addition, the display elevation device may lower the second display 27A based on the power turn-off of the apparatus 20 or the manipulation of the vehicle passenger, thereby allowing the second display 27A to be received or accommodated into the dashboard 23A.

The apparatus 20 according to thirteenth example embodiment of the present disclosure may output a sound to one or more of the indoor space and the outdoor space through at least one or more of the first sound generating apparatus 25-1 disposed between the main structure and the interior material, the second sound generating apparatus 25-2 disposed at the interior material exposed at the indoor space, the third sound generating apparatus 25-3 disposed at the glass window, the fourth sound generating apparatus 25-4 disposed at the garnish member 23M, and the fifth sound generating apparatus 25-5 disposed at the exterior material, and thus, may output the sound by one or more of the exterior material and the interior material as a sound vibration plate, thereby outputting a multichannel surround stereo sound. In addition, the apparatus 20 according to the thirteenth example embodiment of the present disclosure may output a sound by, as a sound vibration plate, a display panel of at least one or more of the displays 26A and 27A of at least one or more of the instrument panel apparatus 26 and the infotainment apparatus 27 and may output a more realistic multi-channel surround stereo sound through each of the first to third sound generating apparatuses 25-1 to 25-3, the instrument panel apparatus 26, and the infotainment apparatus 27.

Additionally, With reference to FIG. 59, an apparatus 20 according to the thirteenth example embodiment of the present disclosure may further include a sound bar 28 disposed on a rear package interior material 23J. The sound bar 28 may be configured to output a sound in conjunction with the infotainment apparatus 27. The sound bar 28 may include any one of the apparatuses 20 according to the fifth to ninth example embodiments of the present disclosure described above with reference to FIGS. 36 to 45, and thus, the repetitive description thereof may be omitted for brevity.

Figure 65:
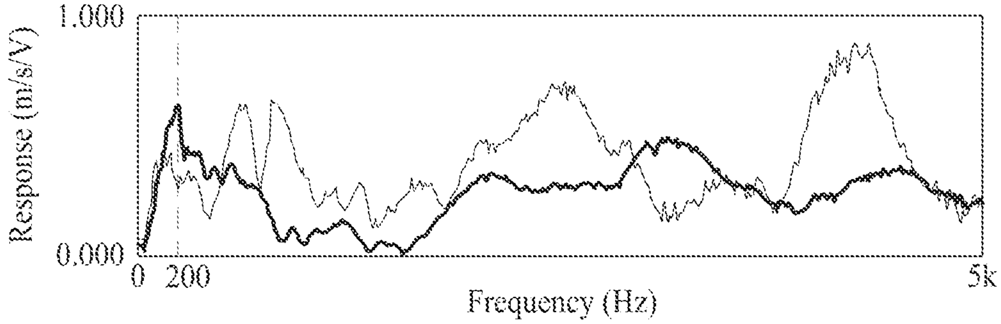
FIG. 65 illustrates a result obtained by comparing a peak response time of an apparatus according to an example embodiment of the present disclosure with a peak response time of an apparatus according to an experimental example.

FIG. 65 illustrates a result obtained by comparing a peak response time of an apparatus according to an example embodiment of the present disclosure with a peak response time of an apparatus according to an experimental example. In FIG. 65, the abscissa axis represents a frequency (Hz), and the ordinate axis represents a response time (m/s/V). A thick solid line of FIG. 65 represents a peak response time of an apparatus according to an example embodiment of the present disclosure where a vibration generating apparatus is provided at a curved portion of a supporting member, and a solid line represents a peak response time of an apparatus according to an experimental example where a vibration generating apparatus is provided at a flat portion of a supporting member.

A peak response time of an apparatus may be measured by a sound analysis apparatus. The sound analysis apparatus may be configured to include a sound card that may transmit or receive sound to or from a control personal computer (PC), an amplifier that may amplify a signal generated from the sound card and transfer the amplified signal to a vibration apparatus, and a microphone that may collect sound generated by an apparatus based on driving of the vibration apparatus. The sound collected through the microphone may be input to the control PC through the sound card, and a control program may check the input sound to analyze the peak response time of the apparatus.

A peak response time of an apparatus has been measured in an anechoic chamber, which is closed in all directions, and measurement equipment has used Audio Precision company's APX525 audio analyzer. When measuring, an applied frequency signal is applied as a sine sweep within a range of 20 Hz to 5 kHz, and ⅓ octave smoothing has been performed on a measurement result. A separation distance between an apparatus and the microphone is adjusted to be 50 cm. A measurement method is not limited thereto.

As seen in FIG. 65, comparing a thick solid line with a solid line, it may be seen that a peak response time is high in a band of 200 Hz. For example, comparing a peak response time of the thick solid line with a peak response time of the solid line, it may be seen that a peak response time is high by 10 times in a band of 200 Hz.

Therefore, according to an example embodiment of the present disclosure, because a vibration generating apparatus is provided at a curved portion of a supporting member, a response time in a low-pitched sound band may increase, thereby providing an apparatus including a vibration apparatus where a sound characteristic of the low-pitched sound band is enhanced.

Figure 66:
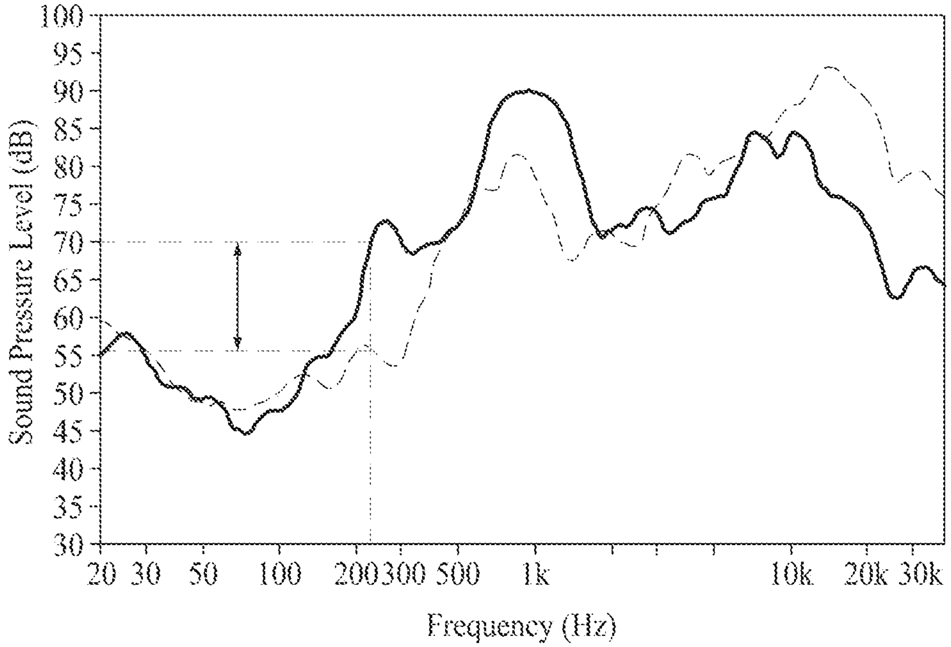
FIG. 66 illustrates a result obtained by comparing a sound output characteristic of an apparatus according to an example embodiment of the present disclosure with a sound output characteristic of an apparatus according to an experimental example.

FIG. 66 illustrates a result obtained by comparing a sound output characteristic of an apparatus according to an example embodiment of the present disclosure with a sound output characteristic of an apparatus according to an experimental example. In FIG. 66, the abscissa axis represents a frequency in hertz (Hz), and the ordinate axis represents a sound pressure level (SPL) in decibels (dB). A thick solid line of FIG. 66 represents a sound pressure level characteristic of an apparatus according to an example embodiment of the present disclosure where a vibration generating apparatus is provided at a curved portion of a supporting member, and a dotted line represents a sound pressure level characteristic of an apparatus according to an experimental example where a vibration generating apparatus is provided at a flat portion of a supporting member.

A sound pressure level characteristic may be measured by a sound analysis apparatus. The sound analysis apparatus may be configured to include a sound card that may transmit or receive sound to or from a control personal computer (PC), an amplifier that may amplify a signal generated from the sound card and transfer the amplified signal to a vibration apparatus, and a microphone that may collect sound generated by an apparatus based on driving of the vibration apparatus. The sound collected through the microphone may be input to the control PC through the sound card, and a control program may check the input sound to analyze the sound pressure level characteristic of the apparatus.

A peak response time of an apparatus has been measured in an anechoic chamber, which is closed in all directions, and measurement equipment has used Audio Precision company's APX525 audio analyzer. When measuring, an applied frequency signal is applied as a sine sweep within a range of 20 Hz to 40 kHz, and ⅓ octave smoothing has been performed on a measurement result. A separation distance between an apparatus and the microphone is adjusted to be 50 cm. A measurement method is not limited thereto.

As seen in FIG. 66, comparing a thick solid line with a solid line, it may be seen that a sound pressure level is high in a band of 200 Hz. For example, comparing a sound pressure level of the thick solid line with a sound pressure level of the solid line, it may be seen that a sound pressure level increases by 15 dB in a band of 200 Hz.

Therefore, according to an example embodiment of the present disclosure, because a vibration generating apparatus is provided at a curved portion of a supporting member, a sound pressure level in a low-pitched sound band may increase, thereby providing an apparatus including a vibration apparatus where a sound characteristic and/or sound pressure level of the low-pitched sound band are/is enhanced.

Figure 67:
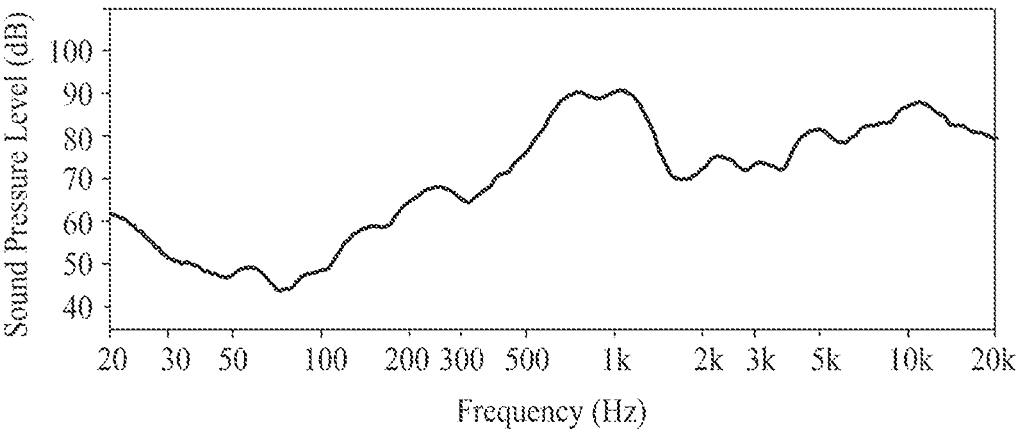
FIG. 67 illustrates a sound pressure level characteristic for each frequency in an apparatus according to an example embodiment of the present disclosure.

FIG. 67 illustrates a sound pressure level characteristic for each frequency in an apparatus according to an example embodiment of the present disclosure. In FIG. 67, the abscissa axis represents a frequency in hertz (Hz), and the ordinate axis represents a sound pressure level (SPL) in decibels (dB).

As seen in FIG. 67, it may be seen that an apparatus according to an example embodiment of the present disclosure has a sound pressure level of 60 dB or more in a frequency of 200 Hz or more. Accordingly, the apparatus according to an example embodiment of the present disclosure may output a sound having an enhanced sound pressure level of the low-pitched sound band by a vibration generating apparatus including a piezoelectric material where a sound characteristic of the high-pitched sound band is excellent.

Figure 68:
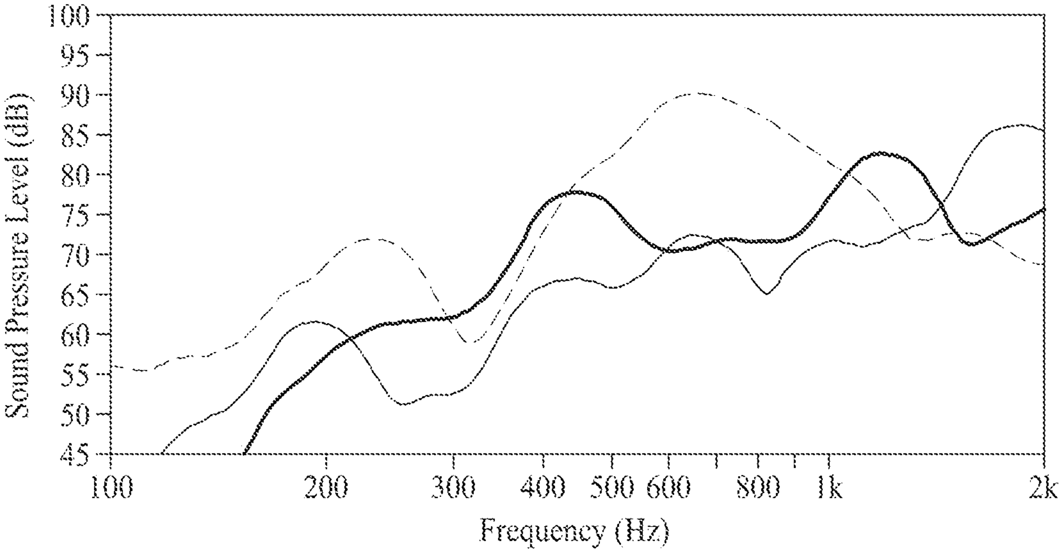
FIG. 68 illustrates a sound pressure level characteristic for each frequency in an apparatus according to an example embodiment of the present disclosure.

FIG. 68 illustrates a sound pressure level characteristic for each frequency in an apparatus according to an example embodiment of the present disclosure. In FIG. 68, the abscissa axis represents a frequency in hertz (Hz), and the ordinate axis represents a sound pressure level (SPL) in decibels (dB). In FIG. 68, a thick solid line represents a sound pressure level characteristic when a tension stress is applied to a vibration generating apparatus by a curved portion having a height of 1 cm (or a curvature height) in an X-axis direction in an embodiment of the present disclosure, a solid line represents a sound pressure level characteristic when a tension stress is applied to a vibration generating apparatus by a curved portion having a height of 2 cm in an X-axis direction in another example embodiment of the present disclosure, and a dotted line represents a sound pressure level characteristic of an experimental example where a tension stress is not applied to a vibration generating apparatus. The X-axis direction may be a direction parallel to a short side of a vibration generating apparatus.

As seen in FIG. 68, comparing each of a thick solid line and a solid line with a dotted line, it may be seen that a sound pressure level decreases at 200 Hz to 300 Hz and a sound pressure level increases at 1 kHz to 2 kHz.

Therefore, according to an example embodiment of the present disclosure, a height of a curved portion in an X-axis direction may be set, and thus, a peak and a dip in a desired pitched sound band may be improved. Accordingly, it may be checked that a sound is enhanced. The peak may be a phenomenon where a sound pressure level bounces in a specific frequency, and the dip may be a phenomenon where a low sound pressure level occurs because the occurrence of a sound having a specific frequency is restricted.

Figure 69:
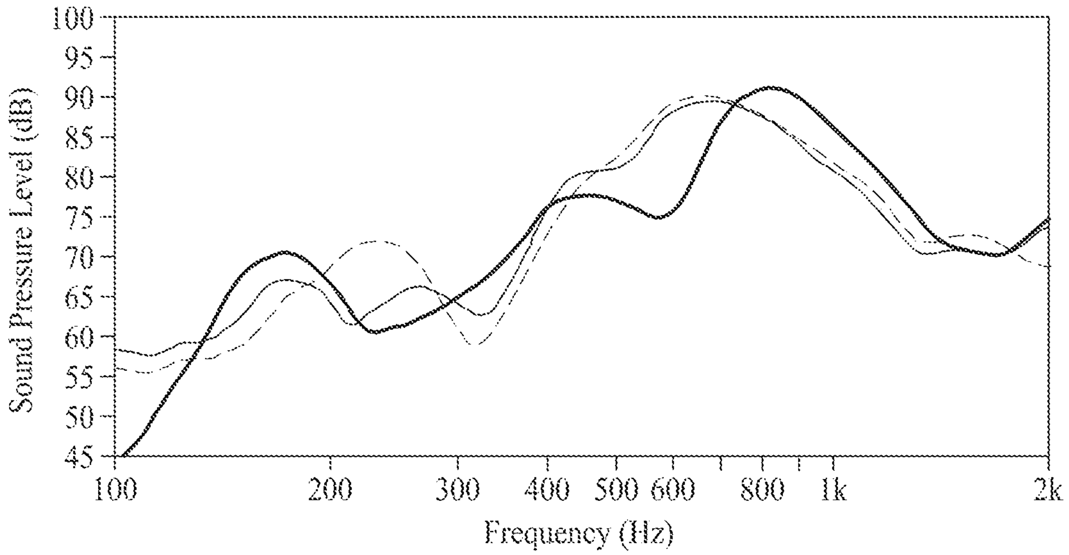
FIG. 69 illustrates a sound pressure level characteristic for each frequency in an apparatus according to an example embodiment of the present disclosure.

FIG. 69 illustrates a sound pressure level characteristic for each frequency in an apparatus according to an example embodiment of the present disclosure. In FIG. 69, the abscissa axis represents a frequency in hertz (Hz), and the ordinate axis represents a sound pressure level (SPL) in decibels (dB). In FIG. 69, a thick solid line represents a sound pressure level characteristic when a tension stress is applied to a vibration generating apparatus by a curved portion having a height of 0.5 cm in an X-axis direction in an embodiment of the present disclosure, a solid line represents a sound pressure level characteristic when a tension stress is applied to a vibration generating apparatus by a curved portion having a height of 0.25 cm in an X-axis direction in another example embodiment of the present disclosure, and a dotted line represents a sound pressure level characteristic of an experimental example where a tension stress is not applied to a vibration generating apparatus.

As seen in FIG. 69, comparing each of a thick solid line and a solid line with a dotted line, it may be seen that a sound pressure level increases at 200 Hz or less. In addition, it may be seen that a peak is formed near 250 Hz in the dotted line, a peak and a peak is formed near about 180 Hz in each of the thick solid line and the solid line.

Therefore, the apparatus according to an example embodiment of the present disclosure may output a sound of a pitched sound band which is broader than an experimental example and may output a sound having an enhanced sound pressure level characteristic of the low-pitched sound band.

Figure 70:
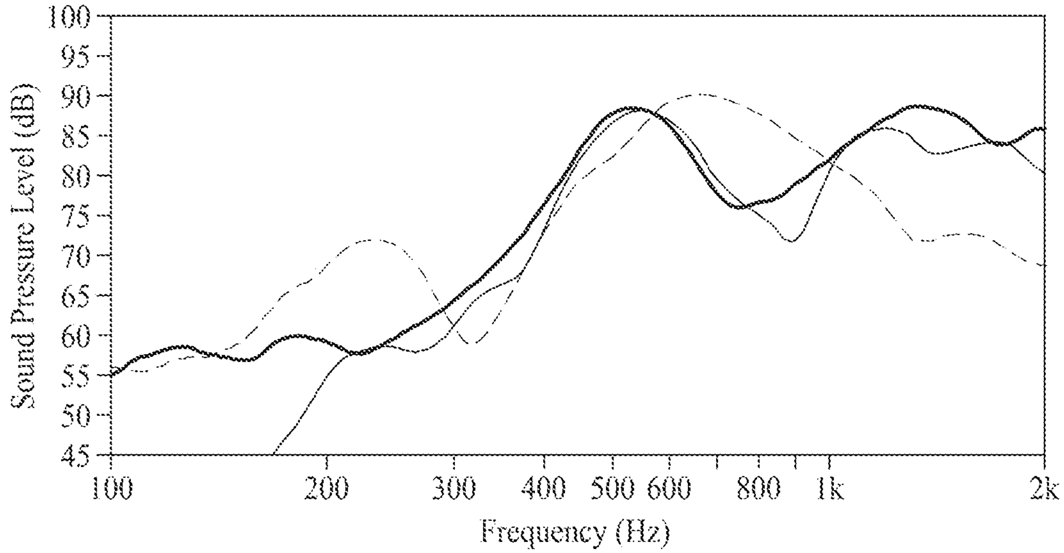
FIG. 70 illustrates a sound pressure level characteristic for each frequency in an apparatus according to an example embodiment of the present disclosure.

FIG. 70 illustrates a sound pressure level characteristic for each frequency in an apparatus according to an example embodiment of the present disclosure. In FIG. 70, the abscissa axis represents a frequency in hertz (Hz), and the ordinate axis represents a sound pressure level (SPL) in decibels (dB). In FIG. 70, a thick solid line represents a sound pressure level characteristic when a tension stress is applied to a vibration generating apparatus by a curved portion having a height of 0.5 cm (or a curvature height) in an Y-axis direction in an embodiment of the present disclosure, a solid line represents a sound pressure level characteristic when a tension stress is applied to a vibration generating apparatus by a curved portion having a height of 1 cm in an Y-axis direction in another example embodiment of the present disclosure, and a dotted line represents a sound pressure level characteristic of an experimental example where a tension stress is not applied to a vibration generating apparatus. The Y-axis direction may be a direction parallel to a long side of a vibration generating apparatus.

As seen in FIG. 70, comparing each of a thick solid line and a solid line with a dotted line, it may be seen that a sound pressure level decreases at 200 Hz to 300 Hz and a sound pressure level increases at 1 kHz to 2 kHz.

Therefore, according to an example embodiment of the present disclosure, a height of a curved portion in an Y-axis direction may be set, and thus, a peak and a dip in a desired pitched sound band may be improved. Accordingly, it may be checked that a sound is enhanced.

Figure 71:
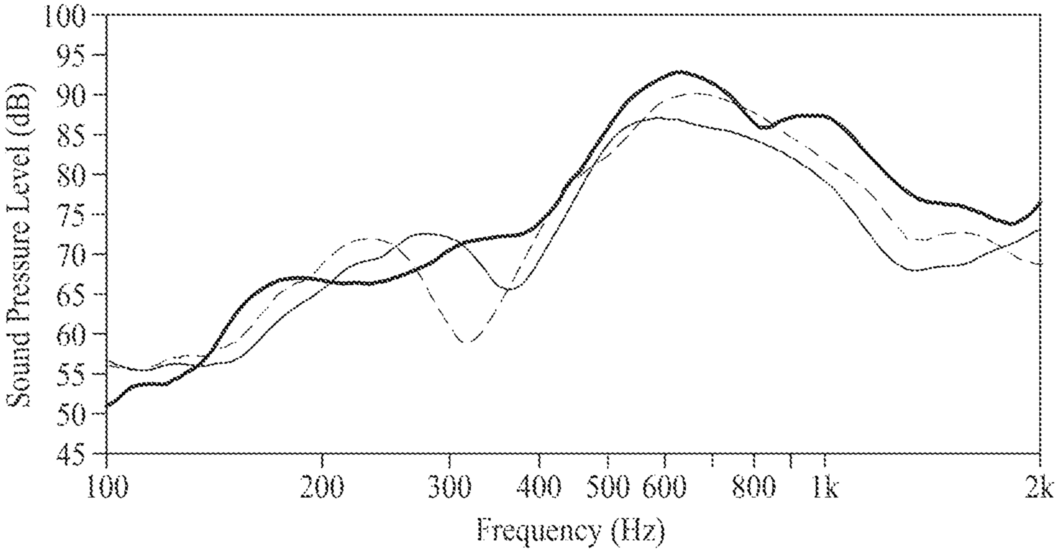
FIG. 71 illustrates a sound pressure level characteristic for each frequency in an apparatus according to an example embodiment of the present disclosure.

FIG. 71 illustrates a sound pressure level characteristic for each frequency in an apparatus according to an example embodiment of the present disclosure. In FIG. 71, the abscissa axis represents a frequency in hertz (Hz), and the ordinate axis represents a sound pressure level (SPL) in decibels (dB). In FIG. 71, a thick solid line represents a sound pressure level characteristic when a tension stress is applied to a vibration generating apparatus by a curved portion having a height of 0.5 cm in an Y-axis direction in an embodiment of the present disclosure, a solid line represents a sound pressure level characteristic when a tension stress is applied to a vibration generating apparatus by a curved portion having a height of 0.25 cm in an Y-axis direction in another example embodiment of the present disclosure, and a dotted line represents a sound pressure level characteristic of an experimental example where a tension stress is not applied to a vibration generating apparatus.

As seen in FIG. 71, comparing each of a thick solid line and a solid line with a dotted line, it may be seen that a sound pressure level increases at 300 Hz. For example, comparing each of the thick solid line and the solid line with the dotted line, it may be seen that dip occurs due to a reduction in sound pressure level at 300 Hz.

Therefore, according to an example embodiment of the present disclosure, a height of a curved portion in an Y-axis direction may be set, and thus, a peak and a dip in a desired pitched sound band may be improved. Accordingly, it may be checked that a sound is enhanced.

Figure 72:
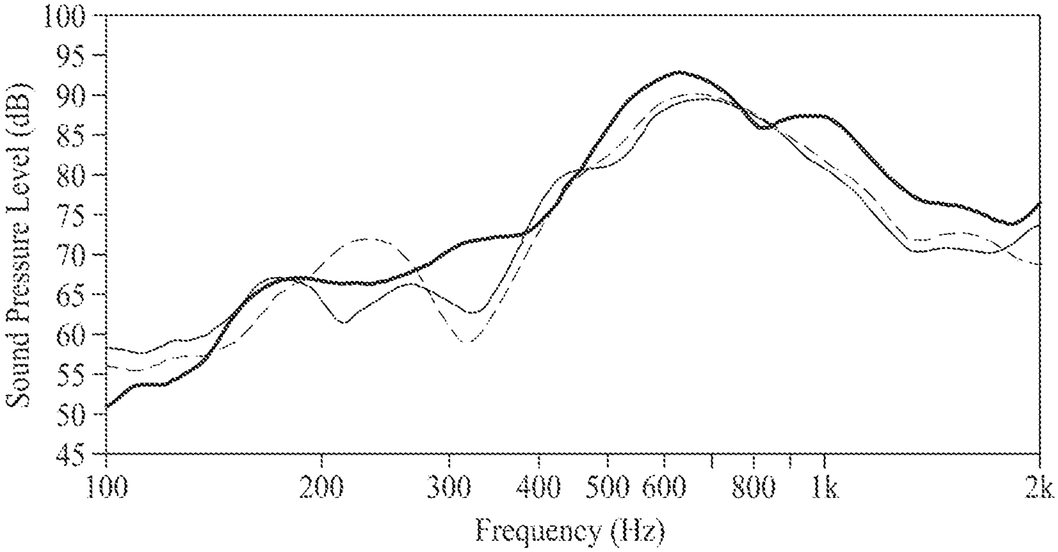
FIG. 72 illustrates a sound pressure level characteristic for each frequency in an apparatus according to an example embodiment of the present disclosure.

FIG. 72 illustrates a sound pressure level characteristic for each frequency in an apparatus according to an example embodiment of the present disclosure. In FIG. 72, the abscissa axis represents a frequency in hertz (Hz), and the ordinate axis represents a sound pressure level (SPL) in decibels (dB). In FIG. 72, a thick solid line represents a sound pressure level characteristic when a tension stress is applied to a vibration generating apparatus by a curved portion having a height of 0.25 cm in an X-axis direction in an embodiment of the present disclosure, a solid line represents a sound pressure level characteristic when a tension stress is applied to a vibration generating apparatus by a curved portion having a height of 0.5 cm in an Y-axis direction in another example embodiment of the present disclosure, and a dotted line represents a sound pressure level characteristic of an experimental example where a tension stress is not applied to a vibration generating apparatus.

As seen in FIG. 72, it may be seen that a sound pressure level characteristic is higher in a case, where a height of a curved portion is formed in a Y-axis direction parallel to a long-side direction of a vibration generating apparatus, than a case where the height of the curved portion is formed in an X-axis direction parallel to a short-side direction of the vibration generating apparatus.

Therefore, in the apparatus according to an example embodiment of the present disclosure, a curvature height and a curvature direction of a curved portion may be set in a vibration generating apparatus including a piezoelectric material where a sound characteristic of the high-pitched sound band is excellent, and thus, a peak and dip may be improved in a desired pitched sound band, whereby a sound having an enhanced sound characteristic and/or sound pressure level characteristic may be output.

An apparatus according to example embodiments of the present disclosure will be described below.

An apparatus according to an example embodiment of the present disclosure may include a vibration member, a supporting member at a rear surface of the vibration member, and a vibration apparatus at the supporting member and including a curved shape.

According to some example embodiments of the present disclosure, the supporting member may include a rear portion at the rear surface of the vibration member, the rear portion including a curved portion having a curved shape, and a lateral portion connected to a periphery of the rear portion and configured to support the vibration member.

According to some example embodiments of the present disclosure, the vibration apparatus may include a vibration generator, a connection member between the curved portion and the vibration generator, and a pad part attached on one surface of the vibration generator.

According to some example embodiments of the present disclosure, the pad part may include a material having stiffness which is smaller than a bending stiffness of the vibration generator or an elastic material.

According to some example embodiments of the present disclosure, the pad part may be attached on a center portion of the one surface of the vibration generator.

According to some example embodiments of the present disclosure, the vibration apparatus may comprise a vibration generator, the vibration generator may comprise a vibration layer, and the vibration layer may include a plurality of first portions and a plurality of second portions between the plurality of first portions.

According to some example embodiments of the present disclosure, each of the plurality of first portions may include an inorganic material and each of the plurality of second portions may include an organic material.

According to some example embodiments of the present disclosure, each of the plurality of first portions may have a different size.

According to some example embodiments of the present disclosure, the vibration apparatus may include a film-type vibration apparatus.

According to some example embodiments of the present disclosure, the supporting member may include a curved portion including a curved surface, and the vibration apparatus may be disposed at the curved portion and may be bent in a curved shape by a curved surface of the curved portion.

According to some example embodiments of the present disclosure, the supporting member may include a rear portion at the rear surface of the vibration member, the rear portion including the curved portion, and a lateral portion connected to a periphery of the rear portion and configured to support the vibration member.

According to some example embodiments of the present disclosure, the curved portion may protrude convexly toward the rear surface of the supporting member from the rear portion.

According to some example embodiments of the present disclosure, the apparatus may further include a gap space between the curved portion of the supporting member and the vibration member.

According to some example embodiments of the present disclosure, the vibration apparatus may include a vibration generator, and a connection member between the curved portion and the vibration generator.

According to some example embodiments of the present disclosure, the vibration generator may include a vibration layer including a piezoelectric material, a first electrode layer at a first surface of the vibration layer, and a second electrode layer at a second surface different from the first surface of the vibration layer.

According to some example embodiments of the present disclosure, the vibration generator may include a vibration layer including a plurality of inorganic material portions and a plurality of organic material portions between the plurality of inorganic material portions, a first electrode layer at a first surface of the vibration layer, and a second electrode layer at a second surface different from the first surface of the vibration layer.

According to some example embodiments of the present disclosure, the vibration apparatus may further include a plate between the curved portion and the connection member.

According to some example embodiments of the present disclosure, the apparatus may further include one or more holes at the curved portion.

According to some example embodiments of the present disclosure, a distance between a center portion of the vibration apparatus and the vibration member may differ from a distance between a periphery portion of the vibration apparatus and the vibration member.

According to some example embodiments of the present disclosure, the supporting member may include a curved portion including a curved surface and one or more holes at the curved portion, and the vibration apparatus may include a plate configured to cover the one or more holes, a vibration generator at a rear surface of the plate, and a connection member between the plate and the vibration generator.

According to some example embodiments of the present disclosure, the plate may include one or more of metal, plastic, paper, wood, rubber, fiber, cloth, and leather.

According to some example embodiments of the present disclosure, the vibration apparatus may further include a mass member at a rear surface of the vibration generator.

According to some example embodiments of the present disclosure, the vibration apparatus may be disposed between the rear surface of the vibration member and the supporting member.

According to some example embodiments of the present disclosure, the supporting member may include a rear portion at a rear surface of the vibration member, a protrusion portion protruding toward a rear surface of the rear portion from the rear portion, a curved portion protruding convexly toward the rear surface of the vibration member from the protrusion portion, and a lateral portion connected to a periphery of the rear portion and configured to support the vibration member, and the vibration apparatus may be disposed at the curved portion and faces the rear surface of the vibration member.

According to some example embodiments of the present disclosure, the vibration member may include one or more of a display panel including a pixel configured to display an image, a screen panel on which an image is to be projected from a display apparatus, a light emitting diode lighting panel, an organic light emitting lighting panel, an inorganic light emitting lighting panel, and a signage panel, or may include one or more of metal, wood, rubber, plastic, glass, fiber, cloth, paper, mirror, and leather.

According to some example embodiments of the present disclosure, the vibration member may include a display panel including a pixel configured to display an image, and a guide member supported by the supporting member and configured to support a rear periphery portion of the display panel, and the display panel may be configured to vibrate based on a vibration of the vibration apparatus to output a sound.

According to some example embodiments of the present disclosure, the display panel may be any one of a liquid crystal display panel, a light emitting display panel, an electrophoresis display panel, a micro light emitting diode display panel, an electro-wetting display panel, and a quantum dot light emitting display panel.

According to some example embodiments of the present disclosure, the vibration member may further include a backlight between the display panel and the supporting member, the vibration apparatus may be configured to vibrate the backlight, and the display panel may be configured to vibrate based on a vibration of the backlight to output a sound.

An apparatus according to an example embodiment of the present disclosure may include a supporting member including a curved portion, and a vibration apparatus at the curved portion.

According to some example embodiments of the present disclosure, the vibration apparatus may include a film-type vibration apparatus.

According to some example embodiments of the present disclosure, the vibration apparatus may include a vibration generator, and a connection member between the curved portion and the vibration generator.

According to some example embodiments of the present disclosure, the vibration generator may include a vibration layer including a piezoelectric material, a first electrode layer at a first surface of the vibration layer, and a second electrode layer at a second surface different from the first surface of the vibration layer.

According to some example embodiments of the present disclosure, the vibration generator may include a vibration layer including a plurality of inorganic material portions and a plurality of organic material portions between the plurality of inorganic material portions, a first electrode layer at a first surface of the vibration layer, and a second electrode layer at a second surface different from the first surface of the vibration layer.

According to some example embodiments of the present disclosure, the supporting member may include a base plate, and the curved portion may protrude convexly from the base plate.

According to some example embodiments of the present disclosure, the supporting member may further include one or more holes at the curved portion, and the vibration apparatus may be disposed at the curved portion and configured to cover the one or more holes.

According to some example embodiments of the present disclosure, the apparatus may further include an enclosure at a rear surface of the base plate and configured to cover the vibration apparatus at the curved portion.

According to some example embodiments of the present disclosure, the supporting member may include a base plate, and a protrusion portion protruding toward a rear surface of the base plate from the base plate, and the curved portion may protrude convexly in a forward direction of the base plate from the protrusion portion.

According to some example embodiments of the present disclosure, the supporting member may further include one or more holes at the curved portion, and the vibration apparatus may be disposed at the curved portion and configured to cover the one or more holes.

An apparatus according to an example embodiment of the present disclosure, a passive vibration member, and a vibration generating apparatus connected to the passive vibration member and configured to vibrate the passive vibration member, the vibration generating apparatus may include a supporting member including a curved portion, and a vibration apparatus at the curved portion.

According to some example embodiments of the present disclosure, the passive vibration member may include a material comprising one or more of metal, plastic, paper, fiber, wood, rubber, cloth, leather, glass, and mirror.

According to some example embodiments of the present disclosure, the passive vibration member may include one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

According to some example embodiments of the present disclosure, the passive vibration member may be a vehicle interior material, the vehicle interior material may include one or more of a dashboard, a pillar interior material, a roof interior material, a door interior material, a seat interior material, a handle interior material, a floor interior material, a rear package interior material, a rear view mirror, an overhead console, a glove box, and a sun visor; and the vibration generating apparatus may be configured to vibrate at least one or more of the dashboard, the pillar interior material, the roof interior material, the door interior material, the seat interior material, the handle interior material, the floor interior material, the rear package interior material, the rear view mirror, the overhead console, the glove box, and the sun visor.

An apparatus according to an example embodiment of the present disclosure may include a vibration member, a supporting member at a rear surface of the vibration member and including a plurality of curved portions, and a plurality of vibration apparatus each disposed at the plurality of curved portion of the supporting member and having a curved shape.

According to some example embodiments of the present disclosure, the plurality of curved portions may include a first curved portion and a second curved portion, the plurality of vibration apparatus may include a first vibration apparatus and a second vibration apparatus, and the first vibration apparatus may be attached on the first curved portion, and the second vibration apparatus may be attached on the second curved portion.

According to some example embodiments of the present disclosure, the supporting member may further include a rear portion, and the first curved portion and the second curved portion may each protrude from the rear portion to have different curvatures or same curvature.

According to some example embodiments of the present disclosure, a size of the first curved portion may be different from or the same as a size of the second curved portion.

According to some example embodiments of the present disclosure, the apparatus may further include one or more holes or slits disposed at one or more of the first curved portion and the second curved portion.

According to some example embodiments of the present disclosure, the supporting member may further include a reinforcement portion at a center portion of the rear portion.

According to some example embodiments of the present disclosure, the supporting member may further include a reinforcement portion at a center portion of the rear portion.

A vibration generating apparatus according to an example embodiment of the present disclosure may be applied to a vibration generating apparatus disposed at an apparatus. The apparatus according to an example embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the vibration generating apparatus according to some example embodiments of the present disclosure may be applied to organic light-emitting lighting apparatuses or inorganic light-emitting lighting apparatuses. When the vibration generating apparatus of an embodiment of the present disclosure is applied to lighting apparatuses, the vibration generating apparatus may act as lighting and a speaker. In addition, when the vibration apparatus according to some example embodiments of the present disclosure is applied to a mobile device, or the like, the vibration generating apparatus may be one or more of a speaker, a receiver, and a haptic device, but embodiments of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure provided they come within the scope of the appended claims and their equivalents.

What is claimed is:

1. An apparatus, comprising:

a vibration member;

a supporting member at a rear surface of the vibration member; and a vibration apparatus at the supporting member and including a curved shape, wherein the supporting member includes:

a first surface facing the vibration apparatus; and a second surface opposite the first surface, wherein the second surface includes a curved surface, wherein the supporting member further includes a curved portion including the second surface, wherein a gap space is disposed between a center of the curved portion of the supporting member and the rear surface of the vibration member, wherein the vibration apparatus is disposed in non-contact with the rear surface of the vibration member by the gap space, wherein the curved portion vibrates together with a vibration of the vibration apparatus, and wherein the vibration member vibrates based on receiving a sound wave generated in the gap space according to the vibration of the vibration apparatus.

2. The apparatus of claim 1, wherein the vibration apparatus comprises a piezoelectric material.

3. The apparatus of claim 1, wherein the vibration apparatus is disposed at the curved portion and is bent in the curved shape by the curved surface of the curved portion.

4. The apparatus of claim 3, wherein the supporting member comprises:

a rear portion at the rear surface of the vibration member, the rear portion including the curved portion; and a lateral portion connected to a periphery of the rear portion and configured to support the vibration member.

5. The apparatus of claim 4, wherein the curved portion protrudes convexly toward a rear surface of the supporting member from the rear portion.

6. The apparatus of claim 3, wherein the vibration apparatus comprises:

a vibration generator; and a connection member between the curved portion and the vibration generator.

7. The apparatus of claim 6, wherein the vibration generator comprises:

a vibration layer including a piezoelectric material;

a first electrode layer at a first surface of the vibration layer, and a second electrode layer at a second surface different from the first surface of the vibration layer.

8. The apparatus of claim 6, wherein the vibration generator comprises:

a vibration layer including a plurality of inorganic material portions and a plurality of organic material portions between the plurality of inorganic material portions;

a first electrode layer at a first surface of the vibration layer; and a second electrode layer at a second surface different from the first surface of the vibration layer.

9. The apparatus of claim 7, wherein the vibration apparatus further comprises a plate between the curved portion and the connection member.

10. The apparatus of claim 6, further comprising one or more holes at the curved portion.

11. The apparatus of claim 1, wherein a distance between a center portion of the vibration apparatus and the vibration member differs from a distance between a periphery portion of the vibration apparatus and the vibration member.

12. The apparatus of claim 11, wherein the supporting member comprises the curved portion including the curved surface and one or more holes at the curved portion, and wherein the vibration apparatus comprises:

a plate configured to cover the one or more holes;

a vibration generator at a rear surface of the plate; and a connection member between the plate and the vibration generator.

13. The apparatus of claim 12, wherein the plate comprises one or more of metal, plastic, paper, wood, rubber, fiber, cloth, and leather.

14. The apparatus of claim 13, wherein the vibration apparatus further comprises a mass member at a rear surface of the vibration generator.

15. The apparatus of claim 1, wherein the vibration apparatus is disposed between the rear surface of the vibration member and the supporting member.

16. The apparatus of claim 15, wherein the supporting member comprises:

a rear portion at the rear surface of the vibration member;

a protrusion portion protruding toward a rear surface of the rear portion from the rear portion; and a lateral portion connected to a periphery of the rear portion and configured to support the vibration member, wherein the curved portion protrudes convexly toward the rear surface of the vibration member from the protrusion portion, and wherein the vibration apparatus is disposed at the curved portion and faces the rear surface of the vibration member.

17. The apparatus of claim 1, wherein the vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, and a signage panel, or comprises one or more of metal, wood, rubber, plastic, glass, fiber, cloth, paper, mirror, and leather.

18. The apparatus of claim 1, wherein the vibration member comprises:

a display panel including a pixel configured to display an image; and a guide member supported by the supporting member and configured to support a rear periphery portion of the display panel, and wherein the display panel is configured to vibrate based on a vibration of the vibration apparatus to output a sound.

19. The apparatus of claim 18, wherein the display panel is any one of a liquid crystal display panel, a light emitting display panel, an electrophoresis display panel, a micro light emitting diode display panel, an electro-wetting display panel, and a quantum dot light emitting display panel.

20. The apparatus of claim 19, wherein:

the vibration member further comprises a backlight between the display panel and the supporting member, the vibration apparatus is configured to vibrate the backlight, and the display panel is configured to vibrate based on a vibration of the backlight to output a sound.

21. An apparatus, comprising:

a passive vibration member:

a supporting member including a curved portion;

a gap space disposed between a center of the curved portion of the supporting member and a rear surface of the passive vibration member; and a vibration apparatus at the curved portion and configured to vibrate the passive vibration member, wherein the curved portion of the supporting member includes:

a first surface facing the vibration apparatus; and a second surface opposite the first surface, wherein the second surface includes a curved surface, wherein the vibration apparatus is disposed in non-contact with the rear surface of the passive vibration member by the gap space, wherein the curved portion vibrates together with a vibration of the vibration apparatus, and wherein the passive vibration member vibrates based on receiving a sound wave generated in the gap space according to the vibration of the vibration apparatus.

22. The apparatus of claim 21, wherein the vibration apparatus comprises a piezoelectric material.

23. The apparatus of claim 21, wherein the vibration apparatus comprises:

a vibration generator; and a connection member between the curved portion and the vibration generator.

24. The apparatus of claim 23, wherein the vibration generator comprises:

a vibration layer including a piezoelectric material;

a first electrode layer at a first surface of the vibration layer; and a second electrode layer at a second surface different from the first surface of the vibration layer.

25. The apparatus of claim 23, wherein the vibration generator comprises:

a vibration layer including a plurality of inorganic material portions and a plurality of organic material portions between the plurality of inorganic material portions;

a first electrode layer at a first surface of the vibration layer; and a second electrode layer at a second surface different from the first surface of the vibration layer.

26. The apparatus of claim 21, wherein:

the supporting member comprises a base plate, and the curved portion protrudes convexly from the base plate.

27. The apparatus of claim 26, wherein:

the supporting member further comprises one or more holes at the curved portion, and the vibration apparatus is disposed at the curved portion and configured to cover the one or more holes.

28. The apparatus of claim 26, further comprising an enclosure at a rear surface of the base plate and configured to cover the vibration apparatus at the curved portion.

29. The apparatus of claim 21, wherein the supporting member comprises:

a base plate; and a protrusion portion protruding toward a rear surface of the base plate from the base plate, and wherein the curved portion protrudes convexly in a forward direction of the base plate from the protrusion portion.

30. The apparatus of claim 29, wherein:

the supporting member further comprises one or more holes at the curved portion, and the vibration apparatus is disposed at the curved portion and configured to cover the one or more holes.

31. The apparatus of claim 21, wherein the passive vibration member comprises a material comprising one or more of metal, plastic, paper, fiber, wood, rubber, cloth, leather, glass, and mirror.

32. The apparatus of claim 21, wherein the passive vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

33. The apparatus of claim 21, wherein:

the passive vibration member is a vehicle interior material;

the vehicle interior material comprises one or more of a dashboard, a pillar interior material, a roof interior material, a door interior material, a seat interior material, a handle interior material, a floor interior material, a rear package interior material, a rear view mirror, an overhead console, a glove box, and a sun visor; and the vibration apparatus is configured to vibrate at least one or more of the dashboard, the pillar interior material, the roof interior material, the door interior material, the seat interior material, the handle interior material, the floor interior material, the rear package interior material, the rear view mirror, the overhead console, the glove box, and the sun visor.

34. An apparatus, comprising:

a vibration member;

a supporting member at a rear surface of the vibration member and including a plurality of curved portions;

a gap space disposed between a center of each of the plurality of curved portions and the rear surface of the vibration member; and a plurality of vibration apparatus each disposed at a respective curved portion of the supporting member and having a curved shape, wherein each curved portion of the supporting member includes:

a first surface facing a respective vibration apparatus; and a second surface opposite the first surface;

wherein the second surface includes a curved surface, wherein each of the plurality of vibration apparatus is disposed in non-contact with the rear surface of the passive vibration member by the gap space, wherein each of the plurality of curved portions vibrates together with a vibration of a corresponding vibration apparatus of the plurality of vibration apparatus, and wherein the vibration member vibrates based on receiving a sound wave generated in each of the gap space according to the vibration of each of the plurality of vibration apparatus.

35. The apparatus of claim 34, wherein the plurality of curved portions include a first curved portion and a second curved portion, wherein the plurality of vibration apparatus include a first vibration apparatus and a second vibration apparatus, and wherein the first vibration apparatus is attached on the first curved portion, and the second vibration apparatus is attached on the second curved portion.

36. The apparatus of claim 35, wherein the supporting member further includes a rear portion, and wherein the first curved portion and the second curved portion each protrudes from the rear portion to have different curvatures or a same curvature.

37. The apparatus of claim 35, wherein a size of the first curved portion is different from or the same as a size of the second curved portion.

38. The apparatus of claim 35, further comprising one or more holes or slits disposed at one or more of the first curved portion and the second curved portion.

39. The apparatus of claim 36, wherein the supporting member further includes a reinforcement portion at a center portion of the rear portion.

* * * * *